US012682176B2

(12) United States Patent
Galvin

(10) Patent No.: US 12,682,176 B2
(45) Date of Patent: Jul. 14, 2026

(54) SYSTEM AND METHOD FOR REAL-TIME TEAM INTENT MODELING USING PERSISTENT COGNITIVE MACHINES WITH FEDERATED HUMAN PROFILES

(71) Applicant: AtomBeam Technologies Inc., Moraga, CA (US)

(72) Inventor: Brian Galvin, Silverdale, WA (US)

(73) Assignee: ATOMBEAM TECHNOLOGIES INC., Moraga, CA (US)

( * ) Notice: Subject to any disclaimer, the term of this patent is extended or adjusted under 35 U.S.C. 154(b) by 0 days.

(21) Appl. No.: 19/370,640

(22) Filed: Oct. 27, 2025

(65) Prior Publication Data

US 2026/0050745 A1      Feb. 19, 2026

Related U.S. Application Data

(63) Continuation-in-part of application No. 19/352,401, filed on Oct. 7, 2025, which is a continuation-in-part
(Continued)

(51) Int. Cl.
| | |
|---|---|
| *G06F 40/30* | (2020.01) |
| *G06F 16/332* | (2019.01) |
| *G06F 16/3329* | (2025.01) |

(52) U.S. Cl.
CPC .......... *G06F 40/30* (2020.01); *G06F 16/3325* (2019.01); *G06F 16/3329* (2019.01)

(58) Field of Classification Search
CPC ... G06F 40/30; G06F 16/3329; G06F 16/3325
See application file for complete search history.

(56) References Cited

U.S. PATENT DOCUMENTS

| | | |
|---|---|---|
| 4,780,718 A | 10/1988 | Hudson et al. |
| 5,708,436 A | 1/1998 | Loiz et al. |
| (Continued) | | |

FOREIGN PATENT DOCUMENTS

| | | |
|---|---|---|
| EP | 3364212 A1 | 8/2018 |
| GB | 2620921 A | 1/2024 |
| WO | 2020104416 A1 | 5/2020 |

OTHER PUBLICATIONS

Balaneshin-Kordan, Saeid et al; "Deep Neural Architecture for Multi-Modal Retrieval based on Joint Embedding Space for Text and Images", Association for Computing Machinery, Feb. 5-9, 2018, pp. 1-9, Marina Del Rey, CA, USA.
(Continued)

*Primary Examiner* — Richemond Dorvil
*Assistant Examiner* — Ethan Daniel Kim
(74) *Attorney, Agent, or Firm* — GALVIN PATENT LAW LLC; Brian R. Galvin

(57) ABSTRACT

A system and method for real-time team intent modeling using persistent cognitive machines with federated human profiles which processes individual team member behavioral signals through geometric intent analyzers that generate high-dimensional vector representations of individual objectives and preferences. A team intent orchestrator aggregates individual vectors into collective representations within a dynamic geometric manifold that evolves based on team coordination patterns. Federated human profiles enable privacy-preserving knowledge sharing across teams through geometric abstraction techniques that preserve coordination utility while protecting individual privacy. The system implements proactive conflict detection through trajectory analysis that identifies potential coordination issues before performance impact, and provides real-time synchronization mechanisms that maintain team coordination coherence despite individual behavioral changes. Cross-team learning
(Continued)

capabilities enable organizational intelligence development through pattern abstraction and context-aware adaptation of successful coordination strategies. The persistent cognitive architecture maintains coordination patterns across sessions and team composition changes, enabling continuous improvement through accumulated team experience.

17 Claims, 35 Drawing Sheets

Related U.S. Application Data of application No. 19/339,302, filed on Sep. 25, 2025, now Pat. No. 12,626,167, said application No. 19/329,533 is a continuation-in-part of application No. 19/329,369, filed on Sep. 15, 2025, said application No. 19/352,401 is a continuation-in-part of application No. 19/329,533, filed on Sep. 15, 2025, said application No. 19/329,369 is a continuation-in-part of application No. 19/328,199, filed on Sep. 14, 2025, which is a continuation-in-part of application No. 19/328,179, filed on Sep. 14, 2025, and a continuation-in-part of application No. 19/328,103, filed on Sep. 13, 2025, said application No. 19/328,179 is a continuation-in-part of application No. 19/326,730, filed on Sep. 12, 2025, now Pat. No. 12,608,555, application No. 19/370,640 is a continuation-in-part of application No. 19/328,094, filed on Sep. 12, 2025, now Pat. No. 12,632,663, said application No. 19/328,103 is a continuation-in-part of application No. 19/326,730, filed on Sep. 12, 2025, now Pat. No. 12,608,555, said application No. 19/328,094 is a continuation-in-part of application No. 19/321,173, filed on Sep. 6, 2025, now Pat. No. 12,602,549, said application No. 19/326,730 is a continuation-in-part of application No. 19/321,173, filed on Sep. 6, 2025, now Pat. No. 12,602,549, said application No. 19/339,302 is a continuation-in-part of application No. 19/294,125, filed on Aug. 7, 2025, now Pat. No. 12,579,437, said application No. 19/321,173 is a continuation-in-part of application No. 19/284,115, filed on Jul. 29, 2025, said application No. 19/326,730 is a continuation-in-part of application No. 19/245,366, filed on Jun. 22, 2025, now Pat. No. 12,418,680, said application No. 19/294,125 is a continuation-in-part of application No. 19/203,069, filed on Jun. 3, 2025, now Pat. No. 12,481,688, which is a continuation-in-part of application No. 19/205,960, filed on May 12, 2025, said application No. 19/326,730 is a continuation-in-part of application No. 19/204,525, filed on May 10, 2025, which is a continuation-in-part of application No. 19/192,215, filed on Apr. 28, 2025, said application No. 19/294,125 is a continuation-in-part of application No. 19/178,873, filed on Apr. 15, 2025, now Pat. No. 12,608,631, which is a continuation-in-part of application No. 19/177,611, filed on Apr. 13, 2025, now Pat. No. 12,572,471, said application No. 19/205,960 is a continuation-in-part of application No. 19/060,794, filed on Feb. 24, 2025, said application No. 19/177,611 is a continuation-in-part of application No. 19/051,193, filed on Feb. 12, 2025, now Pat. No. 12,387,050, said application No. 19/284,115 is a continuation of application No. 19/051,193, filed on Feb. 12, 2025, now Pat. No. 12,387,050, said application No. 19/060,794 is a continuation-in-part of application No. 19/044,546, filed on Feb. 3, 2025, which is a continuation-in-part of application No. 19/026,276, filed on Jan. 16, 2025, said application No. 19/192,215 is a continuation-in-part of application No. 18/972,797, filed on Dec. 6, 2024, now Pat. No. 12,294,392, said application No. 19/026,276 is a continuation-in-part of application No. 18/928,022, filed on Oct. 26, 2024, said application No. 18/919,417 is a continuation-in-part of application No. 18/918,077, filed on Oct. 17, 2024, said application No. 18/928,022 is a continuation-in-part of application No. 18/919,417, filed on Oct. 17, 2024, now Pat. No. 12,602,586, said application No. 18/918,077 is a continuation-in-part of application No. 18/737,906, filed on Jun. 7, 2024, and a continuation-in-part of application No. 18/736,498, filed on Jun. 6, 2024, said application No. 18/972,797 is a continuation-in-part of application No. 18/648,340, filed on Apr. 27, 2024, now Pat. No. 12,166,507, which is a continuation-in-part of application No. 18/427,716, filed on Jan. 30, 2024, now Pat. No. 12,093,972, which is a continuation-in-part of application No. 18/410,980, filed on Jan. 11, 2024, now Pat. No. 12,068,761, which is a continuation-in-part of application No. 18/537,728, filed on Dec. 12, 2023, now Pat. No. 12,058,333.

(60) Provisional application No. 63/848,101, filed on Jul. 21, 2025, provisional application No. 63/847,889, filed on Jul. 21, 2025, provisional application No. 63/848,202, filed on Jul. 21, 2025, provisional application No. 63/847,408, filed on Jul. 20, 2025, provisional application No. 63/847,091, filed on Jul. 19, 2025, provisional application No. 63/847,101, filed on Jul. 19, 2025, provisional application No. 63/847,082, filed on Jul. 19, 2025, provisional application No. 63/847,096, filed on Jul. 19, 2025, provisional application No. 63/651,359, filed on May 23, 2024.

(56) References Cited

U.S. PATENT DOCUMENTS

| | | | |
|---|---|---|---|
| 7,411,540 B1 | 8/2008 | Lopez et al. | |
| 7,629,922 B2 | 12/2009 | Winstead et al. | |
| 7,876,257 B2 | 1/2011 | Vetro et al. | |
| 9,524,392 B2 | 12/2016 | Naehrig et al. | |
| 10,489,393 B1 * | 11/2019 | Mittal | G06F 16/2455 |
| 10,878,808 B1 * | 12/2020 | Mathias | G06F 40/30 |
| 11,132,994 B1 * | 9/2021 | Zhou | G06F 40/30 |
| 11,451,242 B2 | 9/2022 | Choi et al. | |
| 11,656,353 B2 | 5/2023 | Li et al. | |
| 2004/0017307 A1 | 1/2004 | Cirillo et al. | |
| 2004/0160353 A1 | 8/2004 | Cirillo et al. | |
| 2008/0231504 A1 | 9/2008 | Sartor et al. | |
| 2011/0012778 A1 | 1/2011 | Nguyen et al. | |
| 2015/0054678 A1 | 2/2015 | Wakayama | |
| 2017/0048537 A1 | 2/2017 | Boufounos et al. | |
| 2018/0196609 A1 | 7/2018 | Niesen | |
| 2020/0258296 A1 | 8/2020 | Pennings et al. | |
| 2022/0156631 A1 | 5/2022 | Kanso et al. | |
| 2022/0404490 A1 | 12/2022 | Evans et al. | |
| 2023/0131694 A1 | 4/2023 | Saber et al. | |
| 2023/0169623 A1 | 6/2023 | Chen et al. | |
| 2023/0184927 A1 | 6/2023 | Chen et al. | |

(56) References Cited

U.S. PATENT DOCUMENTS

2024/0185037 A1    6/2024  Park et al.
2024/0195438 A1    6/2024  Isik et al.

OTHER PUBLICATIONS

Gim, In, et al; "Prompt Cache: Modular Attention Reuse for Low-Latency Inference", arXiv:2311.04934v2, Apr. 2024.

Khan, Abdul Rafae, et al; "Coding Textual Inputs Boosts the Accuracy of Neural Networks", 2020 Conference on Empirical Methods in Natural Language Processing, Nov. 16-20, 2020, pp. 1350-1360.

Messina, Nicola et al; "Towards Efficient Cross-Modal Visual Textual Retrieval using Transformer-Encoder Deep Features", 2021 International Conference on Content-Based Multimedia Indexing, 2021, pp. 1-6, United States.

Seo, Beomsoek et al; "How Does A Transformer Learn Compression? An Attention Study on Huffman and LZ4", Department of Electronic and Electrical Engineering, Dec. 12, 2023, vol. 11, Seoul, South Korea.

Vaswani, Ashish, et al; "Attention is All You Need", arXiv:1706.03762v7, Aug. 2023.

Wang, Tianming, & Wan, Xiaojun; "T-CVAE: Transformer-based conditioned variational autoencoder for story completion", Proceedings of the Twenty-Eighth Joint Conference on Artificial Intelligence, pp. 5233-5239, 2019.

Wieting, John et al; "A Bilingual Generative Transformer for Semantic Sentence Embedding", arXiv:1911.03895v2, Nov. 2020.

* cited by examiner

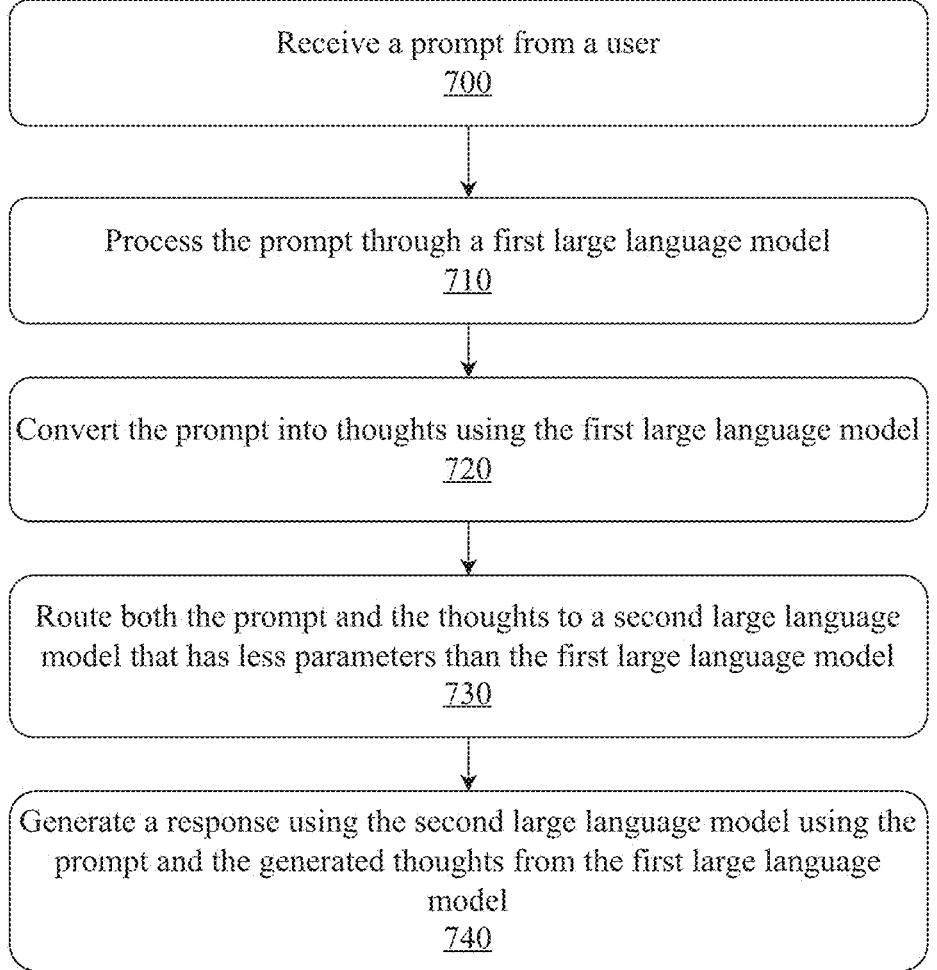

Receive a prompt from a user
700

Process the prompt through a first large language model
710

Convert the prompt into thoughts using the first large language model
720

Route both the prompt and the thoughts to a second large language model that has less parameters than the first large language model
730

Generate a response using the second large language model using the prompt and the generated thoughts from the first large language model
740

FIG. 7

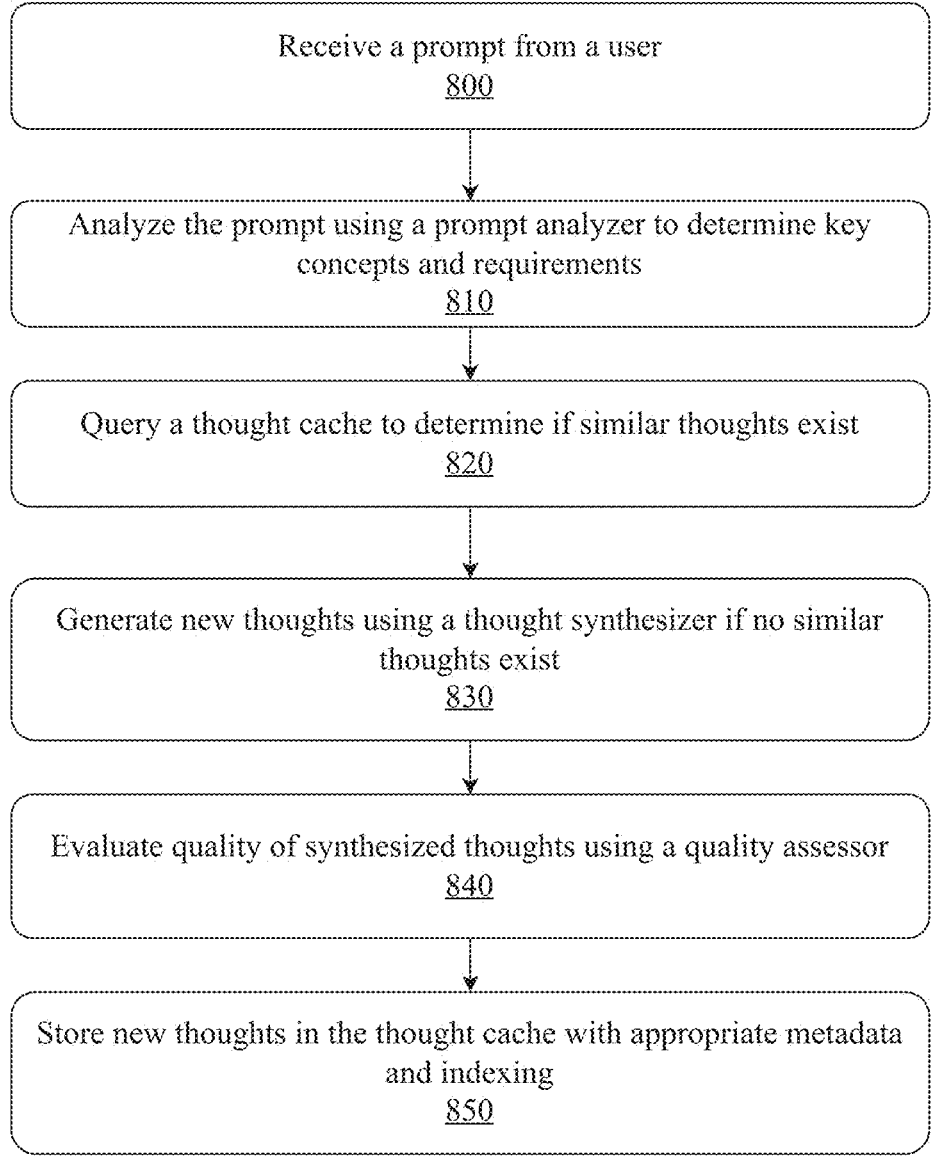

Receive a prompt from a user
800

Analyze the prompt using a prompt analyzer to determine key concepts and requirements
810

Query a thought cache to determine if similar thoughts exist
820

Generate new thoughts using a thought synthesizer if no similar thoughts exist
830

Evaluate quality of synthesized thoughts using a quality assessor
840

Store new thoughts in the thought cache with appropriate metadata and indexing
850

FIG. 8

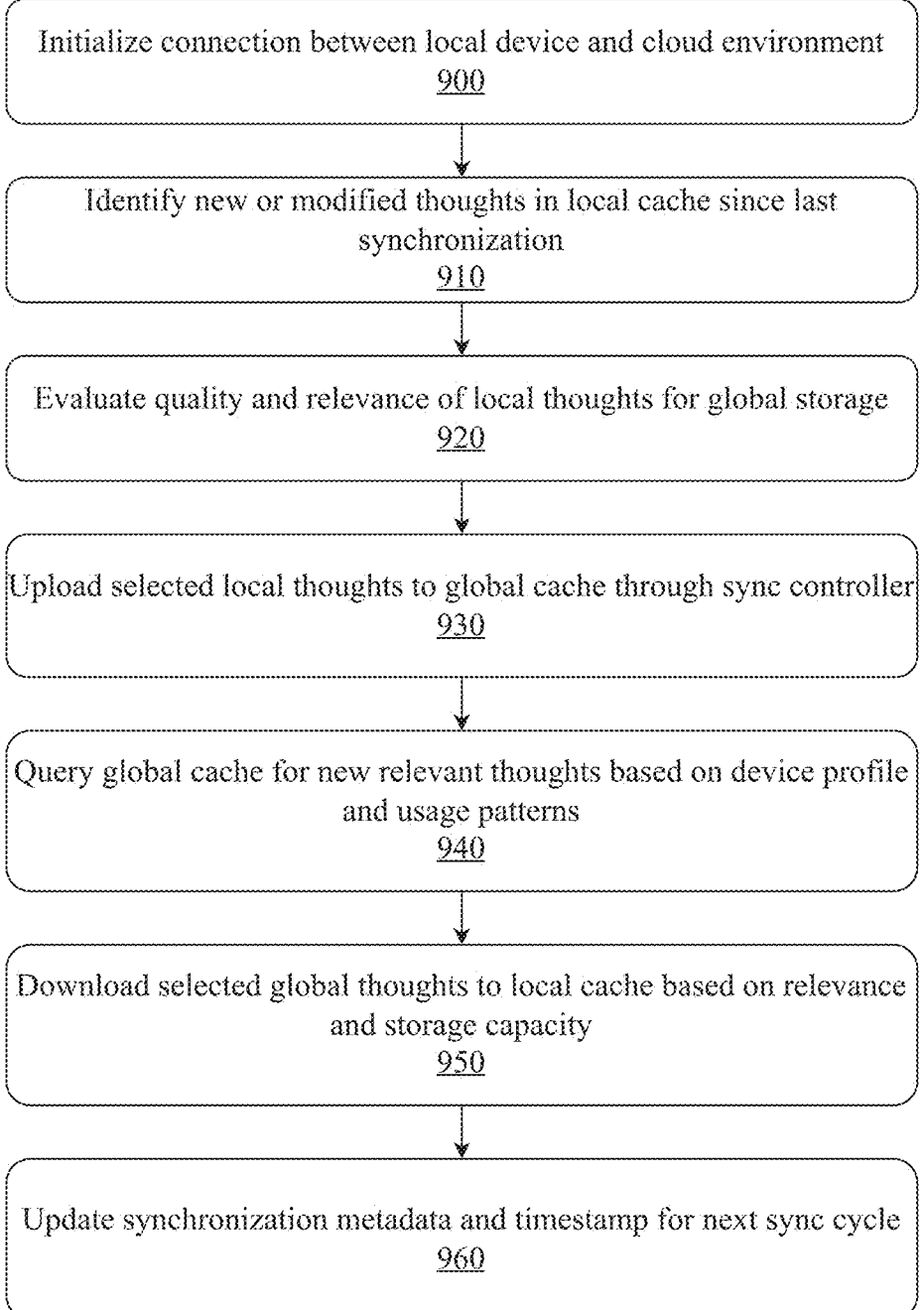

Initialize connection between local device and cloud environment
900

Identify new or modified thoughts in local cache since last synchronization
910

Evaluate quality and relevance of local thoughts for global storage
920

Upload selected local thoughts to global cache through sync controller
930

Query global cache for new relevant thoughts based on device profile and usage patterns
940

Download selected global thoughts to local cache based on relevance and storage capacity
950

Update synchronization metadata and timestamp for next sync cycle
960

FIG. 9

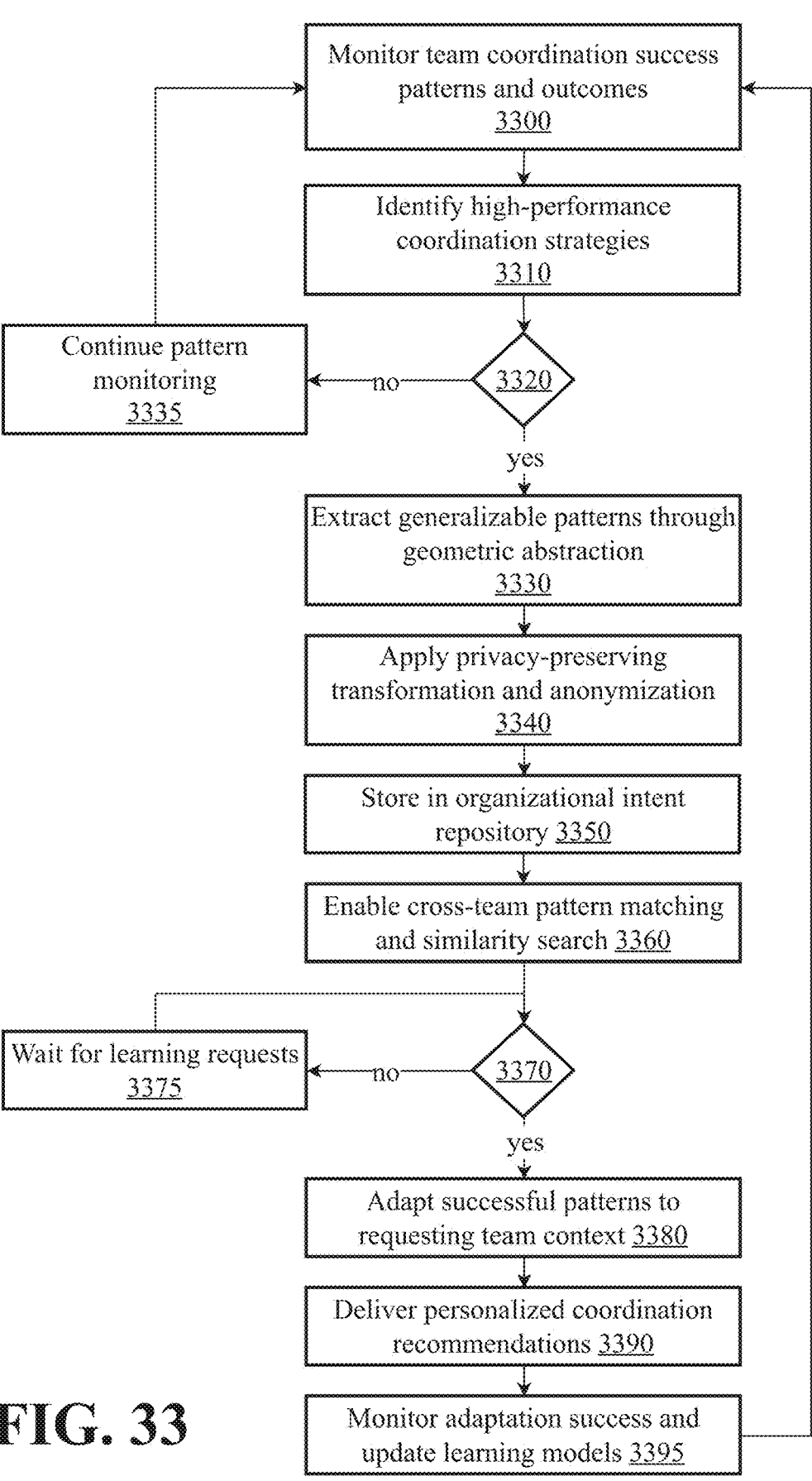

Monitor team coordination success patterns and outcomes
3300

Identify high-performance coordination strategies
3310

3320 no → Continue pattern monitoring 3335 yes

Extract generalizable patterns through geometric abstraction
3330

Apply privacy-preserving transformation and anonymization
3340

Store in organizational intent repository 3350

Enable cross-team pattern matching and similarity search 3360

3370 no → Wait for learning requests 3375 yes

Adapt successful patterns to requesting team context 3380

Deliver personalized coordination recommendations 3390

Monitor adaptation success and update learning models 3395

FIG. 33

SYSTEM AND METHOD FOR REAL-TIME TEAM INTENT MODELING USING PERSISTENT COGNITIVE MACHINES WITH FEDERATED HUMAN PROFILES

CROSS-REFERENCE TO RELATED APPLICATIONS

Priority is claimed in the application data sheet to the following patents or patent applications, each of which is expressly incorporated herein by reference in its entirety:
Ser. No. 19/352,401
Ser. No. 19/339,302
Ser. No. 19/294,125
Ser. No. 19/203,069
Ser. No. 19/205,960
Ser. No. 19/060,794
Ser. No. 19/044,546
Ser. No. 19/026,276
Ser. No. 18/928,022
Ser. No. 18/919,417
Ser. No. 19/918,077
Ser. No. 18/737,906
Ser. No. 18/736,498
63/651,359
Ser. No. 19/178,873
Ser. No. 19/177,611
Ser. No. 19/051,193
63/847,408
Ser. No. 19/329,533
Ser. No. 19/329,369
Ser. No. 19/328,199
Ser. No. 19/328,179
Ser. No. 19/326,730
Ser. No. 19/321,173
Ser. No. 19/284,115
63/847,082
63/847,091
63/847,101
63/847,889
Ser. No. 19/245,366
Ser. No. 19/204,525
Ser. No. 19/192,215
Ser. No. 18/972,797
Ser. No. 18/648,340
Ser. No. 18/427,716
Ser. No. 18/410,980
Ser. No. 18/537,728
Ser. No. 19/328,103
63/848,101
63/848,202
Ser. No. 19/328,094

BACKGROUND OF THE INVENTION

Field of the Invention

The present invention relates to artificial intelligence systems for human-machine dialogue, specifically systems and methods for maintaining personalized conversation continuity through latent contextual threading implemented via geometric manifold traversal and bidirectional adaptation mechanisms.

Discussion of the State of the Art

Current artificial intelligence dialogue systems face significant limitations in maintaining conversation continuity and personalization across extended interactions. Traditional systems rely on context windows that provide only limited historical awareness, typically constrained to recent exchanges within a single session. When context windows exceed capacity, older conversation elements are discarded, leading to loss of important contextual information and degraded dialogue coherence.

Existing approaches to dialogue personalization typically employ retrieval-augmented generation techniques that store and retrieve conversational snippets or user preference profiles as discrete data objects. These systems lack the ability to maintain nuanced, evolving representations of user communication patterns and preferences. While some systems implement user modeling through preference vectors or profile databases, these approaches fail to capture the complex, dynamic nature of human communication preferences that evolve through interaction.

Contemporary dialogue systems also struggle with cross-session continuity. Most implementations treat each conversation session as an independent interaction, requiring users to re-establish context and preferences with each new session. Although some systems attempt to address this through conversation history storage, they typically rely on simple concatenation or keyword matching rather than sophisticated contextual understanding.

Recent developments in large language models have introduced limited forms of contextual memory through techniques such as attention mechanisms and transformer architectures. However, these approaches remain fundamentally constrained by computational limitations and lack the ability to maintain personalized, persistent representations that adapt and evolve based on user interactions. Existing memory mechanisms in language models are typically static during inference and cannot dynamically adapt to user-specific communication patterns.

Current systems also lack sophisticated mechanisms for evaluating dialogue coherence and quality across temporal boundaries. Traditional metrics focus on immediate response quality rather than long-term conversational consistency and user satisfaction. This limitation prevents systems from optimizing their behavior based on extended interaction patterns and user engagement over time.

What is needed is a system that enables real-time team intent modeling through geometric representations while preserving individual privacy through federated human profile architectures. This system should implement persistent cognitive substrates that maintain team coordination patterns, provide proactive conflict detection before performance impacts occur, and support cross-team learning without compromising privacy. The system should utilize geometric manifold representations for evolving coordination patterns, real-time intent synchronization across team members, and predictive coordination capabilities that anticipate needs and suggest optimal strategies while maintaining mathematical consistency and scalable deployment across diverse organizational structures.

SUMMARY OF THE INVENTION

The inventor has developed a system and method for real-time team intent modeling using persistent cognitive machines with federated human profiles which processes individual team member behavioral signals through geometric intent analyzers that generate high-dimensional vector representations of individual objectives and preferences. A team intent orchestrator aggregates individual vectors into collective representations within a dynamic geometric manifold that evolves based on team coordination patterns. Federated human profiles enable privacy-preserving knowledge sharing across teams through geometric abstraction techniques that preserve coordination utility while protecting individual privacy. The system implements proactive conflict detection through trajectory analysis that identifies potential coordination issues before performance impact, and provides real-time synchronization mechanisms that maintain team coordination coherence despite individual behavioral changes. Cross-team learning capabilities enable organizational intelligence development through pattern abstraction and context-aware adaptation of successful coordination strategies. The persistent cognitive architecture maintains coordination patterns across sessions and team composition changes, enabling continuous improvement through accumulated team experience.

According to a preferred embodiment, a computer system for geometric intent processing is disclosed, comprising a hardware memory and one or more processors, wherein the computer system is configured to execute software instructions stored on nontransitory machine-readable storage media that: receive a plurality of multi-modal behavioral input signals from individual users and transform the behavioral input signals into high-dimensional geometric intent vectors through mathematical encoding algorithms that map semantic relationships to coordinate positions within a latent vector space; implement geometric manifold operations including computing geodesic distances between intent vectors using Riemannian metric tensor calculations and determining curvature properties that quantify semantic density distributions across the latent vector space; execute real-time geometric aggregation algorithms that combine individual intent vectors through weighted centroid calculations and manifold-aware interpolation operations while preserving geometric consistency constraints; apply differential privacy transformations to geometric representations through calibrated noise injection while maintaining coordination utility through dimensional reduction algorithms that preserve essential semantic relationships; generate predictive trajectory calculations by solving geodesic equations through numerical integration schemes to forecast intent evolution patterns and identify geometric divergence conditions indicating potential coordination conflicts; and update geometric manifold structure through controlled geometric flow processes that modify local curvature properties based on coordination effectiveness metrics while maintaining mathematical stability through constraint satisfaction algorithms; wherein the geometric processing operations enable computational performance improvements through continuous manifold traversal rather than iterative database queries.

According to another preferred embodiment, a method for geometric intent processing is disclosed, comprising: receiving a plurality of multi-modal behavioral input signals from individual users and transforming the behavioral input signals into high-dimensional geometric intent vectors through mathematical encoding algorithms that map semantic relationships to coordinate positions within a latent vector space; implementing geometric manifold operations including computing geodesic distances between intent vectors using Riemannian metric tensor calculations and determining curvature properties that quantify semantic density distributions across the latent vector space; executing real-time geometric aggregation algorithms that combine individual intent vectors through weighted centroid calculations and manifold-aware interpolation operations while preserving geometric consistency constraints; applying differential privacy transformations to geometric representations through calibrated noise injection while maintaining coordination utility through dimensional reduction algorithms that preserve essential semantic relationships; generating predictive trajectory calculations by solving geodesic equations through numerical integration schemes to forecast intent evolution patterns and identify geometric divergence conditions indicating potential coordination conflicts; and updating geometric manifold structure through controlled geometric flow processes that modify local curvature properties based on coordination effectiveness metrics while maintaining mathematical stability through constraint satisfaction algorithms; wherein the geometric processing operations enable computational performance improvements through continuous manifold traversal rather than iterative database queries.

According to a further aspect, the method includes high-dimensional geometric intent vectors comprising coordinate representations in Riemannian manifold space with time-evolving metric tensors that encode behavioral pattern strength through local curvature variations.

According to a further aspect, the method includes mathematical encoding algorithms comprising multi-modal signal processing that extracts semantic features from textual communications, temporal behavioral patterns, and contextual information through natural language processing and pattern recognition techniques.

According to a further aspect, the method includes geometric aggregation algorithms implementing federated learning coordination that enables collective intelligence processing without exposing individual behavioral data through privacy-preserving geometric abstraction operations.

According to a further aspect, the method includes differential privacy transformations comprising k-anonymity techniques and coordinate system rotation operations that prevent individual identification while preserving geometric relationships necessary for coordination analysis.

According to a further aspect, the method includes predictive trajectory calculations comprising Jacobi field computations that solve geodesic deviation equations to quantify intent trajectory stability and forecast coordination conflict likelihood.

According to a further aspect, the method includes geometric flow processes implementing Ricci flow algorithms that evolve metric tensor properties according to curvature-driven differential equations while preserving manifold topology.

According to a further aspect, the method includes maintaining persistent geometric state across session boundaries through manifold geometry serialization and coordinate position restoration algorithms.

According to a further aspect, the method includes generating coordination recommendations through geometric similarity calculations and pattern matching algorithms that identify optimal coordination strategies based on manifold trajectory analysis.

According to a further aspect, the method includes geometric manifold operations comprising attractor basin creation algorithms that establish stable coordination patterns as persistent geometric structures with curvature properties that guide future intent evolution toward effective coordination states.

BRIEF DESCRIPTION OF THE DRAWING FIGURES

The accompanying drawings illustrate several aspects and, together with the description, serve to explain the principles of the invention according to the aspects. It will be appreciated by one skilled in the art that the particular arrangements illustrated in the drawings are merely exemplary, and are not to be considered as limiting of the scope of the invention or the claims herein in any way.

FIG. 7 is a flow diagram illustrating an exemplary method for natural language processing using a dual-model approach with thought generation.

FIG. 8 is a flow diagram illustrating an exemplary method for thought creation, evaluation, and storage within the system.

FIG. 9 is a flow diagram illustrating an exemplary method for synchronizing thought caches between local devices and a global cloud environment.

FIG. 33 is a flow diagram illustrating an exemplary method for cross-team learning and generalization, according to an embodiment.

DETAILED DESCRIPTION OF THE INVENTION

Figure 1:
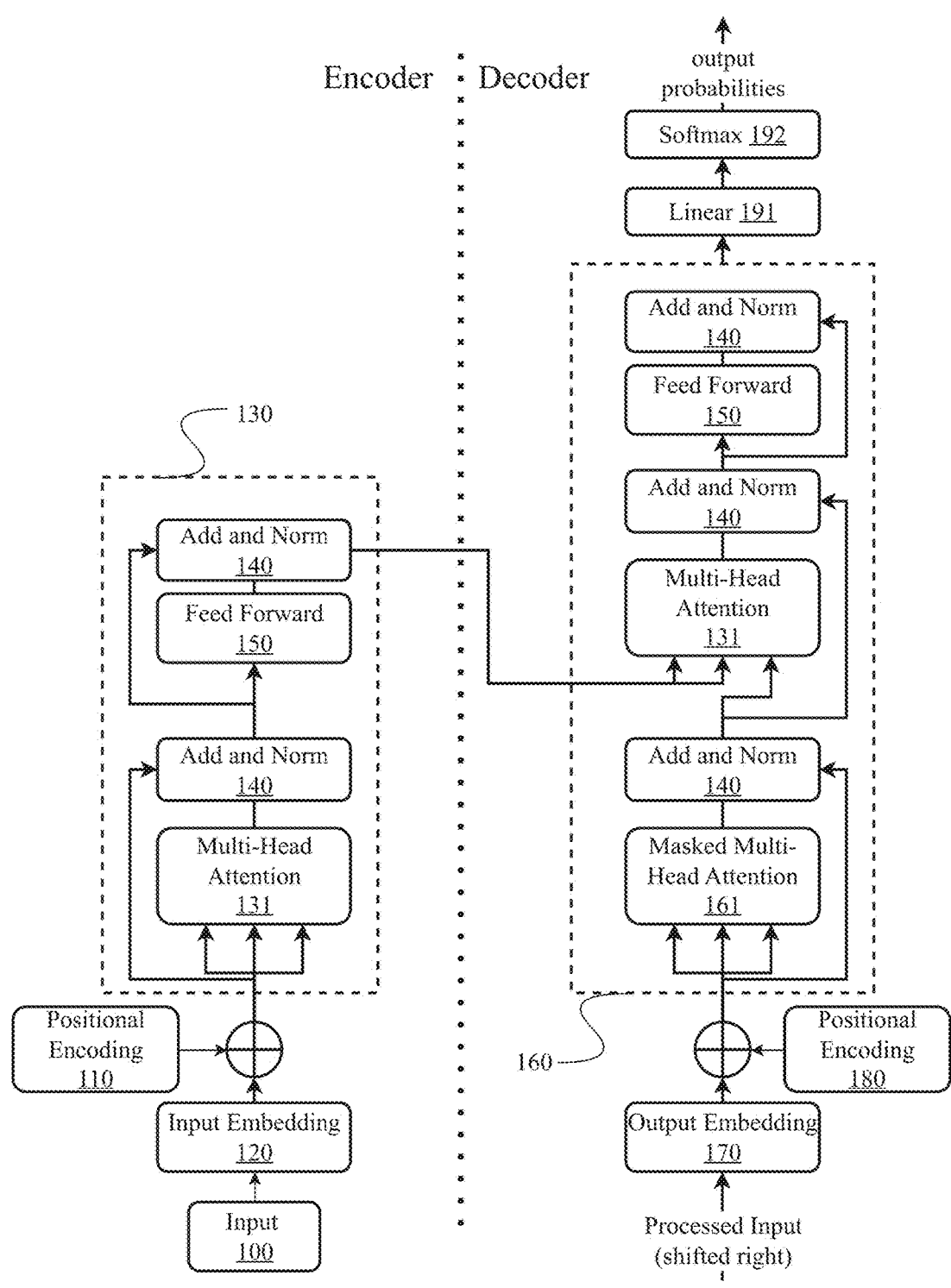
FIG. 1 (Prior Art) is a block diagram illustrating a common transformer architecture used in most large language models.

The inventor has conceived, and reduced to practice, a system and method for real-time team intent modeling using persistent cognitive machines with federated human profiles which processes individual team member behavioral signals through geometric intent analyzers that generate high-dimensional vector representations of individual objectives and preferences. A team intent orchestrator aggregates individual vectors into collective representations within a dynamic geometric manifold that evolves based on team coordination patterns. Federated human profiles enable privacy-preserving knowledge sharing across teams through geometric abstraction techniques that preserve coordination utility while protecting individual privacy. The system implements proactive conflict detection through trajectory analysis that identifies potential coordination issues before performance impact, and provides real-time synchronization mechanisms that maintain team coordination coherence despite individual behavioral changes. Cross-team learning capabilities enable organizational intelligence development through pattern abstraction and context-aware adaptation of successful coordination strategies. The persistent cognitive architecture maintains coordination patterns across sessions and team composition changes, enabling continuous improvement through accumulated team experience.

The multi-tier thought caching architecture consists of a local device cache that stores both user-specific thoughts and frequently accessed generalized thoughts, a user-specific cloud cache that preserves the user's complete thought history with appropriate encryption, and a global generalized thought cache that maintains abstracted reasoning patterns applicable across multiple users. This tiered approach balances the need for personalized, private thought storage with the efficiency benefits of shared reasoning patterns, while ensuring that mobile devices can operate regardless of connectivity status.

Through thought generalization techniques, the system identifies common reasoning patterns across multiple users, removes personally identifiable information and specific context, and abstracts these patterns into generalized thought structures that can be shared without compromising privacy. This generalization process involves pattern recognition to identify similar reasoning approaches, context removal techniques that strip away user-specific elements, and abstraction methods that transform specific thoughts into more universally applicable structures. By sharing these generalized thoughts across users, the system achieves efficiency improvements without requiring each user to independently generate similar reasoning patterns.

The system's mobile-specific optimizations address the constraints of mobile environments, including limited computational resources, battery constraints, and intermittent connectivity. Battery-aware execution scaling adjusts the complexity and resource utilization of language model components based on the device's current power state, implementing multiple execution profiles ranging from high-performance operation when charging to efficient processing when battery levels are low. Incremental thought synchronization optimizes network usage by prioritizing the transfer of high-value thoughts during brief connectivity periods, while predictive thought pre-caching anticipates user needs based on usage patterns and contextual cues, ensuring relevant thoughts are available locally even when connectivity is lost.

To enable extended context while managing the resource constraints of mobile devices, the system implements hierarchical thought management that organizes cached thoughts at different levels of abstraction. Rather than maintaining all historical context as raw tokens, the system progressively compresses older information into more abstract thought representations, preserving essential reasoning patterns and knowledge while reducing storage and processing requirements. This hierarchical approach comprises immediate context level for recent interactions, session context level for the current interaction session, historical context level for previous sessions, and generalized knowledge level for broadly applicable patterns. As information ages or becomes less immediately relevant, it transitions through these levels via context compression processes, while remaining accessible through context expansion when needed for current reasoning tasks.

The system's approach to offline functionality represents an advancement for mobile applications. When network connectivity is unavailable and no directly relevant thoughts exist in the local cache, the system employs adaptation strategies to modify existing cached thoughts to address new prompts. These strategies include generalizing specific thoughts to broader applications, combining multiple partially relevant thoughts to address complex queries, applying thought patterns from one domain to related domains through analogical reasoning, and transforming existing thoughts through modification of context, parameters, or application scope. These adaptation capabilities ensure that users receive responses even without network access, maintaining functionality during offline periods.

This architecture integrates with mobile device capabilities, incorporating contextual awareness through sensor data, supporting voice and visual input modalities, and adapting to the user's environment and activities. Privacy and security considerations are addressed through a hierarchical access control mechanism that maintains separation between personal thoughts in user-specific caches and anonymized thoughts in the global cache, with encryption for user-specific data both on-device and in the cloud.

Through these methods, the system combines the reasoning power of large language models with the efficiency requirements of mobile computing, delivering natural language processing capabilities with reduced computational overhead, offline operation, and optimized battery utilization. This approach enables deployment of advanced language model capabilities in resource-constrained mobile environments without sacrificing the quality of responses, representing an advancement in making language technologies accessible across a broader range of devices and usage scenarios.

One or more different aspects may be described in the present application. Further, for one or more of the aspects described herein, numerous alternative arrangements may be described; it should be appreciated that these are presented for illustrative purposes only and are not limiting of the aspects contained herein or the claims presented herein in any way. One or more of the arrangements may be widely applicable to numerous aspects, as may be readily apparent from the disclosure. In general, arrangements are described in sufficient detail to enable those skilled in the art to practice one or more of the aspects, and it should be appreciated that other arrangements may be utilized and that structural, logical, software, electrical and other changes may be made without departing from the scope of the particular aspects. Particular features of one or more of the aspects described herein may be described with reference to one or more particular aspects or figures that form a part of the present disclosure, and in which are shown, by way of illustration, specific arrangements of one or more of the aspects. It should be appreciated, however, that such features are not limited to usage in the one or more particular aspects or figures with reference to which they are described. The present disclosure is neither a literal description of all arrangements of one or more of the aspects nor a listing of features of one or more of the aspects that must be present in all arrangements.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an aspect with several components in communication with each other does not imply that all such components are required. To the contrary, a variety of optional components may be described to illustrate a wide variety of possible aspects and in order to more fully illustrate one or more aspects. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the aspects, and does not imply that the illustrated process is preferred. Also, steps are generally described once per aspect, but this does not mean they must occur once, or that they may only occur once each time a process, method, or algorithm is carried out or executed. Some steps may be omitted in some aspects or some occurrences, or some steps may be executed more than once in a given aspect or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other aspects need not include the device itself.

Techniques and mechanisms described or referenced herein will sometimes be described in singular form for clarity. However, it should be appreciated that particular aspects may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of various aspects in which, for example, functions may be executed out of order from that shown or discussed, including substantially concurrently or in reverse order, depending on the functionality involved, as would be understood by those having ordinary skill in the art.

Definitions

As used herein, "thought" refers to a discrete unit of reasoning or analysis generated by a large language model during its processing of an input prompt. A thought represents the model's intermediate reasoning steps, analysis, or considerations about the prompt before generating a final response. Thoughts are generated during a reasoning phase of the model's operation and contain the model's understanding, context analysis, and logical processing of the prompt. Unlike raw text or embeddings, thoughts encapsulate the model's processed reasoning in a form that can be cached, retrieved, and reused for similar prompts. Thoughts may be explicitly visible in model outputs or may be internally generated, and can be stored in various cache architectures including local and cloud-based systems. These cached thoughts can be combined with new prompts to generate responses using smaller language models, effectively preserving the reasoning capabilities of larger models while reducing computational overhead.

As used herein, "context" refers to both traditional sequence-based context where a language model processes a series of tokens representing prior interactions or information, and thought-based context where the model processes higher-level abstractions in the form of thought sequences. Traditional context operates at the token level, maintaining a history of specific words, phrases, and their relationships through mechanisms like attention windows. In contrast, thought-based context operates at a higher level of abstraction, where each thought represents a complex unit of reasoning or understanding. This dual nature of context allows the system to maintain contextual awareness both through detailed token-level information and through more abstract thought-level representations, enabling efficient processing of complex interactions while reducing the computational overhead typically associated with maintaining long token sequences. Thought-based context can compress what would traditionally require thousands of tokens into a smaller number of thought units, each capturing key reasoning patterns and conceptual relationships relevant to the interaction.

Two Stage LLM with Infinite Context System Architecture

FIG. 1 (Prior Art) is a block diagram illustrating a common transformer architecture used in most large language models. A transformer generally comprises an encoder (the components on the left side of the illustration) and a decoder (the components on the right side of the illustration).

The illustrated transformer comprises an encoder and a decoder. The encoder takes input embeddings and processes them through a stack of layers (represented as dashed box 130). Each layer consists of: positional encoding, which adds position information to the input embeddings; multi-head attention, which allows the model to attend to different parts of the input sequence; add and norm, which applies residual connection and layer normalization; feed forward, which is a fully connected feed-forward network; and add and norm which is another residual connection and layer normalization.

The power of the transformer model lies in the self-attention mechanism. This mechanism contributes to accelerated learning compared to traditional models such as long short-term memory models. Self-attention empowers the transformer model with the remarkable capability to meticulously scrutinize distinct segments of a given sequence or even encompass the entire contextual essence of a sentence. This profound contextual awareness enables the model to make predictions with an elevated degree of accuracy and relevance.

The transformer takes a processed vector as its input 100. The input embedding 120 to the encoder is a sequence of tokens, typically represented as integers. Each token is mapped to a learnable embedding vector of a fixed size. The embedding layer is a lookup table that converts each token into its corresponding dense vector representation. The embeddings are learned during training and capture semantic and syntactic relationships between tokens.

A dense vector representation, also known as a dense embedding or a continuous vector representation, is a way of representing data, particularly words or tokens, as dense vectors in a high-dimensional continuous space. In the context of natural language processing (NLP) and language models, dense vector representations are used to capture semantic and syntactic information about words or tokens. Each word or token is mapped to a fixed-size vector of real numbers, typically with hundreds or thousands of dimensions. Each word or token is represented by a vector of a fixed size, regardless of the length of the input sequence. The size of the vector is a hyperparameter that is determined during model design. The vectors exist in a continuous high-dimensional space, where each dimension represents a latent feature or aspect of the word or token. The continuous nature allows for capturing fine-grained relationships and similarities between words. The dense vector representations are learned during the training process of the model. The model learns to assign similar vectors to words that have similar meanings or occur in similar contexts. The dense vector representations aim to capture semantic and syntactic relationships between words. Words that have similar meanings or are used in similar contexts tend to have similar vector representations. Dense vector representations allow for performing algebraic operations on words, such as addition and subtraction. These operations can capture analogies and relationships between words, such as "prince"–"man"+"woman"≈"princess". Dense vector representations serve as input features for various downstream NLP tasks, such as text classification, sentiment analysis, named entity recognition, and machine translation. The dense representations provide a rich and informative input to the models, enabling them to learn patterns and make predictions. Some popular examples of dense vector representations include, but are not limited to, Word2Vec, Global Vectors for Word Representations (GloVe), FastText, and BERT.

After the input embedding layer, positional encoding 110 is added to the input embedding to provide position information to the model. Since the Transformer architecture doesn't have inherent recurrence or convolution, positional encodings help capture the order and relative positions of tokens. The positional encodings are typically sine and cosine functions of different frequencies, allowing the model to learn relative positions. The positional encodings have the same dimensionality as the input embeddings and are summed with them.

The encoder utilizes a multi-head attention mechanism 131 which is a key component of the transformer architecture. It allows the encoder to attend to different parts of the input sequence and capture dependencies between tokens. The attention mechanism computes three matrices: query (Q), key (K), and value (V). The query, key, and value matrices are obtained by linearly projecting the input embeddings using learned weight matrices. The attention scores are computed by taking the dot product of the query matrix with the transpose of the key matrix, followed by scaling and applying a softmax function. The attention scores determine the importance of each token in the input sequence for a given position. The value matrix is then multiplied with the attention scores to obtain the weighted sum of the values, which forms the output of the attention mechanism. Multi-head attention splits the query, key, and value matrices into multiple heads, allowing the model to attend to different aspects of the input simultaneously. The outputs from each head are concatenated and linearly projected to obtain the final output of the multi-head attention layer 131.

After the multi-head attention layer, a residual connection is applied, followed by layer normalization at add and norm 140. The residual connection adds the input embeddings to the output of the attention layer, helping the model learn faster and deeper. Layer normalization normalizes the activations across the features, stabilizing the training process.

While traditional multi-head attention mechanisms contributes to accelerated learning compared to models like LSTMs, innovations like multi-head Latent Attention (MLA) further enhance efficiency through low-rank key-value joint compression. MLA achieves this by compressing the key-value pairs into a latent vector, significantly reducing the key value cache required during inference while maintaining or improving performance compared to standard multi-head attention mechanism. The attention mechanism still empowers the model to scrutinize distinct segments of sequences, but MLA does so while requiring only a fraction of the computational resources The feed forward layer 150 is a fully connected neural network applied to each position of the encoder's hidden states. It consists of two linear transformations with a Rectified Linear Unit (ReLU) activation function in between. The purpose of the feed forward 150 layer is to introduce non-linearity and increase the model's capacity to learn complex representations. The output of the feed forward 150 layer has the same dimensionality as the input embeddings. A residual connection and layer normalization 140 are applied after the feed forward 150 layer.

The encoder layers 130 are stacked Nx times, where N is a hyperparameter that determines the depth of the Encoder. Each layer follows the same structure: multi-head attention, add & norm, feed forward, and add & norm. By stacking multiple encoder layers, the model can capture hierarchical and long-range dependencies in the input sequence. The output of the final encoder layer represents the encoded input sequence, which is then passed to the decoder for generating the output sequence.

The decoder generates the output probabilities. It has a similar structure to the Encoder, with a few additions. The decoder takes output embeddings and processes them through a stack of layers (represented as dashed box 160). The output embedding layer 170 takes the previous processed input tokens (shifted right by one position) and converts them into dense vectors. Each token is mapped to a learnable embedding vector of a fixed size. The embedding vectors capture semantic and syntactic relationships between tokens.

Positional encoding 180 is added to the output embedding 170 to provide position information to the model. Since the transformer architecture does not have inherent recurrence or convolution, positional encodings help capture the order and relative positions of tokens. The positional encodings are typically sine and cosine functions of different frequencies, allowing the model to learn relative positions.

The masked multi-head attention 161 mechanism prevents the model form attending to future tokens. This layer performs self-attention on the decoder's input sequence. It allows the decoder to attend to different parts of its own input sequence. The attention is "masked" to prevent the decoder from attending to future tokens, ensuring that the predictions are based only on the previously generated tokens. Multi-head attention splits the input into multiple heads, allowing the model to attend different aspect of the input simultaneously.

After the masked multi-head attention, a residual connection is applied follows by layer normalization via add and norm 140. The residual connection adds the input to the output of the attention layer, helping the model learn faster and deeper. Layer normalization normalizes the activations across the features, stabilizing the training process.

The multi-head attention 131 layer performs attention between the decoder's hidden states and the encoder's output. It allows the decoder to attend to relevant parts of the input sequence based on the encoder's representations. The attention weights are computed based on the compatibility between the Decoder's hidden states and encoder's outputs.

Another add and norm 140 layer is then followed by feed forward network 150. This a fully connected feed-forward network applied to each position of the decoder's hidden states. It consists of two linear transformations with a Rectified Linear Unit (ReLU) activation in between. The feed forward layer helps the model capture non-linear interactions and increases the model's capacity.

Another add and norm 140 layer is followed by linear 191 and softmax 192 layers. The final hidden states of the decoder are passed through a linear transformation to project them into the vocabulary space. Vocabulary space refers to the set of all unique tokens or words that the model can generate or predict. In the context of language models, the vocabulary is a predefined set of tokens that the model is trained on and can output. When the decoder's final hidden states are passed through a linear transformation, they are projected into a vector space with the same dimensionality as the size of the vocabulary. Each dimension in this space corresponds to a specific token in the vocabulary. For example, the model has a vocabulary of 10,000 unique tokens. The linear transformation would project the decoder's hidden states into a 10,000-dimensional vector space. Each element in this vector represents the model's predicted probability or score for the corresponding token in the vocabulary.

A softmax function is applied to the projected values (vectors) to generate output probabilities over the vocabulary. The softmax function normalizes the values so that they sum up to 1, representing a probability distribution over the vocabulary. Each probability indicates the likelihood of a specific token being the next output token. The token with the highest probability is selected as the next output token. During the model's training, the objective is to maximize the probability of the correct next token given the input sequence and the previously generated tokens. The model learns to assign higher probabilities to the tokens that are more likely to appear based on the context. At inference time, the token with the highest probability in the vocabulary space is selected as the next output token. This process is repeated iteratively, with the generated token being fed back into the decoder as input for the next step, until a stopping criterion is met (e.g., reaching a maximum length or generating an end-of-sequence token). The size and composition of the vocabulary can vary depending on the specific task and the data the model is trained on. It can include words, sub-words, or even characters, depending on the tokenization strategy used.

The decoder layers 160 can be stacked Nx times, allowing the model to capture complex dependencies and generate coherent output sequences.

This transformer architecture allows the model to process input sequences, capture long-range dependencies, and generate output sequence based on the encoded input and the previously generated tokens.

There are at least three variations of transformer architecture that may enable an LCM. A first such variation comprises Auto-Encoding Models. In autoencoders, the decoder portion of the transformer is discarded after pre-training and only the encoder is used to generate the output. The popular BERT and ROBERTa models are examples of models based on this architecture and perform well on sentiment analysis and text classification. These types of models may be trained using a process called masked language modeling (MLM).

The primary goal of an autoencoder is to learn efficient representations of input data by encoding the data into a lower-dimensional space and then reconstructing the original data from the encoded representation. Autoencoders are trained in an unsupervised manner, meaning they don't require labeled data. They learn to capture the underlying structure and patterns in the input data without explicit guidance. An autoencoder consists of two main components: an encoder and a decoder. The encoder takes the input data and maps it to a lower-dimensional representation, often referred to as the latent space or bottleneck. The decoder takes the latent representation and tries to reconstruct the original input data. Autoencoders can be used for dimensionality reduction by learning a compressed representation of the input data in the latent space. The latent space has a lower dimensionality than the input data, capturing the most salient features or patterns. The training objective of an autoencoder is to minimize the reconstruction error between the original input and the reconstructed output. The model learns to encode and decode the data in a way that preserves the essential information needed for reconstruction. Variants and extensions of autoencoders can include denoising autoencoders, variational autoencoders (VAEs) which introduce a probabilistic approach to autoencoders wherein they learn a probabilistic encoder and decoder, allowing for generating new samples from the learned latent space, and conditional autoencoders which incorporate additional conditions or labels as input to the encoder and decoder, enabling the generation of samples conditioned on specific attributes.

Autoencoders can have various applications. Autoencoders can be used to detect anomalies by measuring the reconstruction error. Anomalous samples tend to have higher reconstruction errors compared to normal samples. Autoencoders can be used as a pre-training step to learn meaningful features from unlabeled data. The learned features can then be used for downstream tasks like classification or clustering. Additionally, or alternatively, autoencoders, particularly VAEs, can be used as generative models to generate new samples similar to the training data by sampling from the learned latent space. It's worth noting that while autoencoders can be effective for certain tasks, they have some limitations. They may struggle to capture complex dependencies and may generate blurry or less sharp reconstructions compared to other generative models like Generative Adversarial Networks (GANs).

Another type of variation is the auto-regressive model which feature the use of only the decoder portion of the transformer architecture. In autoregressive architectures, the decoder portion of the transformer is retained and the encoder portion is not used after model pre-training. Autoregressive models are a class of models that generate outputs by predicting the next element based on the previously generated elements. In the context of the Transformer architecture and language modeling, auto-regressive models are commonly used for tasks such as text generation, machine translation, and language understanding.

Auto-regressive models generate outputs sequentially, one element at a time. In the case of language modeling, the model predicts the next word or token based on the previous words or tokens in the sequence. The prediction of the next element is conditioned on the previously generated elements. The model learns the conditional probability distribution $P(x_t|x_1, x_2, \ldots, x_{t-1})$, where $x_t$ is the element at position t, and $x_1, x_2, \ldots, x_{t-1}$ are the previously generated elements. The transformer architecture, particularly the decoder component, is well-suited for auto-regressive modeling. The decoder generates the output sequence one element at a time, conditioned on the previously generated elements and the encoded input sequence from the encoder. In the transformer decoder, the self-attention mechanism is masked to prevent the model from attending to future positions during training. This masking ensures that the model relies only on the previously generated elements to make predictions, following the auto-regressive property. During training, the transformer decoder uses a technique called teacher forcing. Instead of feeding the model's own predictions as input for the next step, the ground truth target sequence is used. This helps the model learn to generate the correct output sequence based on the input sequence and the previous target tokens. During inference or generation, the transformer decoder generates the output sequence one element at a time. At each step, the model takes the previously generated elements as input and predicts the next element. This process continues until a stopping criterion is met, such as reaching a maximum sequence length or generating an end-of-sequence token. Auto-regressive models, including the transformer, have achieved state-of-the-art performance in language modeling tasks. They excel at capturing the statistical properties and dependencies in sequential data, making them effective for generating coherent and fluent text.

While text generation is the most suitable use case of auto-regressors, they perform exceptionally well on a wide variety of tasks. Most modern LLMs are auto-regressors including, for example, the popular GPT series of LLMs, BERT, and XLNet.

The third variation of the transformer model is the sequence-to-sequence model which utilizes both the encoder and decoder portions of the transformer and can be trained in multiple ways. One of the methods is span corruption and reconstruction. These models are, generally, best suited for language translation. The T5 and BART family of models are examples of sequence-to-sequence models.

Figure 2:
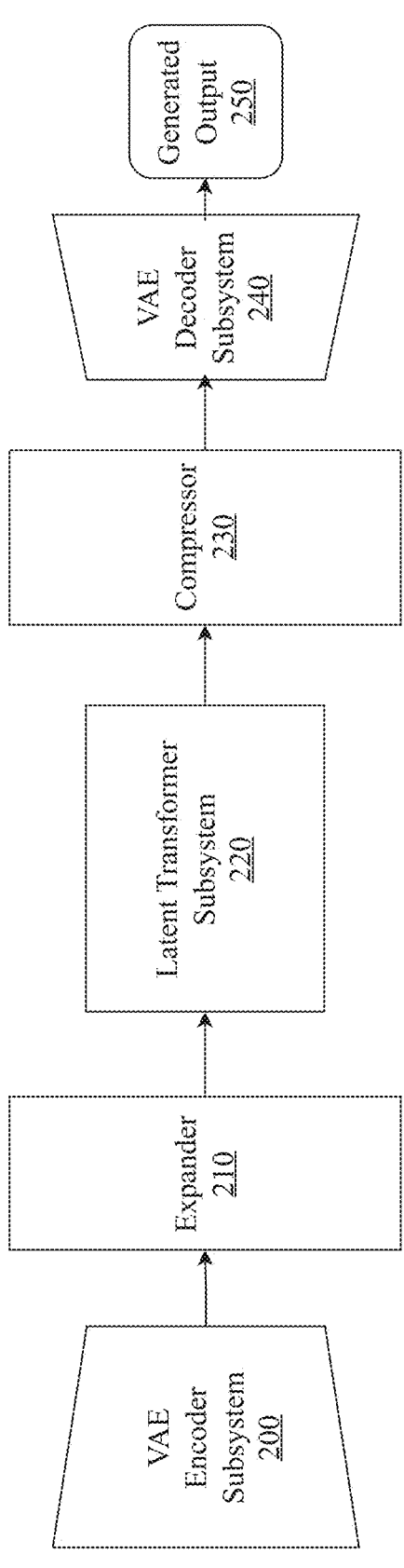
FIG. 2 is a block diagram illustrating an exemplary architecture for a latent transformer, where the transformer operates on latent space vector representations of an input.

FIG. 2 is a block diagram illustrating an exemplary architecture for a latent transformer, where the transformer operates on latent space vector representations of an input. Central to a latent transformer is a latent transformer subsystem 220, which serves as the central processing unit responsible for learning the underlying patterns, relationships, and dependencies within the input data. Latent transformer subsystem 220 leverages advanced techniques such as self-attention mechanisms and multi-head attention to capture the complex interactions and sequences in the data, enabling it to generate accurate and context-aware outputs.

The input to latent transformer subsystem 220 is provided by a VAE (Variational Autoencoder) encoder subsystem 200. VAE encoder subsystem 600 is responsible for encoding an input into a lower-dimensional latent space representation. VAE encoder subsystem 200, learns to compress the data into a compact latent space representation while preserving the essential features and characteristics of the input. Latent space vectors produced by the VAE encoder subsystem 200 may be further processed by an expander 210, which increases the dimensionality of the input data to a point where the vectors can be efficiently processed by latent transformer subsystem 220.

A latent space representation of the input generated by VAE encoder subsystem 200 serves as the input to latent transformer subsystem 220. Latent transformer subsystem 220 operates in this latent space, leveraging the compressed and informative representation to learn the complex patterns and relationships within the data. By working in the latent space, latent transformer subsystem 220 can efficiently process and model the data, capturing the intricate dependencies and generating accurate and meaningful outputs.

Once latent transformer subsystem 220 has processed the latent space representation, the generated output is passed through a VAE decoder subsystem 240. VAE decoder subsystem 240 is responsible for decoding the latent space representation back into the original data space. Prior to processing by VAE decoder subsystem 240, latent transformer subsystem 220 outputs may be compressed back to an original size before being processed by the expander 210 by being processed by a compressor 230. VAE decoder subsystem 240 learns to reconstruct the original data from the latent space representation, ensuring that the generated output is coherent and meaningful.

The reconstructed output from VAE decoder subsystem 240 is provided as a compressed generated output 250. The compressed generated output 250 represents the final result of the latent transformer, which is a compressed version of the original input.

VAE encoder subsystem 200 and VAE decoder subsystem 240 play large roles in the overall functioning of the latent transformer. VAE encoder subsystem 200 enables the system to learn a compressed and informative representation of the input data in the latent space, while the VAE decoder subsystem 240 ensures that the compressed generated output 250 is coherent and meaningful by reconstructing it back into the original data space. The combination of these subsystems allows the latent transformer to focus on learning the complex patterns and relationships within the data, leading to accurate and context-aware outputs.

The specific architectures and parameters of VAE encoder subsystem 200, latent transformer subsystem 220, and VAE decoder subsystem 240 can be customized and adapted based on the characteristics and requirements of the input data and the specific task at hand. The modular design of the system allows for flexibility and extensibility, enabling the integration of different architectures, attention mechanisms, and training techniques to optimize the performance and efficiency of the latent transformer.

Figure 3:
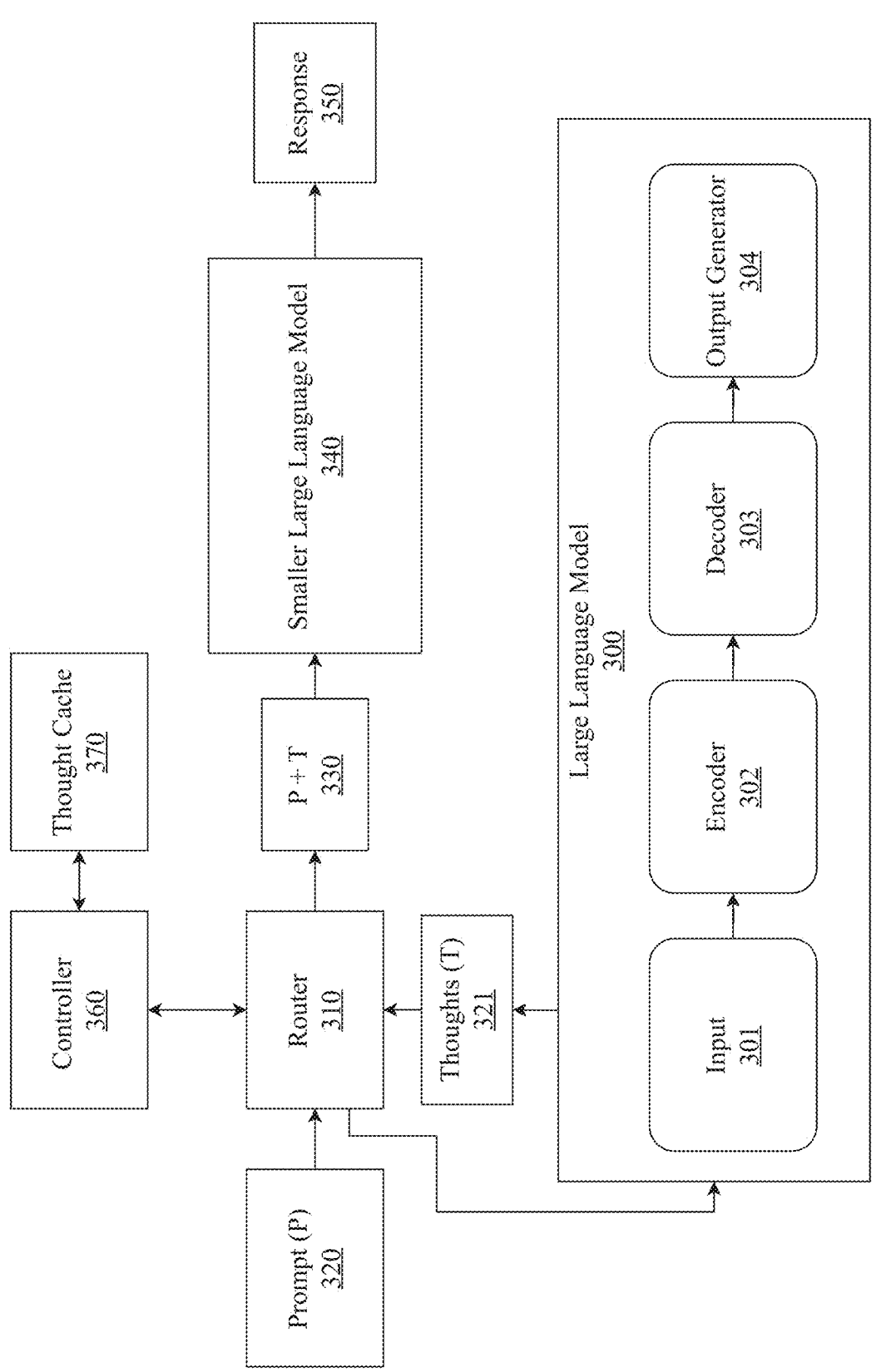
FIG. 3 is a block diagram illustrating an exemplary system architecture for a multi-state LLM with unlimited context.

FIG. 3 is a block diagram illustrating an exemplary system architecture for a multi-state LLM with unlimited context. The system includes a large language model 300, a router 310, a controller 360, a thought cache 370, and a smaller language model 340 that work together to process prompts and generate responses while optimizing computational resources.

The system receives an initial prompt (P) 320 through the router 310. The router serves as the central control component, determining whether to utilize the large language model 300 or access the thought cache 370 through the controller 360. Upon receiving a prompt, the router first queries the thought cache to determine if relevant thoughts exist for similar prompts.

The large language model 300 includes an input component 301, an encoder 302, a decoder 303, and an output generator 304. The large language model 300 can utilize various internal architectures, including but not limited to traditional transformer cores (as shown in FIG. 1) or latent transformer cores (as shown in FIG. 2). The model's attention mechanisms can be implemented using either standard multi-head attention (MHA) or multi-head latent attention (MLA), with the overall system functioning identically regardless of the specific attention mechanism chosen. When using MLA, the model benefits from reduced KV cache requirements during inference while maintaining performance comparable to or better than traditional MHA implementations. When the router determines that cached thoughts are not available or suitable, the prompt is processed through the large language model 300. During this processing, the model enters a reasoning phase where it generates thoughts (T) 321 about the prompt. These thoughts represent the model's analysis and reasoning about the prompt before generating a final response.

The controller 360 manages interaction with the thought cache 370, which can be implemented as either a local or cloud-based storage system. The thought cache stores previously generated thoughts in a vector database format, allowing for efficient retrieval of relevant thoughts for similar prompts. The cache can maintain both session-specific thoughts for temporary storage and long-term thoughts for persistent knowledge.

When thoughts are either generated by the large language model or retrieved from the cache, they are combined with the original prompt to create a prompt and thought combination (P+T) 330. This combination is then routed to the smaller language model 340, which requires significantly fewer computational resources than the large model. The smaller model processes the P+T 330 combination to generate the final response 350.

In operation, for example, if a user submits a prompt asking about climate change impacts, the router first checks the thought cache for relevant existing thoughts. If suitable thoughts exist, they are retrieved and combined with the prompt. If no relevant thoughts are found, the large model processes the prompt to generate new thoughts about climate science, global impacts, and relevant data. These thoughts, combined with the original prompt, are then processed by the smaller model 340 to generate a concise, relevant response. The new thoughts are also cached for future use. To demonstrate how thoughts are created, imagine the prompt "What do you think is the future of string theory, particularly given the spectacular failure of supersymmetry at LHC" being entered into the LLM DeepSeek. During the reasoning phase, the model returns to the user the following thoughts:

"Okay, the user is asking about the future of string theory in light of supersymmetry not being found at the LHC. Let me start by recalling what I know about string theory and SUSY.

String theory relies heavily on supersymmetry because SUSY helps stabilize the extra dimensions and makes the math work better. But the LHC hasn't found any superpartners, which challenges some of the more popular SUSY models. However, I should note that SUSY isn't the only part of string theory. There are versions without it, like bosonic string theory, but those aren't as developed or realistic.

The user might be implying that since SUSY isn't found, string theory is in trouble. I need to address that but also explain why it's not the whole story. Maybe mention that SUSY could still exist at higher energy scales beyond LHC's reach. Also, string theory has other applications beyond particle physics, like in condensed matter or quantum gravity.

I should break down the response into points. First, clarify the relationship between SUSY and string theory. Then discuss the LHC results and their implications. Talk about other areas where string theory contributes, like holography or black hole physics. Mention alternatives within string theory that don't rely on low-energy SUSY. Also, touch on the possibility of future experiments or theoretical breakthroughs.

Need to be balanced. Acknowledge the challenges but also the potential. Avoid being too dismissive or overly optimistic. Maybe conclude by saying the future is uncertain but still active in different areas. Check if there are recent developments post-LHC that I should consider, but since the user didn't specify, stick to general points.

Make sure to explain technical terms like "landscape" or "holography" briefly. Keep the language accessible but precise. The user might be someone with a basic understanding of physics, possibly a student or enthusiast. They want to know if string theory is still viable and where it's headed. They might also be interested in how scientific theories adapt when experimental evidence is lacking.

In summary, structure the answer to address the SUSY issue, discuss other aspects of string theory, mention alternative research directions, and conclude with the ongoing relevance despite challenges. Ensure each point flows logically and answers the user's concern about the theory's future post-LHC results." Using the above generated thoughts, model generated a response to the user's query.

The above thoughts represent T in the accompanying FIG. 3. By extracting thoughts generated by a model in their reasoning phase and passing both those thoughts and the initial prompt through a substantially smaller model with less parameters, the same response may be given while using much less energy.

The system supports multiple cache architectures, including but not limited to local device storage for personal use and cloud-based storage for enterprise applications. This allows for knowledge sharing across users while maintaining appropriate privacy and access controls. Multiple specialized caches can exist for different domains or use cases, such as financial analysis or scientific research.

The system supports multiple specialized cache architectures that enable domain-specific knowledge storage and AI agent collaboration. These architectures include but are not limited to local device caches for personal use, edge caches for specific AI agents, and distributed cloud-based caches for enterprise applications. Each specialized cache maintains its own thought organization optimized for its domain—for instance, a financial analysis cache might structure thoughts around market patterns and risk assessment frameworks, while a scientific research cache might organize thoughts based on experimental methodologies and theoretical frameworks. AI agents can be assigned primary affinity to specific specialized caches while maintaining ability to access other caches when needed. For example, a financial analysis agent might primarily interact with the financial cache but could access the scientific research cache when analyzing biotechnology investments. The system implements cache-specific validation rules and quality metrics tailored to each domain's requirements-financial thoughts might require numerical accuracy validation, while scientific thoughts might undergo peer-review-style verification by other AI agents. These specialized caches can operate independently or in interconnected hierarchies, with bridge agents managing thought transfer between different domains. Enterprise deployments can maintain multiple parallel specialized caches with varying access levels, enabling selective knowledge sharing while preserving security boundaries. For instance, a pharmaceutical company might maintain separate but interconnected caches for public research, proprietary development, and regulatory compliance, with AI agents navigating these boundaries based on clearance levels and task requirements.

The system achieves effectively unlimited context windows through a combination of thought abstraction and hierarchical memory management. Rather than attempting to maintain extended token sequences, the system is capable of converting contextual information into thought representations that capture higher-level patterns and relationships. These thoughts serve as compressed encodings of context, where each thought unit may encapsulate understanding that would traditionally require thousands of tokens to represent.

In one embodiment, the system implements a multi-tier thought storage architecture where context exists simultaneously at multiple levels of abstraction. The most recent context maintains detailed thought representations with full fidelity, while older context is progressively synthesized into more abstract thought patterns that capture essential relationships and understanding while reducing storage requirements. This progressive abstraction allows the system to maintain effectively unlimited context while managing computational resources efficiently.

When processing new prompts, router 310 analyzes both recent detailed thoughts and older abstract thoughts to identify relevant context. A thought synthesizer 430 can then combine these different levels of abstraction to generate new thoughts that incorporate both immediate context and long-term understanding. This multi-level synthesis enables the system to maintain contextual coherence across extended interactions without requiring linear scaling of computational resources.

Thought cache 370 implements indexing structures that maintain temporal relationships between thoughts while enabling efficient retrieval based on relevance. Unlike traditional attention mechanisms that must process entire token sequences, the system can directly access relevant thoughts across any temporal distance through its hierarchical indexing system. This capability allows the model to maintain contextual awareness across arbitrarily long sequences while keeping retrieval costs nearly constant.

In one embodiment, thought cache 370 implements multiple storage tiers that automatically organize thoughts based on their temporal relevance and utilization patterns. In its primary tier, the thought cache maintains recent thoughts with their complete reasoning chains and relationship mappings intact. As these thoughts age within the cache, specialized consolidation mechanisms within the cache combine related thoughts into more efficient meta-thoughts that preserve essential reasoning while reducing storage overhead.

Thought cache 370 monitors access patterns and triggers consolidation events when thought clusters meet specific temporal or utilization thresholds. During these events, thought cache 370 analyzes thought clusters using its built-in synthesis capabilities to generate consolidated meta-thoughts. These meta-thoughts capture insights and relationships from the original thought cluster while requiring significantly less storage space. For example, a sequence of thoughts about various machine learning algorithms might consolidate into a meta-thought capturing their comparative advantages and key implementation considerations.

Intelligence within thought cache 370 adapts consolidation timing based on thought utility metrics. Thought cache 370 tracks each thought's retrieval frequency, synthesis participation, and relationship density with other thoughts. Thoughts demonstrating high utility retain their detailed form longer, while less frequently accessed thoughts undergo earlier consolidation. This adaptive approach ensures that frequently needed reasoning patterns remain readily available in their most useful form.

Thought cache's 370 hierarchical storage structure spans multiple performance tiers, from high-speed memory for recent and frequently accessed thoughts to more economical storage for consolidated meta-thoughts. Thought cache 370 may migrate thoughts between these tiers based on usage patterns and age, optimizing storage resource utilization while maintaining rapid access to relevant contextual information. This tiered structure enables the cache to efficiently manage large volumes of thoughts while keeping the most pertinent information readily accessible.

Thought cache 370 implements a universal thought representation format that enables consistent interpretation across different language models and reasoning contexts. This standardization occurs through a formal thought schema that defines how reasoning steps, logical relationships, and contextual dependencies are encoded. Each thought contains structured fields for core reasoning components, metadata describing the thought's context and assumptions, and explicit markers for temporal and logical dependencies. This structured format ensures that thoughts remain interpretable regardless of which model originally generated them or which model ultimately consumes them.

Before a cached thought is applied to a new context, the system may perform an automated compatibility analysis. This analysis examines both the structural alignment between the cached thought and the current context, and the semantic applicability of the reasoning pattern. The system maintains model-specific adapters that can transform thoughts between different models' preferred reasoning styles while preserving the core logical structure. These adapters handle variations in formatting, vocabulary, and reasoning granularity, ensuring smooth thought transfer between models with different characteristics.

The cache incorporates a contextual validation layer that assesses thought applicability before reuse. When retrieving a cached thought, this layer examines the current prompt's context against the thought's encoded assumptions and dependencies. If misalignments are detected, the system can automatically generate bridging thoughts that reconcile differences between the cached reasoning and the current context. For example, if a cached mathematical proof assumes certain preconditions that differ slightly from the current problem, the system generates additional reasoning steps to account for these differences.

The system's thought schema includes explicit version controls and model compatibility markers. These markers identify which model versions and architectures have successfully utilized each thought, enabling the cache to predict compatibility issues before attempting thought reuse. When new model versions are deployed, the system can automatically flag thoughts that may require revalidation or adaptation to maintain compatibility with updated model capabilities or knowledge cutoffs.

Through these standardization and compatibility mechanisms, the thought cache ensures reliable thought transfer across different models and contexts while maintaining the integrity of reasoning patterns. The combination of structured thought representation, contextual validation, and adaptive transformation enables efficient thought reuse while preventing inconsistencies or misinterpretations.

Through this architecture, the system achieves effective unlimited context not through brute-force token retention but through intelligent abstraction and synthesis of understanding. The smaller language model can process these thought-based contexts more efficiently than traditional token sequences, enabling contextual reasoning without the computational overhead typically associated with extended context windows.

The system supports multiple architectural approaches for maintaining extended context through thought processing. While transformer-based attention mechanisms provide one implementation path, the system can alternatively employ recurrent neural networks (RNNs) for processing thought sequences. In an RNN-based implementation, thoughts are processed sequentially, with the network's hidden state maintaining a compressed representation of historical context. This approach enables efficient processing of arbitrary-length thought sequences while maintaining a constant memory footprint, as the hidden state size remains fixed regardless of sequence length.

The system may also implement memory networks for thought storage and retrieval. These networks maintain an explicit, addressable memory that stores thought representations and their relationships. Unlike attention mechanisms that must process all context simultaneously, memory networks can selectively access relevant thoughts through content-based addressing. The memory network architecture enables direct access to specific thoughts based on relevance to the current prompt, without requiring linear scanning of the entire context history.

The thought cache itself can be structured as a differentiable neural memory, where thoughts are stored as embeddings that can be smoothly updated and combined. This approach enables the cache to learn optimal thought storage and retrieval patterns through experience, adapting its organization to maximize the utility of cached thoughts. The differentiable memory structure supports gradient-based optimization of thought storage and retrieval operations, allowing the system to continuously improve its context management efficiency.

Hybrid architectures combining multiple approaches can leverage the strengths of each method. For example, in one embodiment, the system might employ RNNs for sequential thought processing while using a memory network for long-term storage, or combine transformer attention for recent context with compressed RNN states for historical context. These hybrid approaches enable flexible scaling of context processing based on specific application requirements and resource constraints.

Figure 4:
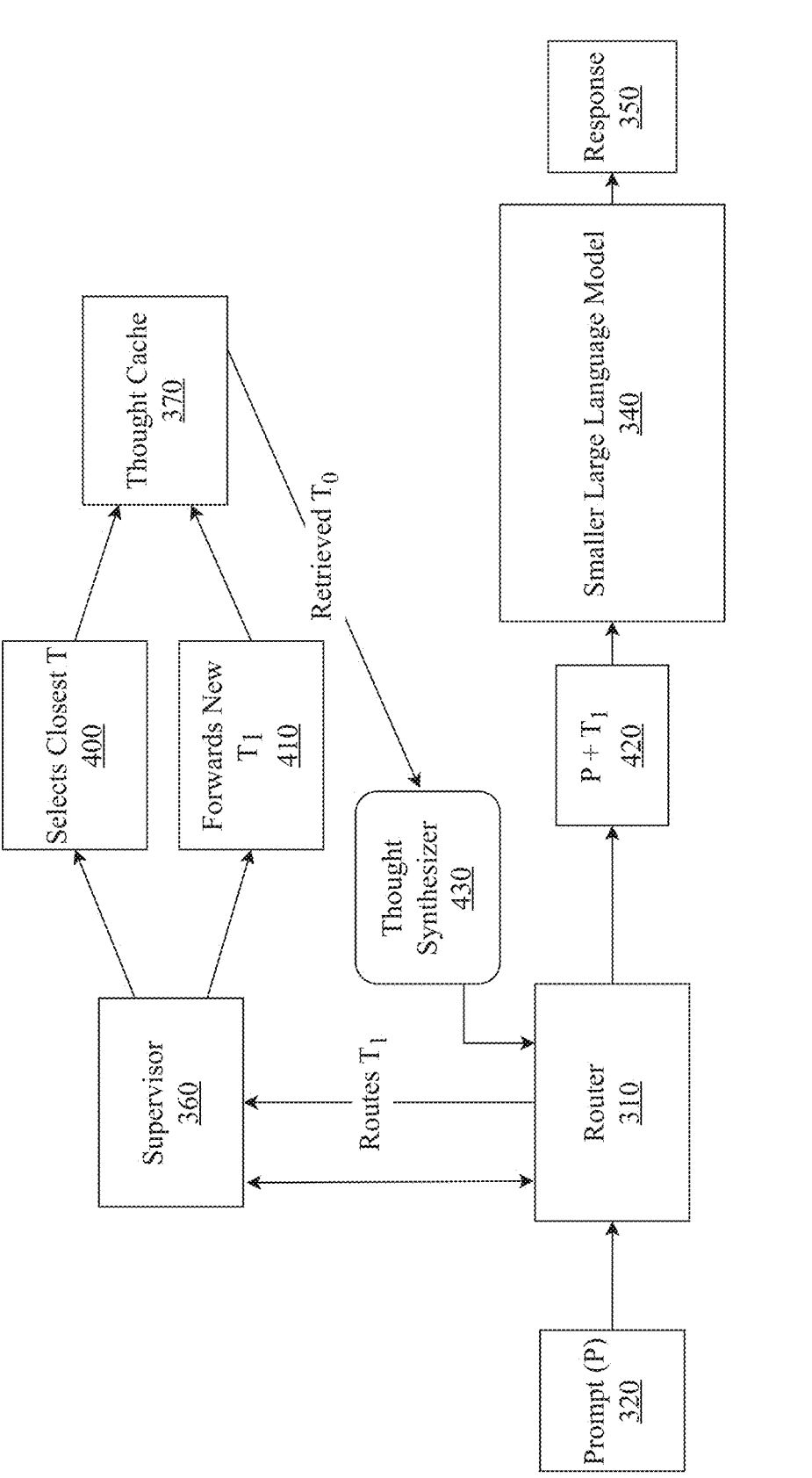
FIG. 4 is a block diagram illustrating an exemplary system architecture for a multi-state LLM with unlimited context with thought synthesis and retrieval.

FIG. 4 is a block diagram illustrating an exemplary system architecture for a multi-state LLM with unlimited context with thought synthesis and retrieval. The figure demonstrates how the system handles scenarios where cached thoughts may be relevant but not precisely matched to the current prompt.

The system begins when a prompt (P) 320 is received by the router 310. When router 310 receives a prompt 320, it interacts with the thought cache 370 through the controller 360 to retrieve potentially relevant thoughts.

The controller 360 performs two key functions in this embodiment. First, it selects the closest thought ($T_0$) 400 from the cache that relates to the current prompt. Second, after a synthesizer 430 creates a new thought $T_1$ 410, controller 360 manages the storage of newly synthesized thoughts. The controller evaluates the retrieved $T_0$ against certain relevance thresholds to determine if synthesis is needed. These thresholds can be configured based on vector similarity scores between the prompt and the cached thought, with different thresholds potentially being set for different domains or use cases. For example, a threshold of 0.8 (on a 0-1 scale) might indicate the thought is relevant enough to use directly, while scores between 0.5-0.8 might trigger synthesis with other related thoughts, and scores below 0.5 might indicate the need to generate entirely new thoughts using the large model. The system can also employ multiple thresholds simultaneously—one for determining if a thought is "close enough" to use directly, another for determining if thoughts are similar enough to be candidates for synthesis, and another for determining if cached thoughts are relevant enough to be considered at all.

The system can assign and append relevance scores and metadata to thoughts in several ways. When a thought (T) is created by the large model, it can be analyzed and scored across multiple dimensions including but not limited to quality assessment metrics, vector embeddings, usage statistics, and domain tags. Quality assessment encompasses the thought's reasoning pattern quality based on its structure and completeness, accuracy scores for verifiable facts, and confidence scores from the model about its conclusions. Vector embeddings can be calculated and stored with each thought, allowing for fast similarity comparisons during cache lookups, with multiple specialized embeddings potentially stored for different aspects like topic, reasoning style, and domain. Usage statistics track metrics such as success rates when the thought is used (including user feedback), frequency of successful reuse, and performance metrics when used with different types of prompts. Domain tags provide additional context through subject matter categorization, specific topic tags, and required expertise level indicators. These scores and metadata can be stored alongside the thought in the cache in a structured format and updated over time based on usage patterns. The comprehensive metadata enables more sophisticated routing and synthesis decisions while allowing the system to improve its thought selection over time through continuous feedback and performance tracking. For instance, a thought might store its general and domain-specific embeddings, various quality and confidence scores, detailed categorization, and usage statistics, all of which can be used to make more informed decisions about when and how to use or synthesize that thought in future operations.

A synthesizer 360 processes $T_0$ to create a new thought $T_1$ that better aligns with the current prompt's requirements. For example, if a prompt asks about specific aspects of quantum computing, and $T_0$ contains general quantum computing concepts, the synthesizer can create a $T_1$ that focuses more precisely on the specific aspects requested in the prompt.

Thought synthesizer 430 combines and processes thoughts when multiple relevant thoughts are found or when existing thoughts need modification. For example, if one cached thought covers quantum bits and another covers error correction, the synthesizer can combine these into a new thought that addresses quantum computing error rates in qubits. The synthesizer can also adapt existing thoughts to better match current prompt requirements. This synthesis process involves understanding the logical relationships between different thoughts, identifying complementary and conflicting information, and creating coherent combinations that preserve the accuracy and context of the original thoughts. The synthesizer employs various combination strategies depending on the relationship between thoughts—it might perform simple concatenation for complementary thoughts, create hierarchical structures for nested concepts, or generate entirely new bridging content to connect related ideas. Additionally, the synthesizer can evaluate the quality of synthesized thoughts and may generate multiple candidate combinations before selecting the most appropriate one based on relevance scores and coherence metrics.

The synthesizer can work with multiple retrieved thoughts simultaneously, combining relevant aspects from each to create a more comprehensive $T_1$. For instance, if one cached thought contains information about neural networks and another about computer vision, the synthesizer could combine relevant aspects of both to create a new thought more specifically targeted to a prompt about neural networks in computer vision applications.

The system may implement multiple strategies for thought synthesis, enabling the combination of existing cached thoughts to generate new, contextually relevant thoughts without necessarily engaging the large language model. These synthesis mechanisms operate on both the semantic content and vector representations of thoughts, employing various combination strategies depending on the relationship between thoughts and specific prompt requirements. The fundamental approach builds upon vector-based synthesis, where thoughts are represented in a high-dimensional embedding space that preserves semantic relationships through spatial relationships. In one embodiment, when multiple relevant thoughts are retrieved from the cache, their vector representations can be combined through a plurality of mathematical operations to create new thought vectors. These operations may include but are not limited to weighted averaging where more relevant thoughts receive higher weights in the final combination, vector addition with normalization that preserves the directional information of component thoughts, dimensional projection where thoughts are combined along specific semantic dimensions while preserving others, and non-linear combination using learned transformation matrices.

The system demonstrates this vector-based synthesis through concrete applications. For instance, when processing a prompt that requires information about quantum computing's impact on cryptocurrency, and the cache contains separate thoughts about quantum computing ($T_1$) and cryptocurrency security ($T_2$), the system performs a weighted combination expressed as T_new=$\alpha$*T1+$\beta$ *T2, where $\alpha$ and $\beta$ represent relevance weights determined by similarity scores between each thought and the prompt. The resulting vector T_new is normalized to maintain consistent magnitude in the embedding space, ensuring that the synthesized thought retains proper proportional representation of its component concepts.

Beyond pure vector operations, the system, in additional embodiments, may employ neural synthesis through a specialized small-scale transformer model trained specifically for thought combination. A neural synthesizer would receive multiple thought vectors as input and generates a new, synthesized thought that captures the relevant aspects of all inputs while maintaining internal consistency. The neural synthesis component is capable of identifying and resolving contradictions between input thoughts, preserving temporal relationships and causal chains, generating bridging content to connect related concepts, and maintaining consistency with the original prompt context. This approach proves particularly valuable when combining thoughts that require subtle understanding of context and implications.

In another embodiment, the system may implement rule-based synthesis through a set of predefined combination patterns based on the logical relationship between thoughts. These patterns support sequential combination for thoughts representing steps in a process, hierarchical combination for thoughts with parent-child relationships, comparative combination for contrasting or parallel thoughts, and supplementary combination for thoughts that provide additional context or examples. The rule-based approach ensures that the structural integrity of thought relationships is preserved during synthesis.

In an embodiment, the system may employ a synthesis quality assessor that evaluates potential thought combinations before they are executed. This assessment examines semantic coherence of the combined thought, preservation of critical information from source thoughts, relevance to the original prompt, and internal consistency of the synthesized thought. The quality assessment process helps prevent the generation and propagation of invalid or inconsistent thought combinations.

In scenarios where multiple synthesis strategies might apply, the system employs a multi-stage synthesis process. This process begins by generating candidate syntheses using different strategies, proceeds to evaluate each candidate using quality metrics, selects the highest-quality synthesis result, and caches the successful synthesis strategy for similar future combinations. This approach ensures optimal synthesis results while building a knowledge base of effective strategies.

The synthesis mechanism supports multiple operation modes including synchronous operation for immediate response requirements, asynchronous operation for background synthesis and cache optimization, and hybrid operation for progressive refinement of synthesized thoughts. This flexibility allows the system to balance response time requirements with synthesis quality needs. Through these synthesis mechanisms, the system can effectively combine and evolve cached thoughts to address new prompts without always requiring the computational overhead of the large language model, while maintaining the quality and relevance of generated responses.

Once $T_1$ is created, it is combined with the original prompt to form P+$T_1$ 420, which is then processed by the smaller language model 340 to generate the final response 350. The newly synthesized $T_1$ is also routed back through the controller for potential caching with thought cache 370, allowing it to be used for future similar prompts.

In one embodiment, thought cache 370 provides performance improvements by eliminating redundant reasoning computations across similar prompts. When 310 router identifies a new prompt with reasoning requirements similar to previously processed queries, thought cache 370 can supply validated thought patterns rather than requiring the large language model to reconstruct the reasoning chain from scratch. This caching mechanism is particularly effective for common analytical patterns, such as mathematical derivations, logical deductions, or standard analytical frameworks that appear frequently across different prompts.

Additionally, thought cache 370 is capable of serving as a quality assurance mechanism by maintaining verified reasoning patterns. Once a thought sequence has been validated and demonstrates consistent success in generating accurate responses, that sequence becomes a trusted template for handling similar queries. For instance, when processing mathematical problems, the cache may contain verified proof structures that can be applied to new problems within the same class, ensuring consistent and reliable solution approaches.

In one embodiment, thought cache 370 implements a validation scoring system that tracks the success rate and reliability of each cached thought. This scoring considers factors such as but not limited to response accuracy, user feedback, and consistency with known truth standards. Thoughts that consistently contribute to high-quality responses receive higher validation scores, making them more likely to be selected for reuse in similar contexts. The cache can also mark certain thoughts as "golden" references when they demonstrate exceptional reliability in specific domains, establishing them as preferred reasoning patterns for their respective problem types.

To prevent the propagation of incorrect reasoning, thought cache 370 may employ a continuous validation mechanism. This mechanism monitors the performance of cached thoughts and can automatically flag patterns that lead to inconsistent or incorrect responses. When potential issues are detected, thought cache 370 may temporarily suspend the use of problematic thoughts and route similar prompts through the large language model for fresh analysis. This self-correction capability ensures that the efficiency benefits of thought caching do not come at the expense of response quality.

Thought cache 370 is capable of supporting selective thought inheritance, where new prompts can partially inherit validated reasoning patterns while allowing for context-specific modifications. This flexibility enables the system to leverage proven reasoning frameworks while adapting them to specific query requirements, combining the benefits of cached reliability with contextual relevance. Through these mechanisms, the thought cache achieves both performance optimization and quality enhancement, delivering faster responses while maintaining or improving the reliability of the system's outputs.

Through this synthesis process, the system can effectively leverage partially relevant cached thoughts to create more precise and relevant thoughts for the current prompt, reducing the need to engage the large language model while still maintaining response quality and relevance.

In another embodiment, thought cache 370 implements security and privacy controls to protect sensitive information while enabling efficient thought reuse. At the storage level, thought cache 370 maintains isolation between user contexts through encrypted partitioning. Each user's thoughts are encrypted with user-specific keys, ensuring that even within shared cache infrastructure, thoughts remain securely compartmentalized. This encryption extends to both the thought content and the associated metadata, preventing unauthorized access to reasoning patterns that might reveal proprietary information.

In the embodiment, thought cache 370 implements a permissions framework that governs thought sharing and reuse. By default, thoughts derived from user interactions are marked private and restricted to the originating user's context. Users can optionally designate specific thoughts for shared use through explicit consent mechanisms. When thoughts are marked for sharing, the cache employs automated sanitization processes that strip personally identifiable information and sensitive data while preserving the underlying reasoning patterns. This sanitization uses advanced pattern recognition to identify and remove context-specific details while maintaining the thought's utility for general reasoning.

To protect against cache poisoning attacks, thought cache 370 may incorporate a multi-stage validation pipeline. Before any thought is cached, it undergoes verification through a separate validation model that assesses its logical consistency and checks for potential malicious patterns. The cache maintains cryptographic checksums of validated thoughts, enabling rapid verification of thought integrity during retrieval operations. Additionally, the cache tracks the provenance of each thought, maintaining secure audit trails of thought creation, modification, and usage patterns.

The system implements graduated access controls that can restrict thought reuse based on security clearance levels, organizational boundaries, or specific sharing agreements. These controls allow enterprises to maintain separate thought caches for different security domains while selectively enabling thought sharing under controlled conditions. For instance, a financial institution might maintain separate caches for public customer service interactions and privileged internal analyses, with strict controls governing any cross-domain thought utilization.

Through these security mechanisms, the thought cache enables efficient reasoning reuse while protecting sensitive information and maintaining system integrity. The combination of encryption, access controls, and validation processes ensures that the performance benefits of thought caching do not compromise security or privacy requirements.

Figure 5:
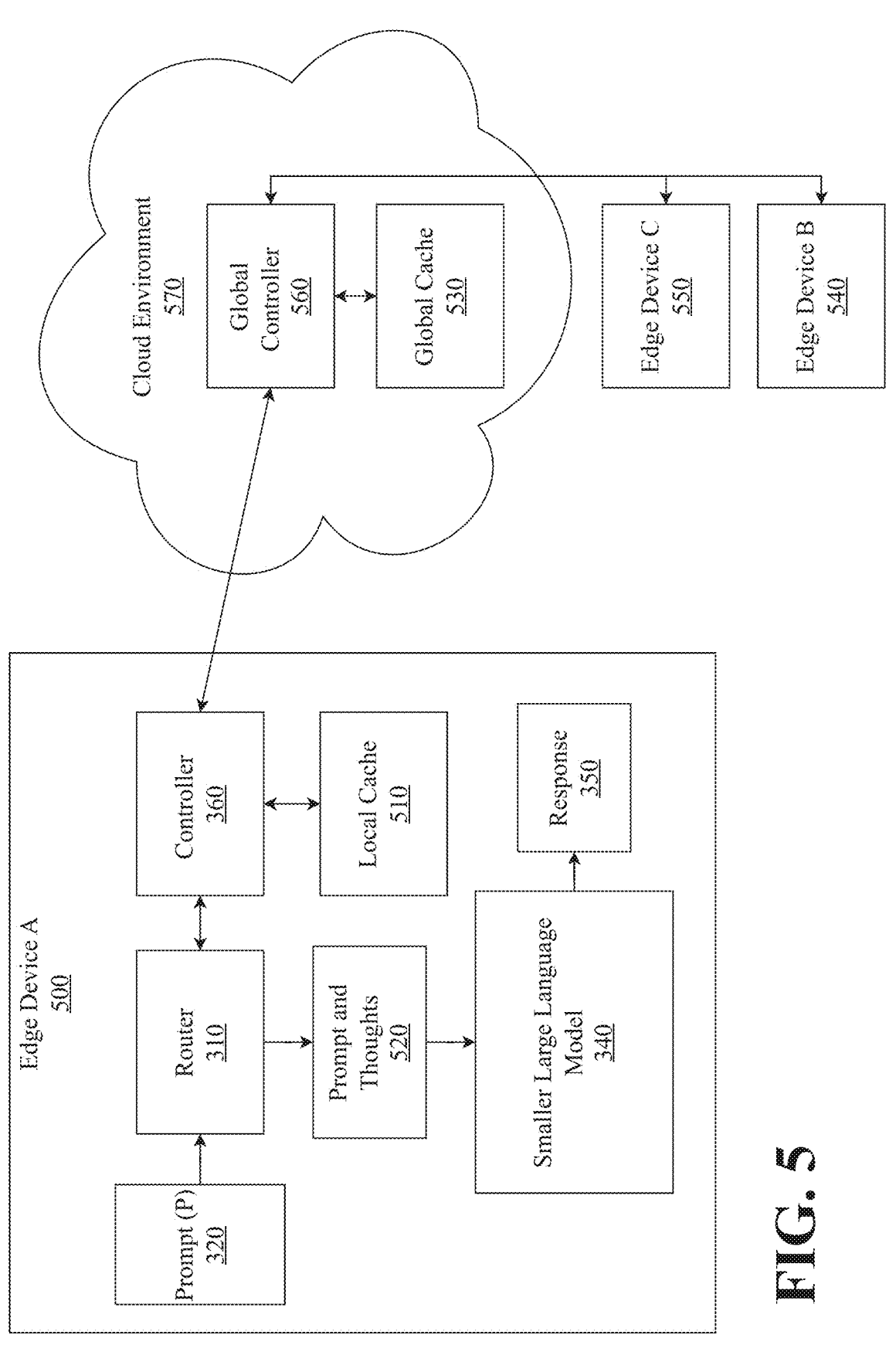
FIG. 5 is a block diagram illustrating an exemplary system architecture for a multi-state LLM with unlimited context with local and global thought caches.

FIG. 5 is a block diagram illustrating an exemplary system architecture for a multi-state LLM with unlimited context with local and global thought caches. This embodiment demonstrates how the system can operate primarily on edge devices while maintaining access to a broader knowledge base through cloud connectivity.

Edge device A 500 represents a complete edge implementation of the system, which could be a device such as but not limited to a mobile phone, tablet, or other personal computing device. Within the edge device 500, router 310 receives prompts (P) 320 and coordinates with a local controller 360 and local cache 510. Local cache 510 stores frequently accessed or personally relevant thoughts directly on the device, enabling quick access and offline functionality.

The smaller language model 340 runs directly on the edge device, processing prompt and thought combinations 520 to generate responses 350. This local processing capability significantly reduces latency and computational requirements compared to constantly accessing cloud resources.

The cloud environment 570 contains a global cache 530 managed by a global controller 560. This global infrastructure serves as a centralized repository for thoughts generated across multiple edge devices (B 540, C 550). The global controller coordinates cache synchronization and manages access patterns across the network of connected devices.

When an edge device's controller 360 cannot find relevant thoughts in its local cache 510, it can query the global controller 560 to search the global cache 530. For example, if a user on edge device A 500 asks a question about a topic they haven't encountered before, the system first checks the local cache 510, then can reach out to the global cache 530 for relevant thoughts.

The system supports bi-directional synchronization, where new thoughts generated on edge devices can be uploaded to the global cache, and frequently accessed global thoughts can be downloaded to local caches. This creates a dynamic knowledge-sharing environment while maintaining efficient local operation.

Through this architecture, the system provides the benefits of edge computing (low latency, offline capability, privacy) while maintaining access to a broader knowledge base through the cloud infrastructure. The distributed nature of the system allows for efficient scaling and knowledge sharing across user communities while minimizing the computational load on individual devices.

Figure 6:
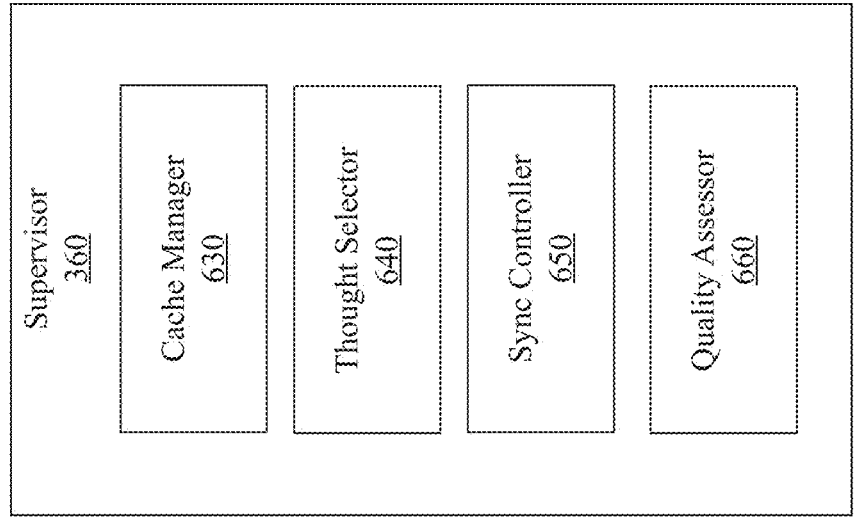
FIG. 6 is a block diagram illustrating exemplary components for a multi-state LLM with unlimited context, a router and a controller.

FIG. 6 is a block diagram illustrating exemplary components for a multi-state LLM with unlimited context, a router and a controller. A prompt analyzer 600 processes incoming prompts to determine their characteristics, domain, and requirements. For example, if a user submits a prompt about quantum computing, the analyzer identifies key technical terms, determines the complexity level, and flags specific concepts that may need specialized thoughts. It also evaluates whether the prompt requires reasoning about multiple concepts (like quantum computing and machine learning) that might benefit from thought synthesis. Analyzer 600 employs natural language processing to break down the prompt into component parts, identifying primary topics, subtopics, relationships between concepts, required depth of knowledge, and any constraints or special requirements specified in the prompt. It can also detect the tone and style of the desired response, technical sophistication level of the user, and whether the prompt requires factual recall, analytical reasoning, or creative synthesis.

A cache query interface 610 serves as the communication bridge between the router and cache systems. It formats prompt analysis results into efficient cache queries and manages the retrieval process. For instance, when searching for thoughts about quantum computing, it might query both technical definition thoughts and practical application thoughts, managing multiple parallel cache requests to both local and global caches. The interface optimizes query patterns based on the analyzer's output, constructing sophisticated search parameters that account for concept hierarchies, semantic relationships, and contextual relevance. It can prioritize different aspects of the query based on importance, manage query timeouts and fallbacks, and handle distributed cache architectures efficiently. The interface also implements caching strategies to optimize frequent queries and manages cache coherence between local and global storage.

A model selector 620 makes intelligent decisions about model utilization based on cache results and prompt analysis. It implements decision logic to determine whether to: use the large model for new thought generation, proceed with cached thoughts through the smaller model, or employ a hybrid approach. For example, if highly relevant thoughts exist in the cache, it might bypass the large model entirely to save computational resources. In one embodiment, model selector 620 employs decision trees and heuristics that consider multiple factors including thought relevance scores, computational resource availability, response time requirements, and quality thresholds. It can dynamically adjust its selection criteria based on system load, cache hit rates, and historical performance metrics. Model selector 620 also maintains statistics about the effectiveness of its decisions to continuously refine its selection strategy and may implement different selection policies based on user preferences or application requirements.

A cache manager 630 handles the organization, storage, and retrieval of thoughts in both local and global caches. It implements indexing strategies for quick thought retrieval and manages cache memory efficiently. For example, it might maintain separate indices for different knowledge domains or implement priority-based storage systems where frequently accessed thoughts are kept in faster memory. Cache manager 630 implements eviction policies to optimize cache utilization, considering factors such as but not limited to thought frequency of use, recency, size, and interdependencies with other cached thoughts. It also handles cache coherence between local and global stores, implements versioning and conflict resolution for distributed caches, and maintains metadata about cache performance and utilization patterns. The manager can dynamically adjust its caching strategies based on usage patterns and system resources, potentially implementing different policies for different types of thoughts or knowledge domains.

A thought selector 640 implements algorithms to identify and select the most relevant thoughts from the cache. It uses similarity metrics and relevance scoring to rank cached thoughts based on their applicability to the current prompt. For instance, when processing a prompt about quantum computing applications in cryptography, it might prioritize thoughts that bridge both quantum and cryptographic concepts. Thought selector 640 may employ multiple ranking algorithms that consider various aspects of thought relevance, including semantic similarity, contextual appropriateness, freshness, and historical success rates. It can perform multi-stage selection processes, first identifying broadly relevant thoughts and then refining the selection based on more specific criteria. The selector also considers relationships between thoughts, potentially selecting groups of related thoughts that together provide comprehensive coverage of the prompt's requirements. It maintains performance metrics about selection accuracy and can adapt its selection criteria based on feedback about the effectiveness of selected thoughts in generating successful responses.

A sync controller 650 manages the complex task of synchronizing thoughts between local and global caches. It implements policies for when to upload local thoughts to the global cache and when to download global thoughts to local storage. For example, it might upload locally generated thoughts about emerging technologies to the global cache while downloading commonly accessed thoughts about fundamental concepts to local storage. Sync controller 650 may employ synchronization strategies that balance network bandwidth usage, storage constraints, and data freshness requirements. It implements conflict resolution mechanisms for handling simultaneous updates, version control for tracking thought evolution, and differential synchronization to minimize data transfer. Sync controller 650 can adapt its sync frequency and policies based on usage patterns, network conditions, and device capabilities. It also maintains detailed synchronization logs and metrics to optimize future sync operations and implements recovery mechanisms for handling failed synchronization attempts. Additionally, sync controller 650 can prioritize synchronization tasks based on thought importance, urgency, and resource availability.

A quality assessor 660 continuously evaluates thought quality and usefulness. It monitors factors such as thought relevance, accuracy, and usage patterns to maintain cache quality. For example, if certain thoughts consistently lead to high-quality responses (as measured by user feedback or other metrics), they might be prioritized for retention and synchronization. Conversely, thoughts that rarely prove useful might be flagged for removal or update. Quality assessor 660 may employ multiple evaluation criteria including syntactic correctness, semantic coherence, factual accuracy, and practical utility. It maintains historical performance metrics for each thought, tracking success rates in different contexts and user satisfaction levels. Quality assessor 660 can detect outdated or inconsistent thoughts, identify redundant thoughts that could be merged, and flag thoughts that may need revision due to changing knowledge or requirements. It implements adaptive quality thresholds that can vary based on thought domain, importance, and usage context. Quality assessor 660 also provides detailed quality reports that can be used to guide cache maintenance operations and thought synthesis decisions, and it can trigger automatic thought improvement processes when quality metrics fall below acceptable thresholds.

Description of Method Aspects

FIG. 7 is a flow diagram illustrating an exemplary method for natural language processing using a dual-model approach with thought generation. In a first step 700, the system receives a prompt from a user. This prompt can be any form of natural language input, such as a question, command, or statement. For example, a user might input "Explain how quantum entanglement works and its applications in quantum computing."

In a step 710, the system processes the prompt through a first large language model. This model is the larger of the two models, containing more parameters and greater processing capability. During this step, the prompt is encoded and processed through the model's architecture to begin the reasoning process. Continuing the example, the large model begins analyzing the quantum entanglement prompt to understand its complexity and required knowledge domains.

In a step 720, the first large language model converts the prompt into thoughts. These thoughts represent the model's reasoning process and understanding of the prompt's requirements. For the quantum entanglement example, the model might generate thoughts such as: "Quantum entanglement involves pairs of particles maintaining correlated properties regardless of distance" and "In quantum computing, entanglement enables quantum bits to exist in multiple states simultaneously, increasing computational power."

In a step 730, the system routes both the original prompt and the generated thoughts to a second large language model that has fewer parameters than the first model. This routing process combines the original prompt and the generated thoughts into a structured input format that the smaller model can efficiently process. Using the example, both the quantum entanglement prompt and the theoretical thoughts about quantum mechanics are packaged together and sent to the smaller model.

In a step 740, the system generates a response using the second large language model, utilizing both the original prompt and the thoughts generated by the first model. This smaller model, while having fewer parameters, can generate high-quality responses because it has access to the sophisticated reasoning already performed by the larger model. In the quantum entanglement example, the smaller model can now generate a clear, accurate response by leveraging both the original prompt and the theoretical framework provided by the larger model's thoughts, without needing to independently reason about complex quantum mechanics concepts.

This method enables efficient use of computational resources while maintaining response quality by leveraging the strengths of both models: the sophisticated reasoning capabilities of the larger model and the efficient response generation of the smaller model.

FIG. 8 is a flow diagram illustrating an exemplary method for thought creation, evaluation, and storage within the system. In a first step 800, the system receives a prompt from a user. This prompt represents any natural language input that requires processing. For example, a user might input "What are the implications of quantum computing on modern cryptography?"

In a step 810, the prompt analyzer processes the input to determine key concepts and requirements. During this step, the analyzer identifies main topics, subtopics, and relationships between concepts. In our example, the analyzer would identify key concepts such as "quantum computing," "cryptography," and their intersection, while also determining the need for forward-looking analysis given the word "implications."

In a step 820, the system queries the thought cache to determine if similar thoughts exist. The query process involves searching both local and potentially global caches for thoughts that match the analyzed concepts. For the example, the system might search for existing thoughts about quantum computing's effects on encryption methods, post-quantum cryptography, or quantum-safe algorithms.

In a step 830, if no similar thoughts exist or existing thoughts aren't sufficiently relevant, the system generates new thoughts using a thought synthesizer. This component may combine fragments of related thoughts or generate entirely new ones. Following the example, if thoughts about quantum computing and modern cryptography exist separately, the synthesizer might combine and adapt them to address their intersection specifically.

In a step 840, the quality assessor evaluates the newly synthesized thoughts. This evaluation considers factors such as relevance, coherence, and completeness. For instance, it would assess whether the synthesized thoughts about quantum computing's cryptographic implications adequately cover both technical and practical aspects of the topic.

In a step 850, the system stores the new thoughts in the cache with appropriate metadata and indexing. This step includes tagging the thoughts with relevant keywords, creating appropriate vector embeddings for future similarity searches, and organizing them within the cache's structure. The thoughts about quantum cryptography might be indexed under both quantum computing and cryptography categories, with metadata indicating their relationship to security, encryption, and future technology implications. This method ensures that the system continuously builds and refines its knowledge base while maintaining quality and accessibility of stored thoughts.

FIG. 9 is a flow diagram illustrating an exemplary method for synchronizing thought caches between local devices and a global cloud environment. In a first step 900, the system initializes a connection between a local device and the cloud environment. This step establishes secure communication channels and verifies authentication credentials. For example, when a user's mobile device connects to the cloud service, it establishes an encrypted connection and validates the device's identity and permissions.

In a step 910, the system identifies new or modified thoughts in the local cache since the last synchronization event. This involves comparing timestamp metadata and modification flags of local thoughts with the last known sync state. For instance, if a user has generated new thoughts about quantum computing on their device while offline, these would be flagged for potential synchronization.

In a step 920, the system evaluates the quality and relevance of local thoughts for global storage. This evaluation considers factors such as thought complexity, uniqueness, and potential value to other users. For example, if a local device has generated highly specialized thoughts about quantum cryptography, the system assesses whether these thoughts would be valuable additions to the global knowledge base.

In a step 930, the system uploads selected local thoughts to the global cache through the sync controller. This step includes formatting the thoughts for global storage and managing the upload process. Continuing the example, the quantum cryptography thoughts would be packaged with appropriate metadata and transferred to the global cache.

In a step 940, the system queries the global cache for new relevant thoughts based on the device profile and usage patterns. This involves analyzing the user's interests and recent activities to identify potentially useful thoughts from the global cache. For instance, if the user frequently works with cryptography-related prompts, the system would search for recent additions to the global cache in this domain.

In a step 950, the system downloads selected global thoughts to the local cache based on relevance and storage capacity. This step optimizes local storage by prioritizing the most relevant thoughts while considering device limitations. For example, the system might download new thoughts about quantum encryption while removing older, less relevant thoughts to maintain optimal cache size.

In a step 960, the system updates synchronization metadata and timestamps for the next sync cycle. This includes recording which thoughts were synchronized, updating version information, and setting markers for the next synchronization event. This information ensures future sync cycles can efficiently identify new changes and maintain cache consistency. This method enables efficient knowledge sharing across a network of devices while maintaining both local and global thought repositories, effectively creating a distributed learning system that benefits from collective user interactions.

Figure 10:
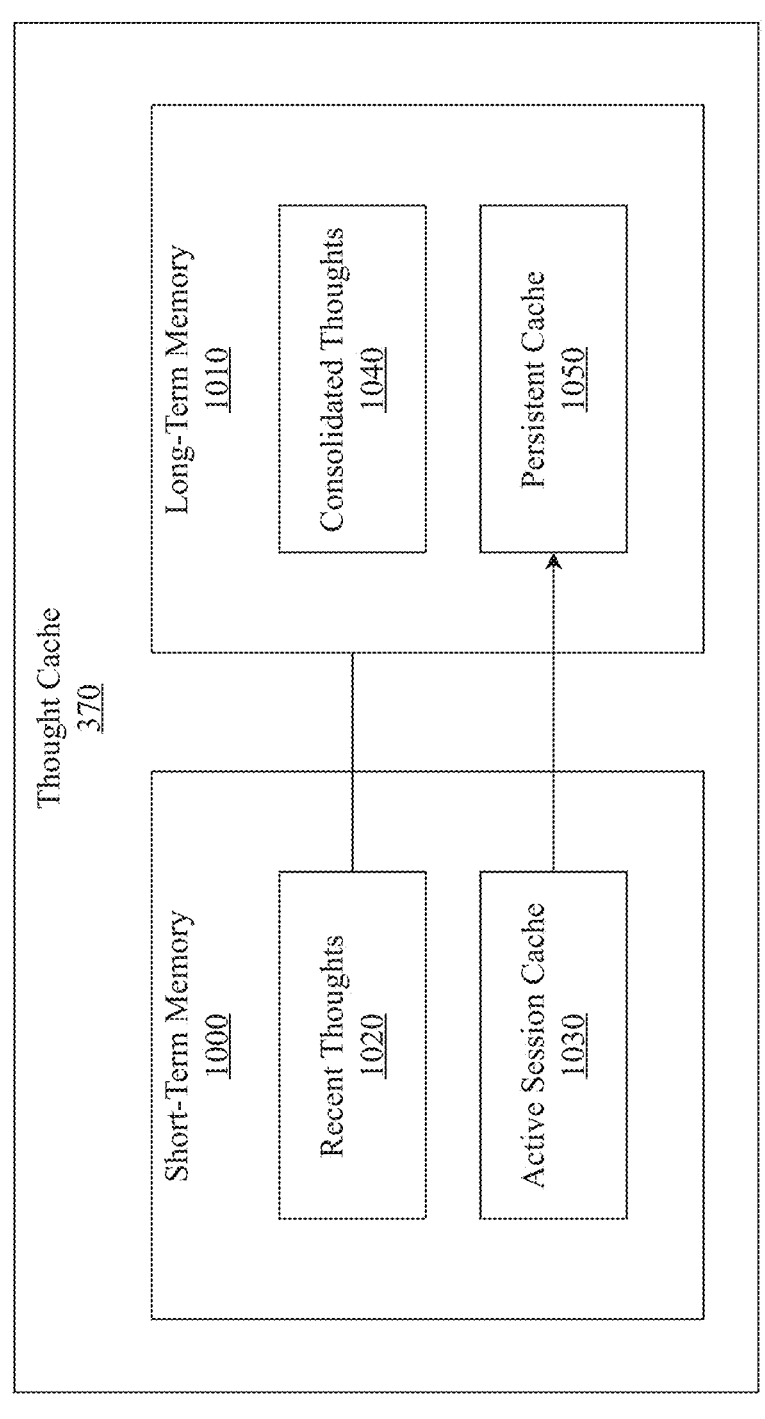
FIG. 10 is a flow diagram illustrating an exemplary system architecture of a thought cache that has both a long-term memory and a short-term memory.

FIG. 10 is a block diagram illustrating an exemplary system architecture of a thought cache that has both a long-term memory and a short-term memory. In one embodiment, thought cache 370 represents a system for maintaining effectively unlimited context in language models through progressive compression and intelligent caching of thought patterns, enabling shared reasoning across multiple AI instances.

Thought cache 370 implements both a short-term memory 1000 and a long-term memory 1010. This dual-memory architecture enables the system to maintain both immediate computational context and historical reasoning patterns while managing computational resources efficiently.

The short-term memory 1000 comprises recent thoughts 1020 and an active session cache 1030. Recent thoughts 1020 maintain complete thought fidelity, storing both the explicit reasoning chains and the internal model states that generated them. This storage preserves not only the textual representation of thoughts but also the computational context and attention patterns that produced them, enabling precise replication of reasoning processes. The active session cache 1030 provides rapid access to these thoughts and their associated states, optimizing performance for ongoing interactions and enabling immediate thought sharing between different AI instances or specialized reasoning modules operating within the same session.

The long-term memory 1010 implements a more sophisticated storage approach through consolidated thoughts 1040 and a persistent cache 1050. Consolidated thoughts 1040 represent progressively compressed versions of thought patterns, where multiple related thoughts are combined into more compact representations while preserving essential reasoning patterns. This consolidation process employs various compression techniques, including attention-based compression, semantic clustering, and state space reduction. The persistent cache 1050 implements an indexed storage system that enables semantic search and retrieval of these consolidated thoughts, supporting efficient thought sharing across different AI instances and computing sessions.

The system implements bidirectional information flow between these components. Thoughts can move from recent thoughts 1020 to consolidated thoughts 1040 through progressive compression, while the active session cache 1030 can transfer frequently accessed patterns to the persistent cache 1050 for long-term retention. This bidirectional flow enables dynamic thought sharing between different system components and AI instances, supporting collaborative reasoning across multiple agents.

The architecture supports multiple implementation approaches for thought storage and transfer. Thoughts can be stored as chain-of-thought text, internal model states, attention patterns, or hybrid representations combining multiple formats. The system can dynamically select the most appropriate storage format based on the thought's intended use and the capabilities of the AI instances that may access it.

This architectural design enables the thought cache to serve as a central memory system for multiple AI instances, supporting collaborative reasoning while maintaining computational efficiency. The combination of short-term and long-term memory systems, along with progressive compression and flexible thought representation, allows the system to maintain effectively unlimited context while enabling efficient thought sharing across different AI agents and reasoning modules.

Through this architecture, the system achieves both unbounded context maintenance and efficient cross-instance thought sharing, two key innovations that enable more sophisticated and resource-efficient AI reasoning systems. The design's flexibility in implementation approaches and storage formats helps prevent trivial circumvention while enabling broad application across different types of language models and AI systems.

In one embodiment the system implements a collaborative thought sharing architecture that enables multiple AI agents to access and utilize a common thought cache. This shared cache architecture supports distributed reasoning across different types of language models and specialized reasoning modules while maintaining thought consistency and accessibility. When multiple users or AI agents operate within the system, they can all contribute to and benefit from the accumulated reasoning patterns stored in the shared cache.

The shared thought cache maintains a unified index that enables any authorized user or AI agent to access relevant thoughts regardless of which agent originally generated them. This indexing system tracks not only the content of thoughts but also their originating context, generating agent, and successful usage patterns. For example, when a specialized mathematical reasoning module generates a thought containing a proof strategy, that thought becomes available to general language models handling related mathematical queries, enabling them to leverage expert reasoning patterns without duplicating the computational effort.

Thought transfer between specialized reasoning modules occurs through a standardized thought protocol. This protocol defines how thoughts are packaged, transmitted, and unpacked between different types of AI agents. When transferring thoughts, the system includes not just the reasoning content but also relevant metadata such as the thought's context requirements, assumptions, and compatibility markers. For instance, if a natural language processing agent generates insights about sentence structure, these thoughts can be transferred to a grammar checking module in a format that preserves the structural analysis while adapting it to the specialized module's processing requirements.

The system coordinates collaborative reasoning through a central orchestration mechanism. This orchestrator tracks which agents are actively processing related prompts and manages the flow of thoughts between them. When multiple agents encounter similar reasoning requirements, the orchestrator can initiate thought sharing to prevent redundant computation. For example, if one agent has already performed detailed analysis of a complex concept, other agents can build upon that analysis rather than repeating it.

Cross-instance reasoning is enabled through thought synthesis capabilities. When different model instances approach similar problems from different angles, their thoughts can be combined to create more comprehensive understanding. The system tracks the complementary strengths of different model instances and can route thoughts to the most appropriate agent for specific types of reasoning tasks. For instance, a general language model might handle initial prompt analysis, while specialized agents process domain-specific aspects, with their combined thoughts contributing to the final response.

The shared cache implements sophisticated access control and version management to maintain thought integrity across multiple agents. Each thought is versioned to track its evolution as different agents interact with and build upon it. The system maintains provenance information that records how thoughts are transformed and combined through multi-agent collaboration, enabling attribution and quality assessment of collaborative reasoning patterns.

Through these mechanisms, the system enables efficient distribution of reasoning tasks across specialized modules while maintaining coherent thought flow. The collaborative architecture allows different AI agents to contribute their specialized capabilities while benefiting from the collective reasoning capacity of the system. This approach significantly reduces computational redundancy while enabling more sophisticated reasoning through the combination of multiple specialized perspectives.

Figure 11:
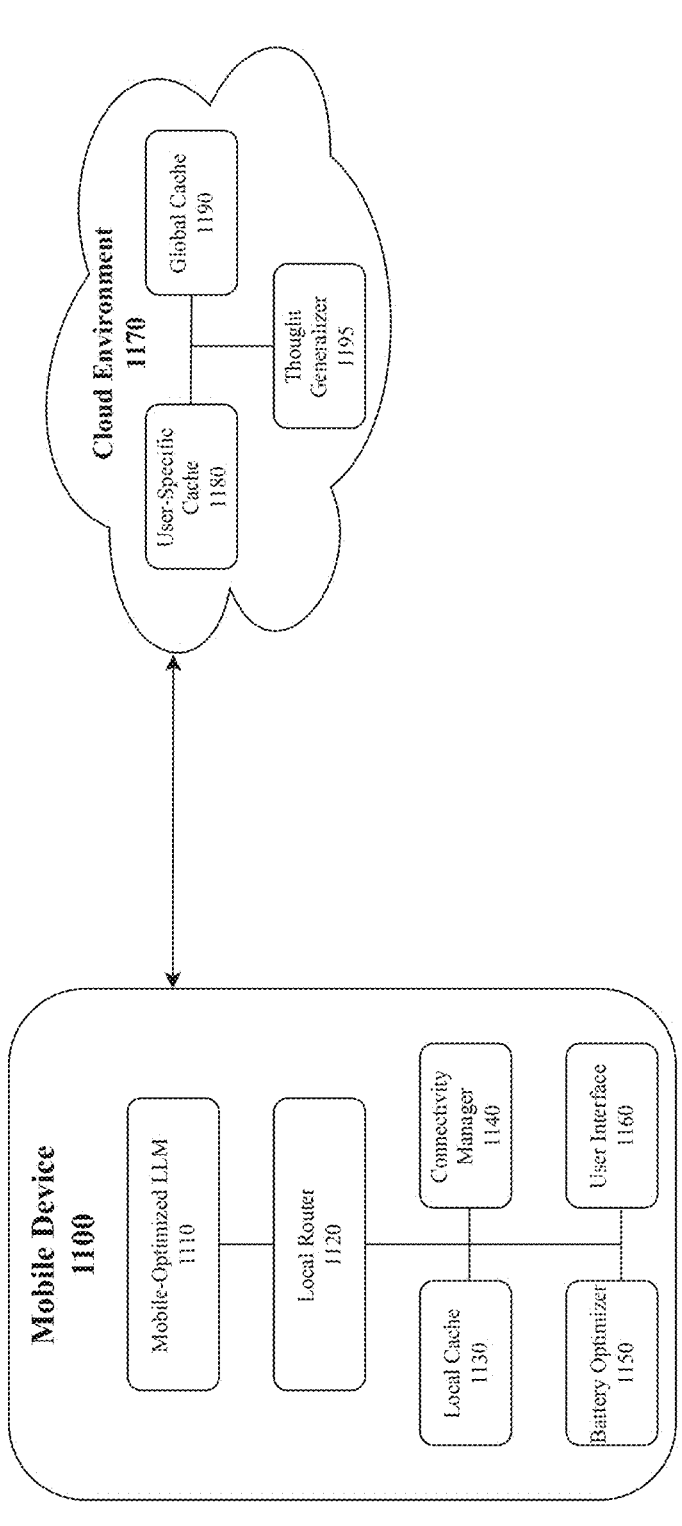
FIG. 11 is a block diagram illustrating exemplary architecture of mobile device optimized multi-stage LLM.

FIG. 11 is a block diagram illustrating exemplary architecture of mobile device optimized multi-stage LLM, in an embodiment. System 1100 operates primarily on mobile computing devices such as, but not limited to, smartphones, tablets, or wearable devices, with cloud connectivity for expanded capabilities.

Mobile device portion of system 1100 comprises several interconnected subsystems that enable efficient natural language processing while addressing mobile-specific constraints. Mobile-optimized LLM 1110 serves as primary processing engine for generating thoughts from user prompts. Unlike traditional large language models, mobile-optimized LLM 1110 employs architectural optimizations specific to mobile execution environments, including model quantization, attention mechanism optimizations, and memory-efficient transformer implementations. Mobile-optimized LLM 1110 processes user prompts to generate intermediate reasoning steps referred to as thoughts, which represent model's analysis and understanding of prompt requirements.

Local router 1120 functions as central coordination mechanism, determining processing paths for user prompts and managing data flow between system components. When user prompt is received, local router 1120 analyzes prompt characteristics and determines whether to process prompt through mobile-optimized LLM 1110 or attempt to retrieve relevant thoughts from local cache 1130. Local router 1120 implements decision logic based on prompt similarity to previously processed queries, availability of cached thoughts, current device resource state, and connectivity status.

Local cache 1130 stores both user-specific thoughts and frequently accessed generalized thoughts directly on mobile device. Local cache 1130 implements efficient storage and retrieval mechanisms optimized for limited mobile storage capacity, including compression techniques and priority-based caching policies. Local cache 1130 maintains two primary sections: personal section for user-specific thoughts and generalized section for commonly used reasoning patterns. This two-section approach enables offline functionality while maintaining privacy boundaries between personal and shared knowledge.

Connectivity manager 1140 monitors network status and manages data synchronization between mobile device and cloud environment. When network connectivity is available, connectivity manager 1140 orchestrates bidirectional synchronization of thoughts between local cache 1130 and both user-specific cloud cache 1180 and global cache 1190. Connectivity manager 1140 implements intelligent synchronization policies, including prioritizing high-value thoughts for limited connectivity scenarios, scheduling bandwidth-intensive operations during optimal network conditions, and maintaining synchronization queues when connectivity is intermittent.

Battery optimizer 1150 monitors device power state and dynamically adjusts system behavior to maximize battery efficiency. Battery optimizer 1150 implements multiple execution profiles for mobile-optimized LLM 1110, ranging from high-performance operation when device is charging to minimal power consumption modes when battery level is critical. Battery optimizer 1150 also coordinates with connectivity manager 1140 to schedule energy-intensive operations such as thought synchronization during charging periods or when device is in idle state.

User interface 1160 provides interaction layer between user and system 1100, handling prompt input and response presentation. User interface 1160 may integrate with mobile device capabilities such as voice input, camera-based context sensing, and haptic feedback to enhance interaction experience. User interface 1160 also provides transparency indicators when system operates in offline mode, communicating confidence levels and limitations appropriately to users.

Cloud environment 1170 extends capabilities of system 1100 beyond constraints of mobile device, providing expanded storage capacity and computational resources for specific operations. User-specific cloud cache 1180 securely stores complete history of user thoughts with appropriate encryption and access controls. Unlike local cache 1130 which must prioritize storage of thoughts based on utility and recency, user-specific cloud cache 1180 maintains comprehensive record of user interactions and generated thoughts, enabling long-term context preservation without consuming mobile device storage resources. User-specific cloud cache 1180 encrypts all stored thoughts with user-specific keys to maintain privacy and prevent unauthorized access.

Global cache 1190 maintains repository of generalized thoughts applicable across multiple users. These thoughts represent common reasoning patterns and knowledge structures that have utility beyond individual user contexts. Global cache 1190 organizes thoughts into domain-specific clusters, reasoning frameworks, and abstracted templates to facilitate efficient retrieval based on prompt characteristics. Unlike user-specific cloud cache 1180, global cache 1190 contains no personally identifiable information or user-specific context.

Thought generalizer 1195 processes user-generated thoughts to create anonymized, generalized thought patterns for global cache 1190. Thought generalizer 1195 implements multi-stage pipeline including pattern recognition to identify similar reasoning approaches across users, context removal techniques that strip away user-specific elements, and abstraction methods that transform specific thoughts into more universally applicable structures. Thought generalizer 1195 operates exclusively in cloud environment 1170 to leverage increased computational resources and access to thoughts across multiple users.

In operation, when user submits prompt through user interface 1160, local router 1120 first queries local cache 1130 to determine if relevant thoughts exist. If suitable thoughts are found, they are combined with original prompt and processed by smaller language model (not shown in FIG. 11, see for example FIG. 5) to generate response. If no relevant thoughts exist in local cache 1130, local router 1120 checks connectivity status through connectivity manager 1140. If online, system may query user-specific cloud cache 1180 and global cache 1190 for relevant thoughts. If offline or if no relevant thoughts are found in cloud caches, prompt is processed by mobile-optimized LLM 1110 to generate new thoughts. These new thoughts are then processed along-side original prompt by smaller language model to generate response.

Throughout this process, battery optimizer 1150 continu-ously monitors power state and adjusts system behavior accordingly. When device is charging or has sufficient battery capacity, system may utilize more complex model configurations or perform background synchronization operations. When battery level is low, system prioritizes efficiency over comprehensive processing, potentially uti-lizing more cached thoughts or simplified model configu-rations.

New thoughts generated during operation are cached in local cache 1130 and, when connectivity permits, synchro-nized with user-specific cloud cache 1180 through connec-tivity manager 1140. Connectivity manager 1140 imple-ments priority-based synchronization, ensuring most valuable thoughts are transferred first during limited con-nectivity periods. Thought generalizer 1195 periodically analyzes thoughts across multiple users to identify patterns suitable for generalization, with resulting abstracted thoughts stored in global cache 1190 for broader reuse across system.

Figure 12:
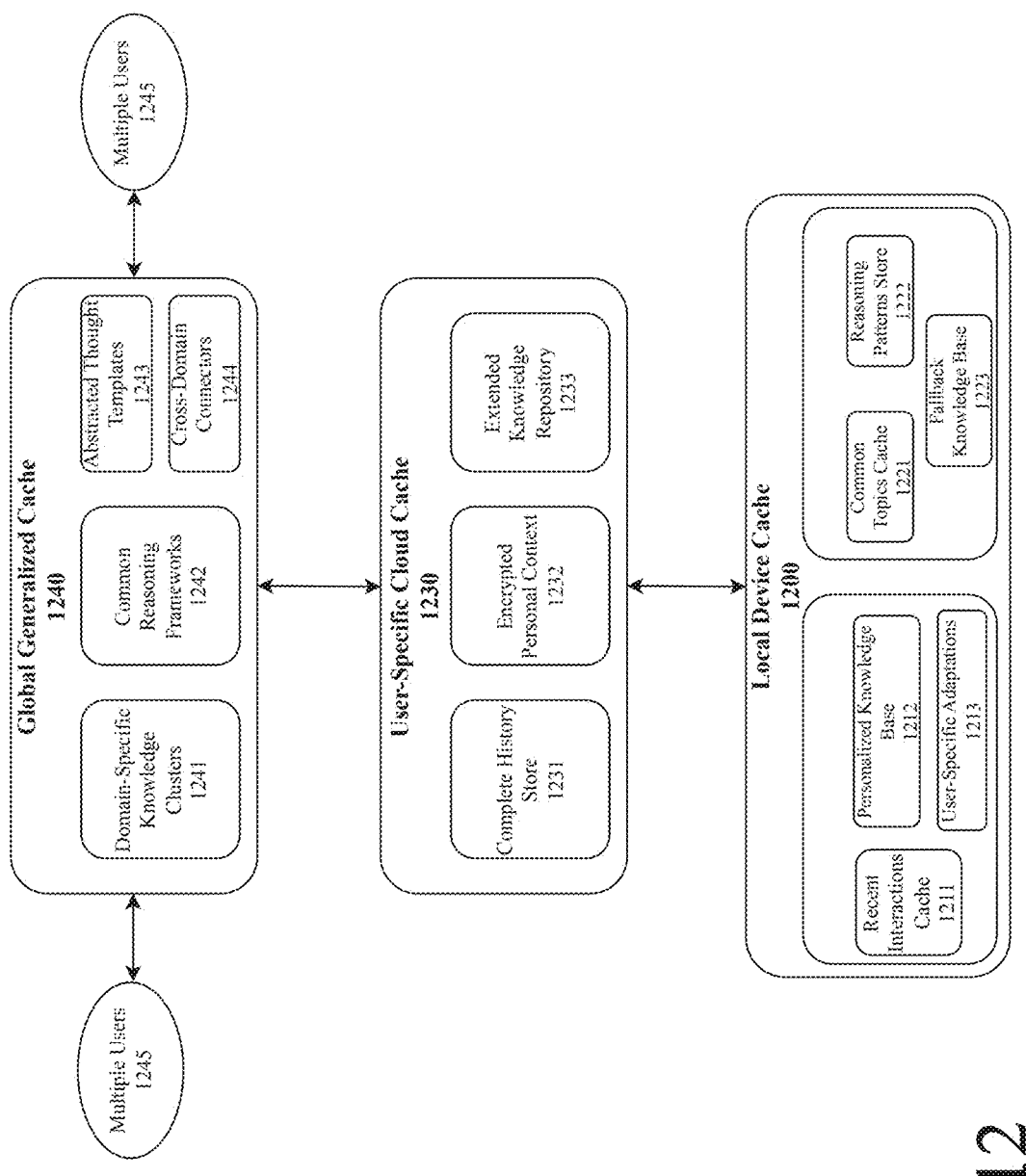
FIG. 12 is a block diagram illustrating exemplary architecture of three-tier thought caching architecture.

FIG. 12 is a block diagram illustrating exemplary archi-tecture of three-tier thought caching architecture, in an embodiment. Three-tier thought caching architecture 1200 implements hierarchical approach to thought storage that balances privacy, efficiency, and knowledge sharing while accommodating constraints of mobile computing environ-ments.

At device level, local device cache 1200 serves as primary storage mechanism for thoughts directly accessible on mobile device without requiring network connectivity. Local device cache 1200 comprises two main sections optimized for different types of thought storage. Personal section 1210 maintains user-specific thoughts and personalized knowl-edge patterns. Within personal section 1210, recent interac-tions cache 1211 stores thoughts generated during latest user sessions with full fidelity and minimal compression, ensur-ing rapid access to immediately relevant context. Recent interactions cache 1211 implements sliding window approach, where older thoughts gradually transition to more compressed formats or move to cloud storage based on configurable retention policies. Personalized knowledge base 1212 maintains thoughts representing user-specific knowledge, preferences, and recurring patterns identified across multiple sessions. Unlike recent interactions cache 1211 which preserves detailed token-level information, per-sonalized knowledge base 1212 stores more abstracted rep-resentations focused on core concepts and relationships pertinent to user. User-specific adaptations 1213 captures customizations to general thought patterns based on user interaction history, including terminology preferences, rea-soning approaches, and domain-specific variations that diverge from generalized patterns.

Generalized section 1220 of local device cache stores non-personal, broadly applicable thoughts that enhance offline capabilities without compromising privacy. Common topics cache 1221 maintains frequently accessed general knowledge applicable across multiple contexts, prioritizing storage based on usage frequency, user interests, and pre-dictive pre-caching based on user behavior patterns. Rea-soning patterns store 1222 contains abstract thought struc-tures representing common reasoning frameworks, such as analysis methodologies, problem-solving approaches, and logical structures that can be applied across domains. Fall-back knowledge base 1223 provides essential baseline knowledge for offline operation when network connectivity is unavailable, including fundamental concepts and broadly applicable information selected based on relevance to user's typical interaction patterns.

Second tier of architecture, user-specific cloud cache 1230, extends personal thought storage beyond limitations of mobile device while maintaining strict privacy boundar-ies. Complete history store 1231 maintains comprehensive record of user-generated thoughts across all interactions, enabling access to historical context beyond storage con-straints of local device. Complete history store 1231 imple-ments intelligent compression strategies where older thoughts transition to increasingly abstract representations while maintaining essential semantic content and relational links. Encrypted personal context 1232 secures sensitive user-specific information using encryption keys accessible only to specific user, ensuring personal data remains pro-tected even within shared cloud infrastructure. Encrypted personal context 1232 stores thoughts containing personally identifiable information, private preferences, and confiden-tial content with enhanced security measures beyond stan-dard cache protections. Extended knowledge repository 1233 maintains broader collection of user-relevant thoughts that exceed local storage capacity, organized by topic domains, temporal relationships, and usage patterns to facili-tate efficient retrieval when needed.

Third tier, global generalized cache 1240, enables knowl-edge sharing across multiple users without compromising individual privacy. Domain-specific knowledge clusters 1241 organize thoughts by subject areas, professional domains, or topic categories, enabling efficient retrieval based on prompt context. Domain-specific knowledge clus-ters 1241 may implement varying levels of specialization, from broadly applicable concepts to highly technical domain knowledge, with appropriate metadata to support context-aware retrieval. Common reasoning frameworks 1242 store generalized thought patterns representing widely used ana-lytical approaches, problem-solving methodologies, and logical structures independent of specific content domains. These frameworks serve as templates that can be instantiated with domain-specific knowledge to address particular prompts. Abstracted thought templates 1243 provide stan-dardized reasoning structures derived from recurring pat-terns across multiple users, with all personal information and specific context removed. Abstracted thought templates 1243 maintain core logical flow and analytical value while eliminating any identifiable user connections or private information. Cross-domain connectors 1244 facilitate knowledge transfer between different subject areas by main-taining thoughts that establish relationships, analogies, or transformations between distinct knowledge domains, enabling more sophisticated reasoning across traditional domain boundaries.

Multiple users 1245 interact with global generalized cache 1240, both contributing to and benefiting from shared knowledge repository. Each user maintains separate local device cache 1200 and user-specific cloud cache 1230, while accessing common global generalized cache 1240, creating ecosystem where reasoning patterns can be refined and enhanced through collective usage while maintaining clear privacy boundaries.

Data flows within three-tier architecture follow specific patterns designed to balance efficiency, privacy, and knowledge sharing. When new thoughts are generated on mobile device, they are first stored in local device cache 1200, typically beginning in recent interactions cache 1211. Based on thought characteristics and privacy implications, thoughts may remain exclusively in personal section 1210 or, if containing no personal information, may also be stored in generalized section 1220 for offline access. When network connectivity is available, connectivity manager synchronizes appropriate thoughts with user-specific cloud cache 1230, prioritizing thoughts based on value, recency, and bandwidth availability. Personal thoughts with private information are exclusively synchronized to encrypted personal context 1232, while more general thoughts may be stored in extended knowledge repository 1233.

Thought generalizer periodically analyzes patterns across multiple users, identifying common reasoning structures that could benefit broader user base. When candidate patterns are identified, thought generalizer removes all personal information and specific context, creating abstracted versions suitable for global sharing. These generalized thoughts undergo validation for utility, quality, and privacy preservation before being added to global generalized cache 1240 in appropriate categories. Regular synchronization processes ensure most valuable generalized thoughts are available in local device cache 1200 of each user, even during offline operation, while respecting storage limitations of mobile devices.

Through this tiered architecture, system balances competing requirements of mobile environments, enabling efficient local operation with limited storage capacity, comprehensive personal history through cloud extensions, and knowledge sharing across users while maintaining strict privacy boundaries throughout thought lifecycle.

Figure 13:
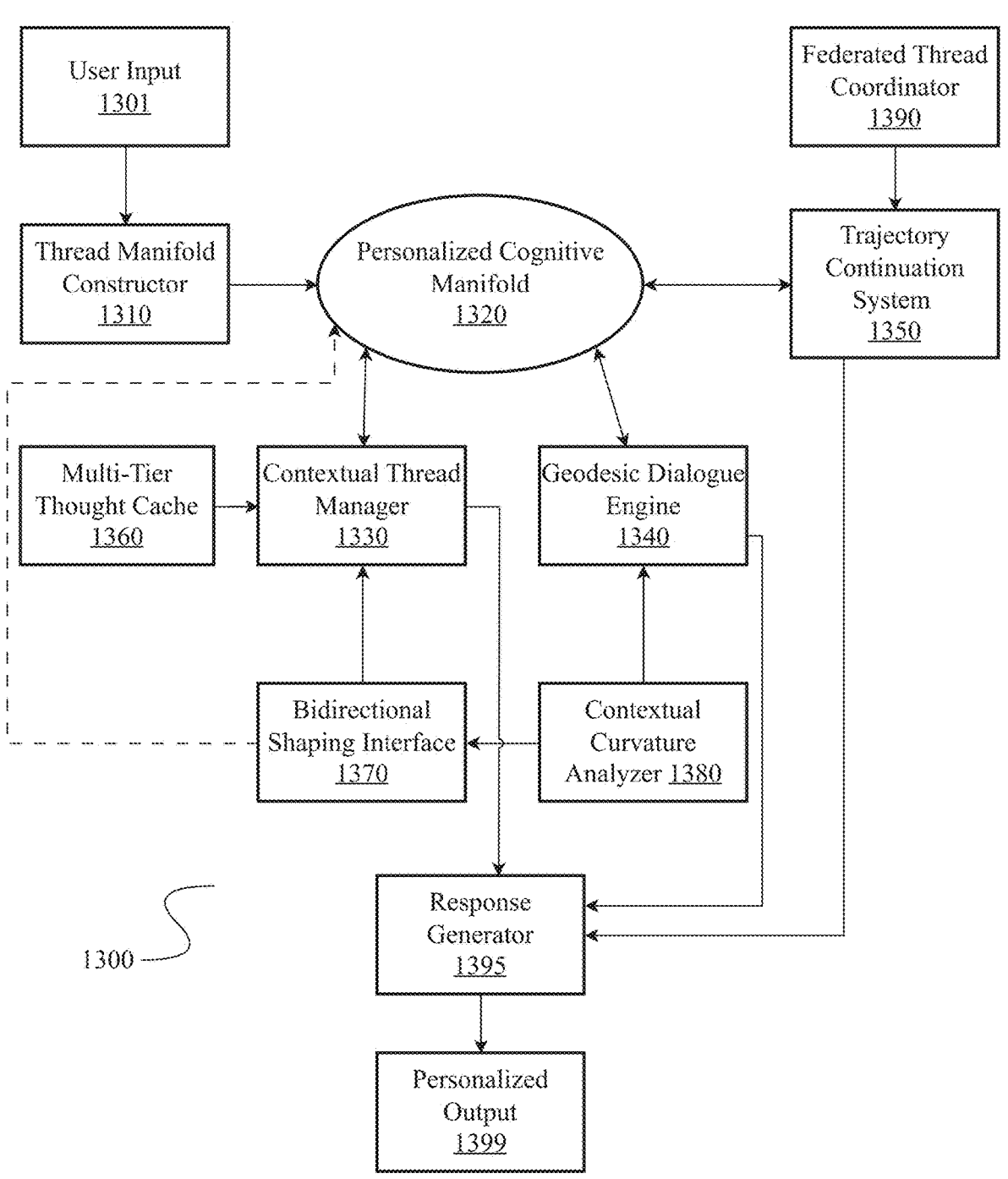
FIG. 13 is a block diagram illustrating exemplary architecture of a latent contextual threading system for personalized PCM-human dialogues, according to an embodiment.

FIG. 13 is a block diagram illustrating exemplary architecture of a latent contextual threading system for personalized PCM-human dialogues 1300, according to an embodiment. The system represents an implementation of a persistent cognitive machine architecture that enables continuous, personalized dialogue experiences through geometric manifold-based contextual threading rather than traditional session-based interactions. Latent contextual threading system 1300 builds upon a mobile-optimized multi-stage LLM architecture and geometric memory manifold systems incorporated herein by reference while introducing components specifically designed to maintain dialogue continuity through personalized cognitive trajectory management.

User input 1301 may comprise various forms of natural language input including text, voice, or multimodal communications that initiate or continue dialogue interactions with the system. User input 1301 may include embedded contextual markers, thread identifiers, or temporal references that assist the system in determining appropriate dialogue continuation strategies. The input may be processed to extract semantic vectors, intent classifications, and trajectory alignment parameters that facilitate geometric manifold navigation. In various embodiments, user input 1301 may be encoded using transformer-based embedding techniques, converted to high-dimensional latent representations, or processed through domain-specific encoding mechanisms that preserve conversational context and user-specific patterns.

Thread manifold constructor 1310 processes user input 1301 through geometric analysis algorithms that determine optimal manifold region selection and trajectory initialization parameters. The constructor may implement Riemannian metric tensor calculations to evaluate local curvature properties, perform geodesic distance measurements to identify proximate dialogue regions, and execute manifold parameterization operations that establish coordinate systems for trajectory navigation. According to various embodiments, thread manifold constructor 1310 utilizes compression-based similarity detection algorithms that identify semantically related dialogue regions, implement attractor field analysis that determines gravitational influences from existing conversation threads, and perform dimensional projection techniques that map high-dimensional input representations onto manifold coordinate systems while preserving essential semantic relationships.

Personalized cognitive manifold 1320 represents the core geometric substrate implemented as a differentiable Riemannian manifold (e.g., $M \subset R^d$) embedded within high-dimensional latent space. The manifold maintains user-specific curvature tensors that encode dialogue preferences, conversation flow patterns, and semantic association strengths developed through repeated interactions. According to various embodiments, the manifold may implement sectional curvature calculations $K(\sigma)$ that quantify semantic coherence within dialogue regions, maintain metric tensor fields guy that encode distance relationships between conversational concepts, and utilize parallel transport operations that enable consistent trajectory continuation across manifold regions. The manifold may store trajectory histories as parameterized curves $\gamma: [t_0, t_1] \rightarrow M$ with associated velocity vector fields that capture conversation momentum and directional preferences.

Contextual thread manager 1330 implements a thread state management system that maintains multiple simultaneous dialogue trajectories through coordinate tracking, state serialization, and context switching algorithms. The manager may utilize thread identification hashing functions that generate unique identifiers for dialogue contexts, implement priority queue data structures for managing thread activation sequences, and maintain thread metadata including creation timestamps, access frequencies, and complexity metrics. According to various embodiments, contextual thread manager 1330 may implement Markov chain models for predicting thread transition probabilities, utilize attention-based weighting mechanisms for determining thread relevance scores, and perform geometric clustering operations that group related dialogue contexts into coherent thread families. Detailed operational algorithms and data structures for contextual thread manager 1330 are further illustrated and described with reference to FIG. 14.

Geodesic dialogue engine 1340 generates responses through manifold traversal operations that follow geodesic paths within personalized cognitive manifold 1320 rather than discrete retrieval mechanisms. The engine may implement path optimization algorithms that solve the geodesic equation $D^2\gamma/dt^2 + \Gamma^k_{ij}(d\gamma^i/dt)(d\gamma^j/dt) = 0$ to determine optimal trajectory continuations, where $\Gamma^k_{ij}$ represents Christoffel symbols encoding manifold curvature. According to various embodiments, geodesic dialogue engine 1340 may utilize variational calculus techniques for minimizing path energy functionals, implement numerical integration schemes for trajectory propagation, and perform geodesic deviation analysis to assess response coherence through geometric stability measures. The engine can also implement intent vector field integration that modulates geodesic paths according to user goal specifications, enabling goal-directed dialogue navigation while maintaining trajectory smoothness.

Trajectory continuation system 1350 maintains dialogue coherence across temporal discontinuities through state serialization, manifold coordinate preservation, and trajectory reconstruction algorithms. The system may implement manifold embedding techniques that preserve geometric relationships during state storage, utilize coordinate transformation matrices for aligning restored trajectories with current manifold configurations, and perform trajectory validation operations that ensure continuation viability through curvature analysis. According to various embodiments, trajectory continuation system 1350 may maintain trajectory caches using compressed representations that preserve essential geometric properties while minimizing storage requirements, implement temporal decay models that adjust trajectory accessibility based on recency and usage patterns, and utilize predictive trajectory extension algorithms that anticipate likely continuation paths based on historical patterns and current context.

Multi-tier thought cache 1360 extends the hierarchical caching architecture with dialogue-specific optimizations including thread-aware indexing, conversation-temporal organization, and personalized retrieval strategies. The cache may implement semantic hashing functions optimized for conversational contexts, maintain separate storage tiers for short-term dialogue working memory, medium-term conversation history, and long-term user interaction patterns. Bidirectional shaping interface 1370 processes user feedback through geometric deformation algorithms that modify manifold curvature in real-time, implementing curvature flow equations $\partial g/\partial t = -2\mathrm{Ric}(g) + \text{user\_feedback\_tensor}$ that evolve metric properties based on interaction patterns.

Contextual curvature analyzer 1380 evaluates dialogue coherence through Ricci curvature calculations, geodesic deviation measurements, and sectional curvature analysis that provide quantitative assessments of conversation flow quality. Federated thread coordinator 1390 manages cross-user thread interactions through privacy-preserving manifold intersection algorithms and selective knowledge transfer protocols adapted from federated architectures.

Response generator 1395 synthesizes outputs from multiple system components through weighted integration schemes that combine geodesic dialogue continuations, cached thought retrievals, and real-time adaptations to produce contextually coherent responses that maintain geometric trajectory consistency. The generator implements response validation algorithms that verify geometric coherence, semantic consistency, and personalization alignment before producing personalized output 1398.

Throughout operation, latent contextual threading system 1300 maintains continuous bidirectional communication between components through defined interface protocols that enable real-time adaptation, geometric optimization, and personalized dialogue evolution while preserving manifold coherence and ensuring scalable performance across diverse conversational contexts and user interaction patterns.

Figure 14:
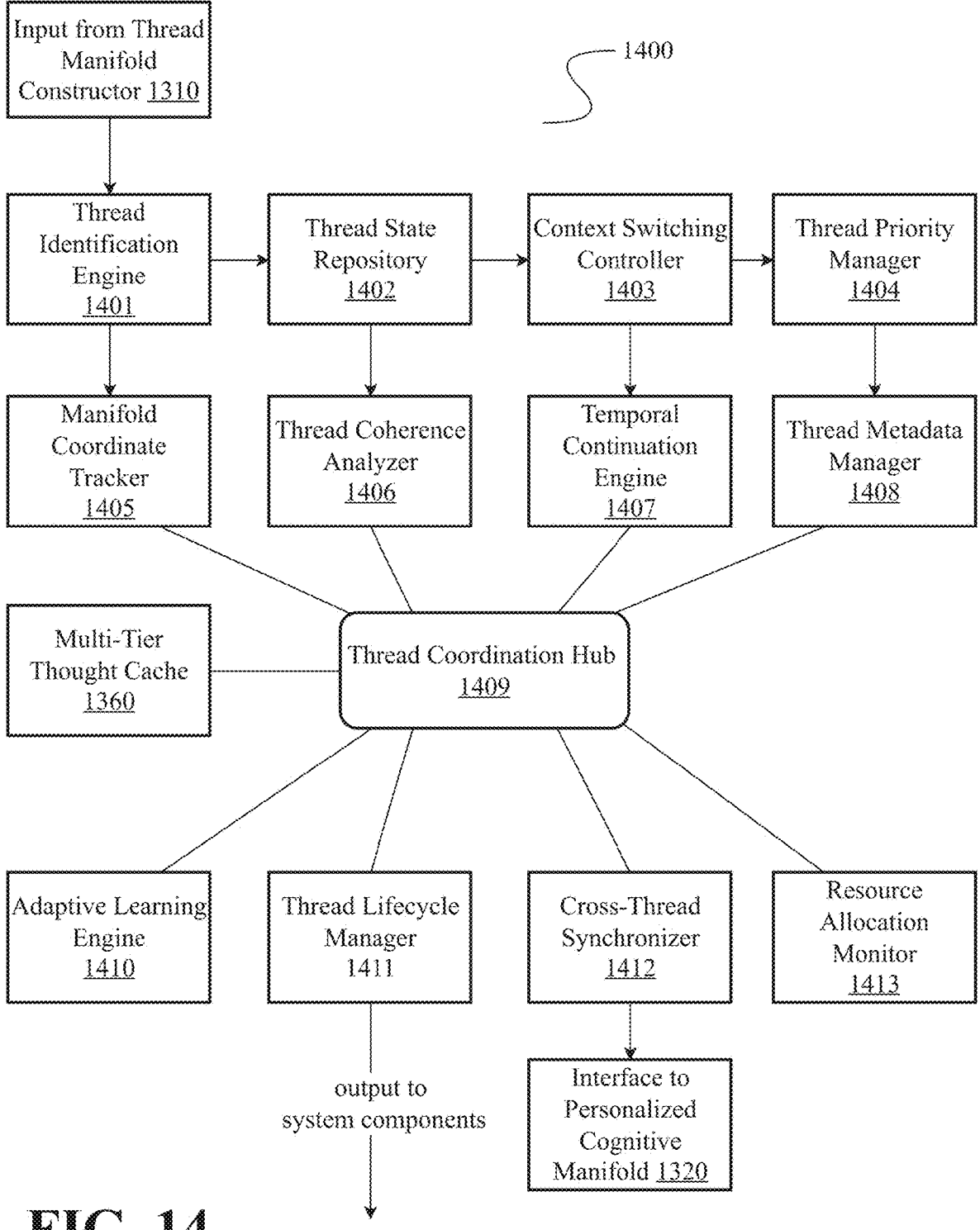
FIG. 14 is a block diagram illustrating exemplary aspect of the latent contextual threading system, a contextual thread manager.

FIG. 14 is a block diagram illustrating exemplary aspect of the latent contextual threading system, a contextual thread manager 1400. Contextual thread manager 1400 is implemented as a component specifically designed to manage multiple simultaneous dialogue threads within personalized cognitive manifolds, enabling users to maintain complex, multi-faceted conversations with seamless context switching and temporal continuity. The architecture implements a hierarchical processing approach comprising distinct functional layers that work cooperatively to provide sophisticated thread management capabilities while maintaining geometric manifold coherence and optimizing computational resource utilization.

Input from thread manifold constructor 1310 provides manifold-aligned user input data that has been preprocessed for geometric compatibility and thread identification. This input may comprise latent vector representations, manifold coordinate specifications, semantic feature vectors, and contextual metadata that facilitate thread classification and routing decisions. Thread identification engine 1401 processes incoming input through pattern recognition algorithms that analyze semantic signatures, temporal patterns, and manifold proximity measures to determine whether input corresponds to existing dialogue threads or requires new thread instantiation. According to various embodiments, thread identification engine 1401 may implement locality-sensitive hashing functions for rapid thread matching, utilize semantic embedding similarity calculations for content-based thread identification, and maintain thread signature databases that enable efficient lookup operations. The engine can also implement fuzzy matching algorithms that account for natural variations in user expression while maintaining thread identity consistency across sessions.

A thread state repository 1402 maintains comprehensive state information for all active and dormant dialogue threads using hierarchical storage mechanisms optimized for rapid access and efficient serialization. The repository may implement thread state data structures comprising manifold coordinate vectors, conversation history summaries, context preservation buffers, and temporal metadata including creation timestamps, last access times, and activity frequency metrics. According to various embodiments, thread state repository 1402 may utilize compressed state representations that preserve essential thread characteristics while minimizing storage overhead, implement differential state tracking that records incremental changes rather than complete state snapshots, and maintain state validation mechanisms that ensure thread integrity across system operations. The repository can also implement automated archival policies that migrate inactive threads to long-term storage while preserving accessibility for future reactivation.

A context switching controller 1403 manages transitions between different dialogue threads through one or more state preservation and restoration algorithms that maintain conversational coherence during thread changes. The controller may implement context preservation mechanisms that capture current dialogue state, manifold position, and semantic context before thread transitions, utilize context restoration algorithms that seamlessly reestablish previous dialogue contexts with minimal latency, and perform context validation operations that ensure restored threads maintain semantic and temporal consistency. According to various embodiments, context switching controller 1403 implements predictive context loading that anticipates likely thread transitions based on user patterns, utilize graduated context switching that provides smooth transitions rather than abrupt changes, and maintain context switching metrics that optimize transition performance based on historical usage patterns.

A thread priority manager 1404 implements dynamic prioritization algorithms that determine thread activation sequences, resource allocation strategies, and processing priorities based on multiple factors including user engagement patterns, thread importance indicators, temporal relevance measures, and system resource constraints. The manager may maintain priority queue data structures that enable efficient thread scheduling, implement adaptive priority adjustment algorithms that respond to changing user behavior patterns, and utilize multi-criteria decision making frameworks that balance competing priority factors. According to various embodiments, thread priority manager 1404 can implement machine learning algorithms that predict thread importance based on historical usage data, utilize attention-based weighting mechanisms that adjust priorities based on user focus patterns, and maintain priority inheritance schemes that propagate importance across related threads.

A manifold coordinate tracker 1405 maintains precise positioning information for each dialogue thread within the personalized cognitive manifold, enabling geometric navigation and trajectory-based thread management. The tracker can implement coordinate update algorithms that maintain thread positions as conversations evolve, utilize manifold projection techniques that map thread states onto geometric coordinates, and perform coordinate validation operations that ensure thread positions remain within valid manifold regions. According to various embodiments, manifold coordinate tracker 1405 may maintain coordinate history buffers that enable trajectory analysis and prediction, implement coordinate interpolation algorithms that estimate intermediate positions during thread transitions, and utilize coordinate clustering techniques that identify related thread groupings based on manifold proximity.

A thread coherence analyzer 1406 evaluates dialogue consistency and semantic flow within and across threads using geometric analysis techniques rather than traditional linguistic metrics. The analyzer can implement curvature-based coherence measurements that assess thread stability through manifold geometry analysis, utilize geodesic deviation calculations that quantify conversation flow consistency, and perform cross-thread coherence analysis that identifies potential conflicts or synergies between simultaneous threads. According to various embodiments, thread coherence analyzer 1406 generates coherence scores that guide thread management decisions, implement coherence prediction algorithms that anticipate potential thread degradation, and maintain coherence optimization recommendations that suggest thread consolidation or separation strategies.

A temporal continuation engine 1407 manages time-based aspects of thread management including, but not limited to, session continuity, temporal decay modeling, and long-term thread persistence. The engine can implement temporal weighting algorithms that adjust thread accessibility based on recency and usage patterns, utilize session boundary detection that identifies natural conversation breakpoints, and perform temporal clustering analysis that groups related temporal interactions within thread contexts. According to various embodiments, temporal continuation engine 1407 implements adaptive temporal decay models that preserve important threads longer than casual interactions, utilize predictive temporal modeling that anticipates likely thread reactivation times, and maintain temporal optimization strategies that balance thread availability with resource efficiency.

A thread metadata manager 1408 maintains comprehensive attribute information for each thread including creation parameters, usage statistics, performance metrics, and user-specific customization settings. The manager can implement metadata schema that capture thread characteristics, semantic categories, user preferences, and system performance indicators, utilize metadata indexing mechanisms that enable efficient thread discovery and categorization, and perform metadata analysis operations that identify usage patterns and optimization opportunities. According to various embodiments, thread metadata manager 1408 implements automated metadata generation that infers thread properties from usage patterns, utilize metadata-based recommendation systems that suggest relevant threads to users, and maintain metadata consistency validation that ensures attribute accuracy across system operations.

A thread coordination hub 1409 can be configured as the central logical coordination point that orchestrates interactions between all thread management components, implementing coordination protocols that ensure consistent system behavior and optimal resource utilization. The hub may implement inter-component communication mechanisms that enable efficient data sharing and coordination, utilize global state management that maintains system-wide consistency, and perform coordination optimization that minimizes redundant operations and maximizes processing efficiency. According to various embodiments, thread coordination hub 1409 may implement distributed coordination algorithms that enable scalable thread management across multiple processing instances, utilize event-driven coordination mechanisms that respond to system state changes, and maintain coordination monitoring that tracks system performance and identifies optimization opportunities.

Adaptive learning engine 1410 continuously improves thread management performance through machine learning algorithms that analyze user interaction patterns, system performance metrics, and thread usage statistics to optimize management strategies. The engine may implement reinforcement learning algorithms that adapt thread management policies based on user feedback and engagement metrics, utilize pattern recognition techniques that identify optimal thread management strategies for different user types and usage contexts, and perform continuous model updating that incorporates new data to improve performance over time. According to various embodiments, adaptive learning engine 1410 implements personalized learning models that adapt to individual user preferences and behavior patterns, utilize federated learning approaches that improve performance while preserving user privacy, and maintain learning validation mechanisms that ensure model improvements provide genuine benefits.

A thread lifecycle manager 1411 handles complete thread management from creation through archival, implementing policies and procedures that optimize thread resource utilization while preserving important conversation history. The manager may implement thread creation algorithms that establish new threads with appropriate initial parameters, utilize thread maintenance procedures that preserve thread health and performance over time, and perform thread archival operations that migrate inactive threads to long-term storage while maintaining accessibility. A cross-thread synchronizer 1412 coordinates interactions between multiple simultaneous threads, managing dependencies, conflicts, and information sharing opportunities that arise from parallel thread processing.

A resource allocation monitor 1413 optimizes computational resource usage across all thread management operations, implementing dynamic allocation strategies that balance performance requirements with system constraints. The monitor may implement resource usage tracking that monitors computational overhead, memory utilization, and processing latency across thread operations, utilize predictive resource modeling that anticipates resource requirements based on thread activity patterns, and perform resource optimization that adjusts allocation strategies to maximize overall system performance.

Throughout operation, contextual thread manager 1400 maintains bidirectional communication with multi-tier thought cache 1360 and other system components, enabling integrated thread management that leverages cached thoughts and manifold-based reasoning capabilities. The system produces outputs directed to geodesic dialogue engine 1340 and maintains interfaces with personalized cognitive manifold 1320 that enable seamless integration of thread management with geometric manifold navigation and dialogue generation processes. According to various embodiments, the architecture may implement different operational modes based on system load, user preferences, and thread complexity requirements, ensuring robust thread management performance across diverse usage scenarios while maintaining the core benefits of personalized contextual threading capabilities.

Figure 15:
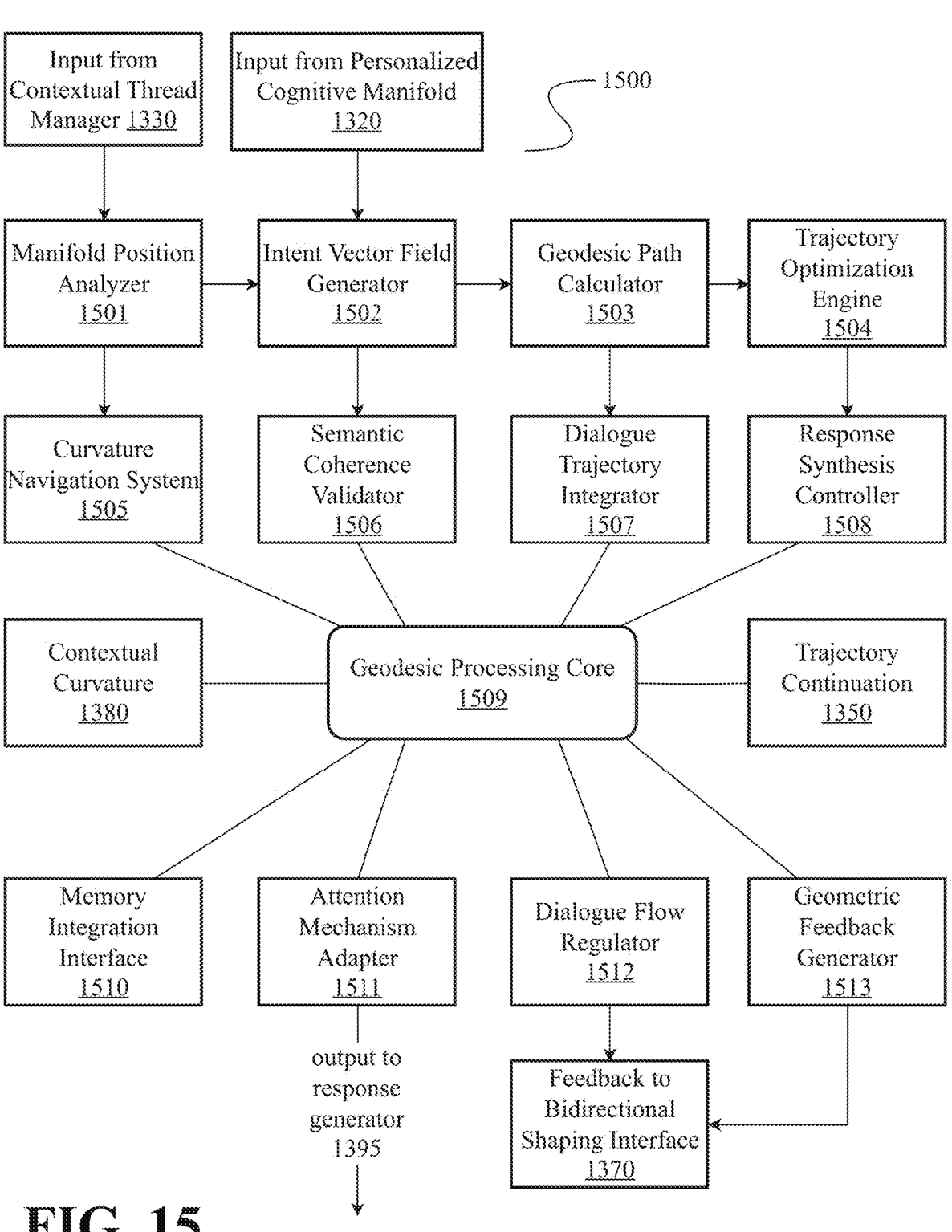
FIG. 15 is a block diagram illustrating an exemplary aspect of the latent contextual threading system, a geodesic dialogue engine.

FIG. 15 is a block diagram illustrating an exemplary aspect of the latent contextual threading system, a geodesic dialogue engine 1500. Geodesic dialogue engine 1500 is configured to generate dialogue responses through geometric manifold traversal rather than traditional retrieval-based or token-prediction approaches, enabling contextually coherent conversations that maintain semantic continuity through geometric trajectory following. The architecture implements a geometric processing pipeline that transforms manifold navigation into natural language responses while preserving dialogue coherence through mathematical principles of differential geometry and Riemannian manifold theory.

Input from contextual thread manager 1330 provides thread-specific context information including, but not limited to, active thread identifiers, manifold coordinate specifications, conversation state parameters, and priority indicators that guide dialogue generation decisions. Input from personalized cognitive manifold 1320 supplies geometric positioning data, curvature information, trajectory histories, and manifold structure parameters that enable precise navigation and trajectory planning within the user's personalized cognitive space. These inputs are processed through coordinated geometric analysis operations that determine optimal dialogue generation strategies based on manifold geometry and conversation context.

A manifold position analyzer 1501 determines the current location within the personalized cognitive manifold through coordinate analysis algorithms that process geometric positioning data and trajectory information. The analyzer may implement coordinate validation procedures that ensure manifold position accuracy, utilize position interpolation algorithms that estimate intermediate positions during conversation transitions, and perform position optimization operations that adjust coordinates for optimal dialogue generation. According to various embodiments, manifold position analyzer 1501 maintains position history buffers that track conversation trajectory evolution, implement position prediction algorithms that anticipate likely trajectory continuations, and utilize multi-scale position analysis that operates across different manifold resolution levels to capture both fine-grained conversation details and broad thematic structures.

An intent vector field generator 1502 creates goal-directed navigation vectors that guide manifold traversal toward desired dialogue outcomes, adapting intent conditioning techniques from geometric memory manifold systems for dialogue-specific applications. The generator may implement utility function formulation algorithms that convert user intents into mathematical optimization objectives, utilize vector field computation techniques that create smooth guidance fields across manifold regions, and perform field optimization operations that balance multiple competing objectives including coherence preservation, goal achievement, and conversation flow maintenance. According to various embodiments, intent vector field generator 1502 implements adaptive field strength modulation that adjusts guidance intensity based on conversation context, utilize multi-objective field generation that accommodates competing dialogue goals, and maintain field consistency validation that ensures vector fields produce stable trajectory guidance.

A geodesic path calculator 1503 computes optimal dialogue trajectories through the manifold by solving geodesic equations such as $D^2\gamma/dt^2 + \Gamma^k_{ij}(d\gamma^i/dt)(d\gamma^j/dt) = 0$, where $\Gamma^k_{ij}$ represents Christoffel symbols encoding manifold curvature and $\gamma$ represents the dialogue trajectory path. The calculator cam implement numerical integration schemes for geodesic computation including, for instance, Runge-Kutta methods, symplectic integrators, and adaptive step-size algorithms that maintain computational accuracy while optimizing performance. According to various embodiments, geodesic path calculator 1503 utilizes constrained geodesic computation that incorporates dialogue constraints and boundary conditions, implement multi-path generation that explores alternative trajectory options, and perform path validation operations that ensure computed geodesics remain within valid manifold regions and maintain semantic coherence.

A trajectory optimization engine 1504 refines dialogue trajectories through optimization algorithms that balance multiple objectives including dialogue coherence, user satisfaction, computational efficiency, and manifold stability. The engine may implement variational optimization techniques that minimize action functionals while satisfying dialogue constraints, utilize gradient-based optimization methods that refine trajectory parameters based on performance feedback, and perform multi-objective optimization that accommodates competing dialogue requirements. According to various embodiments, trajectory optimization engine 1504 may implement reinforcement learning algorithms that improve trajectory selection based on dialogue outcomes, utilize predictive optimization that anticipates trajectory consequences, and maintain optimization validation mechanisms that ensure improved trajectories provide genuine dialogue quality benefits.

A curvature navigation system 1505 implements navigation algorithms that utilize manifold curvature properties to guide dialogue generation, enabling responses that naturally follow the geometric structure of the user's cognitive space. The system may implement curvature-aware pathfinding algorithms that prefer routes through regions of appropriate curvature characteristics, utilize sectional curvature analysis that evaluates semantic stability along proposed dialogue paths, and perform curvature-based flow control that adjusts conversation pacing based on geometric properties. According to various embodiments, curvature navigation system 1505 can implement adaptive curvature sensitivity that adjusts navigation behavior based on conversation complexity, utilize multi-scale curvature analysis that operates across different geometric resolution levels, and maintain curvature validation procedures that ensure navigation decisions produce semantically coherent results.

A semantic coherence validator 1506 evaluates dialogue consistency through geometric analysis techniques that assess trajectory stability, manifold coherence, and semantic flow continuity rather than traditional linguistic validation approaches. The validator may implement geodesic deviation analysis that quantifies conversation stability through geometric measures, utilize curvature-based coherence assessment that evaluates semantic consistency through manifold properties, and perform trajectory alignment validation that ensures dialogue progression maintains geometric coherence. According to various embodiments, semantic coherence validator 1506 generates coherence confidence scores that guide dialogue generation decisions, implement predictive coherence modeling that anticipates potential coherence degradation, and maintain coherence optimization recommendations that suggest trajectory adjustments to preserve dialogue quality.

A dialogue trajectory integrator 1507 synthesizes geometric navigation results with linguistic generation processes, transforming manifold traversal outcomes into natural language dialogue responses that preserve geometric coherence while maintaining conversational naturalness. The integrator can implement trajectory-to-language mapping algorithms that convert geometric paths into semantic content, utilize content interpolation techniques that generate smooth dialogue transitions along trajectory segments, and perform linguistic coherence validation that ensures generated responses maintain both geometric and linguistic consistency. According to various embodiments, dialogue trajectory integrator 1507 may implement adaptive integration strategies that adjust mapping approaches based on conversation context, utilize multi-modal integration that accommodates various response types and formats, and maintain integration quality assessment that validates the effectiveness of geometric-to-linguistic translation processes.

A response synthesis controller 1508 orchestrates the generation of final dialogue responses through coordination of geometric navigation results, cached content retrieval, and real-time adaptation mechanisms. The controller may implement response assembly algorithms that combine trajectory-derived content with contextual information, utilize quality control procedures that validate response appropriateness and coherence, and perform adaptive response modification that adjusts content based on real-time feedback and context changes. According to various embodiments, response synthesis controller 1508 may implement multi-source integration that combines geometric navigation with traditional language model capabilities, utilize response optimization that refines generated content for improved quality and relevance, and maintain response validation mechanisms that ensure final outputs meet dialogue quality standards.

Geodesic processing core 1509 serves as the central coordination hub that orchestrates interactions between all geometric processing components, implementing coordination protocols that ensure consistent mathematical operations and optimal resource utilization across the geometric processing pipeline. The core may implement distributed processing coordination that enables scalable geometric computations, utilize mathematical consistency validation that ensures geometric operations maintain mathematical rigor, and perform processing optimization that minimizes computational overhead while preserving geometric accuracy.

A memory integration interface 1510 provides integration with geometric memory manifold systems, enabling dialogue generation to leverage persistent memory structures through manifold-compatible access mechanisms. The interface may implement memory coordinate translation that aligns dialogue manifold positions with memory manifold structures, utilize cross-manifold navigation that enables dialogue generation to access relevant memory regions, and perform memory integration validation that ensures accessed memory content maintains geometric and semantic consistency with current dialogue contexts.

An attention mechanism adapter 1511 transforms geometric manifold coordinates and trajectory information into vector representations compatible with standard transformer attention mechanisms, enabling integration of geometric dialogue generation with conventional language model architectures. The adapter can implement coordinate-to-vector transformation algorithms that preserve geometric relationships while ensuring dimensional compatibility, utilize attention weight modulation that incorporates geometric information into attention computations, and perform attention validation that ensures geometric integration enhances rather than degrades attention mechanism performance.

A dialogue flow regulator 1512 manages conversation pacing, turn-taking, and flow control through geometric analysis of conversation trajectories and manifold navigation patterns. The regulator may implement flow optimization algorithms that adjust conversation pacing based on geometric properties, utilize turn-taking prediction that anticipates conversation transitions through trajectory analysis, and perform flow validation that ensures conversation progression maintains natural dialogue characteristics.

Geometric feedback generator 1513 produces feedback signals that inform bidirectional manifold shaping processes, enabling the dialogue generation process to contribute to ongoing manifold evolution and personalization. The generator may implement feedback signal generation that captures dialogue success metrics and geometric navigation effectiveness, utilize manifold update recommendations that suggest geometric modifications based on dialogue outcomes, and perform feedback validation that ensures feedback signals contribute positively to manifold evolution.

Throughout operation, geodesic dialogue engine 1500 maintains continuous coordination with contextual curvature analyzer 1380 and trajectory continuation system 1350, enabling integrated geometric processing that leverages manifold analysis and trajectory management capabilities. The engine produces outputs directed to response generator 1395 while providing geometric feedback to bidirectional shaping interface 1370, enabling closed-loop dialogue generation that continuously improves through geometric adaptation and manifold evolution. According to various embodiments, the architecture may implement different processing modes based on conversation complexity, computational resources, and dialogue quality requirements, ensuring robust geometric dialogue generation across diverse conversational contexts while maintaining the core benefits of manifold-based dialogue continuity and coherence.

Figure 16:
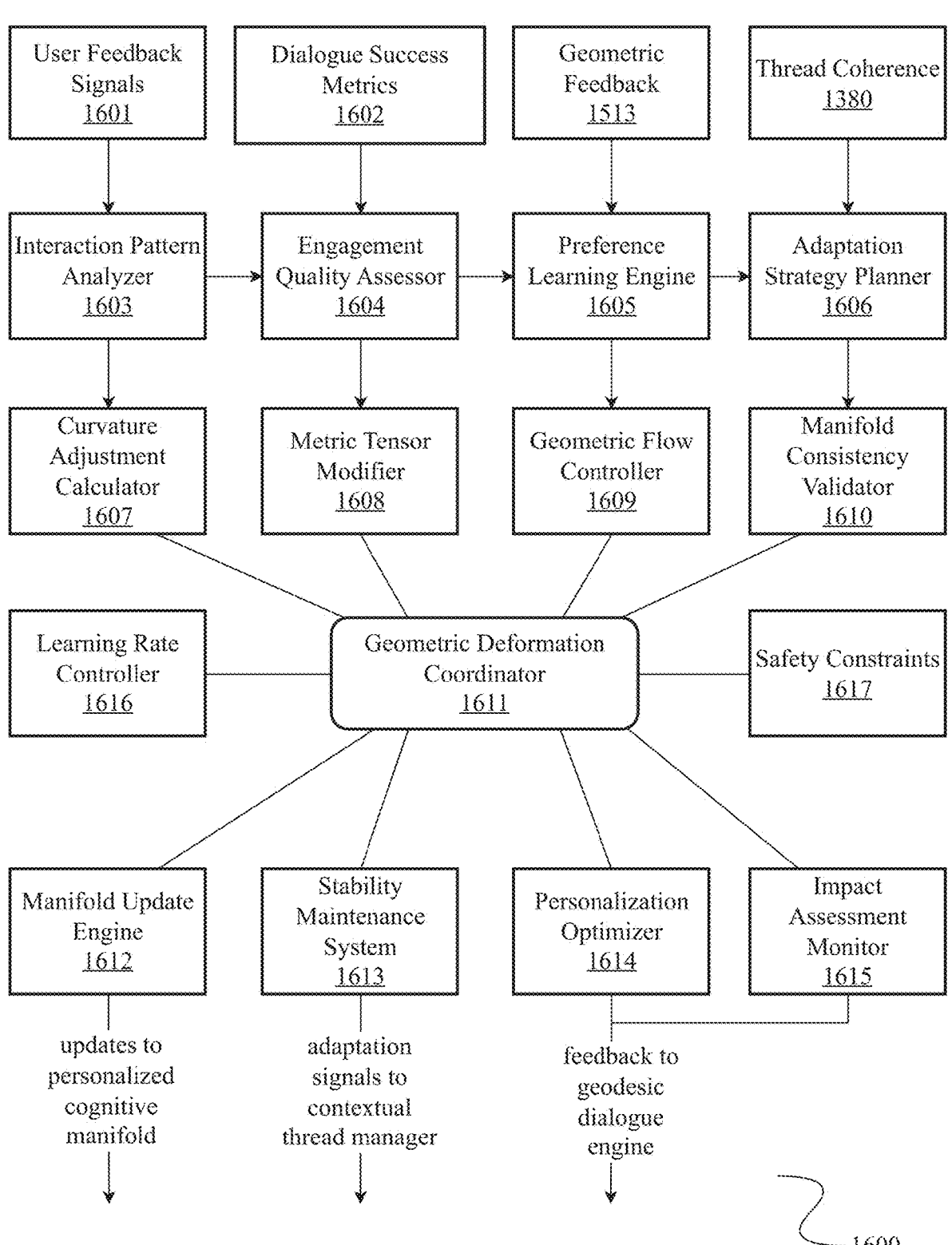
FIG. 16 is a block diagram illustrating an exemplary aspect of the latent contextual threading system, a bidirectional shaping interface.

FIG. 16 is a block diagram illustrating an exemplary aspect of the latent contextual threading system, a bidirectional shaping interface 1600. Bidirectional shaping interface 1600 enables real-time adaptation of the personalized cognitive manifold based on user interactions, system performance feedback, and geometric analysis results. The interface implements one or more learning algorithms that continuously reshape manifold geometry to improve dialogue quality, enhance user satisfaction, and optimize personalization effectiveness while maintaining geometric stability and mathematical coherence throughout the adaptation process.

The architecture receives multiple input streams that provide information about system performance and user interaction patterns. User feedback signals 1601 comprise explicit and implicit feedback from user interactions including satisfaction indicators, engagement metrics, correction signals, and preference expressions that guide adaptation decisions. Dialogue success metrics 1602 provide quantitative measures of conversation quality including coherence scores, task completion rates, user engagement duration, and response appropriateness assessments that inform geometric modification strategies. Geometric feedback from engine 1513 supplies mathematical analysis results from the geodesic dialogue engine including trajectory stability measures, path optimization outcomes, and geometric coherence assessments that guide manifold evolution decisions. Thread coherence analysis 1380 provides geometric evaluation results including curvature measurements, sectional curvature analysis, and geodesic deviation calculations that assess the current state of manifold geometry and identify areas requiring adjustment.

An interaction pattern analyzer 1603 processes user feedback signals through pattern recognition algorithms that identify recurring interaction patterns, behavioral trends, and engagement characteristics that indicate user preferences and adaptation requirements. The analyzer may implement machine learning algorithms including clustering techniques for grouping similar interaction patterns, sequence analysis for identifying temporal patterns in user behavior, and anomaly detection for identifying unusual interaction sequences that may indicate user dissatisfaction or system issues. According to various embodiments, interaction pattern analyzer 1603 maintains pattern history databases that track long-term user behavior evolution, implement pattern classification algorithms that categorize interactions by type and context, and utilize predictive modeling techniques that anticipate likely user behavior patterns based on historical data and current context.

An engagement quality assessor 1604 evaluates user engagement levels through multi-modal analysis techniques that combine explicit feedback indicators, implicit behavioral signals, and conversation flow characteristics to generate comprehensive engagement quality scores. The assessor may implement attention tracking algorithms that monitor user focus patterns, response timing analysis that evaluates user interaction latency and frequency, and sentiment analysis techniques that assess emotional engagement and satisfaction levels. According to various embodiments, engagement quality assessor 1604 may utilize natural language processing techniques to analyze user language patterns for engagement indicators, implement physiological signal processing for users with biometric feedback capabilities, and maintain engagement baseline models that adapt to individual user engagement patterns over time.

A preference learning engine 1605 extracts user preferences from interaction patterns, feedback signals, and engagement data through advanced machine learning algorithms that identify personalization opportunities and adaptation strategies. The engine can implement reinforcement learning algorithms that optimize manifold parameters based on user reward signals, utilize collaborative filtering techniques that leverage patterns from similar users while preserving privacy, and perform preference modeling that captures user-specific dialogue styles, topic interests, and interaction preferences. According to various embodiments, preference learning engine 1605 implements multi-armed bandit algorithms for exploring new personalization strategies while exploiting known successful approaches, utilize hierarchical preference modeling that captures preferences at multiple levels of abstraction, and maintain preference uncertainty estimation that guides exploration strategies in areas with limited user feedback.

An adaptation strategy planner 1606 develops comprehensive manifold modification strategies based on analysis results from other components, implementing strategic planning algorithms that balance competing objectives including personalization effectiveness, geometric stability, computational efficiency, and user satisfaction optimization. The planner may implement multi-objective optimization algorithms that find optimal trade-offs between conflicting adaptation goals, utilize constraint satisfaction techniques that ensure adaptation strategies satisfy geometric and computational constraints, and perform impact prediction that estimates the likely consequences of proposed manifold modifications. According to various embodiments, adaptation strategy planner 1606 can implement hierarchical planning approaches that operate across multiple temporal scales, utilize Monte Carlo simulation techniques for evaluating adaptation strategy outcomes, and maintain strategy validation mechanisms that assess adaptation effectiveness before implementation.

A curvature adjustment calculator 1607 computes specific geometric modifications required to implement adaptation strategies, translating high-level adaptation goals into precise mathematical operations on manifold curvature properties. The calculator may implement differential geometry algorithms for computing curvature modifications, utilize numerical optimization techniques for determining optimal curvature parameter adjustments, and perform geometric validation operations that ensure proposed modifications maintain manifold mathematical properties. According to various embodiments, curvature adjustment calculator 1607 may implement adaptive step-size algorithms that control the magnitude of curvature modifications based on stability considerations, utilize curvature flow simulation that predicts the evolution of geometric properties under proposed modifications, and maintain curvature constraint validation that ensures modifications preserve essential geometric relationships.

A metric tensor modifier 1608 implements modifications to the manifold's metric tensor properties, adapting geometric distance relationships and inner product structures to reflect learned user preferences and improved dialogue flow characteristics. Building upon metric tensor manipulation techniques, the modifier may implement tensor calculus algorithms for computing metric modifications, utilize parallel transport operations for maintaining geometric consistency during metric updates, and perform metric validation procedures that ensure modified tensors maintain positive definiteness and other essential mathematical properties. According to various embodiments, metric tensor modifier 1608 employs gradual metric evolution algorithms that apply modifications smoothly over time, utilize metric interpolation techniques for transitioning between different metric configurations, and maintain metric history tracking that enables rollback of unsuccessful modifications.

A geometric flow controller 1609 manages the temporal evolution of manifold geometry through controlled geometric flow processes that implement adaptation strategies while preserving manifold stability and mathematical coherence. Adapting geometric flow techniques for dialogue-specific requirements, the controller may implement Ricci flow algorithms for curvature evolution, utilize mean curvature flow for surface smoothing operations, and perform flow stability analysis that ensures geometric evolution remains within stable parameter ranges. According to various embodiments, geometric flow controller 1609 may implement adaptive flow rate control that adjusts evolution speed based on stability considerations, utilize flow direction optimization that guides geometric evolution toward desired configurations, and maintain flow checkpoint mechanisms that enable recovery from unstable geometric states.

A manifold consistency validator 1610 ensures that all geometric modifications preserve essential mathematical properties and maintain manifold integrity throughout the adaptation process. The validator may implement topological consistency checking that verifies manifold structure preservation, utilize geometric property validation that ensures curvature modifications maintain mathematical coherence, and perform numerical stability assessment that identifies potential computational issues with proposed modifications. According to various embodiments, manifold consistency validator 1610 may implement automated correction algorithms that adjust modifications to restore consistency when violations are detected, utilize consistency prediction modeling that anticipates potential consistency issues before implementation, and maintain validation history tracking that identifies recurring consistency challenges and develops prevention strategies.

A geometric deformation coordinator 1611 serves as the central coordination hub that orchestrates interactions between all geometric processing components, implementing coordination protocols that ensure consistent mathematical operations and optimal resource utilization across the geometric adaptation pipeline. The coordinator can implement distributed processing coordination that enables scalable geometric computations across multiple processing instances, utilize mathematical consistency validation that ensures geometric operations maintain mathematical rigor throughout the adaptation process, and perform processing optimization that minimizes computational overhead while preserving geometric accuracy and adaptation effectiveness.

A manifold update engine 1612 implements approved geometric modifications through controlled update procedures that apply computed changes to the personalized cognitive manifold while maintaining system stability and performance. The engine may implement atomic update operations that ensure modification consistency, utilize rollback mechanisms for recovering from unsuccessful updates, and perform update validation that confirms successful implementation of geometric changes. Stability maintenance system 1613 monitors manifold stability throughout the adaptation process, implementing stability assessment algorithms that detect potential instabilities and preventive measures that maintain geometric coherence during modifications.

Personalization optimizer 1614 fine-tunes adaptation parameters to maximize personalization effectiveness while balancing computational efficiency and system performance constraints. The optimizer may implement parameter tuning algorithms that adjust adaptation sensitivity based on user feedback quality and frequency, utilize efficiency optimization techniques that minimize computational overhead while preserving adaptation quality, and perform personalization quality assessment that measures the effectiveness of implemented adaptations. Impact assessment monitor 1615 evaluates the consequences of implemented adaptations through comprehensive analysis of dialogue quality improvements, user satisfaction changes, and system performance impacts, providing feedback for future adaptation decisions.

A learning rate controller 1616 manages the speed and magnitude of adaptation processes, implementing adaptive learning rate algorithms that adjust modification intensity based on user feedback confidence, adaptation success rates, and geometric stability considerations. A safety constraints monitor 1617 enforces safety limitations that prevent adaptations from compromising system stability, user privacy, or mathematical coherence, implementing constraint validation algorithms and emergency intervention procedures for addressing potentially harmful adaptations.

Throughout operation, bidirectional shaping interface 1600 maintains continuous coordination with all major system components, producing updates directed to personalized cognitive manifold 1320, adaptation signals for contextual thread manager 1330, and feedback for geodesic dialogue engine 1340. The system implements multiple feedback loops that enable continuous learning and improvement, ensuring that manifold adaptations contribute positively to overall system performance while maintaining the geometric and mathematical properties essential for effective dialogue generation and personalized interaction capabilities. According to various embodiments, the architecture may implement different operational modes based on adaptation complexity, user feedback availability, and system resource constraints, ensuring robust bidirectional shaping performance across diverse usage scenarios while preserving the core benefits of real-time manifold personalization and continuous dialogue improvement.

Figure 17:
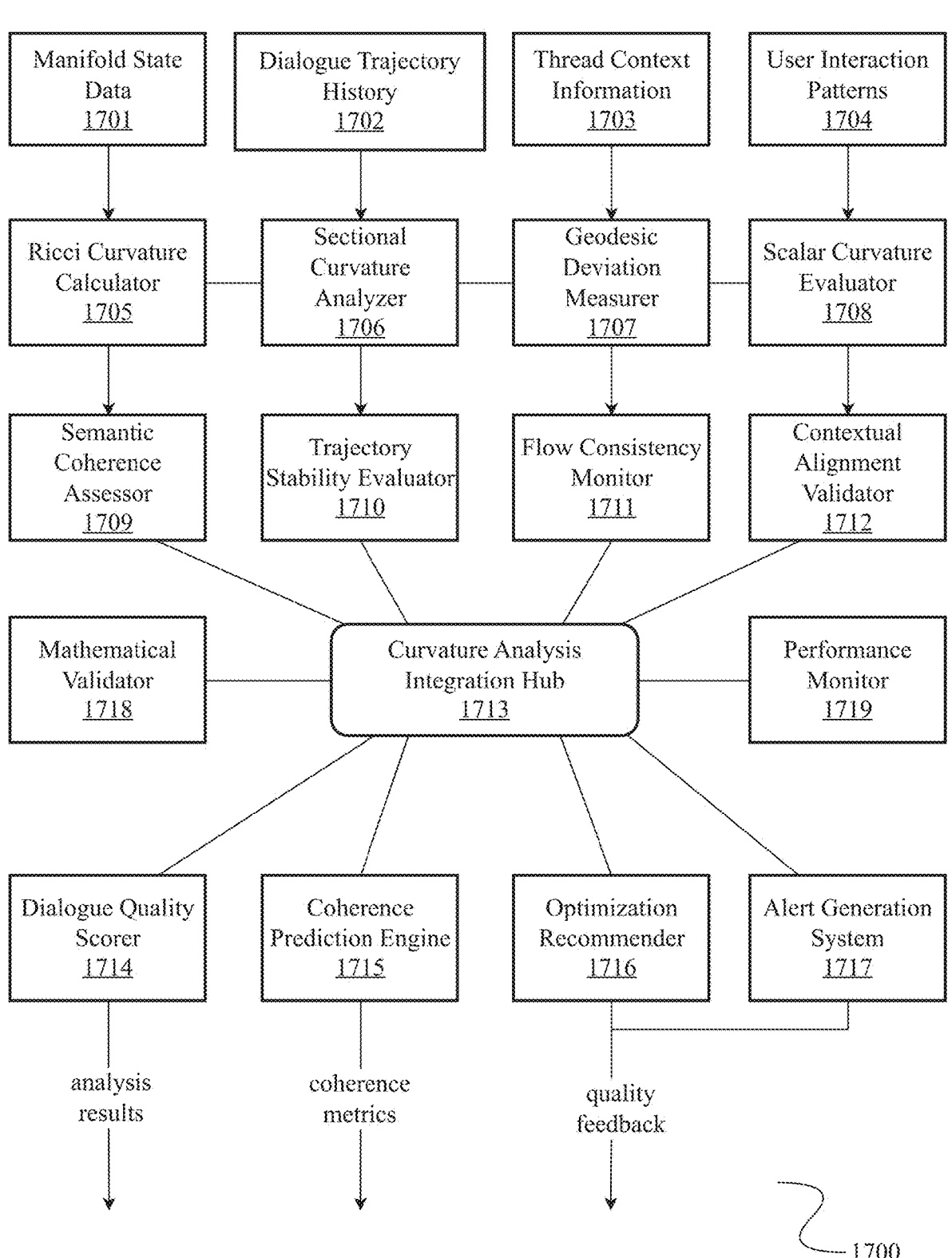
FIG. 17 is a block diagram illustrating an exemplary aspect of the latent contextual threading system, a contextual curvature analyzer.

FIG. 17 is a block diagram illustrating an exemplary aspect of the latent contextual threading system, a contextual curvature analyzer 1700. Contextual curvature analyzer 1700 is configured as a geometric analysis component that evaluates dialogue coherence and semantic flow through mathematical analysis of manifold curvature properties rather than traditional linguistic metrics. The analyzer implements advanced differential geometry algorithms that assess conversation quality, predict trajectory stability, and identify optimization opportunities through rigorous geometric evaluation of the personalized cognitive manifold structure and dynamics.

The architecture processes multiple input streams that provide comprehensive geometric and contextual information for curvature analysis operations. Manifold state data 1701 supplies current geometric configuration information including coordinate positions, metric tensor properties, curvature distributions, and manifold topology characteristics that define the present state of the personalized cognitive manifold. Dialogue trajectory history 1702 provides temporal sequence data including conversation path coordinates, trajectory velocity vectors, acceleration patterns, and historical geometric evolution that enables analysis of conversation flow patterns and trajectory stability characteristics. Thread context information 1703 delivers thread-specific geometric data including thread manifold positions, context boundaries, cross-thread relationships, and thread-specific curvature modifications that inform contextual analysis operations. User interaction patterns 1704 supply behavioral data including interaction frequency distributions, engagement pattern geometries, preference-based curvature influences, and user-specific geometric signatures that guide personalized analysis strategies.

Ricci curvature calculator 1705 computes Ricci curvature tensors that quantify local geometric properties and semantic density concentrations within the manifold, adapting curvature calculation techniques from geometric memory manifold systems for dialogue-specific analysis requirements. The calculator may implement tensor computation algorithms that calculate Ricci curvature components Ric(X,Y) for vector fields X and Y, utilize numerical integration schemes for computing curvature values across manifold regions, and perform curvature distribution analysis that identifies regions of high and low semantic concentration. According to various embodiments, Ricci curvature calculator 1705 can implement adaptive resolution algorithms that adjust calculation precision based on local geometric complexity, utilize parallel computation techniques for efficient curvature evaluation across large manifold regions, and maintain curvature history tracking that enables temporal analysis of geometric evolution patterns.

Sectional curvature analyzer 1706 evaluates sectional curvature $K(\sigma)$ for two-dimensional subspaces $\sigma$ within the manifold, providing insights into semantic robustness and generalization capacity of dialogue regions. Building upon sectional curvature analysis, the analyzer may implement plane selection algorithms that identify semantically significant two-dimensional subspaces for analysis, utilize curvature computation techniques that calculate sectional curvature values for selected planes, and perform curvature interpretation algorithms that translate geometric measurements into dialogue quality indicators. According to various embodiments, sectional curvature analyzer 1706 implements adaptive plane sampling that focuses analysis on regions of high dialogue activity, utilize curvature clustering techniques that group similar curvature characteristics, and maintain curvature significance assessment that identifies geometrically meaningful curvature variations.

A geodesic deviation measurer 1707 quantifies trajectory stability through analysis of geodesic deviation patterns, implementing mathematical techniques that assess how nearby dialogue trajectories diverge or converge over time. In some aspects, measurer may implement Jacobi field calculations that solve the geodesic deviation equation $D^2\xi/dt^2+R(\xi,\dot{\gamma})\dot{\gamma}=0$, where $\xi$ represents the deviation vector and R denotes the Riemann curvature tensor, utilize deviation magnitude analysis that quantifies trajectory separation rates, and perform stability classification that categorizes trajectory regions based on deviation characteristics. According to various embodiments, geodesic deviation measurer 1707 can implement predictive deviation modeling that anticipates trajectory stability based on current geometric conditions, utilize multi-scale deviation analysis that operates across different temporal and spatial scales, and maintain deviation threshold monitoring that identifies regions approaching instability conditions.

Scalar curvature evaluator 1708 computes scalar curvature values that provide overall geometric characterization of manifold regions, offering global geometric insights that complement local curvature measurements from other components. The evaluator may implement scalar curvature integration algorithms that compute $S=g^{\{ij\}}Ric_{\{ij\}}$ where $g^{\{ij\}}$ represents metric tensor components and $Ric_{\{ij\}}$ denotes Ricci curvature components, utilize curvature averaging techniques that generate representative scalar values for manifold regions, and perform curvature gradient analysis that identifies directional trends in geometric properties. According to various embodiments, scalar curvature evaluator 1708 can implement curvature normalization procedures that enable comparison across different manifold regions, utilize curvature significance testing that identifies statistically meaningful geometric variations, and maintain curvature baseline tracking that establishes reference values for comparative analysis.

Semantic coherence assessor 1709 translates geometric curvature measurements into semantic coherence evaluations, implementing algorithms that interpret geometric properties as indicators of dialogue quality and conversation flow consistency. The assessor may implement geometric-to-semantic mapping algorithms that correlate curvature characteristics with dialogue coherence metrics, utilize coherence scoring techniques that generate quantitative assessments of conversation quality based on geometric analysis, and perform coherence trend analysis that identifies patterns in semantic consistency over time. According to various embodiments, semantic coherence assessor 1709 may implement adaptive coherence thresholds that adjust quality standards based on user preferences and conversation context, utilize multi-dimensional coherence evaluation that assesses coherence across multiple geometric and semantic dimensions, and maintain coherence prediction capabilities that anticipate likely coherence evolution based on current geometric trends.

A trajectory stability evaluator 1710 assesses the stability of dialogue trajectories through comprehensive analysis of geometric stability indicators, trajectory deviation patterns, and manifold flow characteristics. The evaluator can implement stability metric calculations that quantify trajectory robustness against perturbations, utilize Lyapunov exponent analysis for assessing exponential stability characteristics, and perform phase space analysis that characterizes trajectory behavior in high-dimensional geometric spaces. According to various embodiments, trajectory stability evaluator 1710 implements multi-scale stability assessment that evaluates stability across different temporal horizons, utilize comparative stability analysis that benchmarks current trajectory stability against historical patterns, and maintain stability alerting mechanisms that identify potentially unstable trajectory conditions before they manifest as dialogue quality degradation.

A flow consistency monitor 1711 evaluates the consistency of dialogue flow through analysis of manifold flow properties, geometric continuity measures, and conversation momentum characteristics. The monitor may implement flow field analysis that characterizes vector field properties governing dialogue evolution, utilize continuity assessment algorithms that evaluate smoothness of conversation transitions, and perform flow coherence analysis that identifies disruptions or inconsistencies in dialogue progression. Contextual alignment validator 1712 ensures that geometric analysis results align with conversational context and user expectations, implementing validation algorithms that verify the relevance and appropriateness of geometric interpretations for current dialogue situations.

A curvature analysis integration hub 1713 serves as the central coordination mechanism that orchestrates interactions between all geometric analysis components, implementing integration protocols that synthesize diverse curvature measurements into comprehensive dialogue quality assessments. The hub may implement multi-source data fusion algorithms that combine curvature measurements from different analysis components, utilize weighted integration schemes that prioritize different geometric measurements based on context and analysis goals, and perform consistency validation that ensures integrated results maintain mathematical coherence across all analysis dimensions.

A dialogue quality scorer 1714 generates quantitative dialogue quality scores based on integrated geometric analysis results, implementing scoring algorithms that translate complex geometric measurements into interpretable quality metrics. The scorer may implement multi-criteria scoring functions that balance different aspects of geometric quality including curvature consistency, trajectory stability, and semantic coherence, utilize adaptive scoring weights that adjust quality emphasis based on user preferences and conversation context, and perform score normalization that enables comparison across different dialogue sessions and user interactions. Coherence prediction engine 1715 forecasts future dialogue coherence based on current geometric trends and historical patterns, implementing predictive modeling algorithms that anticipate likely coherence evolution under various continuation scenarios.

An optimization recommender 1716 analyzes geometric analysis results to identify specific optimization opportunities and recommend geometric modifications that could improve dialogue quality and coherence. The recommender may implement optimization opportunity detection algorithms that identify geometric configurations conducive to improved dialogue flow, utilize recommendation ranking systems that prioritize optimization suggestions based on potential impact and implementation feasibility, and perform recommendation validation that ensures suggested optimizations maintain geometric consistency and mathematical rigor. An alert generation system 1717 monitors analysis results for conditions requiring immediate attention, implementing alerting algorithms that identify potential coherence failures, geometric instabilities, or dialogue quality degradations before they significantly impact user experience.

Mathematical validator 1718 ensures mathematical rigor and computational accuracy throughout all geometric analysis operations, implementing validation algorithms that verify curvature calculations, geometric consistency, and numerical stability. Performance monitor 1719 tracks computational efficiency and resource utilization across all analysis components, implementing performance optimization strategies that balance analysis depth with computational constraints and real-time responsiveness requirements.

Throughout operation, contextual curvature analyzer 1700 produces comprehensive analysis results directed to bidirectional shaping interface 1370 for manifold adaptation guidance, coherence metrics for contextual thread manager 1330 to inform thread management decisions, and quality feedback for geodesic dialogue engine 1340 to guide trajectory optimization. The system implements multiple feedback loops that enable continuous refinement of analysis capabilities and adaptation to user-specific geometric patterns and dialogue preferences. According to various embodiments, the architecture may implement different analysis modes based on computational resources, analysis depth requirements, and real-time performance constraints, ensuring robust geometric analysis capabilities across diverse operational scenarios while maintaining the mathematical rigor essential for accurate dialogue quality assessment through geometric principles.

Figure 18:
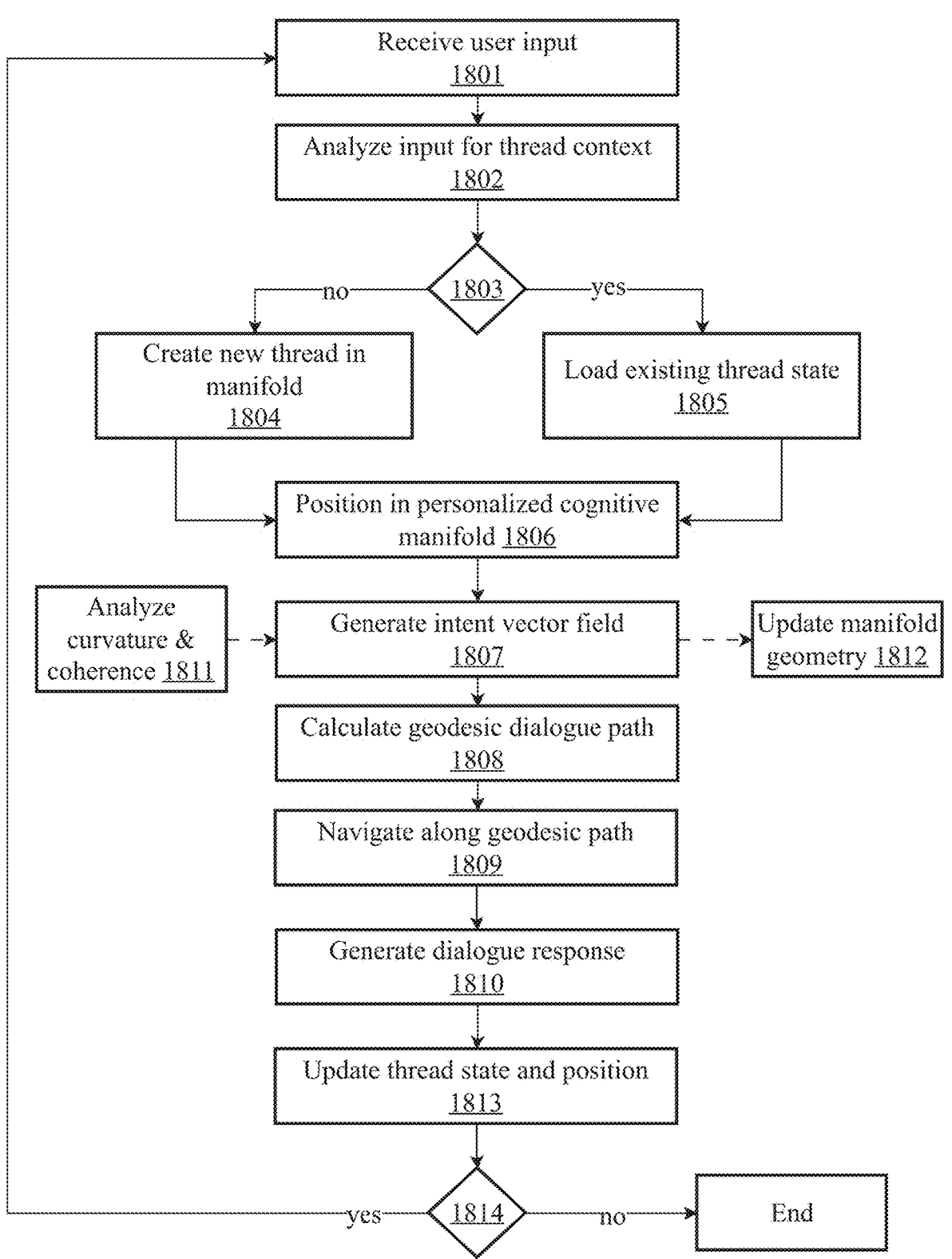
FIG. 18 is a flow diagram illustrating an exemplary method for implementing latent contextual threading for personalized PCM-human dialogues, according to an embodiment.

FIG. 18 is a flow diagram illustrating an exemplary method for implementing latent contextual threading for personalized PCM-human dialogues, according to an embodiment. The method demonstrates a process flow that enables continuous, personalized dialogue experiences through geometric manifold-based contextual threading, incorporating thread management, geometric navigation, real-time adaptation, and bidirectional feedback mechanisms that maintain dialogue coherence across sessions while continuously improving personalization effectiveness.

According to the embodiment, the process begins with receiving user input at step 1801, which may comprise various forms of natural language communication including text, voice, or multimodal inputs that initiate or continue dialogue interactions. The system processes user input through input validation algorithms that verify communication integrity, content analysis procedures that extract semantic information and intent indicators, and preprocessing operations that prepare input data for geometric analysis and thread identification operations. According to various embodiments, receiving user input 1801 may implement multi-modal input processing that accommodates diverse communication channels, input normalization procedures that standardize input formats for consistent processing, and input enrichment operations that augment basic input with contextual metadata and user-specific information.

The system proceeds to analyze input for thread context at step 1802, implementing one or more analysis algorithms that examine user input for contextual indicators, thread identification markers, and conversation continuation signals. This analysis may utilize natural language processing techniques for semantic analysis, pattern recognition algorithms for identifying conversation themes and topics, and context extraction procedures that determine relevant dialogue history and thread associations. According to various embodiments, analyzing input for thread context 1802 can implement machine learning algorithms trained on user-specific conversation patterns, utilize semantic similarity analysis for matching input to existing thread contexts, and perform intent classification that categorizes input according to dialogue goals and conversation types.

The method includes a decision point for determining existing thread presence 1803, where the system evaluates whether user input corresponds to an existing dialogue thread or requires creation of a new conversational context. This decision utilizes thread matching algorithms that compare input characteristics against active and dormant thread profiles, implement similarity scoring techniques that quantify alignment between current input and existing thread contexts, and apply decision thresholds that balance thread reuse with new thread creation based on semantic similarity and contextual relevance measures.

When no existing thread is identified, the method proceeds to create new thread in manifold 1804, implementing thread instantiation procedures that establish new dialogue contexts within the personalized cognitive manifold. This process may involve manifold region allocation that designates geometric space for the new thread, initial positioning algorithms that determine optimal starting coordinates based on input characteristics and user preferences, and thread initialization procedures that establish baseline geometric properties and contextual parameters. According to various embodiments, creating a new thread in manifold 1804 may implement adaptive thread placement that considers existing thread distributions and manifold capacity, utilize predictive positioning algorithms that anticipate likely thread evolution patterns, and perform thread validation operations that ensure new threads maintain geometric consistency with existing manifold structure.

Alternatively, when an existing thread is identified, the method loads existing thread state at step 1805, implementing state restoration procedures that reactivate dormant thread contexts and restore previous dialogue configurations. This process may utilize thread state retrieval algorithms that access stored thread information including geometric positions, conversation history, and contextual parameters, implement state validation procedures that verify thread integrity and geometric consistency, and perform state updating operations that align restored threads with current system configuration and user preferences. According to various embodiments, loading existing thread state 1805 can implement intelligent state restoration that selectively activates relevant thread components while maintaining computational efficiency, utilize state interpolation techniques for bridging temporal gaps in thread activity, and perform state optimization procedures that enhance restored thread performance based on accumulated usage patterns.

The method continues with positioning in personalized cognitive manifold at step 1806, implementing geometric positioning algorithms that establish precise coordinates within the user's personalized cognitive space. This positioning process may utilize coordinate calculation algorithms that determine optimal manifold positions based on thread context and user input characteristics, implement manifold navigation techniques that efficiently traverse geometric space to reach designated positions, and perform position validation operations that ensure geometric consistency and manifold integrity. According to various embodiments, positioning in personalized cognitive manifold 1806 may implement adaptive positioning strategies that adjust coordinate selection based on current manifold state and conversation requirements, utilize multi-scale positioning analysis that operates across different geometric resolution levels, and maintain position optimization procedures that refine coordinates for enhanced dialogue generation effectiveness.

The system proceeds to generate intent vector field at step 1807, implementing vector field computation algorithms that create goal-directed navigation guidance based on user intent and dialogue objectives. This generation process may utilize intent analysis algorithms that extract goal information from user input and conversation context, implement vector field calculation techniques that translate intent into geometric guidance vectors, and perform field optimization operations that balance multiple competing objectives including coherence preservation, goal achievement, and manifold stability. According to various embodiments, generating intent vector field 1807 may implement adaptive field strength modulation that adjusts guidance intensity based on intent confidence and context complexity, utilize multi-objective field generation that accommodates competing dialogue goals simultaneously, and maintain field consistency validation that ensures vector field stability and mathematical coherence.

The method includes calculating geodesic dialogue path at step 1808, implementing sophisticated geometric computation algorithms that determine optimal trajectories through the manifold for dialogue generation. This calculation process may utilize geodesic equation solving techniques that compute paths minimizing geometric action functionals, implement numerical integration schemes for geodesic computation including adaptive step-size algorithms that maintain computational accuracy, and perform path validation operations that ensure computed trajectories remain within valid manifold regions. According to various embodiments, calculating geodesic dialogue path 1808 may implement constrained geodesic computation that incorporates dialogue constraints and boundary conditions, utilize multi-path generation algorithms that explore alternative trajectory options for enhanced dialogue flexibility, and maintain path optimization procedures that refine trajectories based on performance feedback and user preferences.

The system navigates along geodesic path at step 1809, implementing trajectory following algorithms that guide dialogue generation through computed geometric paths while maintaining semantic coherence and conversational flow. This navigation process may utilize path integration techniques that translate geometric trajectories into dialogue progression, implement adaptive navigation algorithms that adjust path following based on real-time feedback and context changes, and perform navigation validation operations that ensure trajectory adherence maintains dialogue quality and geometric consistency. According to various embodiments, navigating along geodesic path 1809 may implement predictive navigation that anticipates trajectory consequences and adjusts navigation accordingly, utilize multi-resolution path following that operates across different temporal and semantic scales, and maintain navigation optimization procedures that enhance path efficiency and dialogue effectiveness.

The method generates dialogue response at step 1810, implementing response synthesis algorithms that transform geometric navigation results into natural language outputs while preserving trajectory-derived semantic coherence and contextual appropriateness. This generation process may utilize trajectory-to-language mapping algorithms that convert geometric path information into semantic content, implement linguistic coherence validation that ensures generated responses maintain both geometric and linguistic consistency, and perform response optimization operations that enhance response quality and relevance. According to various embodiments, generating dialogue response 1810 may implement adaptive response strategies that adjust generation approaches based on conversation context and user preferences, utilize multi-modal response generation that accommodates various output formats and interaction styles, and maintain response quality assessment that validates generation effectiveness and user satisfaction.

Throughout the main process flow, the method implements parallel processing operations including analyzing curvature and coherence at step 1811 and updating manifold geometry at step 1812. These concurrent processes enable real-time geometric analysis and manifold adaptation without interrupting primary dialogue generation operations. The curvature analysis process implements geometric evaluation algorithms that assess dialogue quality through manifold properties, while the manifold update process implements bidirectional shaping operations that adapt geometric structure based on interaction outcomes and user feedback.

The method concludes the primary cycle with updating thread state and position at step 1813, implementing state preservation algorithms that maintain thread continuity for future interactions while recording geometric positions, conversation history, and contextual evolution. This updating process may utilize state serialization techniques that efficiently store thread information, implement incremental update algorithms that minimize computational overhead while preserving essential thread characteristics, and perform state validation operations that ensure updated thread information maintains consistency and integrity.

The method includes a continuation decision point 1814 that determines whether to continue dialogue processing or conclude the threading session. This decision utilizes conversation completion analysis that evaluates dialogue satisfaction and goal achievement, implements user engagement assessment that measures continued interaction interest, and applies continuation criteria that balance user preferences with system resource constraints. When continuation is selected, the method implements a feedback loop that returns processing to receiving user input 1801, enabling iterative dialogue progression with continuous learning and adaptation.

Throughout the entire process flow, the method maintains bidirectional feedback mechanisms that enable continuous improvement of threading capabilities, geometric optimization, and personalization effectiveness. According to various embodiments, the method may implement different processing modes based on conversation complexity, computational resources, and user preferences, ensuring robust latent contextual threading performance across diverse dialogue scenarios while maintaining the core benefits of geometric manifold-based personalized conversation continuity and real-time adaptation capabilities.

Figure 19:
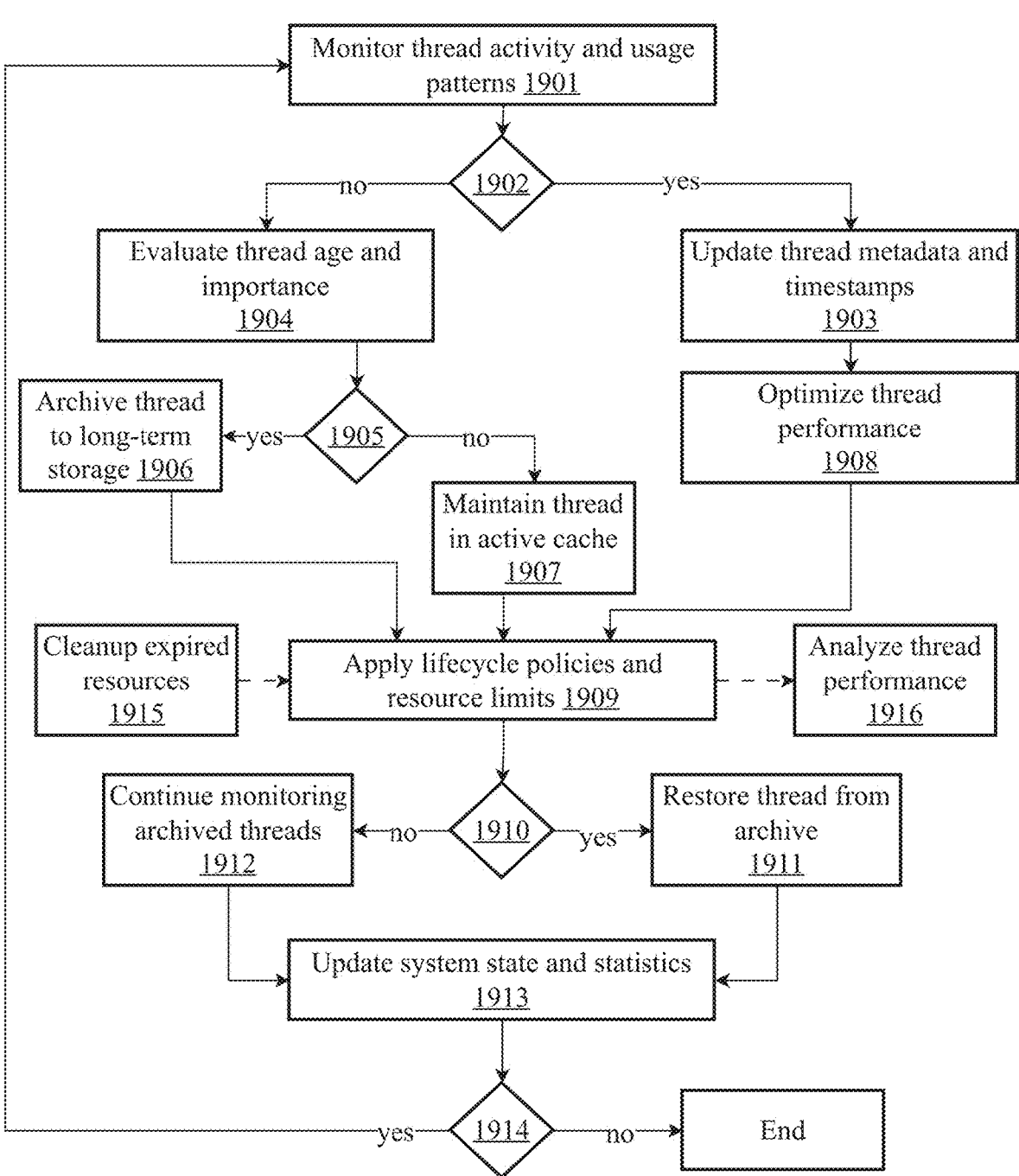
FIG. 19 is a flow diagram illustrating an exemplary method for implementing thread lifecycle management in latent contextual threading systems, according to an embodiment.

FIG. 19 is a flow diagram illustrating an exemplary method for implementing thread lifecycle management in latent contextual threading systems, according to an embodiment. The method demonstrates a lifecycle management process that efficiently manages dialogue threads throughout their complete existence from creation through archival and potential reactivation, implementing sophisticated resource management, performance optimization, and adaptive policies that balance system efficiency with dialogue continuity requirements while maintaining optimal user experience across extended temporal periods.

According to the embodiment, the process begins with monitoring thread activity and usage patterns at step 1901, implementing comprehensive surveillance algorithms that continuously track thread utilization, access frequencies, user engagement levels, and performance characteristics across all active and dormant dialogue threads. This monitoring process may utilize activity tracking algorithms that record thread access timestamps, usage frequency counters, and engagement quality metrics, implement pattern recognition techniques that identify thread usage trends and behavioral patterns, and perform statistical analysis operations that generate usage insights and lifecycle recommendations. According to various embodiments, monitoring thread activity and usage patterns 1901 may implement predictive monitoring algorithms that anticipate thread lifecycle transitions based on usage patterns, utilize multidimensional activity analysis that evaluates threads across temporal, semantic, and user-specific dimensions, and maintain monitoring optimization procedures that balance surveillance depth with computational efficiency requirements.

The system proceeds to evaluate thread activity status 1902, implementing decision algorithms that determine whether individual threads remain actively engaged in dialogue processes or have transitioned to inactive states requiring lifecycle management interventions. This evaluation process may utilize activity threshold analysis that compares current thread engagement against established activity criteria, implement temporal decay assessment that evaluates thread staleness based on last access times and interaction frequencies, and perform engagement quality evaluation that assesses the meaningfulness and value of recent thread interactions. According to various embodiments, determining thread active status 1902 may implement adaptive threshold algorithms that adjust activity criteria based on user behavior patterns and system load conditions, utilize multi-criteria decision frameworks that balance multiple activity indicators including temporal, semantic, and engagement factors, and maintain activity classification validation that ensures accurate thread status determination.

For threads identified as active, the method proceeds to update thread metadata and timestamps at step 1903, implementing maintenance procedures that preserve current thread state information and ensure accurate tracking of thread characteristics and usage patterns. This updating process may utilize metadata synchronization algorithms that maintain consistency between thread state and tracking information, implement timestamp precision management that ensures accurate temporal tracking across system operations, and perform metadata validation operations that verify information integrity and completeness. According to various embodiments, updating thread metadata and timestamps 1903 may implement incremental update strategies that minimize computational overhead while preserving essential tracking information, utilize metadata compression techniques that optimize storage efficiency for frequently updated information, and maintain metadata consistency validation that ensures synchronized information across distributed system components.

Active threads continue to optimize thread performance at step 1908, implementing performance enhancement algorithms that improve thread efficiency, response quality, and resource utilization based on current usage patterns and system conditions. This optimization process may utilize performance metric analysis that identifies enhancement opportunities, implement adaptive optimization strategies that adjust thread configurations based on usage characteristics, and perform optimization validation operations that ensure improvements provide genuine benefits without compromising thread functionality. According to various embodiments, optimizing thread performance 1908 may implement machine learning algorithms that identify optimal thread configurations based on historical performance data, utilize predictive optimization that anticipates performance requirements based on usage trends, and maintain optimization impact assessment that measures enhancement effectiveness and guides future optimization decisions.

For threads identified as inactive, the method evaluates thread age and importance at step 1904, implementing assessment algorithms that determine the lifecycle status and preservation value of dormant threads. This evaluation process may utilize temporal analysis algorithms that assess thread age relative to system policies and user preferences, implement importance scoring techniques that quantify thread value based on historical usage, semantic content, and user engagement characteristics, and perform retention recommendation generation that suggests appropriate lifecycle actions for individual threads. According to various embodiments, evaluating thread age and importance 1904 may implement multi-factor importance assessment that considers user-specific thread value, semantic uniqueness, and historical significance, utilize adaptive aging algorithms that adjust age assessment based on thread characteristics and usage patterns, and maintain importance prediction capabilities that anticipate future thread value based on user behavior trends and content analysis.

The system determines whether threads meet archive threshold criteria at decision point 1905, implementing decision algorithms that evaluate whether inactive threads should be archived to long-term storage or maintained in active cache systems. This determination process may utilize threshold analysis algorithms that compare thread characteristics against established archival criteria, implement resource optimization assessment that balances storage efficiency with accessibility requirements, and perform archival recommendation generation that suggests optimal storage strategies for individual threads. According to various embodiments, determining archive threshold 1905 may implement adaptive threshold algorithms that adjust archival criteria based on system capacity and user behavior patterns, utilize predictive archival modeling that anticipates optimal archival timing based on thread characteristics and usage trends, and maintain threshold optimization procedures that balance storage efficiency with thread accessibility requirements.

Threads meeting archival criteria proceed to archive thread to long-term storage at step 1906, implementing storage migration procedures that transfer thread data to efficient long-term storage systems while maintaining accessibility for potential future reactivation. This archival process may utilize data compression algorithms that optimize storage efficiency while preserving thread integrity, implement storage system selection that chooses appropriate archival platforms based on thread characteristics and access requirements, and perform archival validation operations that ensure successful data migration and storage integrity. According to various embodiments, archiving thread to long-term storage 1906 may implement intelligent compression strategies that balance storage efficiency with decompression speed for potential reactivation, utilize distributed archival systems that enhance data resilience and accessibility, and maintain archival indexing that enables efficient thread discovery and retrieval operations.

Threads not meeting archival criteria continue to maintain thread in active cache at step 1907, implementing cache management procedures that preserve thread accessibility while optimizing cache efficiency and resource utilization. This maintenance process may utilize cache optimization algorithms that arrange threads for optimal access patterns, implement cache capacity management that balances thread retention with system performance requirements, and perform cache validation operations that ensure maintained threads remain accessible and functional. According to various embodiments, maintaining thread in active cache 1907 may implement intelligent cache policies that prioritize thread retention based on predicted reactivation likelihood, utilize adaptive cache sizing that adjusts capacity based on system load and user behavior patterns, and maintain cache performance monitoring that optimizes access efficiency and resource utilization.

The method converges at applying lifecycle policies and resource limits at step 1909, implementing comprehensive policy enforcement that ensures thread management operations comply with system constraints and user preferences while optimizing overall system performance. This policy application process may utilize policy evaluation algorithms that assess current thread distributions against established guidelines, implement resource constraint enforcement that ensures thread management operations remain within system capacity limits, and perform policy optimization procedures that enhance lifecycle efficiency while maintaining user experience quality. According to various embodiments, applying lifecycle policies and resource limits 1909 may implement adaptive policy frameworks that adjust rules based on system conditions and user behavior evolution, utilize predictive resource management that anticipates capacity requirements based on thread lifecycle trends, and maintain policy compliance validation that ensures consistent application of lifecycle management rules.

The system evaluates potential reactivation requests at decision point 1910, implementing decision algorithms that determine whether archived or dormant threads should be restored to active status based on user needs and system conditions. This evaluation process may utilize reactivation criteria analysis that assesses the appropriateness of thread restoration requests, implement cost-benefit assessment that weighs reactivation benefits against resource requirements, and perform reactivation feasibility evaluation that ensures successful thread restoration capabilities. According to various embodiments, evaluating reactivation requests 1910 may implement intelligent reactivation prediction that anticipates likely thread restoration needs based on user behavior patterns, utilize adaptive reactivation criteria that adjust restoration thresholds based on system capacity and user preferences, and maintain reactivation success tracking that optimizes restoration processes based on historical outcomes.

When reactivation is appropriate, the method restores thread from archive at step 1911, implementing restoration procedures that efficiently recover archived thread data and restore full thread functionality within active system operations. This restoration process may utilize data decompression algorithms that efficiently restore archived thread information, implement state reconstruction procedures that rebuild thread context and geometric positioning, and perform restoration validation operations that ensure successfully reactivated threads maintain full functionality and integration with current system state. According to various embodiments, restoring thread from archive 1911 may implement intelligent restoration optimization that minimizes recovery time while preserving thread integrity, utilize predictive restoration that preemptively prepares likely reactivation candidates for faster recovery, and maintain restoration quality assessment that ensures reactivated threads provide equivalent functionality to originally active threads.

When reactivation is not required, the method continues monitoring archived threads at step 1912, implementing surveillance procedures that maintain oversight of archived content while minimizing resource consumption and preserving system efficiency. This monitoring process may utilize lightweight monitoring algorithms that track archived thread status with minimal computational overhead, implement periodic archived content assessment that evaluates long-term storage integrity and accessibility, and perform archived thread lifecycle evaluation that identifies optimization opportunities for long-term storage management.

Throughout the lifecycle management process, the method implements parallel processing operations including cleanup of expired resources at step 1915 and analyzing thread performance at step 1916. These concurrent processes enable efficient resource management and performance optimization without interrupting primary lifecycle management operations. The cleanup process implements resource reclamation algorithms that identify and remove obsolete thread data and expired system resources, while the performance analysis process implements monitoring algorithms that evaluate thread lifecycle efficiency and identify optimization opportunities.

The method concludes with updating system state and statistics at step 1913, implementing comprehensive state management that maintains accurate system-wide information about thread distributions, lifecycle statistics, and performance metrics. This updating process may utilize state synchronization algorithms that ensure consistent system information across distributed components, implement statistical aggregation techniques that generate meaningful insights about thread lifecycle patterns and system performance, and perform state validation operations that ensure accurate system state representation and statistical integrity.

The method comprises a continuation decision point 1914 that determines whether to continue lifecycle monitoring operations or conclude the management session. This decision utilizes system load assessment that evaluates computational capacity for continued monitoring, implements lifecycle completion analysis that determines whether management objectives have been achieved, and applies continuation criteria that balance ongoing monitoring benefits with resource conservation requirements. When continuation is selected, the method implements a feedback loop that returns processing to monitoring thread activity 1901, enabling continuous thread lifecycle management with adaptive optimization and learning capabilities.

Throughout the entire lifecycle management process, the method maintains comprehensive monitoring and optimization mechanisms that enable efficient resource utilization, optimal thread accessibility, and enhanced user experience through intelligent lifecycle management. According to various embodiments, the method may implement different management strategies based on system capacity, user behavior patterns, and performance requirements, ensuring robust thread lifecycle management across diverse operational scenarios while maintaining the core benefits of continuous dialogue availability and efficient resource utilization essential for effective latent contextual threading systems.

Figure 20:
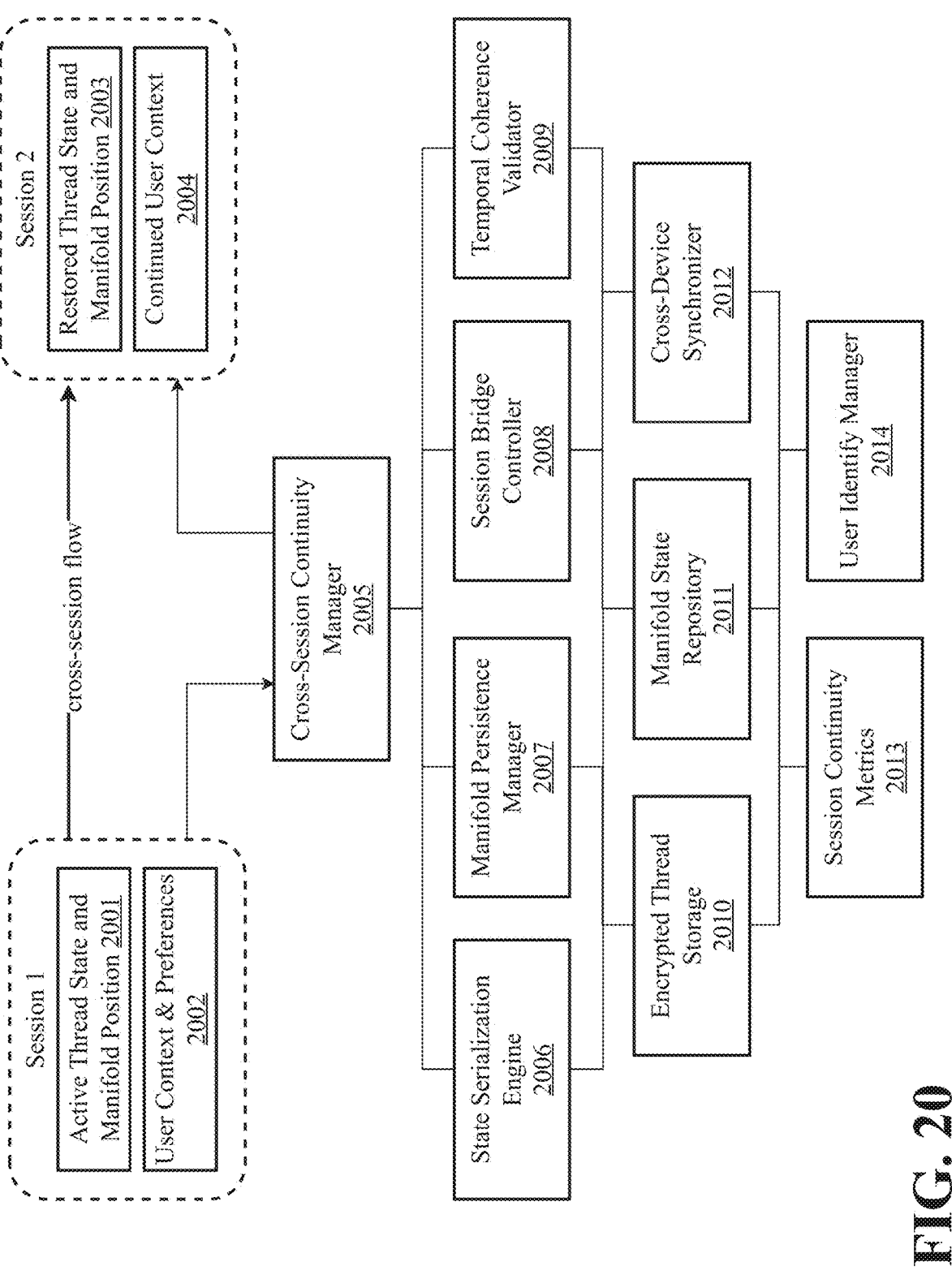
FIG. 20 is a block diagram illustrating an exemplary architecture for cross-session continuity in latent contextual threading systems, according to an embodiment.

FIG. 20 is a block diagram illustrating an exemplary architecture for cross-session continuity in latent contextual threading systems, according to an embodiment. The architecture demonstrates a system that maintains dialogue thread persistence and personalized manifold states across temporal boundaries, session interruptions, and device transitions, enabling seamless conversation resumption while preserving all threading context, geometric positioning, and personalization characteristics that have been developed through previous interactions.

The architecture spans multiple temporal contexts, with Session 1 representing the concluding state of a previous dialogue interaction and Session 2 representing the initiation of a subsequent interaction following a temporal discontinuity. This temporal bridging capability addresses a critical limitation of traditional dialogue systems that lose conversational context and personalization characteristics when sessions end, providing instead a persistent cognitive architecture that maintains continuity across arbitrary time periods and interaction contexts.

Within Session 1, the system captures active thread state and manifold position 2001, implementing one or more state extraction algorithms that preserve all essential characteristics of ongoing dialogue threads including geometric coordinates within the personalized cognitive manifold, thread metadata encompassing conversation history and context parameters, trajectory information including path histories and velocity vectors that characterize conversation momentum, and threading relationships that define connections between multiple simultaneous dialogue contexts. According to various embodiments, capturing active thread state and manifold position 2001 may implement real-time state monitoring that continuously updates thread characteristics during active dialogue, utilize predictive state capture that anticipates likely session termination and prepares state information accordingly, and maintain state validation procedures that ensure captured information maintains sufficient detail for accurate restoration.

Simultaneously, the system preserves user context and preferences 2002, implementing comprehensive user profile management that captures personalization characteristics, interaction preferences, dialogue style indicators, and learned behavioral patterns that inform future dialogue generation strategies. This preservation process may utilize preference extraction algorithms that identify user-specific dialogue characteristics from interaction patterns, implement context summarization techniques that capture essential conversational themes and topics without overwhelming storage requirements, and perform preference validation operations that ensure captured preferences accurately represent user characteristics and provide meaningful personalization guidance.

Cross-session continuity manager 2005 serves as the central orchestration component that coordinates all continuity operations, implementing comprehensive session bridging algorithms that manage the transition from active dialogue states to persistent storage and subsequent restoration to active dialogue capabilities. The manager may implement session lifecycle monitoring that tracks dialogue progression and identifies optimal state capture timing, utilize continuity strategy selection that determines appropriate preservation and restoration approaches based on dialogue characteristics and user preferences, and perform continuity validation operations that ensure successful session bridging while maintaining dialogue quality and user experience continuity.

State serialization engine 2006 transforms active dialogue states into persistent storage formats, implementing sophisticated serialization algorithms that preserve essential thread characteristics while optimizing storage efficiency and restoration speed. The engine may utilize geometric state encoding that preserves manifold coordinates and trajectory information in compact but complete representations, implement thread relationship serialization that maintains connections between multiple dialogue threads and their interdependencies, and perform serialization validation operations that ensure complete information preservation and successful restoration capabilities. According to various embodiments, state serialization engine 2006 can implement adaptive serialization strategies that adjust information density based on thread importance and usage patterns, utilize compression techniques optimized for geometric and conversational data characteristics, and maintain serialization versioning that enables restoration across system updates and architectural modifications.

Manifold persistence manager 2007 specifically addresses the preservation of geometric manifold states, implementing specialized algorithms for maintaining the mathematical properties and geometric relationships that define personalized cognitive spaces. The manager may utilize manifold state encoding that preserves metric tensor properties, curvature characteristics, and geometric structure in mathematically consistent formats, implement coordinate system preservation that maintains geometric relationships across storage and restoration cycles, and perform manifold validation operations that ensure preserved geometric properties maintain mathematical integrity and dialogue generation effectiveness. According to various embodiments, manifold persistence manager 2007 may implement differential manifold storage that preserves only geometric changes rather than complete manifold states for enhanced efficiency, utilize manifold compression techniques that balance storage optimization with geometric precision requirements, and maintain manifold evolution tracking that enables analysis of personalization development over extended temporal periods.

Session bridge controller 2008 orchestrates the complex transition between session termination and session initiation, implementing coordination algorithms that ensure smooth continuity operations while managing system resources and maintaining performance standards. The controller may implement bridge timing optimization that determines optimal moments for state capture and restoration operations, utilize resource allocation strategies that balance continuity operations with ongoing system performance requirements, and perform bridge validation procedures that ensure successful session transitions without data loss or functionality degradation. According to various embodiments, session bridge controller 2008 may implement predictive bridging that anticipates session transitions and prepares continuity operations in advance, utilize adaptive bridging strategies that adjust transition approaches based on dialogue complexity and system conditions, and maintain bridge quality assessment that measures continuity effectiveness and identifies optimization opportunities.

Temporal coherence validator 2009 ensures that restored dialogue states maintain semantic and contextual coherence despite temporal discontinuities, implementing validation algorithms that assess the appropriateness and effectiveness of cross-session continuity operations. The validator may implement coherence measurement techniques that quantify the semantic consistency between pre-interruption and post-restoration dialogue states, utilize temporal alignment algorithms that ensure restored contexts remain relevant and meaningful for continued dialogue, and perform coherence optimization procedures that enhance restoration quality through intelligent context adaptation. According to various embodiments, temporal coherence validator 2009 may implement adaptive coherence standards that adjust validation criteria based on temporal gap duration and context evolution, utilize predictive coherence modeling that anticipates potential coherence challenges and implements preventive measures, and maintain coherence learning capabilities that improve validation effectiveness based on restoration outcomes and user feedback.

The architecture incorporates a storage layer comprising encrypted thread storage 2010, manifold state repository 2011, and cross-device synchronizer 2012. Encrypted thread storage 2010 provides secure persistence for dialogue thread data, building upon privacy and security mechanisms while extending capabilities for cross-session requirements. Manifold state repository 2011 implements specialized storage optimized for geometric manifold data, utilizing mathematical data structures and storage formats that preserve geometric properties and enable efficient restoration of complex mathematical relationships. Cross-device synchronizer 2012 extends continuity capabilities across different devices and platforms, adapting synchronization techniques to enable seamless dialogue continuation regardless of device transitions.

Session continuity metrics 2013 provides comprehensive monitoring and assessment of continuity effectiveness, implementing measurement algorithms that quantify restoration success rates, dialogue quality preservation, user satisfaction with continuity operations, and system performance impacts of cross-session operations. The metrics system may utilize continuity quality scoring that generates quantitative assessments of restoration effectiveness, implement trend analysis that identifies patterns in continuity performance and optimization opportunities, and perform comparative analysis that benchmarks continuity effectiveness across different user types and dialogue characteristics.

User identity manager 2014 ensures appropriate user authentication and identity preservation across session boundaries, implementing security and identity verification algorithms that maintain user privacy while enabling personalized continuity operations. The manager may utilize identity verification techniques that confirm user authorization for accessing preserved dialogue states, implement privacy protection mechanisms that ensure user data remains secure during storage and restoration operations, and perform identity consistency validation that ensures restored personalization characteristics correspond to appropriate user profiles.

In Session 2, the architecture demonstrates successful continuity through restored thread state and manifold position 2003 and continued user context 2004. The restoration process implements comprehensive state reconstruction algorithms that transform stored representations back into active dialogue capabilities, ensuring that restored threads maintain full functionality and geometric positioning equivalent to pre-interruption states. The system validates restoration success through continued user context 2004, confirming that personalization characteristics, preferences, and dialogue patterns remain consistent and effective for ongoing interaction.

Throughout operation, the cross-session continuity architecture maintains bidirectional synchronization between processing components and storage systems, enabling continuous optimization of continuity operations while preserving system performance and user experience quality. The architecture implements temporal bridging that spans arbitrary time periods, from brief interruptions to extended temporal gaps, ensuring robust dialogue continuity regardless of session duration or interruption characteristics. According to various embodiments, the system may implement different continuity strategies based on temporal gap duration, dialogue complexity, and user preferences, ensuring optimal continuity performance across diverse usage scenarios while maintaining the core benefits of persistent, personalized dialogue experiences that transcend individual session boundaries.

Figure 21:
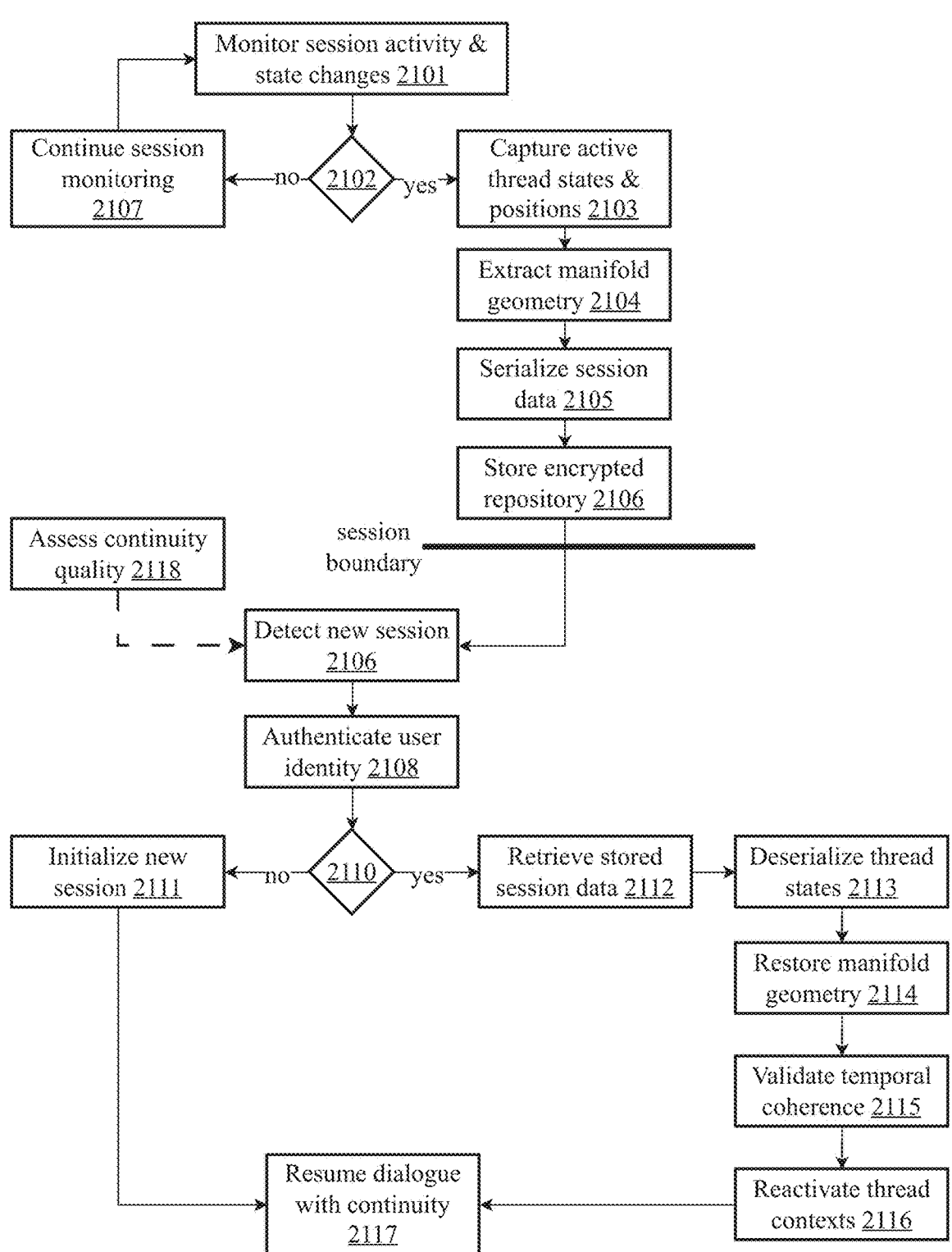
FIG. 21 is a flow diagram illustrating an exemplary method for implementing cross-session continuity in latent contextual threading systems, according to an embodiment.

FIG. 21 is a flow diagram illustrating an exemplary method for implementing cross-session continuity in latent contextual threading systems, according to an embodiment. The method demonstrates a process flow that enables seamless preservation and restoration of dialogue threads and personalized manifold states across temporal boundaries, session interruptions, and device transitions, ensuring dialogue continuity while maintaining geometric positioning, threading context, and personalization characteristics developed through previous interactions.

According to the embodiment, the process begins with monitoring session activity and state changes at step 2101, implementing comprehensive surveillance algorithms that continuously track dialogue session status, user engagement levels, system performance metrics, and environmental conditions that may indicate impending session termination. This monitoring process can utilize activity detection algorithms that analyze user interaction patterns including response timing, engagement frequency, and communication intensity, implement predictive termination analysis that identifies likely session conclusion scenarios based on behavioral patterns and contextual indicators, and perform proactive state preparation that optimizes system readiness for potential continuity operations. According to various embodiments, monitoring session activity and state changes 2101 may implement machine learning algorithms trained on user behavior patterns to predict session termination timing, utilize multi-modal monitoring that combines explicit termination signals with implicit behavioral indicators, and maintain monitoring optimization procedures that balance surveillance depth with computational efficiency requirements.

The system evaluates session termination status at decision point 2102, implementing decision algorithms that determine whether current dialogue sessions are concluding and require continuity preservation operations or continue active operation requiring ongoing monitoring. This evaluation process may utilize termination signal analysis that detects explicit session closure requests, implement implicit termination detection that identifies session conclusion through behavioral pattern analysis, and perform termination confidence assessment that quantifies the likelihood and urgency of continuity operations. According to various embodiments, determining session ending status 2102 may implement adaptive termination thresholds that adjust detection sensitivity based on user patterns and session characteristics, utilize multi-criteria decision frameworks that balance multiple termination indicators including temporal, behavioral, and environmental factors, and maintain termination prediction validation that ensures accurate session status determination without premature or delayed continuity activation.

When session termination is detected, the method proceeds to capture active thread states and positions at step 2103, implementing comprehensive state extraction algorithms that preserve all essential characteristics of ongoing dialogue threads including geometric coordinates within personalized cognitive manifolds, thread metadata encompassing conversation histories and contextual parameters, trajectory information including path histories and velocity vectors that characterize conversation momentum, and threading relationships that define connections between multiple simultaneous dialogue contexts. This capture process may utilize real-time state extraction that minimizes disruption to ongoing dialogue operations, implement priority-based capture that focuses preservation efforts on most critical thread characteristics, and perform capture validation operations that ensure complete information preservation for successful restoration. According to various embodiments, capturing active thread states and positions 2103 may implement intelligent state prioritization that focuses capture operations on threads most likely to require restoration, utilize incremental capture techniques that continuously update preserved state information during active dialogue, and maintain capture optimization procedures that balance preservation completeness with computational efficiency.

The system proceeds to extract manifold geometry at step 2104, implementing specialized algorithms for preserving the mathematical properties and geometric relationships that define personalized cognitive spaces. This extraction process may utilize manifold state encoding that preserves metric tensor properties, curvature characteristics, and geometric structure in mathematically consistent formats, implement coordinate system preservation that maintains geometric relationships and mathematical integrity across storage cycles, and perform geometric validation operations that ensure preserved manifold properties retain mathematical coherence and dialogue generation effectiveness. According to various embodiments, extracting manifold geometry 2104 may implement differential geometric extraction that preserves essential manifold characteristics while optimizing storage efficiency, utilize geometric compression techniques that balance preservation fidelity with storage requirements, and maintain geometric consistency validation that ensures extracted manifold information maintains mathematical rigor and operational effectiveness.

The method continues with serializing session data at step 2105, implementing sophisticated encoding algorithms that transform active dialogue states and geometric information into persistent storage formats optimized for security, efficiency, and restoration accuracy. This serialization process may utilize adaptive encoding strategies that adjust information density based on thread importance and restoration requirements, implement compression techniques optimized for geometric and conversational data characteristics, and perform serialization validation operations that ensure complete information preservation and successful restoration capabilities. According to various embodiments, serializing session data 2105 may implement versioned serialization that enables restoration across system updates and architectural modifications, utilize encryption-aware serialization that optimizes data formats for secure storage requirements, and maintain serialization quality assessment that validates encoding effectiveness and restoration viability.

The system stores data in encrypted repository at step 2106, implementing secure storage operations that preserve serialized session information while maintaining privacy, security, and accessibility requirements for future restoration operations. This storage process may utilize encryption algorithms that protect user data while maintaining restoration efficiency, implement distributed storage strategies that enhance data resilience and availability, and perform storage validation operations that ensure successful data persistence and accessibility. According to various embodiments, storing in encrypted repository 2106 may implement intelligent storage allocation that optimizes storage location based on predicted restoration requirements and access patterns, utilize redundant storage mechanisms that enhance data resilience against system failures, and maintain storage monitoring that tracks data integrity and accessibility over extended temporal periods.

For sessions that do not require immediate termination, the method continues session monitoring at step 2107, implementing ongoing surveillance operations that maintain session oversight while minimizing computational overhead and preserving system performance for active dialogue operations. This continued monitoring may utilize lightweight monitoring algorithms that track essential session characteristics without disrupting dialogue flow, implement adaptive monitoring intensity that adjusts surveillance depth based on session characteristics and termination likelihood, and perform monitoring optimization that balances oversight effectiveness with resource conservation.

Following temporal discontinuity, the method detects new session initiation at step 2108, implementing session establishment algorithms that identify user attempts to resume dialogue interactions and prepare system resources for potential continuity restoration operations. This detection process may utilize session initiation signal analysis that recognizes explicit session startup requests, implement implicit initiation detection that identifies session commencement through user behavior patterns, and perform initiation validation operations that confirm legitimate session establishment requests. According to various embodiments, detecting new session initiation 2108 may implement predictive session detection that anticipates likely session resumption based on user patterns and temporal characteristics, utilize multi-channel initiation monitoring that accommodates various session startup mechanisms, and maintain initiation optimization procedures that minimize session establishment latency while ensuring security and validation requirements.

The system authenticates user identity at step 2109, implementing comprehensive authentication algorithms that verify user authorization for accessing preserved dialogue states while maintaining security and privacy protections. This authentication process may utilize multi-factor authentication techniques that confirm user identity through multiple verification channels, implement adaptive authentication requirements that adjust security measures based on data sensitivity and access context, and perform authentication validation operations that ensure successful identity verification without compromising security standards. According to various embodiments, authenticating user identity 2109 may implement biometric authentication integration that enhances security while maintaining user convenience, utilize contextual authentication that adjusts verification requirements based on access patterns and risk assessment, and maintain authentication optimization that balances security requirements with user experience considerations.

The method evaluates previous data availability at decision point 2110, implementing decision algorithms that determine whether stored session data exists for the authenticated user and assess the appropriateness of continuity restoration operations. This evaluation process may utilize data availability assessment that confirms the existence and accessibility of preserved session information, implement restoration feasibility analysis that evaluates the viability of continuity operations based on data quality and temporal characteristics, and perform restoration recommendation generation that suggests optimal continuity strategies based on available information and user preferences.

For users without previous session data, the method initializes new session at step 2111, implementing session establishment procedures that create fresh dialogue contexts while maintaining system optimization and user experience standards. This initialization process may utilize default session configuration that establishes baseline dialogue capabilities, implement user preference integration that customizes new sessions based on available user information, and perform initialization validation that ensures successful session establishment and functionality.

When previous session data is available, the system retrieves stored session data at step 2112, implementing data access algorithms that efficiently recover preserved session information from encrypted repositories while maintaining security and performance standards. This retrieval process may utilize optimized data access techniques that minimize restoration latency, implement decryption operations that securely access protected session information, and perform retrieval validation that ensures successful data recovery and integrity verification.

The method proceeds to deserialize thread states at step 2113, implementing reconstruction algorithms that transform stored session representations back into active dialogue thread structures. This deserialization process may utilize adaptive reconstruction strategies that optimize restoration accuracy and efficiency, implement validation procedures that ensure reconstructed threads maintain functional integrity, and perform compatibility assessment that ensures restored threads integrate effectively with current system configuration.

The system restores manifold geometry at step 2114, implementing geometric reconstruction algorithms that rebuild personalized cognitive manifold states from preserved mathematical representations. This restoration process may utilize manifold reconstruction techniques that preserve geometric properties and mathematical relationships, implement coordinate system restoration that maintains positional accuracy and geometric consistency, and perform geometric validation that ensures restored manifolds maintain mathematical integrity and dialogue generation effectiveness.

The method validates temporal coherence at step 2115, implementing coherence assessment algorithms that evaluate the semantic and contextual consistency of restored dialogue states despite temporal discontinuities. This validation process may utilize coherence measurement techniques that quantify semantic consistency between pre-interruption and post-restoration states, implement temporal alignment algorithms that ensure restored contexts remain relevant and meaningful, and perform coherence optimization that enhances restoration quality through intelligent context adaptation.

The system reactivates thread contexts at step 2116, implementing activation algorithms that restore full thread functionality and integration with active dialogue operations. This reactivation process may utilize thread integration techniques that seamlessly incorporate restored threads into current dialogue processing, implement context synchronization that aligns restored thread contexts with current system state, and perform activation validation that ensures reactivated threads provide equivalent functionality to originally active threads.

Throughout the restoration process, the method implements parallel quality assessment operations through assess continuity quality at step 2118, enabling concurrent evaluation of restoration effectiveness without interrupting primary continuity operations. This quality assessment process implements monitoring algorithms that track restoration success rates, dialogue quality preservation, and user satisfaction with continuity operations.

The method culminates with resuming dialogue with continuity at step 2117, implementing integration algorithms that transition from restoration operations to active dialogue processing while maintaining the preserved threading context, geometric positioning, and personalization characteristics. This resumption process may utilize dialogue integration techniques that blend restored contexts with current interaction requirements, implement continuity validation that ensures successful restoration and dialogue quality preservation, and perform resumption optimization that enhances dialogue flow and user experience following continuity operations.

Throughout the entire cross-session continuity process, the method maintains comprehensive error handling, rollback capabilities, and performance optimization mechanisms that ensure robust continuity operations across diverse temporal scenarios and system conditions. According to various embodiments, the method may implement different continuity strategies based on temporal gap duration, data availability, and user preferences, ensuring optimal restoration performance while maintaining the core benefits of persistent, personalized dialogue experiences that transcend individual session boundaries and provide seamless conversational continuity across arbitrary temporal discontinuities.

Figure 22:
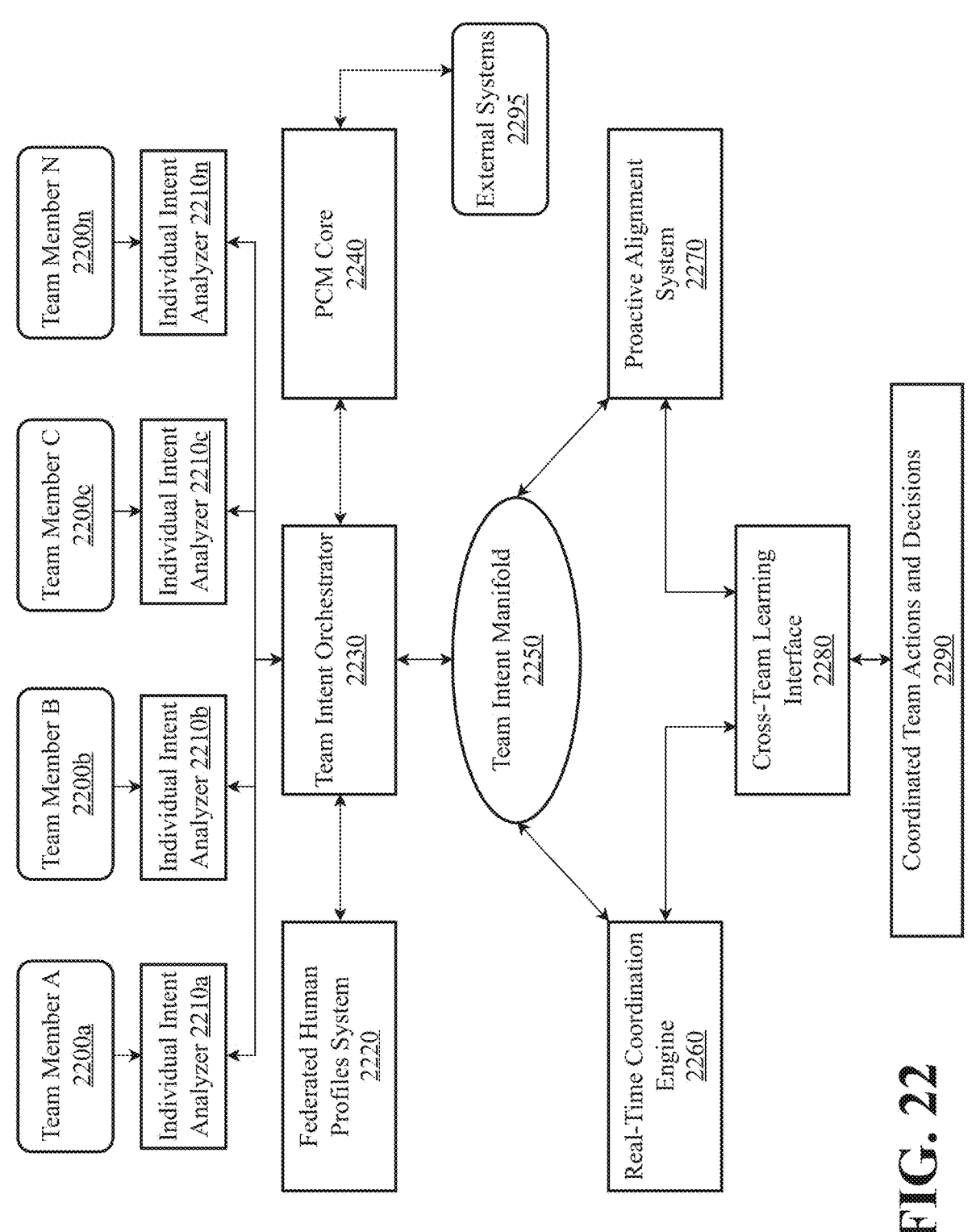
FIG. 22 is a block diagram illustrating an exemplary system architecture for real-time team intent modeling using PCM with federated human profiles, according to an embodiment.

FIG. 22 is a block diagram illustrating an exemplary system architecture for real-time team intent modeling using PCM with federated human profiles, according to an embodiment. The architecture demonstrates a distributed cognitive system that processes individual team member inputs through geometric intent analysis while maintaining privacy boundaries and enabling collective intelligence through federated coordination mechanisms operating within computational latency constraints suitable for interactive team environments.

A plurality of team members 2200a, 2200b, 2200c, and 2200n represent individual participants within a collaborative environment who generate input data including, but not limited to, communications, actions, decisions, and behavioral signals that serve as source material for intent analysis. Each team member 2200a-n connects to a corresponding individual intent analyzer 2210a-n that processes member-specific input streams to extract intent signals, communication patterns, and behavioral indicators through real-time analysis algorithms operating at update frequencies ranging from sub-second to several minutes depending on input signal characteristics and computational resources. Individual intent analyzers 2210a, 2210b, 2210c, and 2210n implement signal processing techniques including natural language analysis for textual communications, temporal pattern recognition for action sequences, and behavioral modeling for interaction dynamics, generating individual intent representations encoded as trajectory vectors within high-dimensional latent spaces that capture each member's immediate objectives, working preferences, and engagement patterns through geometric coordinates.

A federated human profiles system 2220 implements a privacy-preserving architecture for managing individual intent data while enabling controlled sharing across team boundaries through mathematical abstraction techniques. Federated human profiles system 2220 maintains personal intent cache structures that store individual-specific intent patterns with appropriate encryption and access controls, team shared space components that contain geometrically abstracted intent patterns suitable for team-level coordination without exposing personal details through dimensional reduction operations that preserve semantic relationships while removing identifying characteristics, and organizational intent patterns that enable higher-level learning without compromising individual privacy. The system implements graduated privacy controls through multi-tier geometric projection operations where personal intent vectors undergo successive abstraction transformations, including but not limited to principal component analysis, manifold embedding techniques, and differential privacy mechanisms that inject controlled noise while preserving aggregate statistical properties essential for team coordination.

Team intent orchestrator 2230 serves as the central coordination mechanism that integrates individual intent signals from analyzers 2210a-n with federated profile information from system 2220 and PCM core capabilities from system 2240 to generate comprehensive team-level intent understanding through geometric aggregation operations. Team intent orchestrator 2230 analyzes intent patterns across team members using similarity metrics including geodesic distance calculations, angular measurements between intent vectors, and curvature analysis of collective intent manifolds to identify convergence and divergence in objectives with configurable threshold parameters typically ranging from, for example, 0.1 to 0.9 on normalized similarity scales. The orchestrator may coordinate resource allocation based on collective intent priorities computed through weighted optimization algorithms that balance individual preferences against team objectives, and manages real-time adaptation of team coordination strategies based on evolving intent patterns detected through change point analysis and trajectory prediction algorithms.

PCM core components 2240 provide the geometric substrate for team intent representation, incorporating latent manifold 160, cognitive dynamics engine 130, and distributed thought cache infrastructure from previous embodiments adapted for multi-agent intent processing. PCM core components 2240 enable team intent data to be represented as geometric structures within curved manifold spaces having dimensionalities typically ranging from tens to thousands of dimensions depending on team size and intent complexity, with team-level intent patterns emerging through geometric operations including manifold intersection analysis using techniques such as fiber bundle constructions, curvature-based similarity computation through Ricci tensor analysis, and geodesic path optimization for collaborative reasoning trajectories computed by solving variational problems that minimize cognitive effort while satisfying team constraint requirements.

A team intent manifold 2250 implements a geometric representation of collective team objectives and individual member contributions within a unified mathematical framework characterized by time-evolving metric tensors that encode team dynamics. Team intent manifold 2250 maintains collective intent geometry that captures team-level objectives as geometric structures including attractor basins representing stable team states, saddle points indicating decision boundaries, and flow fields encoding team development trajectories, real-time intent synchronization mechanisms that update manifold curvature based on changing individual and team priorities through geometric flow equations that preserve manifold topology while adapting local metric properties, and dynamic adaptation algorithms that reshape manifold properties to reflect evolving team dynamics through controlled geometric deformations including metric scaling, connection modifications, and topological surgery operations when team composition changes significantly.

A real-time coordination engine 2260 processes geometric intent information from team intent manifold 2250 to identify coordination requirements and generate actionable recommendations for team performance optimization through analysis algorithms operating within response time constraints typically under several seconds for interactive applications. Real-time coordination engine 2260 can be configured to implement conflict detection and resolution algorithms that identify when individual intent trajectories diverge from team objectives by computing trajectory deviation measures exceeding configurable thresholds, resource allocation optimization that redistributes tasks based on intent analysis and capability matching using optimization techniques including linear programming, constraint satisfaction, and multi-objective optimization methods, and proactive intervention strategies that address coordination issues before they impact team performance through predictive modeling that extrapolates current intent trajectories to forecast potential conflict scenarios.

A proactive alignment system 2270 generates predictive coordination suggestions based on intent trajectory analysis and historical team performance patterns using machine learning algorithms trained on team interaction data. Proactive alignment system 2270 implements predictive modeling algorithms including, but not limited to, time series analysis, recurrent neural networks, and geometric deep learning methods adapted for manifold-valued data that forecast potential coordination issues with prediction horizons ranging from minutes to weeks depending on intent stability and team dynamics, recommendation generation systems that suggest specific actions for maintaining team alignment through optimization algorithms that identify interventions minimizing projected deviation from team objectives, and adaptive learning mechanisms that improve prediction accuracy based on team response to previous suggestions through reinforcement learning techniques that update model parameters based on coordination outcome feedback.

A cross-team learning interface 2280 enables organizational learning through privacy-preserving sharing of successful team coordination patterns across multiple teams within an organization using federated learning techniques adapted for geometric data. Cross-team learning interface 2280 abstracts successful coordination strategies from individual team contexts through geometric generalization operations that extract invariant patterns while removing team-specific details, maintains anonymized best practice databases that enable knowledge transfer without exposing team-specific information through differential privacy mechanisms and secure aggregation protocols, and implements adaptive learning algorithms including meta-learning and transfer learning approaches that identify generalizable coordination principles applicable across diverse team compositions and objectives by analyzing geometric similarities in successful coordination patterns.

The architecture generates a plurality of coordinated team actions and decisions 2290 through integration of all system components, producing outputs including optimized task assignments computed through multi-agent optimization algorithms, proactive coordination recommendations generated through predictive analysis of intent trajectories, conflict resolution strategies derived from geometric analysis of intent divergence patterns, and performance improvement suggestions based on comparison with successful coordination patterns from cross-team learning. External systems integration 2295 provides interfaces to existing organizational infrastructure including project management platforms, communication systems, and scheduling applications through standardized APIs and data transformation protocols, enabling integration with established workflows while providing enhanced coordination capabilities through geometric intent modeling that operates transparently alongside existing tools.

Connections between system components implement bidirectional communication channels that enable continuous information flow and adaptive system behavior through message passing protocols and shared memory architectures optimized for low-latency geometric data exchange. Individual intent analyzers 2210a-n provide continuous input streams to team intent orchestrator 2230 through data pipelines supporting update rates from real-time streaming to periodic batch processing depending on application requirements and computational constraints, while federated human profiles system 2220 and PCM core components 2240 maintain bidirectional communication with the orchestrator through secure communication protocols that preserve privacy boundaries while enabling both data sharing and system optimization. Team intent manifold 2250 receives coordination directives from orchestrator 2230 and provides geometric analysis results to coordination engine 2260 and alignment system 2270 through geometric data structures and computation results, creating closed-loop feedback systems that enable continuous improvement in team coordination effectiveness through adaptive algorithms that modify system parameters based on coordination success metrics and team performance outcomes.

In an exemplary implementation, consider a software development team comprising three members where team member A 2200a focuses on backend database optimization, team member B 2200b works on frontend user interface development, and team member C 2200c handles API integration between frontend and backend components. Individual intent analyzers 2210a-c process input signals including code commit patterns, communication frequency, and task selection behaviors to generate intent trajectory vectors within a 50-dimensional latent space representing software development activities. Team member A's intent trajectory indicates focus on database performance optimization with geometric coordinates emphasizing efficiency and scalability dimensions, while team member B's trajectory shows concentration on user experience enhancement with coordinates weighted toward interface design and usability dimensions. Team member C initially exhibits intent patterns balanced between both areas but gradually shifts toward frontend-focused activities, creating geometric trajectory convergence with team member B's intent vector.

Team intent orchestrator 2230 computes geodesic distances between intent trajectories using Riemannian metric calculations, detecting that the angular separation between team members B and C has decreased below a threshold of 0.3 radians while the distance to team member A's trajectory has increased above 0.8 radians, indicating potential coordination imbalance. The collective intent manifold 2250 develops curvature concentrations in frontend development regions while backend optimization areas exhibit reduced curvature density, signaling resource allocation misalignment. Real-time coordination engine 2260 identifies this pattern as a conflict scenario where backend development may become under-resourced, generating specific recommendations including task redistribution suggestions that propose moving certain API integration responsibilities from team member C to team member A, thereby rebalancing geometric intent distribution across development domains. The system provides these recommendations within 2.5 seconds of detecting the trajectory deviation, enabling proactive coordination adjustment before development bottlenecks occur.

In an exemplary privacy abstraction scenario, federated human profiles system 2220 processes intent data from a marketing team that has successfully coordinated a product launch campaign, extracting coordination patterns suitable for sharing with other marketing teams without exposing campaign-specific details or individual member information. The original team intent manifold contains high-dimensional geometric structures encoding specific product features, target demographics, timeline constraints, and individual team member specializations represented as coordinate values in a 200-dimensional intent space. The geometric abstraction process begins with dimensional reduction operations using principal component analysis to identify the 15 most significant coordination pattern dimensions that capture essential team dynamics while removing product-specific and individual-identifying information.

The abstraction transformation applies differential privacy mechanisms by injecting Gaussian noise with standard deviation $\sigma=0.1$ into selected coordinate dimensions while preserving geometric relationships essential for coordination understanding. Specific campaign details such as product names, customer segments, and timeline dates undergo entity replacement operations that substitute generic placeholder values while maintaining structural relationships between coordination activities. The resulting abstracted geometric pattern represents generalizable coordination principles including optimal communication frequency patterns encoded as manifold curvature distributions, effective task delegation strategies represented through geodesic path structures connecting different specialization regions, and successful conflict resolution approaches captured as stable attractor basin geometries within the coordination manifold.

Cross-team learning interface 2280 stores this abstracted pattern in the organizational knowledge base where it becomes available to other marketing teams facing similar coordination challenges. When a different marketing team encounters coordination difficulties, the system computes geometric similarity measures between their current intent manifold structure and the abstracted successful pattern, identifying specific geometric transformations that could improve their coordination effectiveness. The privacy abstraction ensures that the learning team cannot reverse-engineer original campaign details or individual member behaviors while still benefiting from proven coordination strategies, achieving knowledge transfer with privacy preservation through mathematical abstraction techniques that maintain utility while eliminating identifying information.

Figure 23:
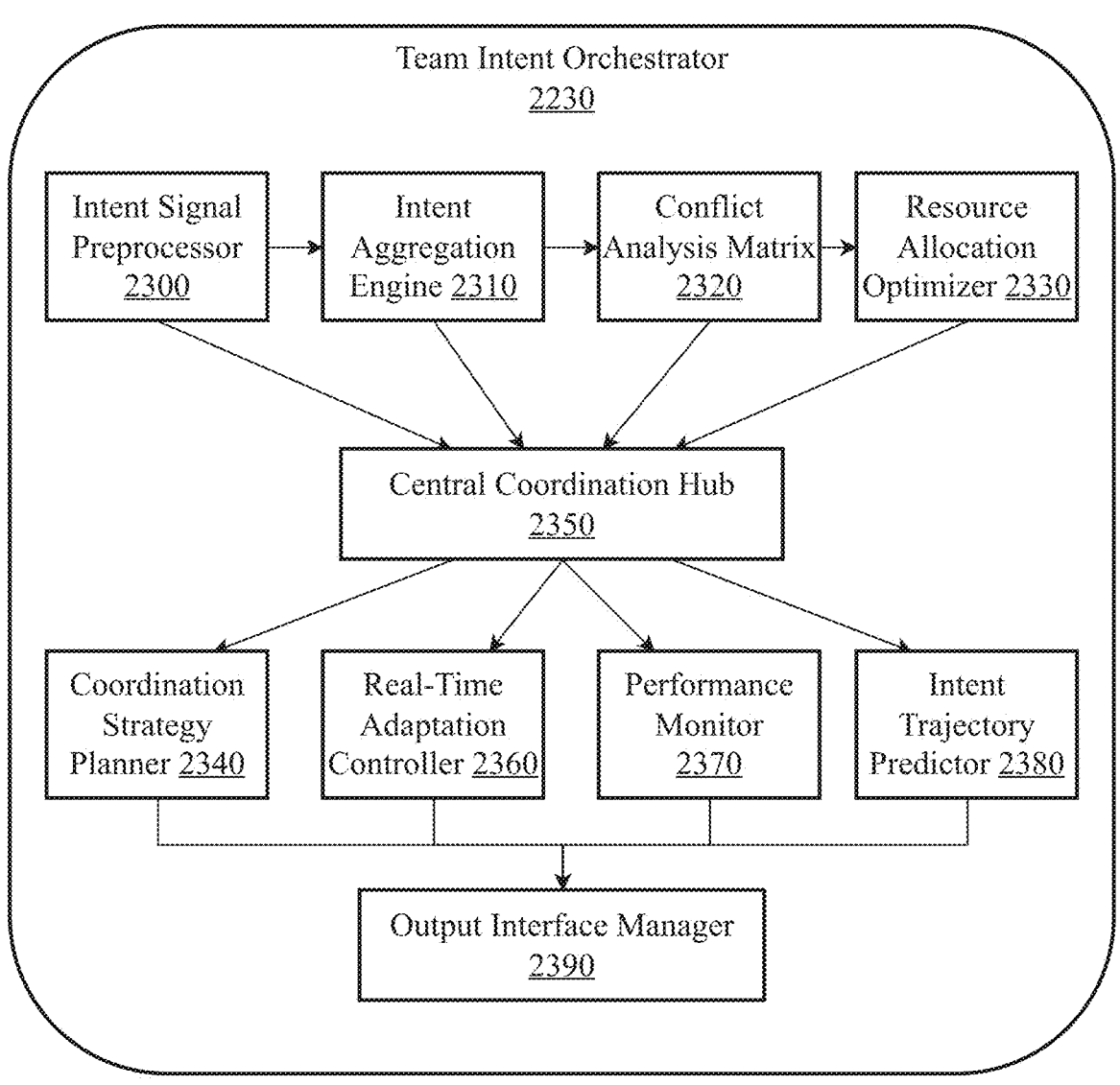
FIG. 23 is a block diagram illustrating an exemplary aspect of a real-time team intent modeling system, team intent orchestrator.

FIG. 23 is a block diagram illustrating an exemplary aspect of a real-time team intent modeling system, team intent orchestrator 2230. This embodiment demonstrates the internal components and data flow mechanisms that enable real-time coordination of team-level intent modeling through geometric analysis and federated profile integration. The architecture can operates as a unified system that receives multiple input streams, processes them through specialized subcomponents, and generates coordinated outputs for team performance optimization within computational complexity constraints that scale approximately logarithmically with team size for teams ranging from 2 to 50 members.

Team intent orchestrator 2230 receives input data streams including individual intent signals from analyzers 2210*a-n* formatted as high-dimensional vectors typically ranging from 10 to 1000 dimensions depending on intent complexity, federated profiles data from system 2220 containing geometrically abstracted preference patterns, PCM core interface data from system 2240 providing manifold geometry and curvature information, external context data from systems 2295 including project timelines and resource constraints, and feedback signals from downstream components formatted as scalar performance metrics and binary success indicators. Input processing implements validation algorithms that verify signal integrity through checksum verification and range validation, temporal synchronization mechanisms that align inputs using adjustable time windows ranging from 100 milliseconds to several seconds depending on application requirements, and context enrichment procedures that augment basic input data with relevant metadata including timestamp information, source identification, and confidence measures.

Intent signal preprocessor 2300 serves as the initial processing stage that validates, normalizes, and enriches incoming intent data streams before distribution to specialized analysis components through standardized data structures. Intent signal preprocessor 2300 implements signal validation algorithms including range checking that verifies vector components fall within expected bounds, consistency verification that detects contradictory or impossible intent combinations, and completeness validation that ensures required data fields are populated, with validation failures triggering configurable responses including signal rejection, interpolation from recent valid signals, or degraded processing modes. Temporal alignment procedures synchronize inputs through buffering mechanisms that accommodate timing variations up to configurable limits typically ranging from 50 milliseconds to 5 seconds, interpolation algorithms including linear and spline-based methods for missing data points, and drift correction techniques that adjust for systematic timing biases. Data normalization processes standardize diverse input formats through vector normalization that scales components to unit magnitude or specified ranges, coordinate system transformation that converts between different geometric representations, and dimensionality alignment that handles varying vector sizes through padding, truncation, or projection operations.

Intent aggregation engine 2310 processes validated intent signals to create unified representations of collective team intent through geometric combination operations implemented using weighted aggregation techniques. Intent aggregation engine 2310 implements trajectory fusion through mathematical operations including weighted centroid calculation where individual intent vectors $v_1$, $v_2, \ldots, v_n$ are combined as $\Sigma(w_i{}^*v_i)$ with weights $w_i$ determined by factors including, but not limited to, member expertise, role authority, and current task relevance, geometric interpolation using techniques such as spherical linear interpolation for directional vectors or geodesic averaging on curved manifolds, and manifold-based aggregation that preserves semantic relationships through operations respecting the underlying geometric structure of the intent space. Dynamic weighting systems adjust individual member influence through algorithms including exponential decay based on recent activity levels, expertise-based scaling using predefined or learned competency measures, and contextual relevance weighting that emphasizes members most qualified for current team objectives, with weight computation typically updating at frequencies ranging from real-time to several minutes depending on team dynamics.

Conflict analysis matrix 2320 implements divergence detection algorithms and resolution strategy generation through geometric analysis of intent trajectory separations and compatibility measures. In some embodiments, conflict analysis matrix 2320 performs divergence detection by computing angular separations between intent vectors using dot product calculations and comparing results against configurable thresholds typically ranging from 0.1 to 0.9 depending on team tolerance for diversity, magnitude difference analysis that identifies significant variations in intent intensity levels, and trajectory prediction that forecasts future divergence based on current velocity vectors and acceleration patterns. Priority conflict analysis identifies competing resource requirements through constraint satisfaction analysis, objective incompatibility detection using logical consistency checking, and timeline conflict identification through schedule overlap analysis. Resolution strategy generation implements algorithms including optimization-based task redistribution that minimizes overall conflict measures, communication facilitation suggestions that recommend specific discussion topics or meeting scheduling, and mediation protocols that provide structured approaches for resolving identified conflicts.

Resource allocation optimizer 2330 processes team intent data to generate optimal task distributions through mathematical optimization techniques including, but not limited to, linear programming, integer programming, and multi-objective optimization depending on problem characteristics and constraint types. Resource allocation optimizer 2330 implements capability matching through algorithms including, for instance, bipartite graph matching that pairs team members with tasks based on skill compatibility scores, preference alignment analysis that considers individual member preferences expressed through intent patterns, and competency assessment that evaluates member qualifications for specific activities. Load balancing algorithms distribute work using techniques including bin packing approaches for discrete task allocation, continuous optimization for divisible work assignments, and fairness constraints that ensure equitable distribution while maintaining efficiency, with optimization objectives typically including completion time minimization, resource utilization maximization, and member satisfaction optimization weighted according to configurable priorities.

Central coordination hub 2350 serves as a primary decision-making component implementing fusion algorithms that integrate potentially conflicting recommendations from multiple analysis modules through techniques including, for example, weighted voting, consensus algorithms, and priority-based resolution. Central coordination hub 2350 implements real-time decision making through algorithms including rule-based systems for well-defined scenarios, machine learning approaches including decision trees or neural networks for complex pattern recognition, and hybrid systems that combine multiple decision-making paradigms. Multi-component integration handles conflicting recommendations through techniques including Pareto optimization that identifies trade-offs between competing objectives, fuzzy logic approaches that accommodate uncertainty and partial conflicts, and temporal reasoning that considers decision timing and sequencing constraints. System health monitoring tracks component performance through metrics including processing latency, error rates, and output quality measures, with automated response mechanisms including component restart procedures, load redistribution, and graceful degradation modes when individual components experience failures.

Coordination strategy planner 2340 generates multi-step coordination plans through temporal planning algorithms including hierarchical task networks, partial-order planning, and constraint-based scheduling approaches adapted for team coordination requirements. Coordination strategy planner 2340 implements planning algorithms that decompose complex team objectives into manageable subtasks with defined dependencies, resource requirements, and success criteria, using techniques including AND/OR tree decomposition, goal regression analysis, and forward state-space search depending on problem complexity and available computational resources. Timeline optimization employs scheduling algorithms including critical path method for dependency management, resource-constrained project scheduling for capacity limitations, and stochastic scheduling approaches that accommodate uncertainty in task duration and resource availability, with optimization typically targeting objectives including makespan minimization, resource utilization efficiency, and deadline satisfaction.

Real-time adaptation controller 2360 manages dynamic parameter adjustment through learning algorithms including gradient descent optimization for continuous parameters, genetic algorithms for discrete parameter combinations, and reinforcement learning approaches that optimize long-term coordination effectiveness. Real-time adaptation controller 2360 implements parameter tuning for variables including similarity thresholds, aggregation weights, decision criteria, and timing parameters through techniques including proportional-integral-derivative control for stability, adaptive filtering for noise reduction, and model predictive control for anticipating parameter changes. Feedback processing analyzes coordination outcomes through statistical analysis of success rates, correlation analysis between parameter settings and performance outcomes, and anomaly detection that identifies unusual patterns requiring investigation, with adaptation rates typically constrained to prevent system instability while enabling responsive improvement.

Performance monitor 2370 tracks coordination effectiveness through comprehensive metrics computation including quantitative measures such as task completion rates, timeline adherence percentages, and resource utilization efficiency, qualitative assessments including member satisfaction surveys and coordination smoothness ratings, and derived metrics including coordination overhead ratios and improvement trend analysis. In some aspects, performance monitor 2370 implements efficiency analysis through statistical techniques including regression analysis to identify performance factors, clustering analysis to group similar coordination patterns, and time series analysis to detect performance trends, with data collection typically spanning multiple temporal scales from real-time monitoring to long-term trend analysis covering weeks or months depending on team stability and project duration.

Intent trajectory predictor 2380 forecasts future team intent evolution through predictive modeling techniques including autoregressive models for stationary intent patterns, state-space models for dynamic intent evolution, and machine learning approaches including recurrent neural networks for complex temporal dependencies. Intent trajectory predictor 2380 implements prediction algorithms with horizons ranging from minutes for immediate coordination needs to weeks for strategic planning, using techniques including Kalman filtering for linear prediction with uncertainty quantification, particle filtering for non-linear dynamics, and ensemble methods that combine multiple prediction approaches to improve robustness. Uncertainty quantification provides confidence intervals through statistical techniques including bootstrap sampling, Bayesian inference, or Monte Carlo simulation depending on available data and computational constraints.

An output interface manager 2390 formats coordination results through data transformation algorithms that convert internal representations to formats required by downstream systems including JSON for web interfaces, protocol buffers for high-performance applications, and custom binary formats for real-time systems. In some embodiments, output interface manager 2390 implements multi-channel delivery through communication protocols including, for example, HTTP REST APIs for web-based systems, message queues for asynchronous communication, and direct memory interfaces for tightly coupled components, with delivery confirmation through acknowledgment protocols, timeout mechanisms, and retry logic that ensures reliable information transfer even under adverse network conditions.

Internal data flow enables coordinated processing through message passing systems that handle inter-component communication for both local processing and for distributed deployments, shared memory architectures for high-performance applications requiring sub-millisecond response times, and event-driven architectures that enable asynchronous processing and loose coupling between components. Flow control mechanisms prevent system overload through backpressure techniques, priority queuing that ensures time-critical coordination decisions receive appropriate processing resources, and circuit breaker patterns that provide graceful degradation when individual components become unavailable or overloaded.

In an exemplary three-member software development team scenario, individual intent vectors representing back-end optimization focus [0.8, 0.2, 0.1], frontend development emphasis [0.1, 0.9, 0.3], and integration work concentration [0.4, 0.6, 0.8] undergo geometric aggregation producing a team centroid vector [0.43, 0.57, 0.4] indicating balanced but frontend-leaning collective intent. When angular separation between members exceeds 0.6 radians, conflict analysis matrix 2320 triggers resource reallocation suggestions processed through optimizer 2330 using Hungarian algorithm variants to reassign specific API development tasks from the integration-focused member to the backend specialist, reducing angular separation to 0.4 radians and improving overall team alignment while maintaining individual expertise utilization.

Figure 24:
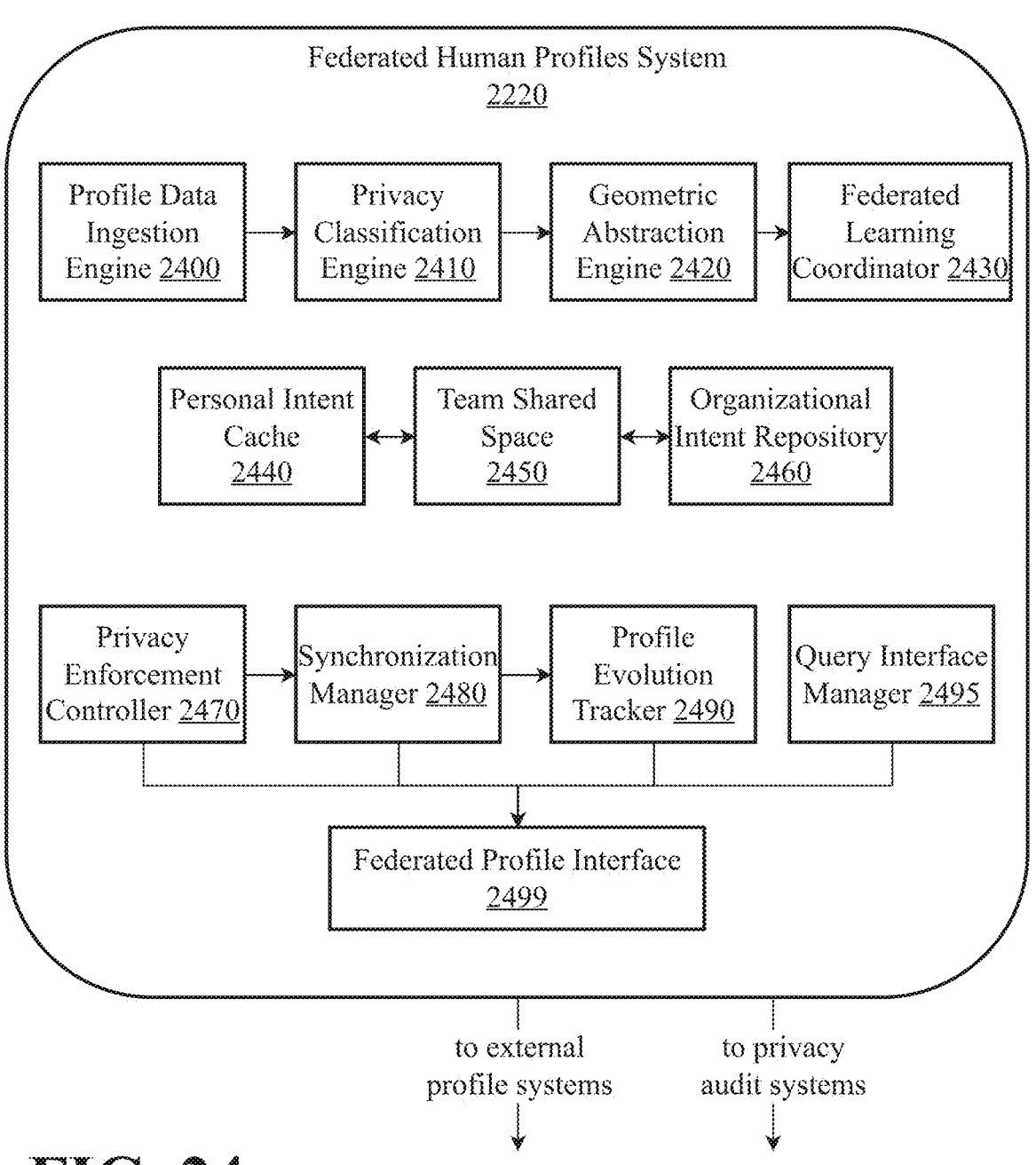
FIG. 24 is a block diagram illustrating an exemplary aspect of a real-time team intent modeling system, federated human profiles system.

FIG. 24 is a block diagram illustrating an exemplary aspect of a real-time team intent modeling system, federated human profiles system 2220. This embodiment demonstrates the multi-tier storage architecture and privacy-preserving processing mechanisms that enable team coordination through geometric abstraction of individual profile data while maintaining graduated privacy controls across personal, team, and organizational boundaries. The architecture implements federated learning principles that allow collective intelligence to emerge from individual profile patterns without compromising personal privacy or exposing sensitive individual information.

Federated human profiles system 2220 receives input data streams including individual intent data from analyzers 2210a-n comprising behavioral patterns, preference indicators, and interaction histories typically encoded as high-dimensional vectors (e.g., ranging from 50 to 2000 dimensions depending on profile complexity), user interaction history including, but not limited to, communication patterns, task preferences, and collaboration styles collected over time periods ranging from days to years, external profile data from organizational systems including role definitions, competency assessments, and historical performance metrics, and privacy preferences specifying individual control requirements for data sharing and abstraction levels. In some aspects, input processing implements validation protocols that verify data integrity through cryptographic hash verification, temporal consistency checking that identifies and resolves conflicting historical data, and completeness assessment that ensures sufficient data quality for meaningful profile construction while accommodating varying data availability across team members.

A profile data ingestion engine 2400 is configured as an initial processing component that validates, normalizes, and prepares incoming profile information for storage and analysis across the federated architecture. Profile data ingestion engine 2400 implements data validation algorithms including, for instance, schema verification that ensures incoming data conforms to expected formats and field requirements, range validation that verifies numerical values fall within acceptable bounds, and consistency checking that identifies contradictory information requiring resolution or flagging. Format normalization processes standardize diverse input sources through data transformation algorithms that convert between different encoding schemes, coordinate system alignment that ensures geometric compatibility across profile representations, and temporal normalization that synchronizes time-based data to common reference frames, with normalization typically preserving essential semantic relationships while enabling unified processing across heterogeneous data sources.

Privacy classification engine 2410 analyzes incoming profile data to determine appropriate privacy levels and access control requirements through automated sensitivity analysis and policy-based classification systems. Privacy classification engine 2410 implements sensitivity analysis algorithms including pattern recognition techniques that identify personally identifiable information, statistical analysis that assesses information uniqueness and potential for individual identification, and contextual evaluation that considers data sensitivity based on organizational policies and regulatory requirements. Access control tagging applies hierarchical privacy labels through multi-level security models that define access permissions for different system components, role-based access control that restricts data availability based on organizational hierarchy and team membership, and purpose-based limitations that control data usage according to specified coordination objectives, while providing manual override capabilities for edge cases requiring human review.

A geometric abstraction engine 2420 performs privacy-preserving transformations that extract coordination-relevant patterns while removing identifying characteristics through mathematical techniques including dimensional reduction and noise injection. Geometric abstraction engine 2420 implements dimensional reduction through algorithms including, but not limited to, principal component analysis that preserves variance while reducing dimensionality, manifold learning techniques such as t-SNE or UMAP that maintain local neighborhood relationships, and feature selection methods that identify coordination-relevant dimensions while discarding personally identifying components. Privacy transformation applies differential privacy mechanisms through calibrated noise injection using Gaussian or Laplacian distributions with privacy parameters typically (for example) ranging from 0.1 to 10.0 depending on privacy requirements, k-anonymity techniques that ensure individual profiles remain indistinguishable within groups of size $k \geq 3$, and geometric perturbation methods that maintain semantic relationships while preventing individual identification through coordinate system rotation and scaling operations.

Federated learning coordinator 2430 manages cross-team pattern recognition and collective intelligence development through distributed learning algorithms that operate on abstracted profile representations without accessing raw individual data. Federated learning coordinator 2430 implements pattern aggregation techniques including gradient averaging for distributed optimization, secure multi-party computation protocols that enable collaborative learning without data sharing, and consensus algorithms that identify common coordination patterns across multiple teams while preserving team-specific variations. Cross-team learning employs techniques including meta-learning that identifies generalizable coordination principles, transfer learning that adapts successful patterns from one team context to another, and ensemble methods that combine insights from multiple teams to improve overall coordination effectiveness, with learning algorithms typically operating on encrypted or heavily abstracted data representations to maintain privacy boundaries.

Personal intent cache 2440 maintains individual-specific profile information with maximum privacy protection through encrypted storage and strict access controls limited to the individual user and essential system components. In some embodiments, personal intent cache 2440 implements encrypted storage using techniques such as AES-256 encryption for data at rest, elliptic curve cryptography for key management, and homomorphic encryption capabilities that enable certain computations on encrypted data without decryption, with encryption keys typically managed through hierarchical key management systems that separate user authentication from data access. Individual pattern storage can be configured to maintain detailed behavioral models including, for instance, communication preferences, task selection patterns, collaboration styles, and performance optimization strategies with temporal resolution ranging from minutes for short-term behavioral patterns to months for long-term preference evolution, typically requiring storage capacities from megabytes to gigabytes per individual depending on profile complexity and historical depth.

A team shared space 2450 contains geometrically abstracted profile patterns suitable for team-level coordination while protecting individual privacy through mathematical transformation and aggregation techniques. Team shared space 2450 implements abstracted pattern storage through techniques including centroid calculation that represents team-level behavioral tendencies, covariance analysis that captures team diversity and complementarity patterns, and cluster analysis that identifies sub-team groupings and specialization areas, with abstraction levels typically removing a majority of (e.g., 85-95%) individually identifying information while preserving coordination-relevant patterns. Collaboration profile generation synthesizes team-level insights including optimal team composition patterns, effective communication strategies, successful conflict resolution approaches, and productive task allocation methods derived from collective behavioral analysis, with profiles typically updated at frequencies ranging from hourly for highly dynamic teams to weekly for stable team configurations.

An organizational intent repository 2460 maintains highly abstracted, anonymized coordination patterns that enable organizational learning without exposing team-specific or individual information through advanced privacy-preserving aggregation techniques. Organizational intent repository 2460 implements cross-team pattern analysis using techniques including statistical aggregation that identifies common coordination challenges and successful resolution strategies, meta-analysis that combines insights from multiple teams to identify generalizable principles, and anomaly detection that identifies unusual but potentially valuable coordination innovations, with anonymization typically achieved through exemplary k-anonymity levels $\geq 10$ and differential privacy parameters $\varepsilon \leq 1.0$ to ensure individual and team privacy protection. Anonymous insight generation creates organizational knowledge including best practice identification, coordination strategy optimization, team formation guidance, and performance prediction models that benefit the entire organization while maintaining strict privacy boundaries.

A privacy enforcement controller 2470 validates all data access requests and maintains comprehensive audit trails to ensure privacy policy compliance and detect potential security violations. In some aspects, privacy enforcement controller 2470 provides access validation through algorithms including, but not limited to, attribute-based access control that evaluates requests against complex policy rules, risk assessment that considers data sensitivity and requestor credentials, and dynamic policy enforcement that adapts access controls based on current context and threat levels, with validation decisions typically completed within milliseconds to avoid impacting system performance. Audit logging maintains detailed records of all data access including timestamp information, requestor identification, data categories accessed, and purpose justification, with log retention periods typically ranging from months to years depending on regulatory requirements and organizational policies.

A synchronization manager 2480 maintains consistency across the multi-tier storage architecture through distributed synchronization protocols and conflict resolution mechanisms. In some embodiments, synchronization manager 2480 implements cross-tier updates using techniques including, but not limited to, vector clocks for distributed timestamp management, consensus protocols such as Raft or Byzantine fault tolerance algorithms for consistent state management, and eventual consistency models that accommodate network partitions and temporary unavailability. Consistency control may handle conflicting updates through techniques including last-writer-wins with timestamp ordering, semantic conflict resolution that considers data meaning and context, and manual review processes for complex conflicts requiring human judgment.

A profile evolution tracker 2490 monitors long-term changes in individual and team coordination patterns to identify learning opportunities and adaptation requirements. Profile evolution tracker 2490 implements pattern learning through techniques including time series analysis that identifies behavioral trends, change point detection that recognizes significant shifts in coordination patterns, and stability analysis that distinguishes temporary variations from permanent behavioral changes, with tracking typically operating over time horizons ranging from weeks for short-term adaptation to years for long-term professional development. Adaptation monitoring evaluates the effectiveness of coordination improvements through metrics such as, for instance, task completion efficiency, team satisfaction measures, and coordination overhead reduction, providing feedback for system optimization and individual development planning.

A query interface manager 2495 handles profile retrieval requests and format translation to support diverse downstream system requirements while enforcing appropriate privacy controls. Query interface manager 2495 implements profile retrieval through techniques including similarity search algorithms that identify relevant profiles based on coordination requirements, recommendation systems that suggest optimal team compositions or collaboration strategies, and predictive analytics that forecast coordination outcomes based on profile combinations, with query processing typically completed within sub-second timeframes for interactive applications. Format translation provides outputs in various formats including JSON for web interfaces, binary protocols for high-performance applications, and standardized schemas for integration with external systems, while maintaining privacy protection appropriate to each access tier and use case.

A federated profile interface 2499 coordinates multi-tier access management and privacy-aware delivery of profile information to downstream systems including team intent orchestrator 2230, cross-team learning interface 2280, external profile systems, and privacy audit systems. In some embodiments, the interface implements graduated access controls that provide different levels of profile detail based on system requirements and privacy permissions, data minimization techniques that deliver only information necessary for specific coordination tasks, and privacy-preserving aggregation that combines individual profiles into collective insights without exposing personal details, with delivery mechanisms typically supporting both synchronous API calls for immediate access and asynchronous messaging for batch processing and system integration.

In an exemplary implementation, an individual team member's detailed profile containing specific communication preferences, task completion times, and collaboration patterns encoded as a 500-dimensional vector undergoes geometric abstraction through principal component analysis reducing dimensionality to 50 components, followed by differential privacy noise injection with $\varepsilon=2.0$ that adds calibrated Gaussian noise to prevent individual identification while preserving coordination-relevant patterns. The resulting abstracted profile maintains sufficient information for team coordination optimization while ensuring individual privacy protection through k-anonymity $\geq 5$ within the team shared space, enabling effective team coordination without compromising personal privacy or exposing sensitive behavioral details to unauthorized system components or team members.

Figure 25:
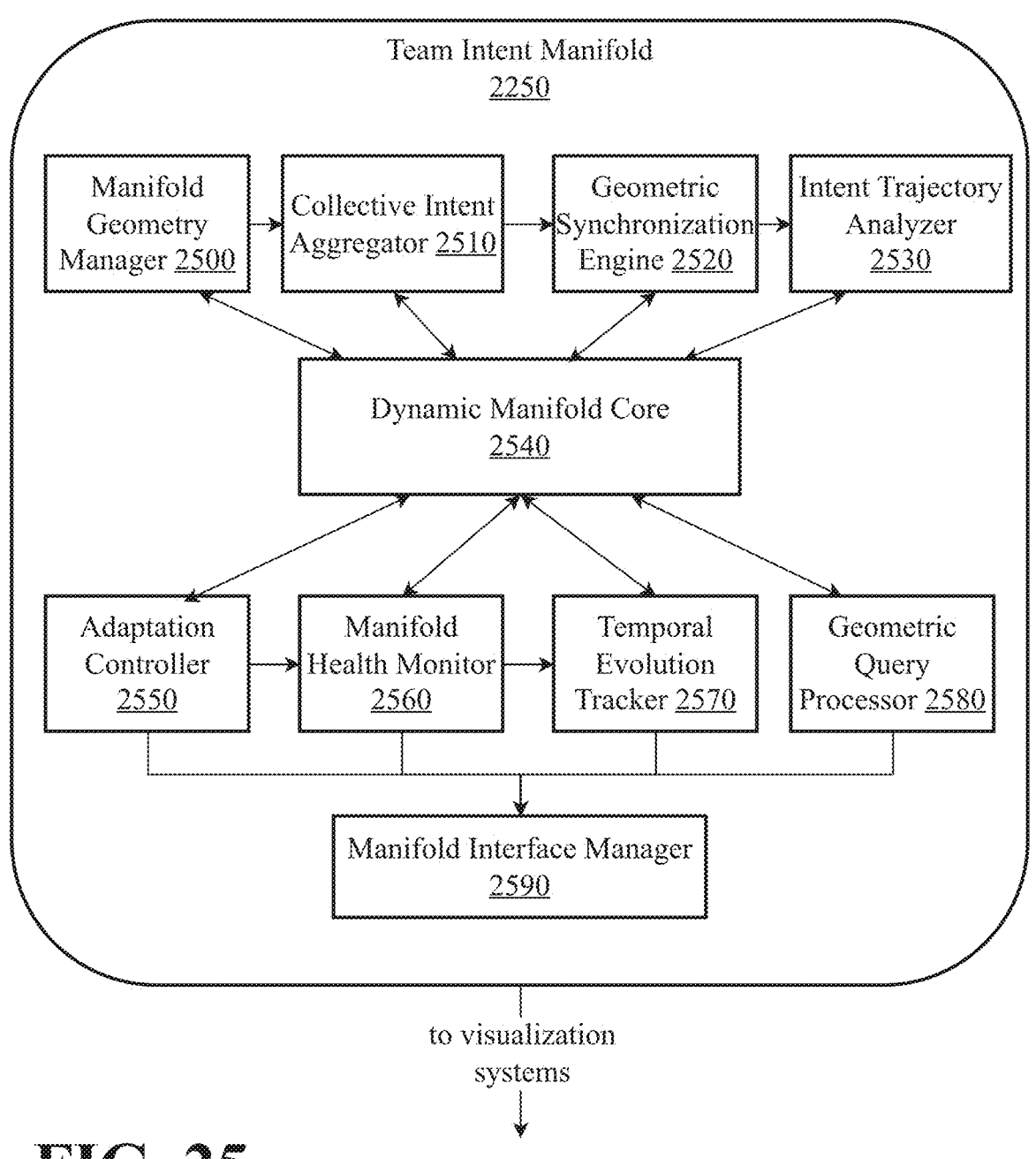
FIG. 25 is a block diagram illustrating an exemplary aspect of a real-time team intent modeling system, team intent manifold.

FIG. 25 is a block diagram illustrating an exemplary aspect of a real-time team intent modeling system, team intent manifold 2250. The embodiment demonstrates the geometric substrate components and dynamic processing mechanisms that maintain a continuously evolving mathematical representation of collective team intent through differential geometric operations and real-time manifold adaptation. The architecture implements a living geometric space where individual team member intents are unified into coherent collective patterns while preserving the mathematical properties necessary for efficient coordination analysis and prediction.

Team intent manifold 2250 receives input data streams including coordination directives from team intent orchestrator 2230 containing aggregated intent patterns and coordination requirements, PCM core manifold data from system 2240 providing underlying geometric infrastructure and computational primitives, individual intent trajectories representing real-time behavioral patterns and objective evolution from team members, and historical team patterns containing successful coordination strategies and learned behavioral models accumulated over previous team interactions. Input processing implements geometric validation protocols that ensure incoming trajectory data maintains mathematical consistency with existing manifold structure, temporal alignment procedures that synchronize trajectories arriving at different update frequencies, and semantic verification that confirms intent patterns conform to established team coordination frameworks.

A manifold geometry manager 2500 is present and configured for maintaining and evolving the mathematical structure underlying the team intent representation through differential geometric operations. Manifold geometry manager 2500 implements metric tensor update algorithms that modify the geometric properties of the intent space based on usage patterns and coordination effectiveness, with tensor modifications reflecting how conceptual distances between different intent categories change as teams develop more efficient collaboration patterns. Curvature computation processes analyze local geometric properties to identify regions of high intent density where multiple team members focus attention, creating natural attraction points for future coordination activities. The component maintains mathematical consistency through geometric constraint satisfaction that ensures manifold updates preserve essential topological properties while allowing adaptive restructuring, coordinate system management that handles transformations between different geometric representations, and stability verification that prevents geometric deformations from creating mathematical singularities or computational instabilities.

A collective intent aggregator 2510 processes individual intent trajectories to generate unified team-level representations through geometric fusion operations that preserve semantic relationships while creating emergent collective patterns. In some embodiments, collective intent aggregator 2510 implements trajectory fusion algorithms that combine individual intent paths into coherent team-level movements through the geometric space, using weighted combination techniques that account for individual member expertise, role responsibilities, and contextual relevance. Emergent pattern detection identifies collective behaviors that arise from individual interactions, including, for instance, synchronized intent convergence indicating team alignment, complementary trajectory patterns suggesting effective task specialization, and oscillatory behaviors that may indicate coordination challenges requiring intervention. The aggregation process maintains individual member identity within collective representations through multi-scale geometric structures that preserve personal intent characteristics while enabling team-level analysis and optimization.

A geometric synchronization engine 2520 manages real-time updates and consistency maintenance across the distributed manifold representation through coordinated geometric operations and state synchronization protocols. According to some aspects, geometric synchronization engine 2520 implements real-time update mechanisms that propagate individual intent changes throughout the manifold structure while maintaining geometric consistency, using incremental update algorithms that minimize computational overhead while preserving mathematical accuracy. Consistency maintenance ensures that concurrent updates from multiple team members result in coherent manifold evolution through conflict resolution algorithms that handle simultaneous geometric modifications, temporal ordering mechanisms that establish causal relationships between intent changes, and distributed coordination protocols that synchronize manifold state across multiple system components without requiring centralized control.

An intent trajectory analyzer 2530 performs geometric analysis of intent paths to extract coordination-relevant information and support similarity-based matching and prediction algorithms. In some implementations, intent trajectory analyzer 2530 implements path computation algorithms that calculate optimal trajectories through the intent manifold for achieving specific coordination objectives, using geodesic optimization techniques that find paths of minimal cognitive effort while satisfying team constraint requirements. Similarity analysis identifies patterns in intent trajectories that indicate successful coordination strategies, potential conflict situations, or opportunities for improved collaboration through geometric distance calculations, curvature-based pattern matching, and temporal correlation analysis that recognizes recurring behavioral patterns across different time periods and team configurations.

A dynamic manifold core 2540 serves as a central mathematical engine that maintains the evolving geometric representation of team intent through time-dependent differential geometric operations. Dynamic manifold core 2540 implements time-evolving metric tensors that encode how semantic relationships between different intent categories change as teams develop more sophisticated coordination patterns, with tensor evolution governed by usage-based adaptation algorithms that strengthen geometric connections between frequently co-occurring intent patterns while allowing unused connections to weaken naturally. Curvature-based intent density management creates regions of high curvature where team attention concentrates, forming natural attractor basins that guide future intent development toward successful coordination patterns. Geodesic path optimization computes efficient trajectories through the intent space that minimize coordination effort while maximizing team objective achievement, using variational calculus and constraint optimization techniques adapted for curved geometric spaces. Attractor basin management maintains stable coordination patterns as persistent geometric structures that provide consistent guidance for team behavior while allowing adaptive modification based on changing circumstances and objectives.

An adaptation controller 2550 manages the dynamic evolution of manifold properties through learning rate control and stability monitoring mechanisms that balance responsiveness against mathematical consistency. Adaptation controller 2550 implements learning rate control algorithms that determine how quickly the manifold geometry adapts to new intent patterns, using adaptive control theory to balance rapid response to important changes against stability requirements that prevent excessive sensitivity to temporary fluctuations. Stability monitoring tracks geometric health metrics including curvature bounds, metric tensor condition numbers, and trajectory convergence properties to ensure manifold evolution remains mathematically well-defined and computationally tractable, with automated intervention mechanisms that apply corrective modifications when geometric instabilities are detected.

Manifold health monitor 2560 continuously evaluates the mathematical and computational integrity of the geometric representation through comprehensive analysis of geometric properties and system performance characteristics. Manifold health monitor 2560 utilizes geometric integrity checking through mathematical validation of metric properties, curvature bounds verification, and topological consistency analysis that ensures the manifold maintains well-defined geometric structure suitable for reliable coordination analysis. Performance metrics tracking monitors computational efficiency, memory utilization, and response time characteristics to ensure the geometric representation scales appropriately with team size and coordination complexity, providing feedback for system optimization and resource allocation decisions.

A temporal evolution tracker 2570 maintains historical records of manifold development and analyzes long-term trends in team coordination patterns through geometric time series analysis and evolutionary pattern recognition. In various aspects, temporal evolution tracker 2570 utilizes history management through compressed geometric representations that preserve essential coordination patterns while minimizing storage requirements, using techniques including geometric data compression, semantic summarization, and temporal decimation that maintain critical historical information while managing computational and storage overhead. Trend analysis identifies long-term patterns in team coordination development including skill acquisition curves, collaboration efficiency improvements, and strategic adaptation patterns that inform team development planning and performance optimization strategies.

A geometric query processor 2580 handles requests for geometric analysis and similarity computation from other system components through efficient algorithms optimized for curved manifold operations. According to an embodiment, geometric query processor 2580 utilizes distance computation using geodesic calculation algorithms adapted for the curved geometry of the intent manifold, providing accurate similarity measures between different intent patterns, team configurations, or coordination strategies. Similarity queries support pattern matching operations that identify analogous situations from historical data, find team members with complementary intent patterns, or locate successful coordination strategies applicable to current circumstances, using geometric search algorithms including nearest neighbor computation, similarity clustering, and pattern recognition techniques designed for non-Euclidean geometric spaces.

A manifold interface manager 2590 coordinates data export and visualization support for downstream systems while maintaining the geometric fidelity necessary for accurate coordination analysis and decision-making. Manifold interface manager 2590 may implement geometric data export through format conversion algorithms that translate internal geometric representations into formats suitable for different downstream applications including real-time coordination engine 2260, proactive alignment system 2270, PCM core updates for system 2240, visualization systems for human interpretation, and cross-team learning interface 2280. Visualization support generates geometric projections and dimensional reduction operations that enable human understanding of high-dimensional team intent patterns through two and three-dimensional representations, interactive exploration interfaces, and temporal animation capabilities that show coordination pattern evolution over time.

The internal processing architecture enables coordinated geometric operations through distributed computation mechanisms that maintain mathematical consistency while supporting real-time performance requirements, with data flow coordination ensuring that geometric updates propagate efficiently throughout the system while preserving causal ordering and semantic relationships. Feedback control loops enable continuous adaptation where geometric analysis results influence manifold evolution parameters, creating self-improving coordination capabilities that become more effective through continued use and accumulated team experience.

In an exemplary team coordination scenario, individual intent trajectories from three team members following different paths through the high-dimensional intent manifold undergo geometric aggregation through the collective intent aggregator 2510, which computes a team centroid trajectory while identifying regions of high curvature where individual paths converge. The dynamic manifold core 2540 updates local metric properties to reflect increased semantic density in convergence regions, creating attractor basins that guide future team coordination toward demonstrated successful patterns while the temporal evolution tracker 2570 records these geometric changes for future reference and pattern recognition, enabling organizational learning through mathematical abstraction of successful team coordination strategies.

Figure 26:
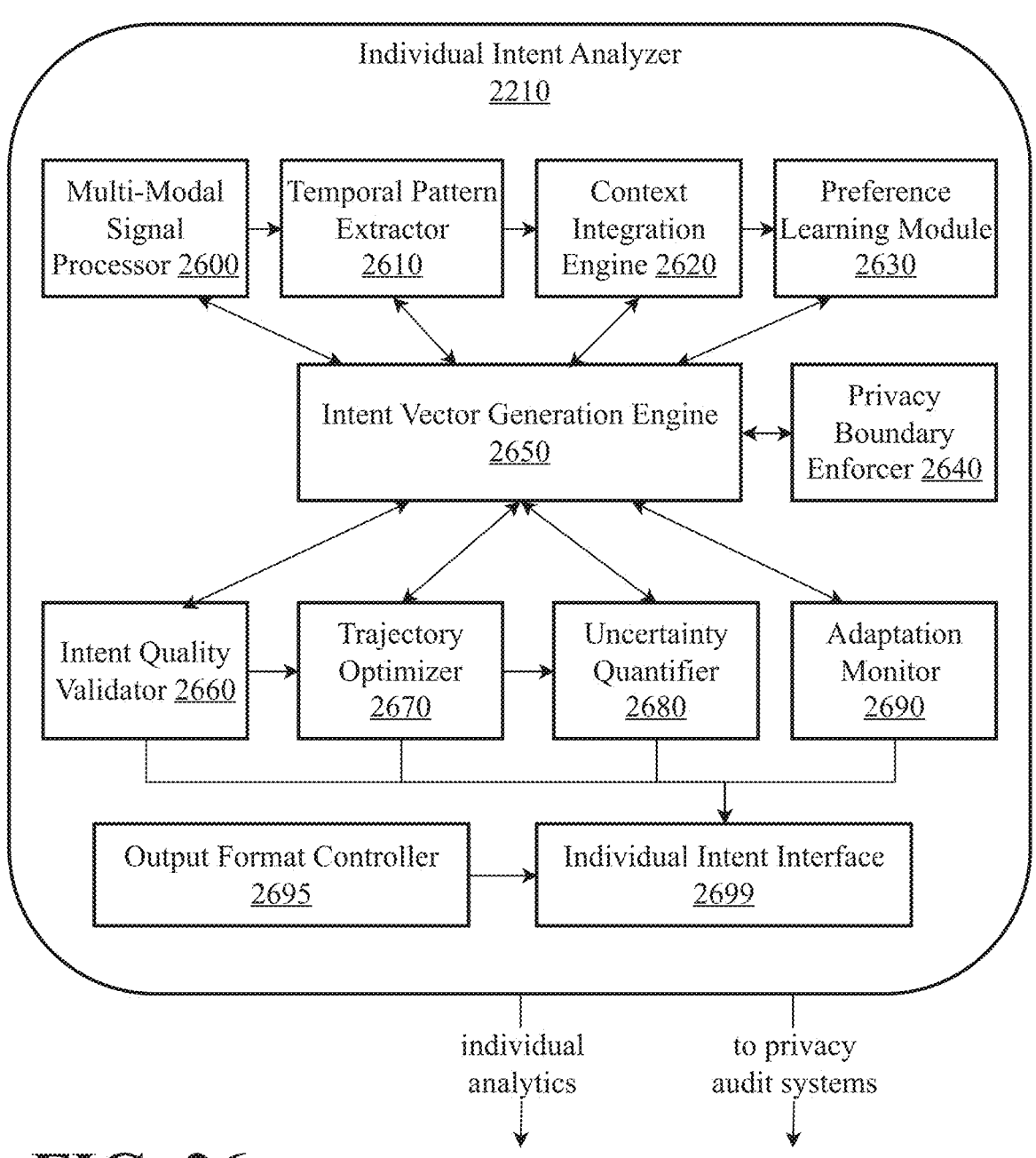
FIG. 26 is a block diagram illustrating an exemplary aspect of a real-time team intent modeling system, individual intent analyzer.

FIG. 26 is a block diagram illustrating an exemplary aspect of a real-time team intent modeling system, individual intent analyzer 2210. The embodiment illustrates the multi-modal processing components and geometric vector generation mechanisms that transform individual team member behavioral signals into mathematical intent representations suitable for team coordination analysis while maintaining strict privacy boundaries and ensuring high-quality output through comprehensive validation and optimization processes. The architecture implements real-time analysis of diverse behavioral inputs to create continuous geometric trajectories that capture individual intent evolution and preference patterns.

Individual intent analyzer 2210 receives input data streams including communication data containing textual messages, voice recordings, and interaction patterns that provide direct indicators of individual objectives and preferences, behavioral signals encompassing task selection patterns, collaboration frequency metrics, and engagement indicators derived from system interaction logs, task activity data including completion rates, time allocation patterns, and priority selections that reveal individual work preferences and expertise areas, temporal patterns reflecting daily rhythms, work session characteristics, and response time distributions that indicate individual productivity cycles and attention patterns, context information including environmental factors, project deadlines, and resource availability that influence individual decision-making processes, and historical preferences containing learned behavioral models and adaptation patterns accumulated over previous interactions and team collaborations. Input preprocessing implements data validation protocols that verify signal integrity and identify potential noise or corruption, temporal alignment procedures that synchronize inputs arriving at different frequencies and from various sources, and semantic consistency checking that ensures input data maintains logical coherence across different modalities and time periods.

A multi-modal signal processor 2600 serves as the primary input processing component that analyzes and extracts semantic meaning from diverse communication and behavioral data streams through natural language processing and behavioral pattern recognition algorithms. Multi-modal signal processor 2600 implements natural language processing through techniques including, but not limited to, sentiment analysis that identifies emotional states and satisfaction levels, intent extraction that recognizes explicit goals and objectives from textual communications, topic modeling that categorizes communication content into semantic themes, and discourse analysis that identifies communication patterns and collaboration styles. Behavioral parsing processes non-linguistic signals through activity pattern recognition that identifies recurring behavioral sequences, engagement level assessment that quantifies participation intensity and focus duration, and interaction style analysis that characterizes individual approaches to collaboration and conflict resolution, with parsing algorithms adapted to handle various input modalities while preserving essential semantic relationships for downstream geometric encoding.

A temporal pattern extractor 2610 analyzes time-dependent behavioral characteristics to identify individual rhythms, productivity cycles, and temporal preferences that influence coordination effectiveness and team scheduling optimization. In some aspects, temporal pattern extractor 2610 implements sequence analysis through techniques including time series decomposition that identifies periodic components in behavioral patterns, change point detection that recognizes significant shifts in individual behavior or preferences, and autocorrelation analysis that quantifies consistency and predictability in temporal behaviors. Rhythm detection identifies individual productivity patterns including peak performance periods, collaboration preferences timing, and optimal task scheduling windows through spectral analysis, periodogram computation, and circadian rhythm modeling that accounts for individual biological and professional scheduling preferences, enabling coordination systems to optimize team interactions based on individual temporal characteristics and availability patterns.

A context integration engine 2620 processes environmental and situational information to understand how external factors influence individual intent formation and behavioral expression within team coordination scenarios. Context integration engine 2620 implements situational analysis through techniques including, for instance, environmental factor assessment that considers workspace conditions, resource availability, and external pressure influences, deadline impact analysis that quantifies how time constraints affect individual priority setting and collaboration willingness, and resource constraint evaluation that identifies how limited availability affects individual decision-making and team participation patterns. Environment mapping creates spatial and temporal context models that capture how physical location, time zones, and organizational hierarchy influence individual behavior and coordination preferences, using contextual embedding techniques that integrate environmental information with behavioral patterns to improve intent prediction accuracy and coordination recommendation quality.

A preference learning module 2630 continuously adapts individual behavioral models based on observed patterns and feedback signals to improve intent prediction accuracy and coordination effectiveness over time. According to an embodiment, preference learning module 2630 implements pattern recognition through machine learning algorithms including collaborative filtering that identifies preferences based on similar individual patterns, reinforcement learning that optimizes behavioral models based on coordination success feedback, and unsupervised clustering that discovers latent preference categories and behavioral archetypes. Adaptation tracking monitors changes in individual preferences and behavioral patterns through techniques including drift detection that identifies gradual changes in collaboration styles, preference stability analysis that distinguishes temporary variations from permanent behavioral shifts, and learning rate optimization that balances responsiveness to new patterns against stability of established behavioral models, enabling the system to maintain accurate intent representations despite individual growth and changing circumstances.

A privacy boundary enforcer 2640 implements comprehensive access control and data filtering mechanisms to ensure individual behavioral information remains protected while enabling necessary data sharing for team coordination purposes. In some aspects, privacy boundary enforcer 2640 implements access control through role-based permissions that restrict data availability based on organizational hierarchy and team membership, purpose-based limitations that control data usage according to specific coordination objectives, and temporal access restrictions that limit historical data availability to protect individual privacy over time. Data filtering applies privacy-preserving transformations including differential privacy mechanisms that add calibrated noise to protect individual identification, data minimization techniques that extract only coordination-relevant information while discarding sensitive personal details, and anonymization procedures that remove identifying characteristics while preserving behavioral patterns necessary for effective team coordination analysis and optimization.

An intent vector generation engine 2650 serves as the central mathematical processing component that transforms multi-modal behavioral inputs into high-dimensional geometric representations suitable for team coordination analysis and manifold-based reasoning operations. According to an embodiment, intent vector generation engine 2650 utilizes multi-dimensional intent encoding through techniques including semantic embedding that maps behavioral patterns into continuous vector spaces, dimensionality optimization that balances representation accuracy against computational efficiency, and geometric consistency maintenance that ensures vector operations preserve meaningful semantic relationships. Semantic relationship mapping identifies connections between different intent categories and behavioral patterns through correlation analysis, graph-based modeling, and manifold learning techniques that capture non-linear relationships between individual preferences and coordination behaviors. Geometric trajectory construction creates continuous paths through intent space that represent individual behavioral evolution over time, using interpolation algorithms, smoothing techniques, and constraint satisfaction methods that ensure trajectory mathematical properties support effective geometric analysis and similarity computation. Real-time vector updates maintain current intent representations through incremental learning algorithms, online adaptation techniques, and change detection mechanisms that identify significant behavioral shifts requiring vector recalibration.

An intent quality validator 2660 evaluates the accuracy and reliability of generated intent vectors through comprehensive consistency checking and confidence scoring mechanisms that ensure high-quality output for downstream coordination systems. In some aspects, intent quality validator 2660 utilizes consistency checking through techniques including internal coherence analysis that identifies contradictory behavioral indicators, temporal stability assessment that evaluates whether intent vectors maintain appropriate consistency over time, and cross-modal validation that verifies agreement between different input sources and analysis methods. Confidence scoring quantifies the reliability of intent predictions through uncertainty estimation techniques including Bayesian inference that provides probabilistic confidence measures, ensemble methods that combine multiple analysis approaches to improve reliability, and historical accuracy tracking that adjusts confidence scores based on previous prediction performance and validation outcomes.

A trajectory optimizer 2670 refines geometric intent representations through mathematical optimization techniques that improve trajectory smoothness, eliminate noise artifacts, and enhance geometric properties for effective coordination analysis. Trajectory optimizer 2670 may implement path smoothing through techniques including spline interpolation that creates smooth curves through discrete intent points, Kalman filtering that reduces noise while preserving essential behavioral patterns, and geometric flow algorithms that optimize trajectory properties according to manifold constraints. Geometric refinement adjusts vector representations through optimization procedures including gradient descent for continuous parameter adjustment, constraint satisfaction for maintaining mathematical consistency, and regularization techniques that balance trajectory accuracy against computational complexity and overfitting prevention.

An uncertainty quantifier 2680 provides comprehensive assessment of prediction reliability and ambiguity in intent analysis through statistical techniques and confidence interval computation that enable downstream systems to make informed decisions based on prediction quality. Uncertainty quantifier 2680 can implement confidence interval generation through techniques including bootstrap sampling that estimates prediction variability, Bayesian methods that provide principled uncertainty quantification, and ensemble approaches that combine multiple prediction models to assess agreement and identify areas of high uncertainty. Ambiguity assessment identifies situations where intent analysis faces inherent limitations including conflicting behavioral signals, insufficient historical data, or rapidly changing individual preferences that reduce prediction reliability, enabling coordination systems to appropriately weight individual contributions and request additional information when necessary.

An adaptation monitor 2690 manages the dynamic evolution of individual behavioral models through learning rate control and performance tracking mechanisms that balance responsiveness against stability and ensure continuous improvement in intent analysis accuracy. According to an implementation, adaptation monitor 2690 may utilize learning rate control through techniques including adaptive optimization that adjusts update rates based on prediction performance, stability analysis that prevents excessive model changes that could reduce reliability, and feedback incorporation that uses coordination success metrics to guide model adaptation strategies. Performance tracking monitors intent analysis effectiveness through metrics including prediction accuracy over various time horizons, coordination improvement attribution that identifies individual contributions to team performance, and model stability indicators that ensure consistent intent representation despite individual behavioral evolution and environmental changes.

Output format controller 2695 manages data serialization and protocol adaptation to ensure intent vector information can be efficiently transmitted to diverse downstream systems with varying interface requirements and data format preferences. Output format controller 2695 may implement vector serialization through techniques including compressed encoding that minimizes transmission overhead while preserving essential information, standardized format conversion that enables interoperability with different coordination systems, and protocol adaptation that handles various communication methods including synchronous API calls, asynchronous messaging, and batch processing interfaces. The component maintains format flexibility through configurable output templates, automatic format detection and conversion, and compatibility layers that enable integration with legacy systems while supporting modern high-performance interfaces.

An individual intent interface 2699 coordinates the delivery of processed intent information to downstream systems including team intent orchestrator 2230 for coordination analysis, federated profiles system 2220 for privacy-preserving profile management, team intent manifold 2250 for geometric representation integration, individual analytics systems for personal insight generation, and privacy audit systems for compliance monitoring. The interface implements graduated information sharing that provides different levels of detail based on recipient authorization and intended use, privacy-aware delivery that ensures sensitive individual information remains protected during transmission, and quality assurance that validates output correctness and completeness before distribution to ensure downstream systems receive reliable intent representations suitable for effective team coordination analysis and optimization.

In an exemplary individual analysis scenario, communication data indicating increased discussion of technical challenges, behavioral signals showing longer work sessions and reduced break frequency, task activity data reflecting focus on complex problem-solving activities, and temporal patterns indicating shifted working hours undergo integrated processing where the multi-modal signal processor 2600 extracts semantic indicators of high engagement and technical focus, the temporal pattern extractor 2610 identifies productivity optimization behaviors, and the context integration engine 2620 correlates these patterns with project deadlines and resource constraints. The intent vector generation engine 2650 synthesizes these inputs into a high-dimensional vector representing increased technical focus and deadline-driven intensity, while the privacy boundary enforcer 2640 ensures sensitive details about individual working patterns remain protected through geometric abstraction before delivery to team coordination systems.

Figure 27:
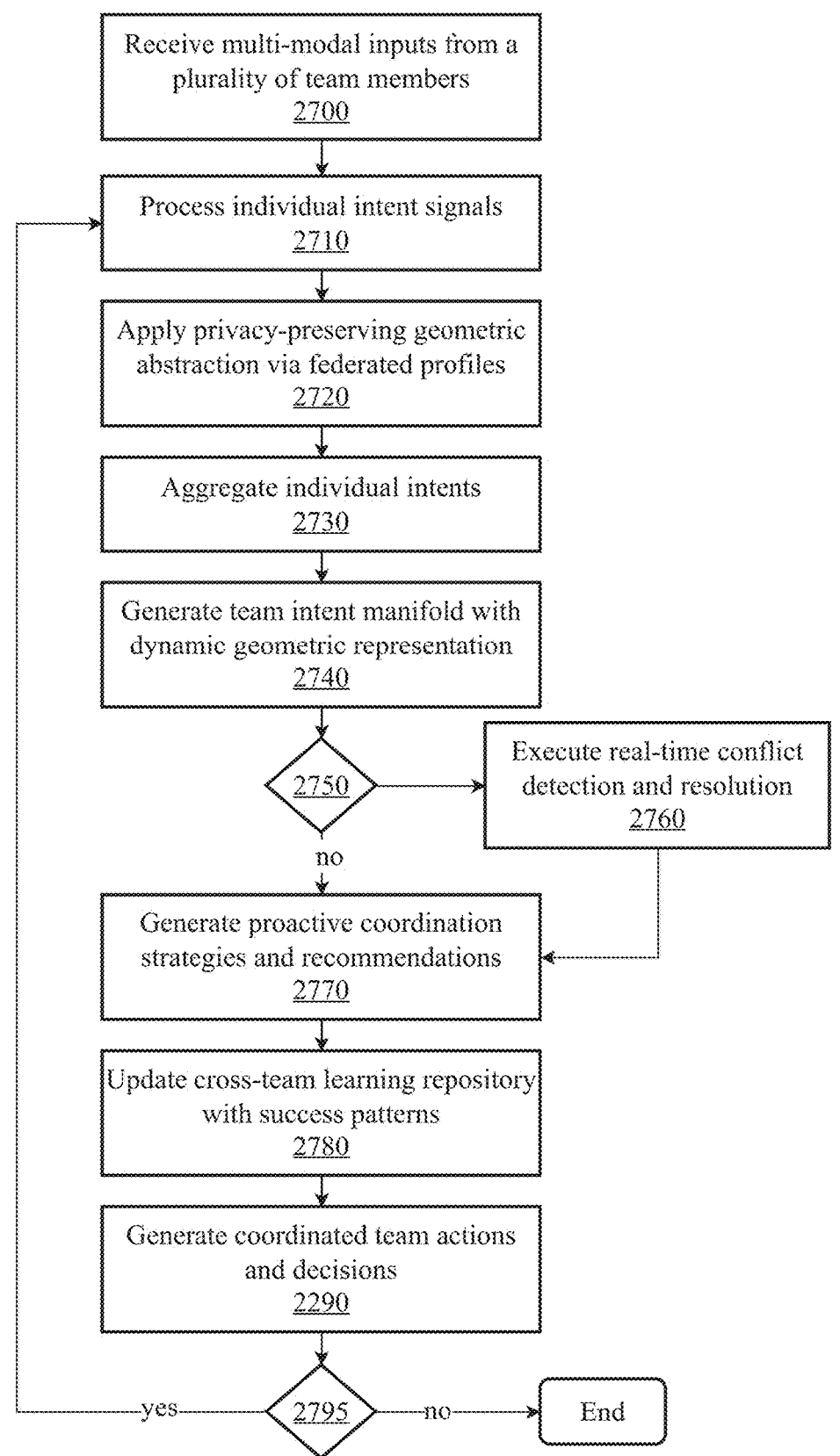
FIG. 27 is a flow diagram illustrating an exemplary method for real-time team intent modeling using PCM with federated human profiles, according to an embodiment.

FIG. 27 is a flow diagram illustrating an exemplary method for real-time team intent modeling using PCM with federated human profiles, according to an embodiment. The method provides a complete process flow from individual team member input collection through geometric intent analysis to coordinated team action generation while maintaining privacy boundaries and enabling continuous adaptive coordination through iterative processing and learning mechanisms.

According to the embodiment, the process begins at step 2700 with receiving multi-modal inputs from team members 2200*a-n*, implementing input collection protocols that gather diverse behavioral signals including communication data containing textual messages, voice recordings, and interaction patterns, behavioral indicators encompassing task selection patterns, collaboration frequency metrics, and engagement measurements, task activity information including completion rates, priority selections, and time allocation patterns, temporal behavioral data reflecting individual work rhythms and productivity cycles, contextual information including environmental factors and resource constraints, and historical preference data accumulated from previous interactions and team collaborations. Input validation ensures data integrity through verification protocols that check signal consistency, temporal coherence, and semantic validity across multiple data sources, with preprocessing algorithms that normalize diverse input formats, synchronize temporal alignment, and apply initial quality filtering to prepare data streams for subsequent analysis operations.

The method proceeds to step 2710 with processing individual intent signals through intent analyzers 2210*a-n*, implementing multi-modal signal analysis that extracts semantic meaning from communication data through natural language processing techniques including sentiment analysis, intent extraction, and discourse pattern recognition, analyzes behavioral patterns through temporal sequence analysis, engagement level assessment, and collaboration style characterization, integrates contextual information through situational analysis algorithms that consider environmental factors, resource constraints, and deadline pressures, and generates geometric intent vector representations through mathematical encoding techniques that transform behavioral indicators into high-dimensional coordinate systems suitable for geometric analysis and manifold operations. Individual processing maintains privacy boundaries through access control mechanisms that restrict data availability based on user permissions and organizational policies, while generating intent vectors with sufficient mathematical precision to support downstream geometric operations and coordination analysis.

At step 2720, the method applies privacy-preserving geometric abstraction via federated profiles system 2220, implementing privacy classification algorithms that analyze individual intent data to determine appropriate sharing levels and access control requirements based on sensitivity analysis, personal identification risk assessment, and organizational privacy policies. Geometric abstraction processes transform individual intent vectors through dimensional reduction techniques including principal component analysis, manifold learning, and feature selection methods that preserve coordination-relevant patterns while removing personally identifying characteristics, differential privacy mechanisms that inject calibrated noise to prevent individual identification while maintaining statistical utility for team coordination, and multi-tier abstraction that creates graduated privacy levels suitable for personal storage, team sharing, and organizational learning. Privacy transformation ensures individual behavioral details remain protected while enabling collective intelligence through mathematical abstraction techniques that maintain semantic relationships necessary for effective coordination analysis and optimization.

The method continues to step 2730 with aggregating individual intents through team intent orchestrator 2230, implementing intent fusion algorithms that combine geometrically abstracted individual vectors into collective team representations through weighted aggregation techniques that account for member expertise, role responsibilities, and contextual relevance. Conflict analysis identifies potential coordination issues through geometric divergence detection that computes angular separations between individual intent vectors, priority incompatibility assessment that identifies competing resource requirements, and trajectory prediction that forecasts potential coordination challenges based on current intent evolution patterns. Resource allocation optimization generates task distribution recommendations through capability matching algorithms that align individual skills with team requirements, load balancing techniques that optimize work distribution across team members, and dynamic reallocation mechanisms that adapt assignments based on changing intent patterns and external constraints, with coordination decisions informed by both individual preferences and collective optimization objectives.

At step 2740, the method generates team intent manifold 2250 with dynamic geometric representation, implementing manifold construction algorithms that create curved geometric spaces encoding team coordination patterns through time-evolving metric tensors that reflect semantic relationships between different intent categories, curvature computation that identifies regions of high intent density where team attention concentrates, and geodesic path optimization that finds efficient trajectories through the intent space for achieving coordination objectives. Dynamic adaptation mechanisms update manifold properties based on team usage patterns and coordination effectiveness through geometric flow algorithms that modify local curvature, metric tensor evolution that strengthens connections between frequently co-occurring intent patterns, and attractor basin management that maintains stable coordination strategies as persistent geometric structures while allowing adaptive modification based on changing circumstances and team development.

The method includes decision step 2750 for intent conflict detection, implementing geometric analysis algorithms that evaluate team coordination coherence through trajectory divergence measurement, curvature analysis that identifies regions of intent instability, and temporal pattern assessment that detects coordination deterioration trends. Conflict detection utilizes similarity metrics including geodesic distance calculations between individual intent vectors, angular separation analysis that identifies significant divergences from team objectives, and stability assessment that evaluates whether current coordination patterns support effective team performance, with configurable threshold parameters that balance sensitivity to coordination issues against tolerance for natural team diversity and individual specialization patterns.

When conflicts are detected, the method proceeds to step 2760 with executing real-time conflict detection and resolution through coordination engine 2260, implementing intervention strategies that address identified coordination challenges through task redistribution algorithms that reallocate responsibilities to minimize intent conflicts, communication facilitation that recommends specific discussion topics or meeting scheduling to address coordination issues, and mediation protocols that provide structured approaches for resolving competing objectives or resource requirements. Resolution effectiveness monitoring evaluates intervention success through coordination improvement metrics, team satisfaction assessment, and objective achievement tracking that provides feedback for future conflict detection and resolution strategy optimization, with adaptive learning mechanisms that improve intervention effectiveness based on historical success patterns and team-specific coordination preferences.

The method continues to step 2770 with generating proactive coordination strategies and recommendations through proactive alignment system 2270, implementing predictive analysis that forecasts future coordination requirements based on current intent trajectory evolution, resource availability projections, and historical team performance patterns. Strategy generation creates comprehensive coordination plans through multi-objective optimization that balances individual preferences against team objectives, timeline optimization that schedules coordination activities to minimize completion time while respecting resource constraints, and contingency planning that develops alternative approaches for potential coordination challenges, with recommendation systems that provide specific actionable guidance for maintaining team alignment and optimizing collective performance based on geometric analysis of intent patterns and successful coordination strategies.

At step 2780, the method updates cross-team learning repository with success patterns through cross-team learning interface 2280, implementing pattern abstraction algorithms that extract generalizable coordination strategies from successful team interactions through geometric generalization techniques that identify invariant patterns while removing team-specific details, statistical analysis that quantifies coordination effectiveness across different team configurations and contexts, and success factor identification that isolates critical elements contributing to effective team coordination. Knowledge sharing mechanisms enable organizational learning through privacy-preserving aggregation that combines insights from multiple teams without exposing sensitive team-specific information, pattern matching algorithms that identify relevant coordination strategies for new team contexts, and adaptive recommendation systems that customize successful strategies for different team compositions and objectives based on similarity analysis and contextual adaptation.

The method proceeds to step 2790 with generating coordinated team actions and decisions 2290, implementing output synthesis that combines coordination analysis results, conflict resolution outcomes, and proactive recommendations into comprehensive action plans through decision integration algorithms that balance competing priorities and constraints, action prioritization that sequences coordination activities based on urgency and impact assessment, and resource allocation that assigns specific responsibilities and resources to support coordinated team activities. Output formatting creates actionable guidance through task specification that defines clear objectives and success criteria, timeline establishment that provides realistic scheduling for coordination activities, and communication protocols that ensure all team members receive appropriate information and guidance for effective coordination implementation, with quality assurance mechanisms that validate output completeness and consistency before delivery to team members and external systems.

The method includes decision step 2795 for continuing real-time monitoring, implementing system state assessment that evaluates whether ongoing coordination monitoring remains beneficial based on team activity levels, coordination stability, and resource availability constraints. Continuation criteria consider factors including team session duration, coordination effectiveness trends, system resource utilization, and user engagement patterns to determine whether to maintain active monitoring or transition to reduced surveillance modes, with adaptive scheduling that optimizes monitoring intensity based on team coordination requirements and system performance considerations.

When real-time monitoring continues, the method returns to step 2710 for processing updated individual intent signals, creating a continuous feedback loop that enables persistent coordination optimization through iterative refinement of intent analysis, conflict detection, and coordination strategy generation. The iterative process incorporates learning from previous coordination cycles through parameter adaptation that improves analysis accuracy based on coordination success feedback, threshold adjustment that optimizes conflict detection sensitivity based on team tolerance and effectiveness outcomes, and strategy refinement that enhances recommendation quality through accumulated experience and pattern recognition, enabling the system to develop increasingly sophisticated understanding of team coordination dynamics and improve coordination effectiveness through continued operation and learning.

When real-time monitoring concludes, the method terminates while preserving accumulated learning and coordination patterns for future team interactions, implementing state preservation that maintains team coordination models, preference patterns, and successful strategy records for subsequent sessions, with cleanup procedures that manage system resources and ensure appropriate data retention according to privacy policies and organizational requirements.

Figure 28:
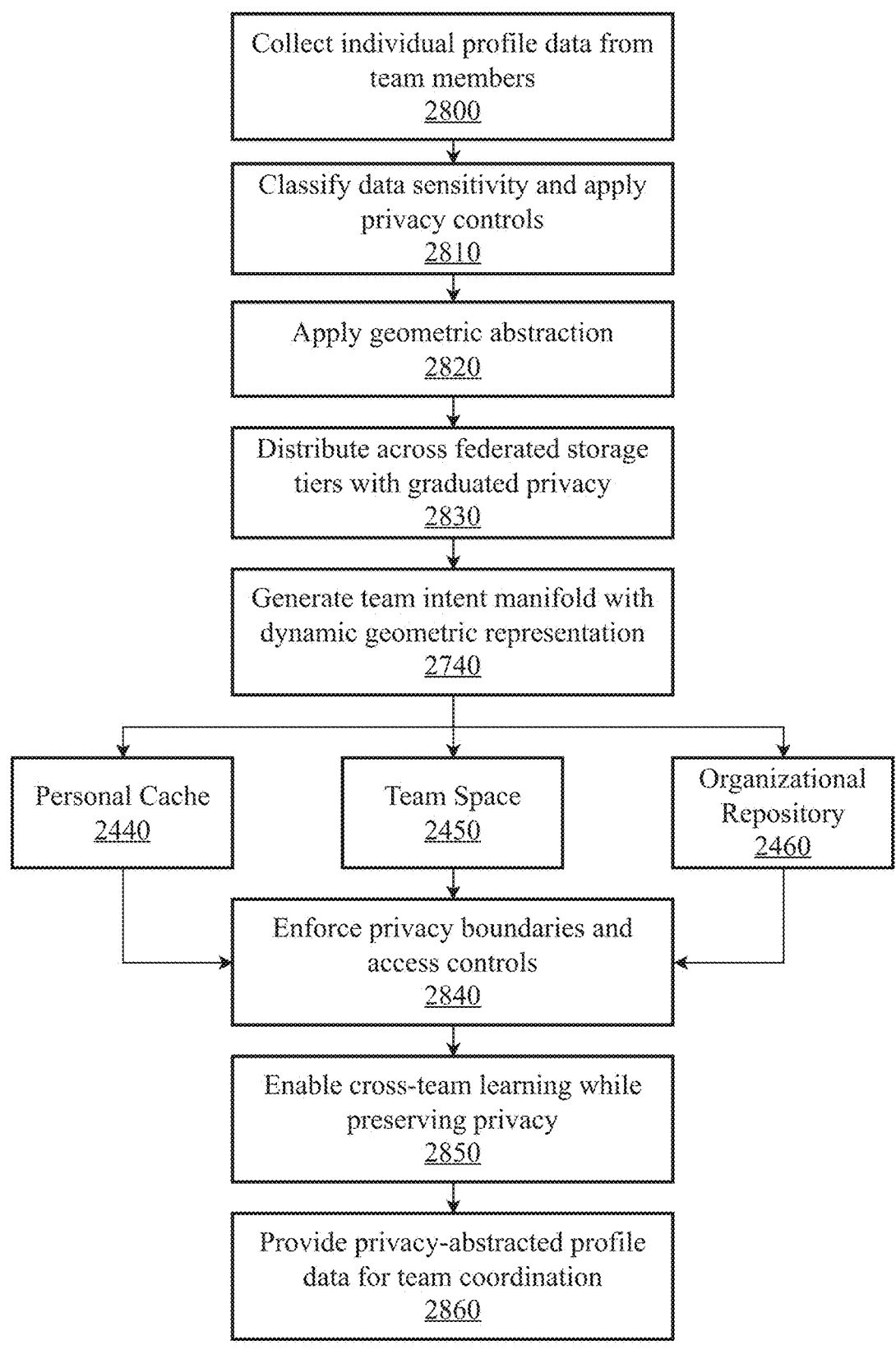
FIG. 28 is a flow diagram illustrating an exemplary method for federated profile privacy abstraction, according to an embodiment.

FIG. 28 is a flow diagram illustrating an exemplary method for federated profile privacy abstraction, according to an embodiment. This method demonstrates a process of transforming individual team member behavioral data into privacy-preserved geometric representations suitable for team coordination while maintaining graduated privacy protection across multi-tier federated storage architecture that enables collective intelligence without compromising individual privacy or exposing sensitive personal information.

According to the embodiment, the process begins at step 2800 with collecting individual profile data from team members, implementing comprehensive data gathering protocols that acquire diverse behavioral indicators including communication patterns containing textual messages, interaction frequencies, and collaboration styles, task activity information encompassing completion rates, priority selections, and work allocation preferences, temporal behavioral data reflecting individual productivity cycles, engagement patterns, and availability preferences, contextual information including environmental factors, resource constraints, and situational influences that affect individual decision-making processes, and historical interaction data accumulated from previous team collaborations and individual performance patterns. Data collection maintains temporal consistency through synchronized acquisition protocols that align information from multiple sources, implements validation procedures that verify data integrity and completeness, and applies initial quality filtering that identifies and handles missing or corrupted information while preserving essential behavioral patterns necessary for subsequent geometric analysis and privacy processing operations.

The method proceeds to step 2810 with classifying data sensitivity and applying privacy controls through privacy classification engine 2410, implementing automated sensitivity analysis algorithms that evaluate individual profile information to determine appropriate privacy protection levels based on personal identification risk assessment, organizational policy compliance requirements, and regulatory framework adherence. Classification analysis employs pattern recognition techniques that identify personally identifiable information, statistical uniqueness assessment that quantifies individual distinguishability within team contexts, and contextual evaluation that considers data sensitivity based on organizational hierarchy, role responsibilities, and project confidentiality requirements. Privacy control application generates appropriate access permissions through role-based authorization that restricts data availability based on organizational structure and team membership, purpose-based limitations that control information usage according to specific coordination objectives, and temporal restrictions that manage historical data retention and availability to protect individual privacy evolution over time.

At step 2820, the method applies geometric abstraction processing through comprehensive privacy transformation algorithms that preserve coordination-relevant information while removing personally identifying characteristics. Geometric abstraction implements dimensional reduction techniques including principal component analysis that preserves statistical variance while reducing vector dimensionality, manifold learning approaches such as locally linear embedding or t-distributed stochastic neighbor embedding that maintain semantic neighborhood relationships while compressing representation complexity, and feature selection algorithms that identify coordination-relevant dimensions while discarding personally identifying components. Privacy transformation applies differential privacy mechanisms through calibrated noise injection using Laplacian or Gaussian distributions with privacy parameters adjusted based on sensitivity classification results, k-anonymity techniques that ensure individual profiles remain indistinguishable within appropriately sized groups, and geometric perturbation methods including coordinate system rotation and scaling operations that preserve semantic relationships while preventing individual identification through mathematical analysis or pattern matching techniques.

The method continues to step 2830 with distributing processed profile information across federated storage tiers with graduated privacy protection, implementing multi-tier storage architecture that balances individual privacy protection against collective coordination utility. Personal cache 2440 maintains complete individual profile information with maximum privacy protection through encrypted storage using advanced cryptographic techniques, strict access controls that limit information availability to the individual user and essential system components, and comprehensive audit logging that tracks all access attempts and usage patterns for security monitoring and compliance verification. Team space 2450 contains geometrically abstracted profile patterns suitable for team-level coordination while protecting individual identity through mathematical transformation that removes personally identifying characteristics, semantic preservation that maintains coordination-relevant behavioral patterns, and access controls that restrict information availability to authorized team members and coordination systems. Organizational repository 2460 stores highly abstracted anonymous insights that enable organizational learning and cross-team pattern recognition through statistical aggregation that combines insights from multiple teams without exposing team-specific information, pattern generalization that identifies successful coordination strategies applicable across different organizational contexts, and anonymization techniques that ensure individual and team privacy protection through k-anonymity levels and differential privacy parameters that prevent identification even through sophisticated analysis techniques.

At step 2840, the method enforces privacy boundaries and access controls through privacy enforcement controller 2470, implementing comprehensive access validation that evaluates all data requests against established privacy policies and organizational security requirements. Access control enforcement utilizes attribute-based access control systems that evaluate requests based on user credentials, data sensitivity classifications, intended usage purposes, and contextual factors including time of access, system state, and organizational policies. Privacy boundary maintenance implements dynamic policy enforcement that adapts access permissions based on current security posture and threat assessment, audit trail generation that maintains detailed logs of all data access including requester identity, timestamp information, data categories accessed, and purpose justification, and violation detection algorithms that identify potential privacy breaches or unauthorized access attempts through anomaly detection, pattern analysis, and statistical monitoring of access patterns and system behavior.

The method proceeds to step 2850 with enabling cross-team learning while preserving privacy through federated learning coordinator 2430, implementing distributed learning algorithms that extract generalizable coordination patterns without accessing raw individual or team-specific data. Cross-team learning utilizes secure multi-party computation protocols that enable collaborative pattern recognition across organizational boundaries without data sharing, gradient aggregation techniques that combine learning updates from multiple teams while preserving local data privacy, and consensus algorithms that identify common coordination strategies and best practices through statistical analysis of abstracted behavioral patterns. Privacy preservation during learning employs homomorphic encryption techniques that enable computations on encrypted data, differential privacy mechanisms that add calibrated noise to learning updates, and federated averaging algorithms that combine insights from multiple sources while preventing individual team identification or sensitive information extraction through sophisticated analysis or reverse engineering techniques.

At step 2860, the method provides privacy-abstracted profile data for team coordination, implementing output generation protocols that deliver coordination-relevant information to downstream systems while maintaining appropriate privacy protection levels. Output formatting creates geometric representations suitable for team intent orchestrator 2230, manifold-compatible data structures for team intent manifold 2250, and aggregated patterns for proactive alignment system 2270 while ensuring all delivered information maintains privacy abstraction appropriate to recipient authorization levels and intended usage contexts. Quality assurance validates output completeness and accuracy through consistency checking that verifies abstracted information maintains semantic coherence with original behavioral patterns, utility verification that confirms abstracted data supports effective coordination analysis and decision-making, and privacy validation that ensures output meets established privacy protection requirements and organizational compliance standards.

The method concludes with successful privacy preservation that enables effective team coordination through geometric abstraction techniques while maintaining individual privacy protection, organizational compliance with privacy regulations, and collective intelligence capabilities that improve team performance without compromising personal information security. Output delivery provides coordination systems with mathematically consistent behavioral representations that support geometric analysis, similarity computation, and predictive modeling while ensuring individual team members maintain privacy control over personal information and organizational data governance requirements are satisfied through comprehensive audit trails, access controls, and privacy protection mechanisms.

In an exemplary implementation scenario, individual team member profile data containing detailed communication preferences, task completion patterns, and collaboration styles undergoes privacy classification that identifies medium-sensitivity information suitable for team-level sharing with geometric abstraction. The geometric abstraction engine applies principal component analysis to reduce a detailed behavioral vector from high dimensionality to a compact representation while preserving coordination-relevant patterns, injects differential privacy noise with carefully calibrated parameters to prevent individual identification, and distributes the resulting abstracted profile across storage tiers with personal cache maintaining encrypted original data, team space receiving geometrically abstracted coordination patterns, and organizational repository obtaining anonymous statistical insights that contribute to collective learning while maintaining complete individual privacy protection through mathematical transformation and access control enforcement.

Figure 29:
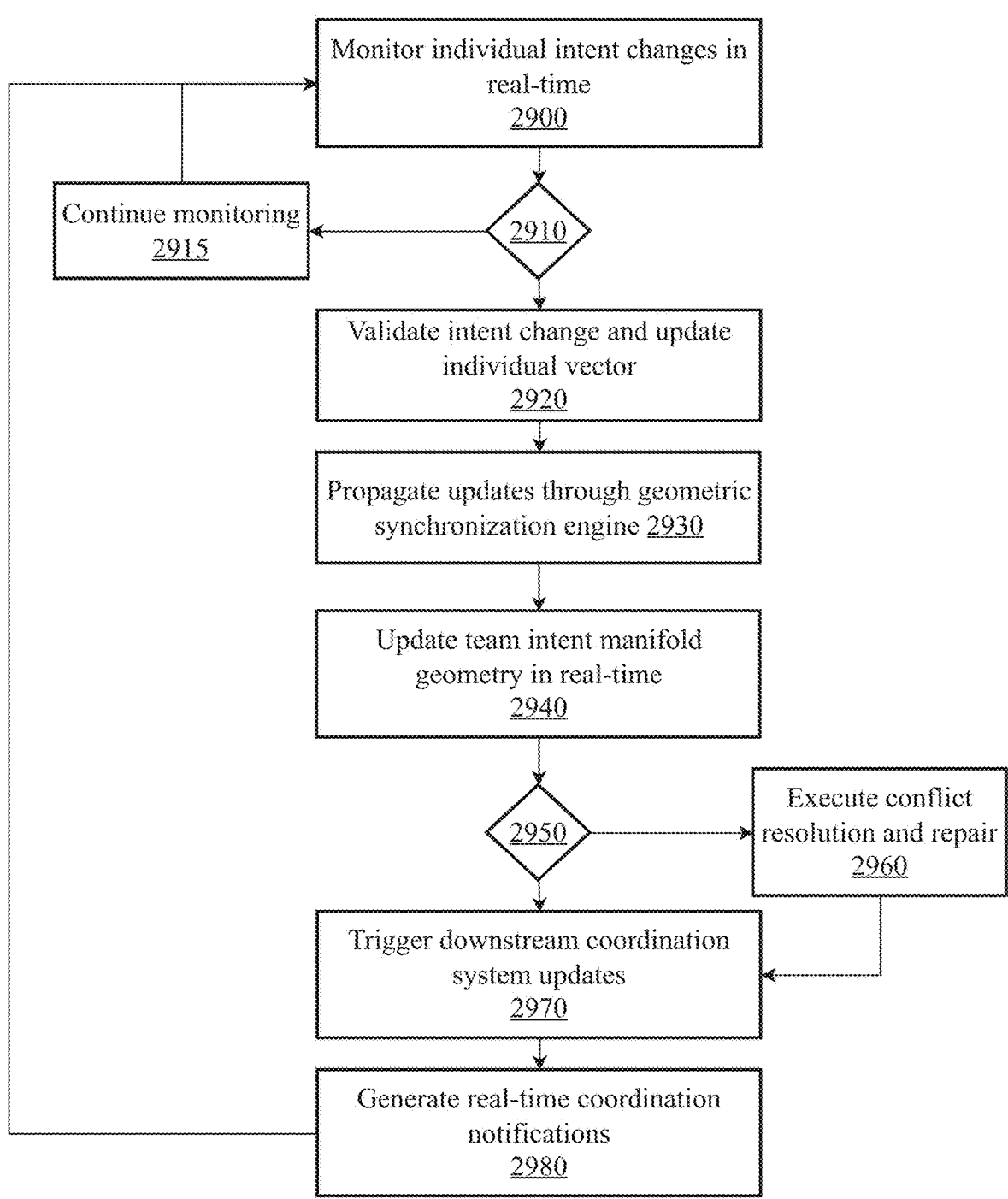
FIG. 29 is a flow diagram illustrating an exemplary method for real-time intent synchronization, according to an embodiment.

FIG. 29 is a flow diagram illustrating an exemplary method for real-time intent synchronization, according to an embodiment. The method demonstrates the continuous monitoring and update propagation mechanisms that maintain coherent team coordination through immediate detection of individual intent changes, geometric consistency preservation, and cascading system updates that ensure all coordination components reflect current team intent states within real-time performance constraints suitable for interactive team environments.

According to the embodiment, the process begins at step 2900 with monitoring individual intent changes in real-time, implementing continuous surveillance algorithms that track behavioral indicators across multiple team members through event-driven monitoring systems that detect changes in communication patterns, task activity modifications, and interaction frequency variations. Real-time monitoring utilizes change detection algorithms including statistical process control that identifies significant deviations from established behavioral baselines, temporal pattern analysis that recognizes shifts in individual productivity cycles and engagement levels, and threshold-based alerting that triggers processing when intent modifications exceed configurable significance levels. Monitoring infrastructure maintains low-latency data collection through streaming protocols that minimize processing delays, distributed sensors that capture behavioral signals from multiple input sources simultaneously, and efficient data structures that enable rapid comparison between current and historical intent patterns while managing computational overhead and memory utilization constraints.

The method proceeds to decision step 2910 with evaluating whether significant intent changes have been detected, implementing change significance assessment through magnitude analysis that quantifies the degree of intent vector modification using geometric distance calculations, temporal analysis that evaluates change persistence and stability over configurable time windows, and contextual evaluation that considers whether detected changes represent meaningful behavioral shifts versus temporary fluctuations or measurement noise. Significance determination utilizes adaptive thresholds that adjust sensitivity based on individual behavioral patterns and team coordination requirements, confidence scoring that assesses change reliability through statistical validation techniques, and priority classification that identifies changes requiring immediate processing versus those suitable for batch processing during lower system utilization periods.

When no significant changes are detected, the method continues at step 2915 with ongoing monitoring, implementing efficient surveillance that maintains system responsiveness while minimizing computational resource consumption through optimized polling frequencies that balance detection latency against processing overhead, intelligent sampling strategies that increase monitoring intensity during periods of high team activity, and resource management algorithms that allocate monitoring capacity based on team member activity levels and coordination criticality. Continuous monitoring loop returns to step 2900 through feedback pathways that maintain persistent surveillance while enabling system optimization and adaptive performance tuning based on team behavioral patterns and coordination effectiveness metrics.

When significant intent changes are detected, the method proceeds to step 2920 with validating intent changes and updating individual vectors, implementing validation protocols that verify change authenticity through consistency checking across multiple data sources, temporal coherence analysis that ensures detected changes align with individual behavioral patterns and team context, and anomaly detection that identifies potential measurement errors or system malfunctions that could generate false positive change indicators. Individual vector updates apply mathematical transformations that incorporate new behavioral information while maintaining geometric consistency with existing manifold structure through incremental update algorithms that preserve essential semantic relationships, coordinate system stability maintenance that prevents mathematical discontinuities, and version control mechanisms that enable change tracking and potential rollback capabilities for system recovery and audit purposes.

The method continues to step 2930 with propagating updates through geometric synchronization engine 2520, implementing coordinated update distribution that ensures all system components receive consistent information about intent modifications through message passing protocols that maintain causal ordering of updates, distributed synchronization algorithms that coordinate concurrent modifications from multiple team members, and consistency preservation mechanisms that prevent race conditions and ensure atomic updates across the distributed system architecture. Update propagation utilizes efficient communication protocols that minimize network overhead and latency, priority-based routing that ensures critical coordination updates receive expedited processing, and reliable delivery mechanisms that guarantee update reception through acknowledgment protocols, timeout management, and retry logic that handles network failures and temporary system unavailability.

At step 2940, the method updates team intent manifold geometry in real-time through manifold 2250, implementing geometric modification algorithms that integrate individual intent changes into collective team representations while preserving mathematical consistency and semantic coherence. Manifold updates utilize incremental geometric operations including local curvature adjustments that reflect changing intent density patterns, metric tensor modifications that update semantic distance relationships between different intent categories, and geodesic path recalculation that maintains optimal trajectory efficiency for team coordination objectives. Real-time geometric processing employs computational optimization techniques including lazy evaluation that defers expensive calculations until required, incremental computation that minimizes processing overhead through efficient update propagation, and parallel processing algorithms that distribute geometric calculations across available computational resources while maintaining mathematical accuracy and consistency requirements.

The method includes decision step 2950 for geometric consistency validation, implementing comprehensive consistency checking that evaluates whether manifold modifications maintain mathematical integrity and semantic coherence through geometric property verification including metric positive definiteness, curvature bound validation, and topological stability assessment. Consistency evaluation utilizes automated testing algorithms that detect mathematical anomalies, semantic coherence analysis that ensures intent relationships remain logically consistent, and performance impact assessment that verifies system responsiveness remains within acceptable bounds following geometric updates. Consistency validation employs tolerance-based evaluation that accommodates numerical precision limitations while detecting significant mathematical errors, and diagnostic algorithms that identify specific consistency violations and generate detailed error reports for system debugging and repair.

When geometric consistency issues are detected, the method proceeds to step 2960 with executing conflict resolution and repair, implementing automated recovery algorithms that restore mathematical consistency through geometric correction procedures, rollback mechanisms that revert problematic updates while preserving valid modifications, and alternative update strategies that achieve intent synchronization through different mathematical approaches. Conflict resolution utilizes constraint satisfaction techniques that find geometric configurations satisfying both individual intent requirements and mathematical consistency constraints, optimization algorithms that minimize disruption to existing coordination patterns while resolving conflicts, and repair verification that ensures resolution effectiveness through comprehensive consistency checking and performance validation.

When geometric consistency is maintained, the method continues to step 2970 with triggering downstream coordination system updates, implementing cascade notification protocols that inform all affected coordination components about intent changes and manifold modifications. Downstream updates may notify team intent orchestrator 2230 about changes requiring coordination analysis, real-time coordination engine 2260 about potential conflict situations, proactive alignment system 2270 about opportunities for coordination optimization, cross-team learning interface 2280 about successful coordination patterns, and external systems 2295 about coordination changes affecting project management and communication platforms. Update triggering utilizes event-driven architectures that minimize processing latency, selective notification systems that deliver relevant information to appropriate system components, and format conversion mechanisms that adapt update information to downstream system interface requirements.

At step 2980, the method generates real-time coordination notifications, implementing user notification systems that inform team members about relevant coordination changes through adaptive communication channels including in-system alerts for immediate attention requirements, email notifications for non-urgent coordination updates, and mobile notifications for time-critical coordination issues requiring prompt response. Notification generation utilizes intelligent filtering that prevents information overload through relevance assessment, personalization algorithms that adapt notification content and frequency to individual preferences and role responsibilities, and escalation procedures that ensure critical coordination information receives appropriate attention through progressive notification intensification and alternative communication channels when initial notifications are not acknowledged.

The method returns to step 2900 through continuous loop implementation that maintains persistent real-time monitoring while incorporating lessons learned from processed intent changes, enabling adaptive system behavior that improves change detection accuracy and processing efficiency through machine learning algorithms, statistical model updates, and threshold optimization based on coordination effectiveness feedback and system performance metrics. Continuous operation ensures the system maintains real-time responsiveness to team intent evolution while optimizing resource utilization and coordination effectiveness through accumulated experience and adaptive parameter tuning.

In an exemplary team coordination situation, an individual team member's intent change indicating shift from backend development focus to frontend collaboration activities triggers immediate detection through communication pattern analysis and task selection monitoring. The change undergoes validation confirming authenticity and significance, propagates through geometric synchronization engine 2520 updating team intent manifold 2250 with modified curvature reflecting new collaboration patterns, triggers coordination engine 2260 to identify potential resource reallocation opportunities, and generates notifications to relevant team members about collaboration availability and project coordination adjustments, completing the entire synchronization cycle within sub-second timeframes while maintaining geometric consistency and enabling immediate team coordination response to changing individual intents and collective team requirements.

Figure 30:
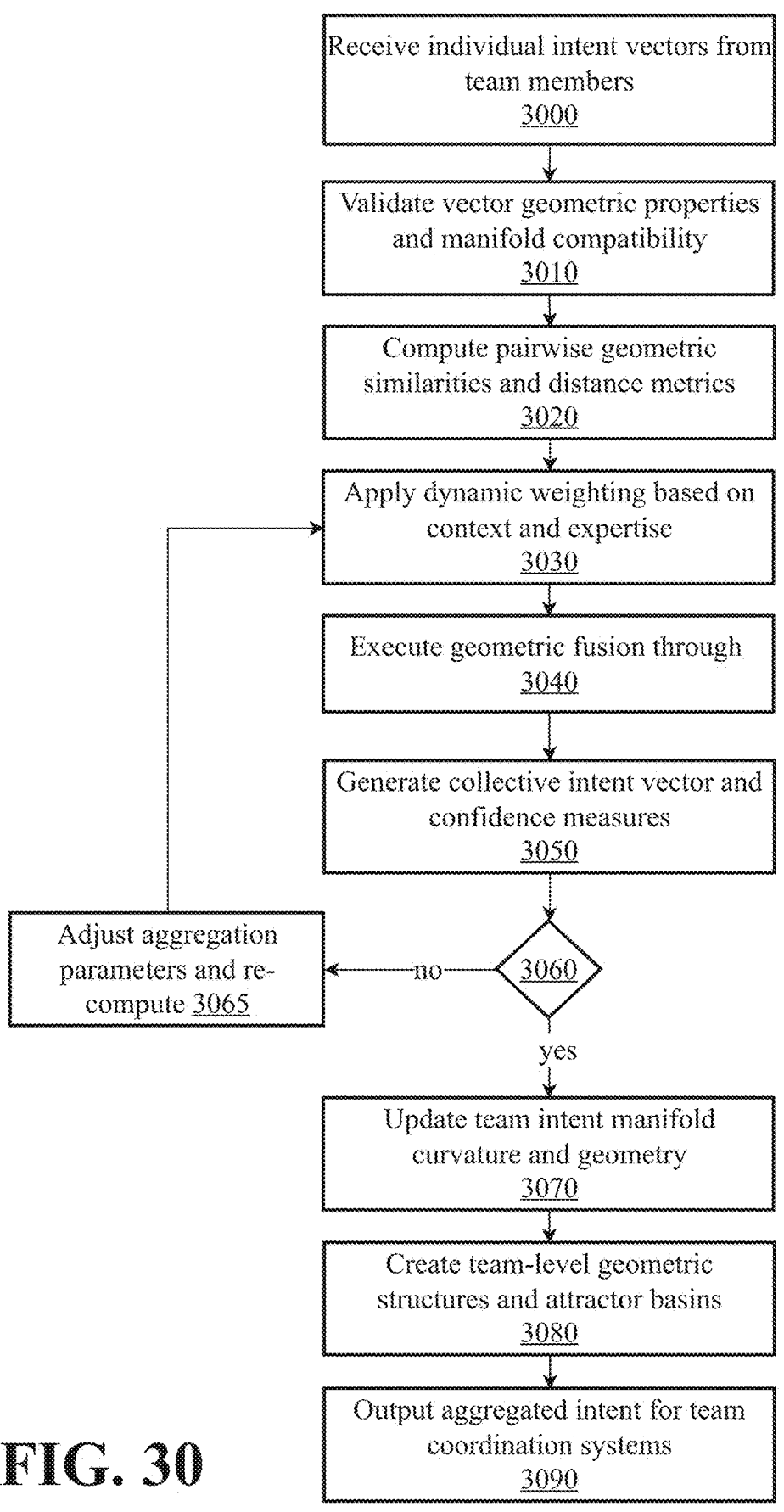
FIG. 30 is a flow diagram illustrating an exemplary method for geometric intent aggregation, according to an embodiment.

FIG. 30 is a flow diagram illustrating an exemplary method for geometric intent aggregation, according to an embodiment. This method demonstrates the mathematical processes that transform individual team member intent vectors into coherent collective representations through manifold-aware geometric operations, dynamic weighting strategies, and quality-controlled fusion algorithms that preserve semantic relationships while generating team-level coordination insights suitable for downstream coordination systems and geometric manifold integration.

According to the embodiment, the process begins at step 3000 with receiving individual intent vectors from team members, implementing input collection protocols that gather high-dimensional geometric representations of individual behavioral patterns, objectives, and preferences encoded as mathematical vectors within the team intent manifold coordinate system. Individual intent vectors arrive through standardized interfaces that maintain temporal synchronization, format consistency, and semantic alignment across diverse team member input sources, with input validation ensuring vector completeness, dimensional compatibility, and mathematical validity for subsequent geometric processing operations. Input processing implements buffering mechanisms that accommodate varying arrival times and update frequencies from different team members, coordinate system verification that ensures all vectors exist within compatible geometric spaces, and metadata extraction that captures contextual information including vector confidence levels, temporal validity periods, and source attribution necessary for appropriate weighting and aggregation strategies.

The method proceeds to step 3010 with validating vector geometric properties and manifold compatibility, implementing comprehensive mathematical verification that ensures individual intent vectors maintain appropriate geometric characteristics for collective aggregation and manifold integration. Geometric property validation may comprise dimensionality verification that confirms vectors exist within expected coordinate spaces, magnitude analysis that ensures vector norms fall within reasonable bounds preventing mathematical instabilities, and orthogonality assessment that evaluates vector independence and potential redundancy among team member inputs. Manifold compatibility checking verifies that individual vectors can be meaningfully combined within the current team intent manifold structure through coordinate system consistency validation, curvature compatibility assessment that ensures individual intents align with existing manifold geometry, and semantic coherence evaluation that confirms individual vectors represent conceptually compatible intent categories suitable for geometric fusion operations.

At step 3020, the method computes pairwise geometric similarities and distance metrics through mathematical analysis of relationships between individual intent vectors using manifold-aware distance calculations. Geodesic distance computation determines shortest paths between intent vectors along the curved manifold surface using variational calculus techniques that solve optimization problems for minimal path length while respecting geometric constraints, with calculations accounting for local curvature properties and metric tensor variations that influence semantic distance relationships between different intent categories. Angular separation analysis measures directional differences between intent vectors through dot product calculations and inverse trigonometric functions that quantify alignment or divergence in individual objectives and preferences, providing geometric measures of team consensus or conflict potential. Curvature interaction assessment evaluates how individual intent vectors influence local manifold geometry and affect collective team coordination patterns through differential geometric calculations that measure geometric deformation and semantic density variations resulting from individual contributions to team intent representation.

The method continues to step 3030 with applying dynamic weighting based on context and expertise, implementing adaptive weighting algorithms that adjust individual vector influence on collective aggregation based on multiple factors including, but not limited to, team member expertise levels, current contextual relevance, and historical coordination effectiveness. Expertise-based weighting utilizes competency assessments that evaluate individual team member qualifications and experience relevant to current coordination objectives, role-based authority metrics that consider organizational hierarchy and responsibility distribution, and performance history analysis that weights contributions based on previous coordination success and reliability patterns. In some aspects, contextual weighting algorithms assess current situational relevance through task alignment analysis that matches individual expertise with immediate team requirements, urgency evaluation that prioritizes inputs from members most qualified to address time-critical coordination needs, and resource availability assessment that considers individual capacity and availability for contribution to team coordination activities. Dynamic weight computation implements adaptive algorithms that modify weighting parameters based on changing team composition, evolving project requirements, and real-time coordination effectiveness feedback.

At step 3040, the method executes geometric fusion through collective intent aggregator 2510, implementing various mathematical operations that combine weighted individual vectors into unified team representations while preserving essential semantic relationships and geometric properties. For example, weighted centroid computation calculates collective intent centers through mathematical operations that sum individual vectors multiplied by their respective weights, normalized by total weight to generate representative team intent positions within the manifold coordinate system, with calculations accounting for manifold curvature that may cause centroid positions to differ from simple Euclidean averages. Manifold-aware interpolation utilizes geometric algorithms including geodesic averaging that finds optimal intermediate positions along curved manifold surfaces, spherical linear interpolation adapted for non-Euclidean spaces, and exponential mapping techniques that project aggregation results onto appropriate manifold regions while maintaining mathematical consistency and semantic meaning preservation.

Semantic relationship preservation ensures that mathematical aggregation operations maintain logical consistency and meaningful interpretation of team coordination patterns through constraint satisfaction algorithms that enforce semantic compatibility requirements, relationship validation that verifies aggregated results align with individual input patterns, and coherence checking that ensures collective representations support effective coordination analysis and decision-making processes. Emergent pattern detection identifies collective behaviors and coordination strategies that arise from individual interactions through cluster analysis that recognizes groupings within aggregated intent patterns, correlation analysis that identifies systematic relationships between different intent categories, and novelty detection that recognizes emergent coordination patterns not explicitly present in individual inputs but arising from geometric combination and interaction effects.

The method proceeds to step 3050 with generating collective intent vector and confidence measures, implementing output generation algorithms that create mathematical representations suitable for downstream coordination systems while providing reliability assessments that enable appropriate utilization of aggregated results. Collective intent vector generation produces high-dimensional geometric representations that encode team-level coordination patterns, objective priorities, and behavioral tendencies through mathematical synthesis of individual contributions weighted according to expertise and contextual relevance, with output vectors maintaining dimensional consistency and semantic alignment with manifold coordinate systems used throughout the team coordination architecture. Confidence measure computation generates statistical assessments of aggregation reliability through uncertainty quantification that considers individual vector confidence levels, geometric consistency metrics that evaluate mathematical stability of aggregation results, and convergence analysis that assesses aggregation stability and repeatability under varying input conditions and parameter settings.

The method comprises decision point 3060 for aggregation quality assessment, implementing comprehensive evaluation of mathematical and semantic quality through multiple validation criteria including geometric consistency verification, semantic preservation assessment, and computational stability analysis. Quality evaluation utilizes geometric consistency checking that verifies aggregated results maintain appropriate mathematical properties including positive definiteness, bounded curvature, and topological stability within manifold coordinate systems, semantic preservation assessment that confirms aggregated intent vectors maintain meaningful interpretation and alignment with individual input patterns, convergence stability analysis that evaluates mathematical convergence properties and sensitivity to parameter variations, and computational efficiency measurement that ensures aggregation processes complete within acceptable time and resource constraints for real-time coordination applications.

When aggregation quality is insufficient, the method proceeds to step 3065 with adjusting aggregation parameters and re-computing, implementing adaptive parameter optimization that modifies weighting strategies, geometric algorithms, and convergence criteria to achieve acceptable quality levels. Parameter adjustment utilizes optimization algorithms including gradient descent for continuous parameter spaces, genetic algorithms for discrete parameter combinations, and Bayesian optimization for complex parameter interactions, with adjustment strategies guided by quality metric feedback and convergence analysis results that identify specific areas requiring parameter modification. Re-computation applies modified parameters through iterative processing that returns to step 3030 with updated weighting strategies, enabling systematic quality improvement through parameter optimization and algorithmic refinement based on mathematical and semantic quality assessments.

When aggregation quality meets acceptance criteria, the method continues to step 3070 with updating team intent manifold curvature and geometry through dynamic manifold core 2540, implementing geometric modification algorithms that integrate collective intent patterns into persistent manifold representation. Manifold updates may utilize differential geometric operations including metric tensor modifications that adjust semantic distance relationships based on collective intent patterns, curvature updates that reflect changing team coordination density and focus areas, and geodesic path recalculation that maintains optimal trajectory efficiency for evolving team coordination requirements. Geometric integration ensures mathematical consistency through constraint satisfaction algorithms that preserve manifold properties, stability verification that prevents mathematical singularities or computational instabilities, and semantic alignment that ensures geometric modifications support effective coordination analysis and prediction capabilities.

The method proceeds to step 3080 with creating team-level geometric structures and attractor basins, implementing geometric construction algorithms that establish persistent coordination patterns and stable team behavioral attractors within the manifold representation. Attractor basin creation identifies regions of high team intent density that represent stable coordination patterns through curvature analysis that locates natural coordination focus areas, stability assessment that evaluates long-term persistence of coordination patterns, and accessibility analysis that ensures attractor basins remain reachable through reasonable coordination effort and behavioral modification. Team-level structure generation creates geometric frameworks that support coordination analysis including hierarchical organization that represents different levels of team coordination complexity, network structures that encode collaboration relationships and communication patterns, and temporal evolution frameworks that track team coordination development and adaptation over time.

At step 3090, the method outputs aggregated intent for team coordination systems, implementing delivery protocols that distribute collective intent representations to downstream coordination components while maintaining appropriate format compatibility and semantic fidelity. Output delivery may provide team intent orchestrator 2230 with collective behavioral patterns for coordination analysis, real-time coordination engine 2260 with team intent distributions for conflict detection and resolution, proactive alignment system 2270 with predictive coordination patterns for recommendation generation, manifold geometry systems with updated geometric representations for persistent coordination modeling, and learning systems with successful aggregation patterns for organizational knowledge development. Output formatting implements data transformation that adapts internal geometric representations to downstream system interface requirements, quality assurance that validates output completeness and accuracy, and delivery confirmation that ensures successful transmission and reception of aggregated intent information.

In an exemplary three-member team coordination situation, individual intent vectors representing software architecture focus, user interface development, and quality assurance priorities undergo pairwise distance calculation revealing moderate alignment in project objectives but significant differences in implementation approaches. Dynamic weighting applies higher influence to the architecture specialist for technical decisions while balancing user interface and quality perspectives, with geometric fusion generating a collective intent vector that emphasizes architectural consistency while incorporating user experience and quality requirements. Quality assessment confirms mathematical stability and semantic coherence, triggering manifold curvature updates that strengthen coordination patterns around technical decision-making while maintaining balanced attention to user experience and quality assurance, resulting in team-level geometric structures that guide future coordination toward integrated development approaches that satisfy all team member expertise areas and project requirements.

Figure 31:
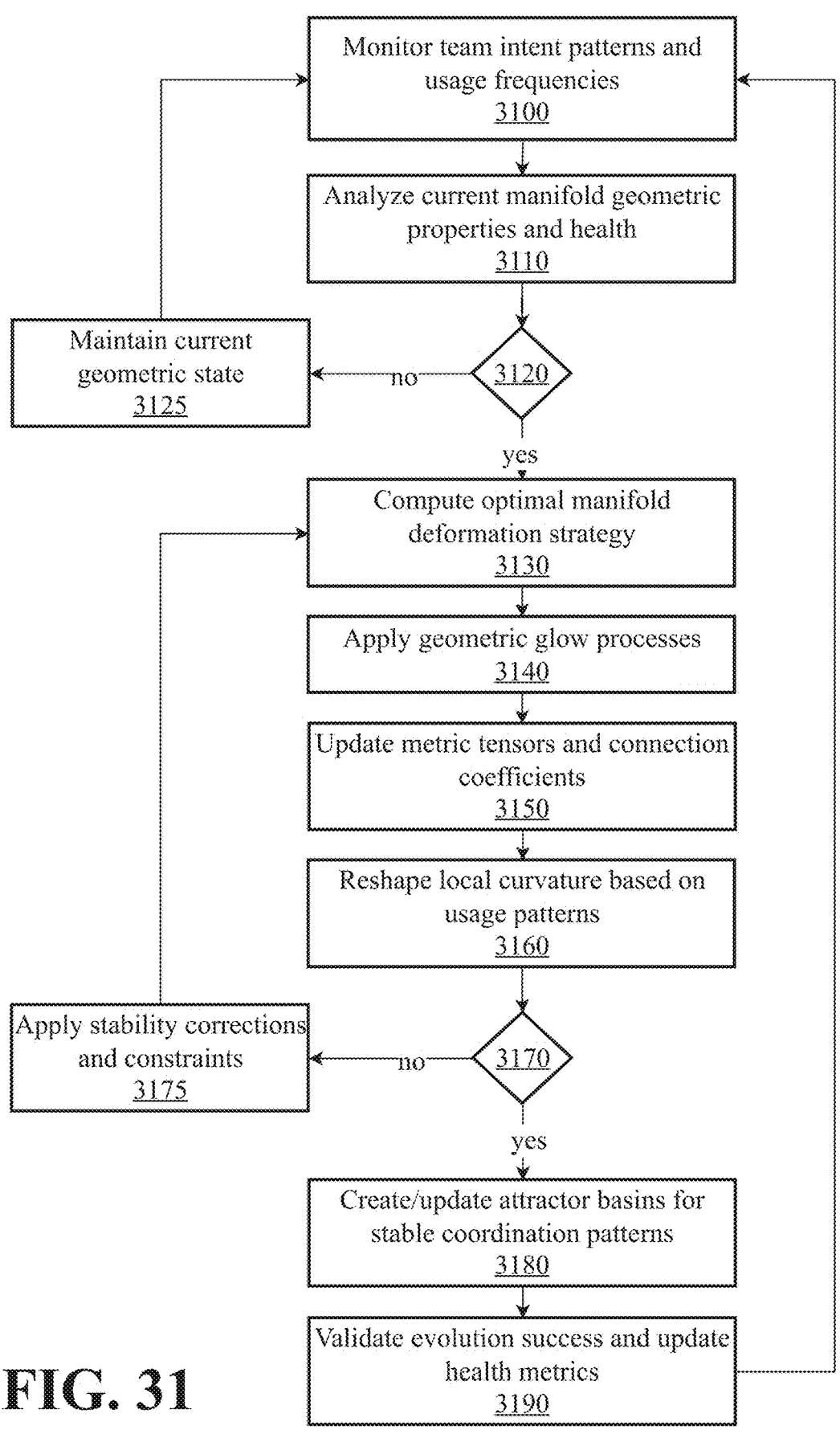
FIG. 31 is a flow diagram illustrating an exemplary method for team manifold evolution, according to an embodiment.

FIG. 31 is a flow diagram illustrating an exemplary method for team manifold evolution, according to an embodiment. This method demonstrates the continuous adaptive processes that reshape the geometric substrate of team coordination through mathematical deformation algorithms, stability-preserving modifications, and usage-driven optimization that enables the manifold representation to improve coordination effectiveness through accumulated team experience while maintaining essential geometric properties and mathematical consistency.

According to the embodiment, the process begins at step 3100 with monitoring team intent patterns and usage frequencies, implementing various surveillance algorithms that track how team members navigate through the geometric intent space, identify frequently traversed coordination pathways, and measure the effectiveness of current manifold structure in supporting team coordination objectives. In some aspects, pattern monitoring utilizes statistical analysis techniques that quantify usage frequency distributions across different manifold regions, correlation analysis that identifies relationships between geometric structure and coordination success rates, and temporal analysis that tracks evolution of team coordination patterns over multiple time scales ranging from minutes to months. Usage frequency measurement implements efficient data collection mechanisms that capture geometric traversal patterns without compromising system performance, aggregate usage statistics across team members while preserving individual privacy, and identify coordination bottlenecks or inefficiencies that may benefit from manifold restructuring through geometric modification and optimization procedures.

The method proceeds to step 3110 with analyzing current manifold geometric properties and health, implementing comprehensive mathematical assessment of manifold structure including geometric consistency verification, computational stability evaluation, and coordination effectiveness measurement. Geometric property analysis examines metric tensor characteristics including, but not limited to, positive definiteness verification that ensures valid distance measurements, smoothness assessment that evaluates continuity of geometric transitions, and curvature distribution analysis that identifies regions of excessive complexity or geometric instability. Manifold health assessment evaluates coordination support effectiveness through performance metrics including average coordination time, conflict resolution efficiency, and team satisfaction measures correlated with geometric structure properties, computational efficiency metrics including processing latencies and memory utilization patterns, and mathematical stability indicators including condition numbers, convergence properties, and numerical accuracy measures that ensure reliable geometric computations and consistent coordination analysis.

At decision step 3120, the method determines whether manifold evolution is required through systematic evaluation of current geometric structure effectiveness and identification of optimization opportunities. Evolution requirement assessment may utilize performance threshold analysis that compares current coordination effectiveness against established benchmarks, geometric efficiency evaluation that identifies suboptimal manifold regions causing coordination difficulties, stability analysis that detects mathematical irregularities requiring correction, and usage pattern analysis that recognizes shifts in team coordination needs requiring geometric adaptation. Decision criteria may consider factors including, but not limited to, coordination performance degradation beyond acceptable thresholds, geometric instabilities affecting mathematical consistency, significant changes in team composition or coordination requirements, and identification of successful coordination patterns that could benefit from geometric reinforcement through curvature modification and attractor basin creation.

When evolution is not required, the method continues at step 3125 with maintaining current geometric state through stability monitoring and performance tracking while preserving existing manifold structure. Geometric state maintenance implements continuous monitoring that ensures mathematical properties remain stable, performance tracking that verifies coordination effectiveness remains acceptable, and periodic reassessment that identifies future evolution requirements based on changing team dynamics or coordination needs. State preservation maintains current metric tensors, curvature distributions, and attractor basin configurations while enabling future evolution when circumstances change or new optimization opportunities emerge.

When evolution is required, the method proceeds to step 3130 with computing optimal manifold deformation strategy through sophisticated mathematical optimization that balances coordination improvement against stability preservation and computational efficiency. Deformation strategy computation utilizes metric tensor optimization algorithms that determine optimal distance relationship modifications based on observed coordination patterns, curvature flow computation that calculates geometric modifications preserving mathematical consistency while improving coordination effectiveness, and constraint satisfaction techniques that ensure deformation strategies satisfy mathematical stability requirements and semantic coherence constraints. Optimization processes employ variational calculus methods that minimize coordination effort while maximizing team performance, differential geometric techniques that compute smooth geometric transitions preserving manifold topology, and multi-objective optimization algorithms that balance competing objectives including coordination effectiveness, computational efficiency, and mathematical stability maintenance.

The method continues to step 3140 with applying geometric flow processes through dynamic manifold core 2540, implementing mathematical deformation algorithms that gradually modify manifold structure according to computed optimization strategies. Geometric flow application can utilize Ricci flow techniques that evolve metric tensors according to curvature-driven differential equations, mean curvature flow algorithms that smooth geometric irregularities while preserving essential coordination structure, and harmonic flow processes that optimize geodesic path efficiency for improved coordination trajectory computation. Flow process implementation employs numerical integration techniques including adaptive time-stepping that maintains stability during geometric transitions, conservation law enforcement that preserves essential geometric invariants, and convergence monitoring that ensures flow processes achieve desired geometric modifications without introducing mathematical instabilities or computational difficulties.

At step 3150, the method updates metric tensors and connection coefficients through precise mathematical modifications that implement computed deformation strategies while preserving geometric consistency and computational accuracy. Metric tensor updates modify distance relationships between intent categories based on observed coordination effectiveness, strengthen geometric connections between frequently co-occurring coordination patterns, and adjust semantic space properties to reflect evolved team coordination preferences and capabilities. Connection coefficient computation updates parallel transport operations that govern how coordination trajectories propagate through the modified geometric space, recalculates geodesic equations that determine optimal coordination pathways, and maintains mathematical consistency through constraint satisfaction algorithms that ensure updated geometric properties satisfy differential geometric requirements and support reliable coordination analysis and prediction.

The method proceeds to step 3160 with reshaping local curvature based on usage patterns, implementing geometric modification algorithms that create regions of high curvature in frequently accessed coordination areas while reducing curvature complexity in underutilized manifold regions. Curvature reshaping utilizes usage-based weighting that increases curvature density in coordination regions demonstrating high effectiveness and frequent access, smoothing algorithms that reduce geometric complexity in manifold areas causing coordination difficulties or inefficiencies, and attractor basin creation techniques that establish stable coordination patterns as persistent geometric structures. Local curvature modification employs differential geometric operations including Gaussian curvature adjustment that modifies local geometric properties, sectional curvature optimization that improves coordination trajectory efficiency, and scalar curvature normalization that maintains overall geometric consistency while enabling local optimization for specific coordination patterns and team behavioral preferences.

At decision step 3170, the method validates mathematical stability through comprehensive geometric analysis that ensures manifold modifications maintain essential mathematical properties and computational reliability. Stability assessment examines metric tensor properties including positive definiteness verification that ensures valid geometric structure, eigenvalue analysis that confirms mathematical well-posedness, and condition number evaluation that assesses numerical stability for reliable geometric computations. Mathematical consistency checking verifies that geometric modifications preserve topological properties, maintain smooth manifold structure, and support consistent coordination analysis through continuity verification, differentiability assessment, and convergence analysis that ensures geometric operations produce mathematically valid and computationally stable results suitable for ongoing coordination analysis and team performance optimization.

When mathematical stability is compromised, the method proceeds to step 3175 with applying stability corrections and constraints through corrective algorithms that restore geometric consistency while preserving beneficial coordination improvements. Stability correction utilizes constraint projection techniques that modify geometric parameters to satisfy mathematical requirements, regularization algorithms that smooth geometric irregularities causing instability, and rollback mechanisms that revert problematic modifications while retaining beneficial geometric changes. Correction processes employ optimization algorithms that find geometric configurations satisfying both stability constraints and coordination effectiveness requirements, numerical stabilization techniques that improve computational accuracy and reliability, and validation procedures that verify correction effectiveness through comprehensive mathematical testing and coordination performance assessment.

When mathematical stability is maintained, the method continues to step 3180 with creating and updating attractor basins for stable coordination patterns, implementing geometric construction algorithms that establish persistent coordination strategies as stable mathematical structures within the manifold representation. Attractor basin creation identifies successful coordination patterns through performance analysis and geometric clustering, establishes geometric regions with appropriate curvature properties that naturally guide coordination behavior toward effective strategies, and maintains basin stability through mathematical properties that resist perturbation while allowing adaptive modification based on evolving team needs. Basin management utilizes dynamical systems theory that ensures attractor stability and accessibility, geometric analysis that optimizes basin size and influence regions, and adaptive algorithms that modify basin properties based on coordination effectiveness feedback and team development patterns.

The method proceeds to step 3190 with validating evolution success and updating health metrics through comprehensive assessment of geometric modification effectiveness and coordination improvement measurement. Evolution validation compares coordination performance before and after manifold modification, evaluates mathematical stability and computational efficiency of evolved geometric structure, and assesses team satisfaction and coordination effectiveness improvements resulting from geometric evolution. Health metric updates maintain historical records of manifold evolution including successful modification strategies, performance improvement measurements, and stability characteristics that inform future evolution decisions and optimization strategies, enabling continuous improvement through accumulated geometric optimization experience and coordination effectiveness analysis.

The method returns to step 3100 through continuous monitoring loop that maintains persistent manifold adaptation capability while incorporating lessons learned from evolution processes, enabling systematic improvement in geometric optimization strategies and coordination effectiveness through iterative refinement and accumulated team coordination experience. Continuous evolution ensures the manifold representation remains optimally configured for current team coordination requirements while adapting to changing team composition, evolving project needs, and improved understanding of effective coordination patterns through persistent geometric learning and mathematical optimization.

In an exemplary team coordination situation, monitoring reveals that team members consistently experience coordination difficulties in specific manifold regions where individual intent patterns frequently conflict, triggering evolution analysis that identifies suboptimal curvature distributions causing inefficient geodesic paths between complementary coordination strategies. Optimal deformation computation determines metric tensor modifications that smooth geometric transitions between conflicting intent areas while creating attractor basins around successful collaboration patterns, with geometric flow processes gradually implementing modifications over multiple coordination cycles. Stability validation confirms mathematical consistency of evolved geometry, while performance assessment demonstrates measurable improvement in coordination efficiency and team satisfaction, establishing evolved manifold structure as persistent geometric foundation for enhanced team coordination effectiveness and continued adaptive optimization based on ongoing team experience and coordination success patterns.

Figure 32:
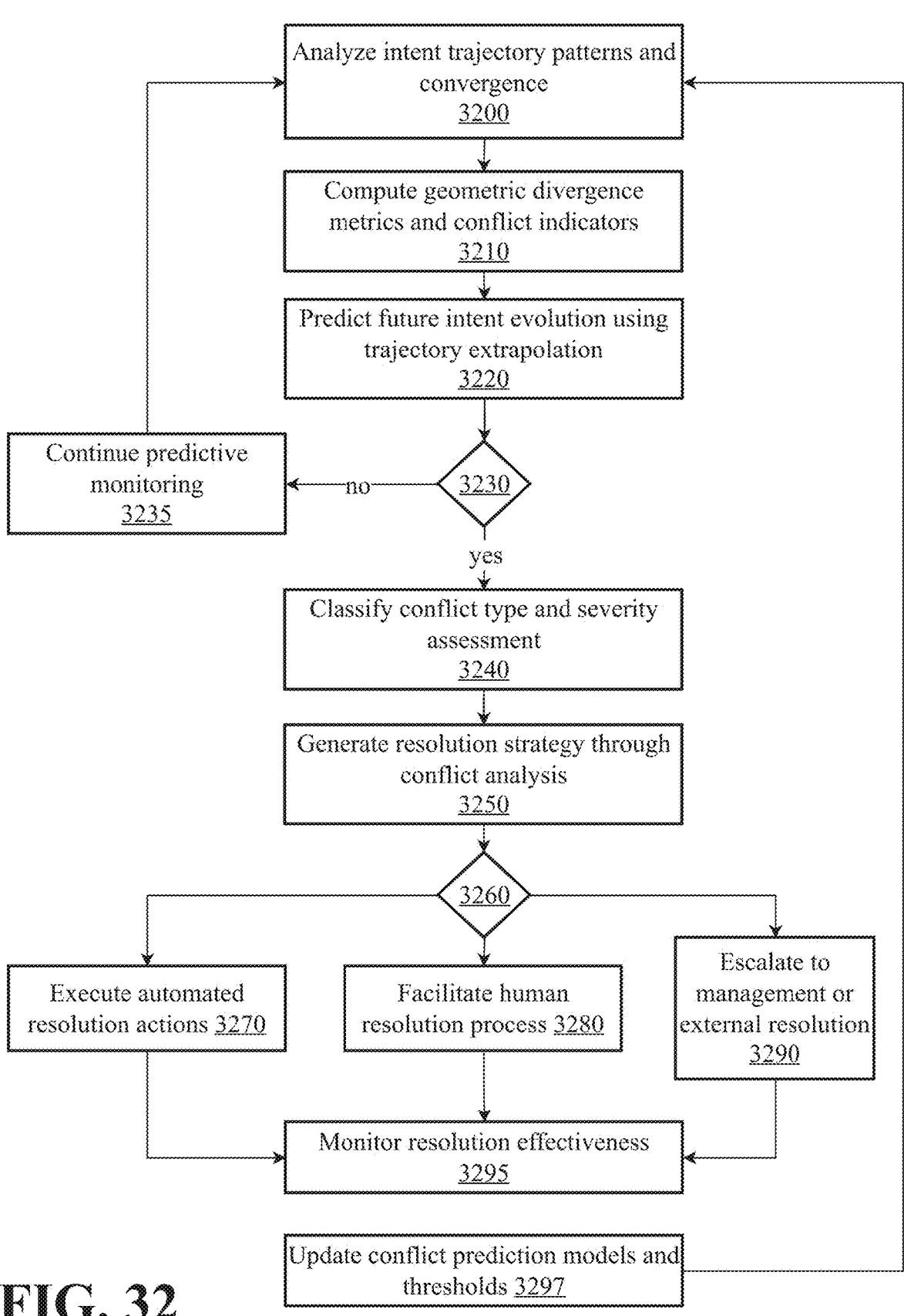
FIG. 32 is a flow diagram illustrating an exemplary method for proactive conflict detection and resolution, according to an embodiment.

FIG. 32 is a flow diagram illustrating an exemplary method for proactive conflict detection and resolution, according to an embodiment. This method demonstrates the predictive analysis processes that identify potential team coordination conflicts before they impact performance through geometric trajectory analysis, multi-level intervention strategies, and adaptive learning mechanisms that continuously improve conflict prediction accuracy and resolution effectiveness based on accumulated team coordination experience and outcome feedback.

According to the embodiment, the process begins at step 3200 with analyzing intent trajectory patterns and convergence, implementing comprehensive monitoring algorithms that track individual team member intent evolution through geometric space and identify patterns indicating potential coordination difficulties or objective misalignment. In some implementations, trajectory pattern analysis may utilize mathematical techniques including, but not limited to, vector field analysis that examines intent direction and magnitude changes over time, convergence assessment that measures whether individual intents are moving toward compatible coordination states, and stability evaluation that identifies intent patterns exhibiting excessive volatility or unpredictable behavior that may lead to coordination challenges. Intent evolution tracking implements temporal analysis algorithms that maintain historical trajectory records, trend identification that recognizes systematic changes in individual coordination behavior, and correlation analysis that identifies relationships between trajectory patterns and subsequent coordination outcomes, enabling predictive modeling based on geometric pattern recognition and accumulated coordination experience.

The method proceeds to step 3210 with computing geometric divergence metrics and conflict indicators through mathematical analysis of relationships between individual intent trajectories using manifold-aware distance calculations and geometric property assessment. Angular separation computation can measure directional differences between intent vectors through dot product calculations and inverse trigonometric functions that quantify alignment or divergence in team member objectives, with measurements compared against configurable thresholds that indicate increasing conflict potential based on geometric angle relationships. Geodesic distance analysis may calculate shortest paths between intent positions along the curved manifold surface using differential geometric techniques that account for local curvature properties and metric tensor variations, providing semantic distance measures that reflect conceptual separation between different team coordination approaches and identifying when intent positions exceed acceptable collaboration ranges.

Trajectory velocity difference assessment evaluates rates of change in individual intent evolution through derivative calculations that measure acceleration and deceleration patterns in intent modification, identifying situations where team members are changing objectives or priorities at incompatible rates that may lead to coordination misalignment. Conflict indicator computation combines multiple geometric metrics through weighted aggregation algorithms that consider angular separation, geodesic distance, and velocity divergence in unified conflict probability assessment, with indicator values providing quantitative measures of conflict likelihood suitable for automated decision-making and intervention threshold evaluation.

At step 3220, the method predicts future intent evolution using trajectory extrapolation through mathematical forecasting algorithms that project current intent patterns forward in time to identify potential coordination difficulties before they manifest in actual team performance degradation. Trajectory extrapolation utilizes numerical integration techniques including Runge-Kutta methods that solve differential equations governing intent evolution, polynomial extrapolation that fits mathematical curves to historical trajectory data and extends them into future time periods, and stochastic modeling that accounts for uncertainty in intent prediction through probabilistic analysis and confidence interval computation. Future state prediction implements multiple temporal horizons ranging from minutes for immediate conflict prevention to days or weeks for strategic coordination planning, with prediction accuracy validated through comparison with actual intent evolution and continuous model refinement based on prediction error analysis and outcome feedback.

At decision step 3230, the method evaluates whether potential conflicts have been detected through systematic assessment of geometric divergence metrics, trajectory extrapolation results, and conflict probability indicators against established threshold criteria. Conflict detection utilizes multi-criteria decision analysis that considers geometric separation measures, predicted trajectory collision points, and historical correlation patterns between similar geometric configurations and subsequent coordination difficulties. Detection thresholds implement adaptive algorithms that adjust sensitivity based on team coordination effectiveness, project criticality, and historical false positive rates, ensuring appropriate balance between early conflict detection and operational efficiency without excessive intervention in normal team coordination variability.

When no potential conflicts are detected, the method continues at step 3235 with ongoing predictive monitoring that maintains surveillance capabilities while optimizing computational resource utilization and avoiding unnecessary intervention in effective team coordination processes. Continuous monitoring implements efficient algorithms that maintain geometric analysis and trajectory prediction capabilities while adapting monitoring intensity based on team activity levels, coordination complexity, and historical conflict patterns, enabling persistent conflict prevention capabilities without compromising system performance or team operational efficiency.

When potential conflicts are detected, the method proceeds to step 3240 with classifying conflict types and conducting severity assessment through systematic analysis of geometric patterns, trajectory characteristics, and contextual factors that determine appropriate resolution strategies. Conflict classification identifies specific coordination challenges including resource competition where multiple team members require access to limited resources or capabilities, priority conflicts where individual objectives compete for attention or scheduling precedence, timeline misalignment where individual schedules or deadlines create coordination difficulties, and skill overlaps where multiple team members attempt to contribute in similar areas potentially creating redundancy or territorial disputes. Severity assessment evaluates conflict impact potential through analysis of geometric separation magnitude, predicted timeline for conflict manifestation, team member expertise and authority levels, and project criticality factors that determine intervention urgency and appropriate resolution approach selection.

The method continues to step 3250 with generating resolution strategies through conflict analysis matrix 2320, implementing systematic evaluation of available intervention approaches based on conflict classification, severity assessment, and team-specific coordination preferences. Resolution strategy generation utilizes optimization algorithms that identify intervention approaches most likely to resolve identified conflicts while minimizing disruption to effective team coordination patterns, considering factors including individual team member preferences and working styles, organizational policies and authority structures, resource availability and reallocation possibilities, and historical effectiveness of similar interventions in comparable conflict situations. Strategy options include task redistribution that optimizes work allocation based on individual expertise and capacity while reducing resource competition, communication facilitation that recommends specific discussion topics or meeting scheduling to address coordination misunderstandings, resource reallocation that adjusts access to shared resources based on priority analysis and timeline requirements, and timeline adjustment that modifies individual schedules or deadlines to eliminate scheduling conflicts and improve coordination efficiency.

At decision step 3260, the method selects appropriate intervention strategies based on conflict severity, team preferences, organizational policies, and available resolution mechanisms through multi-criteria evaluation that determines optimal intervention approaches. Intervention selection considers factors including conflict urgency and potential impact on team performance, team member authority levels and decision-making preferences, organizational culture and intervention policies, and availability of automated resolution mechanisms versus requirements for human involvement in conflict resolution processes. Strategy selection implements decision trees that systematically evaluate intervention options against established criteria, ensuring appropriate matching between conflict characteristics and resolution approaches while maintaining consistency with team coordination preferences and organizational operational guidelines.

When automated resolution is selected, the method proceeds to step 3270 with executing automated resolution actions through system-driven interventions that address identified conflicts without requiring direct human involvement or decision-making. Automated resolution utilizes algorithmic approaches including task reallocation algorithms that redistribute work assignments based on optimization criteria, resource scheduling systems that automatically adjust access to shared resources, notification systems that alert team members about potential conflicts with suggested resolution approaches, and workflow modification algorithms that adjust project timelines or dependencies to eliminate identified coordination difficulties. Automated interventions implement safety mechanisms that ensure resolution actions align with team preferences and organizational policies while providing audit trails that enable review and validation of automated resolution effectiveness.

When facilitated resolution is selected, the method proceeds to step 3280 with facilitating human resolution processes through system-supported mediation that provides team members with information, tools, and guidance for collaborative conflict resolution. Facilitated resolution utilizes recommendation systems that suggest specific discussion topics, meeting formats, or decision-making processes most likely to resolve identified conflicts, information sharing that provides team members with relevant data about conflict sources and potential resolution approaches, and structured communication tools that guide conflict resolution conversations while maintaining focus on coordination effectiveness rather than interpersonal issues. Human facilitation implements collaborative decision-making support that enables team members to evaluate resolution options while providing geometric analysis and outcome prediction that informs human decision-making with mathematical insights about coordination effectiveness and conflict resolution probability.

When escalation is required, the method proceeds to step 3290 with escalating conflicts to management or external resolution mechanisms when conflicts exceed team-level resolution capabilities or involve issues requiring organizational authority or external mediation. Escalation processes utilize structured reporting that provides management with comprehensive conflict analysis including geometric assessment, attempted resolution strategies, and recommended intervention approaches, ensuring efficient communication about coordination difficulties and appropriate context for management decision-making. External resolution may involve organizational mediation resources, project management intervention, or third-party conflict resolution services depending on conflict characteristics and organizational policies governing team coordination and conflict management procedures.

The method continues to step 3295 with monitoring resolution effectiveness and learning from outcomes through systematic assessment of intervention success and identification of improvement opportunities for future conflict prediction and resolution. Effectiveness monitoring evaluates resolution success through multiple metrics including conflict resolution time, team satisfaction with intervention approaches, coordination performance improvement following resolution, and absence of conflict recurrence in similar geometric configurations. Outcome learning implements machine learning algorithms that identify patterns in successful resolution strategies, correlate conflict characteristics with optimal intervention approaches, and update prediction models based on resolution effectiveness and team feedback about intervention quality and appropriateness.

At step 3297, the method updates conflict prediction models and thresholds through systematic refinement of detection algorithms, intervention selection criteria, and threshold parameters based on accumulated experience and resolution outcome analysis. Model updates utilize statistical analysis of prediction accuracy including false positive and false negative rates, resolution effectiveness correlation with conflict characteristics, and team-specific patterns that improve prediction accuracy for particular coordination contexts. Threshold adjustment implements adaptive algorithms that optimize conflict detection sensitivity based on team tolerance for intervention, project criticality requirements, and historical balance between early detection benefits and operational efficiency considerations, ensuring continuous improvement in conflict prevention effectiveness while maintaining appropriate operational balance.

The method returns to step 3200 through continuous monitoring loop that maintains persistent conflict prevention capabilities while incorporating lessons learned from resolution experiences, enabling systematic improvement in conflict prediction accuracy and resolution effectiveness through accumulated geometric analysis experience and team coordination pattern recognition. Continuous operation ensures proactive conflict prevention remains responsive to evolving team dynamics, changing project requirements, and improved understanding of effective coordination patterns through iterative refinement and adaptive optimization based on ongoing conflict resolution experience and team performance feedback.

In an exemplary team coordination situation, trajectory analysis detects increasing angular separation between two team members' intent vectors indicating divergent approaches to a shared project component, with geometric extrapolation predicting trajectory intersection in a high-conflict manifold region within the next day based on current evolution rates. Conflict classification identifies this as a priority conflict with medium severity, triggering generation of facilitated resolution strategy that recommends structured discussion focused on approach integration rather than selection. The system provides both team members with geometric visualization of their trajectory divergence and suggests specific compromise approaches that would result in convergent intent evolution, enabling proactive resolution through informed collaborative decision-making that prevents coordination disruption while maintaining individual expertise contributions and improving overall team coordination effectiveness through early intervention and mathematical insight-guided conflict prevention.

FIG. 33 is a flow diagram illustrating an exemplary method for cross-team learning and generalization, according to an embodiment. This method demonstrates the organizational intelligence processes that identify, abstract, and share successful coordination patterns across multiple teams while preserving privacy boundaries and enabling context-aware adaptation of proven coordination strategies to different team configurations, thereby facilitating collective organizational learning and coordination effectiveness improvement through systematic knowledge extraction and distribution mechanisms.

The method begins at step 3300 with monitoring team coordination success patterns and outcomes through comprehensive performance tracking systems that evaluate team effectiveness across multiple dimensions and identify coordination strategies demonstrating superior results. Success pattern monitoring implements performance metrics collection including task completion rates that measure team efficiency in achieving objectives, coordination effectiveness indicators that assess smoothness of collaboration and conflict resolution, team satisfaction measurements that evaluate member engagement and collaboration quality, and innovation metrics that quantify creative problem-solving and adaptive coordination capabilities. Outcome tracking utilizes statistical analysis techniques that correlate coordination approaches with performance results, temporal analysis that identifies patterns emerging over different time scales, and comparative assessment that benchmarks team performance against organizational baselines and similar team configurations, enabling systematic identification of coordination strategies producing measurably superior results suitable for organizational knowledge sharing and replication.

The method proceeds to step 3310 with identifying high-performance coordination strategies through systematic analysis of successful team behaviors, geometric patterns within team intent manifolds, and coordination approaches demonstrating consistent effectiveness across various contexts and challenges. Strategy identification utilizes pattern recognition algorithms that detect recurring coordination behaviors associated with superior performance outcomes, geometric analysis that identifies manifold structures and trajectory patterns corresponding to effective team coordination, and statistical correlation analysis that establishes relationships between specific coordination approaches and measurable performance improvements. High-performance strategy detection implements machine learning techniques including clustering algorithms that group similar successful coordination patterns, anomaly detection that identifies exceptionally effective coordination approaches, and feature extraction that isolates key elements contributing to coordination success, enabling systematic documentation of proven strategies suitable for abstraction and organizational sharing.

At decision step 3320, the method evaluates whether identified coordination patterns demonstrate sufficient value and generalizability to warrant extraction and sharing across the organization through systematic assessment of pattern effectiveness, applicability scope, and organizational benefit potential. Pattern value assessment considers factors including performance improvement magnitude achieved through specific coordination approaches, reproducibility across different team configurations and project contexts, scalability potential for application to larger or different team structures, and strategic alignment with organizational coordination objectives and cultural values. Sharing worthiness evaluation utilizes cost-benefit analysis that weighs abstraction and distribution efforts against potential organizational coordination improvements, uniqueness assessment that identifies novel or particularly effective coordination innovations, and impact projection that estimates potential benefits from organizational adoption of successful coordination strategies.

When coordination patterns are not deemed suitable for sharing, the method continues at step 3325 with ongoing pattern monitoring that maintains surveillance capabilities while optimizing resource allocation toward identification of higher-value coordination strategies. Continued monitoring implements efficient tracking algorithms that preserve computational resources while maintaining pattern recognition capabilities, threshold adjustment that refines criteria for identifying sharing-worthy coordination patterns, and historical analysis that learns from previous pattern evaluation decisions to improve future identification accuracy and organizational learning effectiveness.

When patterns are identified as valuable for sharing, the method proceeds to step 3330 with extracting generalizable patterns through geometric abstraction processes that preserve essential coordination structure while removing team-specific contextual details that could compromise privacy or limit applicability. Pattern extraction utilizes mathematical abstraction techniques that identify structural elements common to successful coordination approaches while eliminating team-specific variables including individual member identities, project-specific details, and organizational context particulars. Generalization processes implement dimensional reduction algorithms that preserve coordination-relevant pattern characteristics, invariant property identification that isolates coordination principles independent of specific team configurations, and structural pattern analysis that extracts mathematical relationships underlying successful coordination behaviors, enabling creation of abstract coordination templates applicable across diverse team contexts while maintaining essential effectiveness characteristics.

The method continues to step 3340 with applying privacy-preserving transformation and anonymization through comprehensive data protection mechanisms that ensure team-specific information remains confidential while preserving coordination pattern utility for organizational learning. Privacy transformation utilizes differential privacy techniques that inject calibrated noise to prevent individual or team identification while maintaining statistical utility for coordination analysis, k-anonymity methods that ensure abstracted patterns cannot be traced to specific teams or individuals, data minimization approaches that retain only coordination-relevant information while discarding potentially identifying details, and aggregation techniques that combine patterns from multiple sources to further obscure original team contexts. Anonymization processes implement mathematical transformation algorithms that modify pattern representations through coordinate system rotation, scaling operations, and statistical perturbation while preserving geometric relationships essential for coordination effectiveness, ensuring robust privacy protection without compromising organizational learning value.

At step 3350, the method stores abstracted patterns in organizational intent repository 2460 through systematic cataloging and indexing mechanisms that enable efficient pattern retrieval and similarity matching for future organizational learning applications. Repository storage implements structured data organization that facilitates pattern search and comparison, metadata management that captures pattern characteristics including effectiveness metrics, applicability contexts, and abstraction parameters, and version control systems that track pattern evolution and improvement over time. Storage mechanisms utilize efficient data structures that support geometric pattern matching, semantic search capabilities that enable context-based pattern retrieval, and scalability architectures that accommodate growing organizational knowledge bases while maintaining query performance and system responsiveness for real-time coordination support and organizational learning applications.

The method proceeds to step 3360 with enabling cross-team pattern matching and similarity search through sophisticated algorithms that identify relevant coordination strategies for teams facing similar challenges or seeking coordination improvement opportunities. Pattern matching utilizes geometric similarity calculations that compare team coordination requirements with available abstracted patterns, semantic analysis that evaluates contextual alignment between requesting teams and successful coordination strategies, and multi-criteria assessment that considers factors including team size, skill composition, project characteristics, and organizational constraints. Similarity search implements efficient algorithms including nearest neighbor computation in high-dimensional pattern spaces, clustering techniques that group related coordination challenges and solutions, and recommendation systems that proactively suggest relevant coordination patterns based on team characteristics and performance objectives, enabling targeted organizational learning that maximizes coordination improvement potential while minimizing implementation effort and resource requirements.

At decision step 3370, the method evaluates whether other teams have requested coordination pattern recommendations or learning support through systematic monitoring of organizational learning needs and proactive identification of coordination improvement opportunities. Pattern request detection utilizes multiple channels including explicit requests from teams seeking coordination guidance, automated identification of teams exhibiting coordination challenges that could benefit from proven strategies, performance monitoring that identifies teams with coordination effectiveness below organizational benchmarks, and predictive analysis that forecasts coordination improvement opportunities based on team development patterns and project requirements. Request evaluation implements priority assessment that considers team needs urgency, potential coordination improvement impact, and availability of relevant abstracted patterns suitable for team-specific adaptation and application.

When no pattern requests are identified, the method continues at step 3375 with waiting for learning requests while maintaining repository readiness and pattern availability for immediate organizational learning support. Request waiting implements efficient monitoring systems that detect coordination learning needs without consuming excessive computational resources, notification mechanisms that alert teams about relevant coordination pattern availability, and proactive assessment that identifies potential learning opportunities before teams explicitly request coordination support, ensuring responsive organizational learning capabilities while optimizing resource utilization and maintaining system performance for ongoing coordination support activities.

When pattern requests are identified, the method proceeds to step 3380 with adapting successful patterns to requesting team context through sophisticated customization algorithms that modify abstracted coordination strategies to align with specific team characteristics, constraints, and objectives. Pattern adaptation utilizes context mapping techniques that identify correspondences between abstracted pattern elements and requesting team coordination requirements, parameter adjustment algorithms that modify pattern characteristics including team size scaling, skill set alignment, and timeline adaptation, and structural modification procedures that adapt coordination frameworks to accommodate team-specific constraints including resource limitations, organizational hierarchy, and cultural factors. Adaptation processes implement optimization algorithms that maximize coordination effectiveness while respecting team constraints and preferences, validation mechanisms that ensure adapted patterns maintain mathematical consistency and coordination viability, and customization tracking that enables pattern refinement based on adaptation success and team feedback.

The method continues to step 3390 with delivering personalized coordination recommendations through comprehensive guidance systems that provide teams with actionable coordination strategies customized for their specific context and requirements. Recommendation delivery utilizes multiple communication channels including direct system integration that provides coordination suggestions within existing team collaboration tools, structured documentation that explains adapted coordination strategies with implementation guidance, and interactive training resources that help teams understand and adopt recommended coordination approaches. Delivery mechanisms implement personalization algorithms that adapt communication style and detail level to team preferences and expertise, progress tracking that monitors recommendation implementation and effectiveness, and support systems that provide ongoing guidance and troubleshooting assistance during coordination strategy adoption and refinement.

At step 3395, the method monitors adaptation success and updates learning models through systematic evaluation of coordination improvement outcomes and refinement of pattern abstraction, adaptation, and delivery mechanisms based on implementation results and team feedback. Success monitoring utilizes performance metrics that track coordination effectiveness improvements following recommendation implementation, satisfaction assessment that evaluates team reception and adoption of recommended coordination strategies, and longitudinal analysis that measures sustained coordination improvements over extended time periods. Learning model updates implement machine learning algorithms that improve pattern recognition accuracy based on success outcome correlation, adaptation algorithm refinement that enhances customization effectiveness through accumulated experience, and recommendation system optimization that improves delivery mechanisms and team engagement through iterative refinement based on adoption patterns and feedback analysis.

The method returns to step 3300 through continuous learning loop that maintains persistent organizational learning capabilities while incorporating insights from pattern adaptation experiences, enabling systematic improvement in coordination pattern identification, abstraction quality, and adaptation effectiveness through accumulated organizational learning experience and coordination success analysis. Continuous operation ensures organizational knowledge repository remains current with evolving coordination best practices while enabling increasingly sophisticated pattern recognition and adaptation capabilities that maximize organizational coordination effectiveness through systematic knowledge extraction, sharing, and application across diverse team contexts and coordination challenges.

In an exemplary organizational learning situation, monitoring identifies a software development team achieving exceptional coordination effectiveness through a novel integration of agile methodology with geometric intent alignment, resulting in completion times thirty percent faster than organizational average with higher quality outcomes and team satisfaction. Pattern extraction abstracts the structural elements including specific communication rhythms, decision-making protocols, and conflict resolution approaches while removing team-specific details such as individual names, project particulars, and technology choices. When a different development team requests coordination improvement guidance, the system adapts the abstracted pattern to accommodate the requesting team's larger size, different skill composition, and distinct project requirements, delivering customized recommendations that enable the second team to achieve similar coordination effectiveness improvements through systematic application of proven coordination principles adapted to their specific context and organizational environment.

Figure 34:
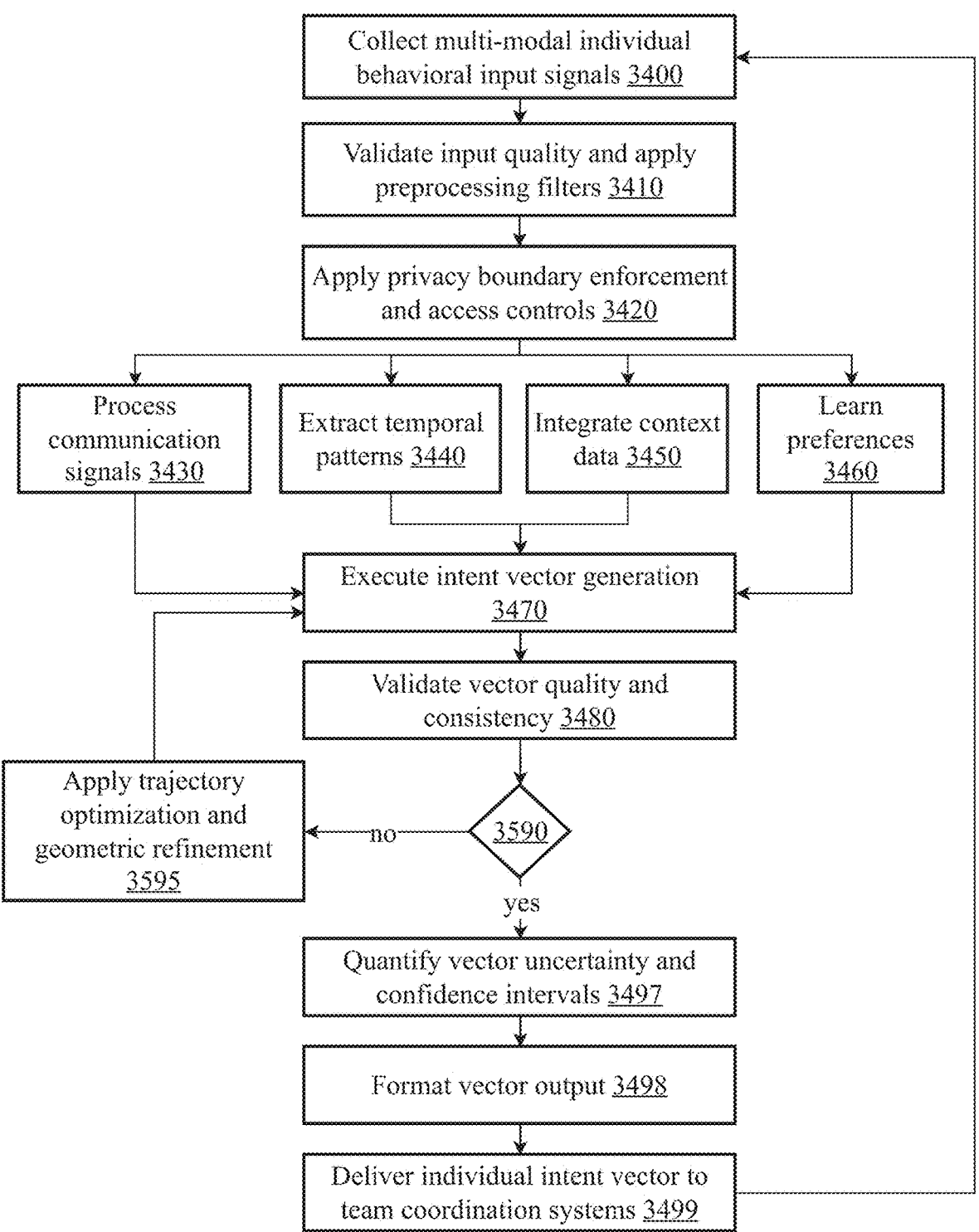
FIG. 34 is a flow diagram illustrating an exemplary method for individual intent vector generation, according to an embodiment.

FIG. 34 is a flow diagram illustrating an exemplary method for individual intent vector generation, according to an embodiment. This method demonstrates the comprehensive multi-modal processing mechanisms that transform diverse individual behavioral inputs into high-dimensional geometric representations suitable for team coordination analysis through privacy-preserving signal processing, quality-controlled vector synthesis, and adaptive learning algorithms that continuously improve intent representation accuracy based on coordination effectiveness feedback and individual behavioral pattern evolution.

According to an embodiment, the process begins at step 3400 with collecting multi-modal individual behavioral input signals through comprehensive data acquisition systems that gather diverse indicators of individual intent, preferences, and coordination patterns from multiple sources and modalities. Input signal collection encompasses communication data including, but not limited to, textual messages, email correspondence, voice recordings, and interaction logs that provide direct indicators of individual objectives and collaboration preferences, task activity information including completion patterns, priority selections, time allocation distributions, and work focus areas that reveal individual productivity rhythms and expertise concentrations, temporal behavioral patterns including daily activity cycles, response time characteristics, and engagement frequency variations that indicate individual coordination preferences and availability patterns, and contextual information including environmental factors, resource constraints, project deadlines, and organizational hierarchy influences that affect individual decision-making and coordination behavior. Data acquisition implements real-time collection protocols that minimize latency between behavioral events and intent analysis, temporal synchronization mechanisms that align inputs from different sources with consistent timestamps, and metadata capture that preserves essential contextual information including data source identification, confidence levels, and temporal validity periods necessary for accurate intent interpretation and vector generation.

The method proceeds to step 3410 with validating input quality and applying preprocessing filters through systematic data verification and preparation procedures that ensure signal integrity and suitability for geometric intent analysis. In some embodiments, input validation implements data quality assessment including completeness verification that identifies missing or corrupted data elements, consistency checking that detects contradictory information across different input sources, range validation that ensures numerical values fall within expected bounds preventing mathematical instabilities, and temporal coherence analysis that identifies implausible timing relationships or sequence violations.

Preprocessing filters apply data cleaning techniques including noise reduction algorithms that eliminate measurement artifacts and irrelevant signal components, outlier detection and handling procedures that identify and appropriately manage exceptional data points, normalization processes that standardize diverse input formats and scales for unified mathematical processing, and feature extraction algorithms that isolate coordination-relevant signal characteristics while discarding irrelevant information, ensuring optimal data quality for subsequent geometric processing and intent vector generation operations.

At step 3420, the method applies privacy boundary enforcement and access controls through privacy boundary enforcer 2640, implementing comprehensive data protection mechanisms that ensure individual behavioral information remains appropriately protected while enabling necessary coordination analysis. Privacy enforcement utilizes access control validation that verifies system and user permissions for accessing different categories of individual behavioral data, purpose-based restrictions that limit data usage according to specific coordination objectives and organizational policies, temporal access limitations that manage historical data availability and retention periods to protect individual privacy evolution, and audit trail generation that maintains detailed logs of all data access and processing activities for compliance monitoring and security verification. Data filtering applies privacy-preserving transformations including sensitivity-based redaction that removes or obscures personally identifying information, aggregation techniques that combine individual data with similar patterns to reduce identification risk, and differential privacy mechanisms that inject calibrated noise to prevent individual identification while preserving statistical utility for coordination analysis, ensuring individual privacy protection while maintaining data utility necessary for effective intent vector generation and team coordination support.

The method continues with parallel processing through multiple specialized channels that simultaneously analyze different aspects of individual behavioral signals through dedicated processing systems optimized for specific signal types and analysis requirements. At step 3430, communication signal processing through multi-modal signal processor 2600 implements natural language processing techniques including, but not limited to, sentiment analysis that extracts emotional indicators and satisfaction levels from textual communications, intent extraction algorithms that identify explicit goals and objectives from conversation content, topic modeling that categorizes communication themes and subject matter focus areas, and discourse analysis that recognizes communication patterns, collaboration styles, and interpersonal interaction preferences. Communication analysis utilizes machine learning algorithms including transformer-based language models for semantic understanding, named entity recognition for extracting relevant coordination topics, and conversation flow analysis for identifying communication effectiveness patterns, generating semantic features suitable for geometric encoding and intent vector construction.

At step 3440, temporal pattern extraction through temporal pattern extractor 2610 analyzes time-dependent behavioral characteristics including activity rhythm identification that recognizes individual productivity cycles and peak performance periods, sequence pattern analysis that identifies recurring behavioral patterns and task execution strategies, periodicity detection that discovers regular timing patterns in individual coordination behavior, and temporal correlation analysis that identifies relationships between different behavioral activities and time-based coordination preferences. Temporal analysis implements signal processing techniques including Fourier analysis for frequency domain pattern recognition, autocorrelation functions for identifying periodic behaviors, change point detection for recognizing significant shifts in behavioral patterns, and time series modeling for capturing temporal dependencies and trends, generating temporal features that capture individual coordination timing preferences and behavioral predictability patterns.

At step 3450, context integration through context integration engine 2620 processes environmental and situational information including situational analysis that evaluates how external factors influence individual behavior and coordination preferences, environmental factor assessment that considers workspace conditions, resource availability, and organizational constraints, deadline impact analysis that quantifies how time pressures affect individual coordination behavior, and social context evaluation that assesses how team composition and interpersonal relationships influence individual coordination patterns. Context processing utilizes contextual embedding techniques that encode environmental factors into geometric representations compatible with intent vector spaces, influence modeling algorithms that quantify how different contextual factors affect individual behavioral patterns, and contextual adaptation mechanisms that adjust intent interpretation based on situational circumstances, generating contextual features that enable accurate intent representation across diverse coordination scenarios and environmental conditions.

At step 3460, preference learning through preference learning module 2630 implements adaptive algorithms that identify and model individual coordination preferences through pattern recognition techniques including collaborative filtering that identifies preferences based on behavioral similarity patterns, reinforcement learning that optimizes preference models based on coordination outcome feedback, unsupervised clustering that discovers latent preference categories and behavioral archetypes, and adaptive learning algorithms that continuously refine preference models based on evolving individual behavior and coordination effectiveness. Preference learning utilizes machine learning approaches including neural networks for complex preference pattern recognition, Bayesian methods for uncertainty quantification in preference estimation, and ensemble techniques that combine multiple preference modeling approaches for improved accuracy and robustness, generating preference features that capture individual coordination styles, collaboration preferences, and adaptive behavioral tendencies.

At step 3470, the method executes intent vector generation through intent vector generation engine 2650, implementing mathematical synthesis that combines multi-modal behavioral features into unified high-dimensional geometric representations suitable for manifold-based coordination analysis. Vector generation may utilize multi-dimensional encoding techniques that map behavioral features into coordinate systems with dimensionalities typically ranging from tens to hundreds of dimensions depending on behavioral complexity and coordination requirements, semantic relationship mapping that preserves meaningful connections between different behavioral categories and intent characteristics, geometric trajectory construction that creates continuous paths through intent space representing individual behavioral evolution over time, and real-time vector updates that maintain current intent representations through incremental modification algorithms that accommodate changing individual behavior while preserving mathematical consistency.

The method continues to step 3480 with validating vector quality and consistency through intent quality validator 2660, implementing comprehensive assessment of generated intent vectors including mathematical property verification, semantic coherence evaluation, and coordination utility assessment. Quality validation may examine vector magnitude bounds that ensure generated vectors maintain appropriate scale and normalization for geometric analysis, dimensional consistency that verifies vectors conform to expected coordinate system requirements, temporal stability that evaluates whether intent vectors maintain reasonable consistency over appropriate time periods, semantic coherence that assesses whether vector representations align with observed behavioral patterns and coordination preferences, geometric validity that ensures vectors satisfy mathematical requirements for manifold operations and similarity computations, and confidence measure generation that quantifies reliability and uncertainty associated with intent vector representations.

At decision step 3490, the method evaluates vector quality acceptability through systematic comparison of validation results against established quality criteria and performance thresholds. Quality assessment considers mathematical consistency requirements, semantic alignment with behavioral inputs, geometric compatibility with manifold operations, and coordination utility for downstream systems, with acceptance criteria balancing vector accuracy against computational efficiency and real-time performance requirements. Quality evaluation can utilize multi-criteria decision analysis that weighs different validation metrics according to coordination effectiveness requirements and system performance constraints.

When vector quality is insufficient, the method proceeds to step 3495 with applying trajectory optimization and geometric refinement through trajectory optimizer 2670, implementing mathematical correction procedures that improve vector quality while preserving essential behavioral information and geometric properties. Optimization applies path smoothing algorithms that eliminate noise and irregularities in geometric trajectories, geometric refinement procedures that enhance vector mathematical properties and manifold compatibility, constraint satisfaction techniques that ensure optimized vectors meet quality requirements while maintaining semantic fidelity, and iterative improvement algorithms that systematically enhance vector quality through multiple refinement cycles until acceptable performance is achieved.

When vector quality meets acceptance criteria, the method continues to step 3497 with quantifying vector uncertainty and confidence intervals through uncertainty quantifier 2680, implementing statistical analysis that provides reliability assessments for generated intent vectors. Uncertainty quantification utilizes confidence interval computation that provides probabilistic bounds on vector accuracy, uncertainty propagation analysis that tracks how input signal uncertainty affects vector reliability, ensemble methods that combine multiple vector generation approaches to assess consistency and reliability, and Bayesian inference techniques that provide principled uncertainty estimates based on available behavioral evidence and model confidence.

At step 3498, the method formats vector output for downstream systems through output format controller 2695, implementing data transformation and serialization procedures that ensure intent vectors can be efficiently transmitted and utilized by diverse coordination systems. Output formatting applies vector serialization that converts internal geometric representations into standardized data formats, protocol adaptation that handles different communication interfaces and data exchange requirements, metadata packaging that includes confidence measures, timestamp information, and processing provenance, and quality assurance that validates formatted output completeness and accuracy before delivery to downstream coordination systems.

The method proceeds to step 3499 with delivering individual intent vectors to team coordination systems including, for example, team intent orchestrator 2230 for aggregation and coordination analysis, federated profiles system 2220 for privacy-preserving profile management, team intent manifold 2250 for geometric integration, analytics systems for individual performance assessment, and privacy audit systems for compliance monitoring. Vector delivery implements reliable transmission protocols that ensure successful data transfer, format compatibility verification that confirms downstream systems can properly process delivered vectors, delivery confirmation mechanisms that track successful receipt and processing, and error handling procedures that manage delivery failures and provide alternative transmission pathways when necessary.

The method may also comprise monitoring performance and updates adaptation models through adaptation monitor 2690, implementing systematic evaluation of intent vector effectiveness and continuous improvement of vector generation algorithms based on coordination outcome feedback. Performance monitoring tracks vector accuracy through correlation analysis between intent predictions and actual individual behavior, coordination effectiveness assessment that evaluates how well intent vectors support team coordination analysis and decision-making, user satisfaction measurement that assesses individual acceptance and utility of coordination recommendations based on generated intent vectors, and system performance metrics including processing latency, resource utilization, and scalability characteristics. Model updates utilize machine learning algorithms that improve vector generation accuracy based on performance feedback, parameter optimization that enhances algorithm effectiveness through systematic tuning, and adaptive threshold adjustment that optimizes quality criteria based on coordination effectiveness and system performance trade-offs.

The method returns to step 3400 through continuous processing loop that maintains persistent intent vector generation capabilities while incorporating performance insights and behavioral pattern evolution, enabling systematic improvement in vector accuracy and coordination support effectiveness through accumulated individual behavioral analysis experience and continuous algorithm refinement based on coordination outcome feedback and individual preference learning.

In an exemplary individual processing situation, multimodal input collection gathers communication data showing increased technical discussion frequency, task activity patterns indicating focus on complex problem-solving activities, temporal patterns revealing shifted working hours toward collaboration-intensive periods, and contextual information reflecting project deadline pressure and resource constraints. Parallel processing extracts semantic indicators of technical leadership engagement, temporal patterns suggesting coordination willingness during high-pressure periods, and preference learning identifying increased collaboration seeking behavior. Intent vector generation synthesizes these features into a high-dimensional geometric representation encoding technical focus, collaboration readiness, and deadline-driven coordination preferences, with quality validation confirming mathematical consistency and uncertainty quantification providing confidence measures that enable downstream coordination systems to appropriately weight individual contributions and generate effective team coordination recommendations based on accurate individual intent understanding.

Hardware Architecture

Figure 35:
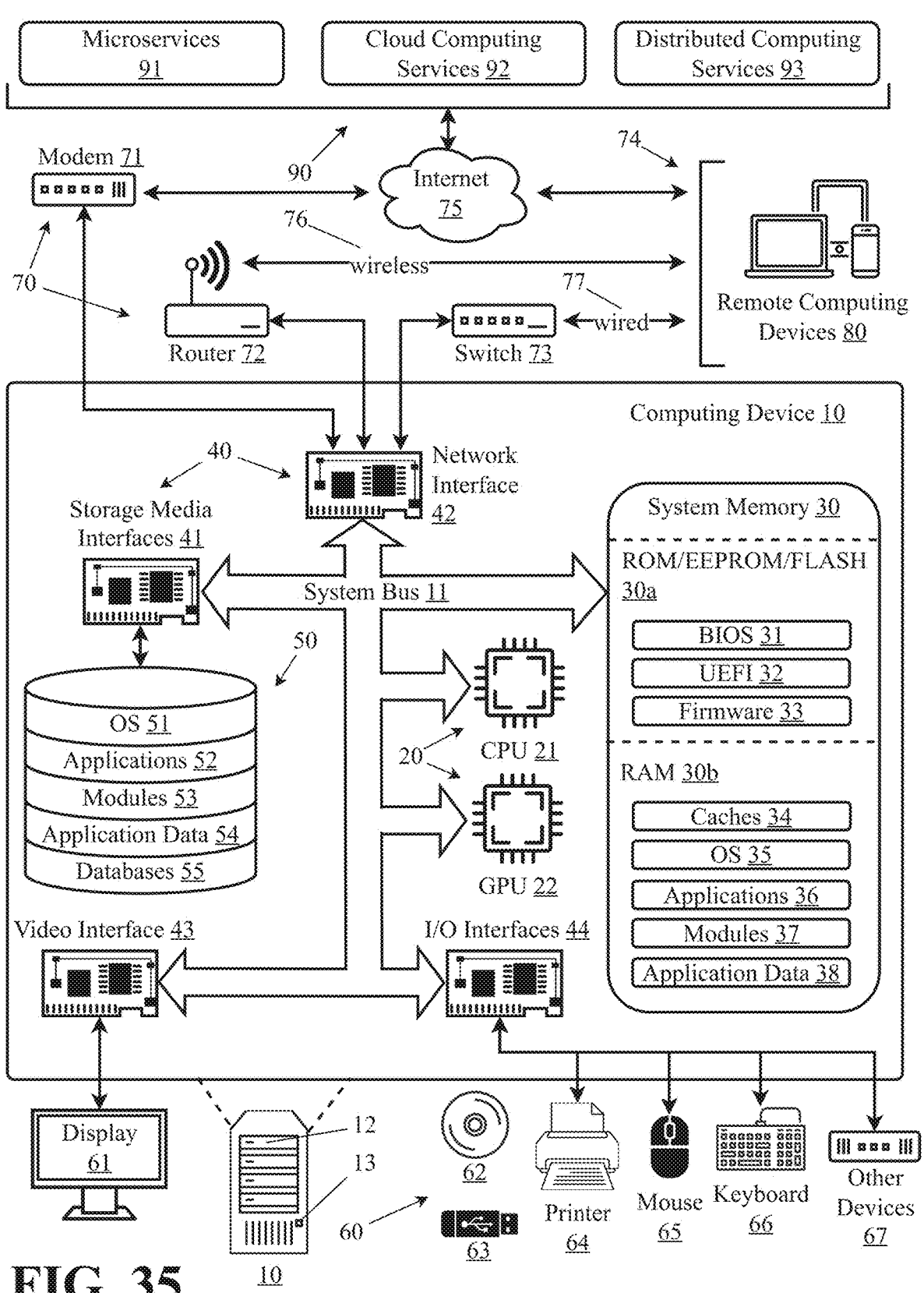
FIG. 35 illustrates an exemplary computing environment on which an embodiment described herein may be implemented.

FIG. 35 illustrates an exemplary computing environment on which an embodiment described herein may be implemented, in full or in part. This exemplary computing environment describes computer-related components and processes supporting enabling disclosure of computer-implemented embodiments. Inclusion in this exemplary computing environment of well-known processes and computer components, if any, is not a suggestion or admission that any embodiment is no more than an aggregation of such processes or components. Rather, implementation of an embodiment using processes and components described in this exemplary computing environment will involve programming or configuration of such processes and components resulting in a machine specially programmed or configured for such implementation. The exemplary computing environment described herein is only one example of such an environment and other configurations of the components and processes are possible, including other relationships between and among components, and/or absence of some processes or components described. Further, the exemplary computing environment described herein is not intended to suggest any limitation as to the scope of use or functionality of any embodiment implemented, in whole or in part, on components or processes described herein.

The exemplary computing environment described herein comprises a computing device 10 (further comprising a system bus 11, one or more processors 20, a system memory 30, one or more interfaces 40, one or more non-volatile data storage devices 50), external peripherals and accessories 60, external communication devices 70, remote computing devices 80, and cloud-based services 90.

System bus 11 couples the various system components, coordinating operation of and data transmission between those various system components. System bus 11 represents one or more of any type or combination of types of wired or wireless bus structures including, but not limited to, memory busses or memory controllers, point-to-point connections, switching fabrics, peripheral busses, accelerated graphics ports, and local busses using any of a variety of bus architectures. By way of example, such architectures include, but are not limited to, Industry Standard Architecture (ISA) busses, Micro Channel Architecture (MCA) busses, Enhanced ISA (EISA) busses, Video Electronics Standards Association (VESA) local busses, a Peripheral Component Interconnects (PCI) busses also known as a Mezzanine busses, or any selection of, or combination of, such busses. Depending on the specific physical implementation, one or more of the processors 20, system memory 30 and other components of the computing device 10 can be physically co-located or integrated into a single physical component, such as on a single chip. In such a case, some or all of system bus 11 can be electrical pathways within a single chip structure.

Computing device may further comprise externally-accessible data input and storage devices 12 such as compact disc read-only memory (CD-ROM) drives, digital versatile discs (DVD), or other optical disc storage for reading and/or writing optical discs 62; magnetic cassettes, magnetic tape, magnetic disk storage, or other magnetic storage devices; or any other medium which can be used to store the desired content and which can be accessed by the computing device 10. Computing device may further comprise externally-accessible data ports or connections 12 such as serial ports, parallel ports, universal serial bus (USB) ports, and infrared ports and/or transmitter/receivers. Computing device may further comprise hardware for wireless communication with external devices such as IEEE 1394 ("Firewire") interfaces, IEEE 802.11 wireless interfaces, BLUETOOTH® wireless interfaces, and so forth. Such ports and interfaces may be used to connect any number of external peripherals and accessories 60 such as visual displays, monitors, and touch-sensitive screens 61, USB solid state memory data storage drives (commonly known as "flash drives" or "thumb drives") 63, printers 64, pointers and manipulators such as mice 65, keyboards 66, and other devices 67 such as joysticks and gaming pads, touchpads, additional displays and monitors, and external hard drives (whether solid state or disc-based), microphones, speakers, cameras, and optical scanners.

Processors 20 are logic circuitry capable of receiving programming instructions and processing (or executing) those instructions to perform computer operations such as retrieving data, storing data, and performing mathematical calculations. Processors 20 are not limited by the materials from which they are formed or the processing mechanisms employed therein, but are typically comprised of semiconductor materials into which many transistors are formed together into logic gates on a chip (i.e., an integrated circuit or IC). The term processor includes any device capable of receiving and processing instructions including, but not limited to, processors operating on the basis of quantum computing, optical computing, mechanical computing (e.g., using nanotechnology entities to transfer data), and so forth. Depending on configuration, computing device 10 may comprise more than one processor. For example, computing device 10 may comprise one or more central processing units (CPUs) 21, each of which itself has multiple processors or multiple processing cores, each capable of independently or semi-independently processing programming instructions based on technologies like complex instruction set computer (CISC) or reduced instruction set computer (RISC). Further, computing device 10 may comprise one or more specialized processors such as a graphics processing unit (GPU) 22 configured to accelerate processing of computer graphics and images via a large array of specialized processing cores arranged in parallel. Further computing device 10 may be comprised of one or more specialized processes such as Intelligent Processing Units, field-programmable gate arrays or application-specific integrated circuits for specific tasks or types of tasks. The term processor may further include: neural processing units (NPUs) or neural computing units optimized for machine learning and artificial intelligence workloads using specialized architectures and data paths; tensor processing units (TPUs) designed to efficiently perform matrix multiplication and convolution operations used heavily in neural networks and deep learning applications; application-specific integrated circuits (ASICs) implementing custom logic for domain-specific tasks; application-specific instruction set processors (ASIPs) with instruction sets tailored for particular applications; field-programmable gate arrays (FPGAs) providing reconfigurable logic fabric that can be customized for specific processing tasks; processors operating on emerging computing paradigms such as quantum computing, optical computing, mechanical computing (e.g., using nanotechnology entities to transfer data), and so forth. Depending on configuration, computing device 10 may comprise one or more of any of the above types of processors in order to efficiently handle a variety of general purpose and specialized computing tasks. The specific processor configuration may be selected based on performance, power, cost, or other design constraints relevant to the intended application of computing device 10.

System memory 30 is processor-accessible data storage in the form of volatile and/or nonvolatile memory. System memory 30 may be either or both of two types: non-volatile memory and volatile memory. Non-volatile memory 30a is not erased when power to the memory is removed, and includes memory types such as read only memory (ROM), electronically-erasable programmable memory (EEPROM), and rewritable solid state memory (commonly known as "flash memory"). Non-volatile memory 30a is typically used for long-term storage of a basic input/output system (BIOS) 31, containing the basic instructions, typically loaded during computer startup, for transfer of information between components within computing device, or a unified extensible firmware interface (UEFI), which is a modern replacement for BIOS that supports larger hard drives, faster boot times, more security features, and provides native support for graphics and mouse cursors. Non-volatile memory 30a may also be used to store firmware comprising a complete operating system 35 and applications 36 for operating computer-controlled devices. The firmware approach is often used for purpose-specific computer-controlled devices such as appliances and Internet-of-Things (IoT) devices where processing power and data storage space is limited. Volatile memory 30b is erased when power to the memory is removed and is typically used for short-term storage of data for processing. Volatile memory 30b includes memory types such as random-access memory (RAM), and is normally the primary operating memory into which the operating system 35, applications 36, program modules 37, and application data 38 are loaded for execution by processors 20. Volatile memory 30b is generally faster than non-volatile memory 30a due to its electrical characteristics and is directly accessible to processors 20 for processing of instructions and data storage and retrieval. Volatile memory 30b may comprise one or more smaller cache memories which operate at a higher clock speed and are typically placed on the same IC as the processors to improve performance.

There are several types of computer memory, each with its own characteristics and use cases. System memory 30 may be configured in one or more of the several types described herein, including high bandwidth memory (HBM) and advanced packaging technologies like chip-on-wafer-on-substrate (CoWoS). Static random access memory (SRAM) provides fast, low-latency memory used for cache memory in processors, but is more expensive and consumes more power compared to dynamic random access memory (DRAM). SRAM retains data as long as power is supplied. DRAM is the main memory in most computer systems and is slower than SRAM but cheaper and more dense. DRAM requires periodic refresh to retain data. NAND flash is a type of non-volatile memory used for storage in solid state drives (SSDs) and mobile devices and provides high density and lower cost per bit compared to DRAM with the trade-off of slower write speeds and limited write endurance. HBM is an emerging memory technology that provides high bandwidth and low power consumption which stacks multiple DRAM dies vertically, connected by through-silicon vias (TSVs). HBM offers much higher bandwidth (up to 1 TB/s) compared to traditional DRAM and may be used in high-performance graphics cards, AI accelerators, and edge computing devices. Advanced packaging and CoWoS are technologies that enable the integration of multiple chips or dies into a single package. CoWoS is a 2.5D packaging technology that interconnects multiple dies side-by-side on a silicon interposer and allows for higher bandwidth, lower latency, and reduced power consumption compared to traditional PCB-based packaging. This technology enables the integration of heterogeneous dies (e.g., CPU, GPU, HBM) in a single package and may be used in high-performance computing, AI accelerators, and edge computing devices.

Interfaces 40 may include, but are not limited to, storage media interfaces 41, network interfaces 42, display interfaces 43, and input/output interfaces 44. Storage media interface 41 provides the necessary hardware interface for loading data from non-volatile data storage devices 50 into system memory 30 and storage data from system memory 30 to non-volatile data storage device 50. Network interface 42 provides the necessary hardware interface for computing device 10 to communicate with remote computing devices 80 and cloud-based services 90 via one or more external communication devices 70. Display interface 43 allows for connection of displays 61, monitors, touchscreens, and other visual input/output devices. Display interface 43 may include a graphics card for processing graphics-intensive calculations and for handling demanding display requirements. Typically, a graphics card includes a graphics processing unit (GPU) and video RAM (VRAM) to accelerate display of graphics. In some high-performance computing systems, multiple GPUs may be connected using NVLink bridges, which provide high-bandwidth, low-latency interconnects between GPUs. NVLink bridges enable faster data transfer between GPUs, allowing for more efficient parallel processing and improved performance in applications such as machine learning, scientific simulations, and graphics rendering. One or more input/output (I/O) interfaces 44 provide the necessary support for communications between computing device 10 and any external peripherals and accessories 60. For wireless communications, the necessary radio-frequency hardware and firmware may be connected to I/O interface 44 or may be integrated into I/O interface 44. Network interface 42 may support various communication standards and protocols, such as Ethernet and Small Form-Factor Pluggable (SFP). Ethernet is a widely used wired networking technology that enables local area network (LAN) communication. Ethernet interfaces typically use RJ45 connectors and support data rates ranging from 10 Mbps to 100 Gbps, with common speeds being 100 Mbps, 1 Gbps, 10 Gbps, 25 Gbps, 40 Gbps, and 100 Gbps. Ethernet is known for its reliability, low latency, and cost-effectiveness, making it a popular choice for home, office, and data center networks. SFP is a compact, hot-pluggable transceiver used for both telecommunication and data communications applications. SFP interfaces provide a modular and flexible solution for connecting network devices, such as switches and routers, to fiber optic or copper networking cables. SFP transceivers support various data rates, ranging from 100 Mbps to 100 Gbps, and can be easily replaced or upgraded without the need to replace the entire network interface card. This modularity allows for network scalability and adaptability to different network requirements and fiber types, such as single-mode or multi-mode fiber.

Non-volatile data storage devices 50 are typically used for long-term storage of data. Data on non-volatile data storage devices 50 is not erased when power to the non-volatile data storage devices 50 is removed. Non-volatile data storage devices 50 may be implemented using any technology for non-volatile storage of content including, but not limited to, CD-ROM drives, digital versatile discs (DVD), or other optical disc storage; magnetic cassettes, magnetic tape, magnetic disc storage, or other magnetic storage devices; solid state memory technologies such as EEPROM or flash memory; or other memory technology or any other medium which can be used to store data without requiring power to retain the data after it is written. Non-volatile data storage devices 50 may be non-removable from computing device 10 as in the case of internal hard drives, removable from computing device 10 as in the case of external USB hard drives, or a combination thereof, but computing device will typically comprise one or more internal, non-removable hard drives using either magnetic disc or solid state memory technology. Non-volatile data storage devices 50 may be implemented using various technologies, including hard disk drives (HDDs) and solid-state drives (SSDs). HDDs use spinning magnetic platters and read/write heads to store and retrieve data, while SSDs use NAND flash memory. SSDs offer faster read/write speeds, lower latency, and better durability due to the lack of moving parts, while HDDs typically provide higher storage capacities and lower cost per gigabyte. NAND flash memory comes in different types, such as Single-Level Cell (SLC), Multi-Level Cell (MLC), Triple-Level Cell (TLC), and Quad-Level Cell (QLC), each with trade-offs between performance, endurance, and cost. Storage devices connect to the computing device 10 through various interfaces, such as SATA, NVMe, and PCIe. SATA is the traditional interface for HDDs and SATA SSDs, while NVMe (Non-Volatile Memory Express) is a newer, high-performance protocol designed for SSDs connected via PCIe. PCIe SSDs offer the highest performance due to the direct connection to the PCIe bus, bypassing the limitations of the SATA interface. Other storage form factors include M.2 SSDs, which are compact storage devices that connect directly to the motherboard using the M.2 slot, supporting both SATA and NVMe interfaces. Additionally, technologies like Intel Optane memory combine 3D XPoint technology with NAND flash to provide high-performance storage and caching solutions. Non-volatile data storage devices 50 may be non-removable from computing device 10, as in the case of internal hard drives, removable from computing device 10, as in the case of external USB hard drives, or a combination thereof. However, computing devices will typically comprise one or more internal, non-removable hard drives using either magnetic disc or solid-state memory technology. Non-volatile data storage devices 50 may store any type of data including, but not limited to, an operating system 51 for providing low-level and mid-level functionality of computing device 10, applications 52 for providing high-level functionality of computing device 10, program modules 53 such as containerized programs or applications, or other modular content or modular programming, application data 54, and databases 55 such as relational databases, non-relational databases, object oriented databases, NoSQL databases, vector databases, knowledge graph databases, key-value databases, document oriented data stores, and graph databases.

Applications (also known as computer software or software applications) are sets of programming instructions designed to perform specific tasks or provide specific functionality on a computer or other computing devices. Applications are typically written in high-level programming languages such as C, C++, Scala, Erlang, GoLang, Java, Scala, Rust, and Python, which are then either interpreted at runtime or compiled into low-level, binary, processor-executable instructions operable on processors 20. Applications may be containerized so that they can be run on any computer hardware running any known operating system. Containerization of computer software is a method of packaging and deploying applications along with their operating system dependencies into self-contained, isolated units known as containers. Containers provide a lightweight and consistent runtime environment that allows applications to run reliably across different computing environments, such as development, testing, and production systems facilitated by specifications such as containerd.

The memories and non-volatile data storage devices described herein do not include communication media. Communication media are means of transmission of information such as modulated electromagnetic waves or modulated data signals configured to transmit, not store, information. By way of example, and not limitation, communication media includes wired communications such as sound signals transmitted to a speaker via a speaker wire, and wireless communications such as acoustic waves, radio frequency (RF) transmissions, infrared emissions, and other wireless media.

External communication devices 70 are devices that facilitate communications between computing device and either remote computing devices 80, or cloud-based services 90, or both. External communication devices 70 include, but are not limited to, data modems 71 which facilitate data transmission between computing device and the Internet 75 via a common carrier such as a telephone company or internet service provider (ISP), routers 72 which facilitate data transmission between computing device and other devices, and switches 73 which provide direct data communications between devices on a network or optical transmitters (e.g., lasers). Here, modem 71 is shown connecting computing device 10 to both remote computing devices 80 and cloud-based services 90 via the Internet 75. While modem 71, router 72, and switch 73 are shown here as being connected to network interface 42, many different network configurations using external communication devices 70 are possible. Using external communication devices 70, networks may be configured as local area networks (LANs) for a single location, building, or campus, wide area networks (WANs) comprising data networks that extend over a larger geographical area, and virtual private networks (VPNs) which can be of any size but connect computers via encrypted communications over public networks such as the Internet 75. As just one exemplary network configuration, network interface 42 may be connected to switch 73 which is connected to router 72 which is connected to modem 71 which provides access for computing device 10 to the Internet 75. Further, any combination of wired 77 or wireless 76 communications between and among computing device 10, external communication devices 70, remote computing devices 80, and cloud-based services 90 may be used. Remote computing devices 80, for example, may communicate with computing device through a variety of communication channels 74 such as through switch 73 via a wired 77 connection, through router 72 via a wireless connection 76, or through modem 71 via the Internet 75. Furthermore, while not shown here, other hardware that is specifically designed for servers or networking functions may be employed. For example, secure socket layer (SSL) acceleration cards can be used to offload SSL encryption computations, and transmission control protocol/internet protocol (TCP/IP) offload hardware and/or packet classifiers on network interfaces 42 may be installed and used at server devices or intermediate networking equipment (e.g., for deep packet inspection).

In a networked environment, certain components of computing device 10 may be fully or partially implemented on remote computing devices 80 or cloud-based services 90. Data stored in non-volatile data storage device 50 may be received from, shared with, duplicated on, or offloaded to a non-volatile data storage device on one or more remote computing devices 80 or in a cloud computing service 92. Processing by processors 20 may be received from, shared with, duplicated on, or offloaded to processors of one or more remote computing devices 80 or in a distributed computing service 93. By way of example, data may reside on a cloud computing service 92, but may be usable or otherwise accessible for use by computing device 10. Also, certain processing subtasks may be sent to a microservice 91 for processing with the result being transmitted to computing device 10 for incorporation into a larger processing task. Also, while components and processes of the exemplary computing environment are illustrated herein as discrete units (e.g., OS 51 being stored on non-volatile data storage device 51 and loaded into system memory 35 for use) such processes and components may reside or be processed at various times in different components of computing device 10, remote computing devices 80, and/or cloud-based services 90. Also, certain processing subtasks may be sent to a microservice 91 for processing with the result being transmitted to computing device 10 for incorporation into a larger processing task. Infrastructure as Code (IaaC) tools like Terraform can be used to manage and provision computing resources across multiple cloud providers or hyperscalers. This allows for workload balancing based on factors such as cost, performance, and availability. For example, Terraform can be used to automatically provision and scale resources on AWS spot instances during periods of high demand, such as for surge rendering tasks, to take advantage of lower costs while maintaining the required performance levels. In the context of rendering, tools like Blender can be used for object rendering of specific elements, such as a car, bike, or house. These elements can be approximated and roughed in using techniques like bounding box approximation or low-poly modeling to reduce the computational resources required for initial rendering passes. The rendered elements can then be integrated into the larger scene or environment as needed, with the option to replace the approximated elements with higher-fidelity models as the rendering process progresses.

In an implementation, the disclosed systems and methods may utilize, at least in part, containerization techniques to execute one or more processes and/or steps disclosed herein. Containerization is a lightweight and efficient virtualization technique that allows you to package and run applications and their dependencies in isolated environments called containers. One of the most popular containerization platforms is containerd, which is widely used in software development and deployment. Containerization, particularly with open-source technologies like containerd and container orchestration systems like Kubernetes, is a common approach for deploying and managing applications. Containers are created from images, which are lightweight, standalone, and executable packages that include application code, libraries, dependencies, and runtime. Images are often built from a containerfile or similar, which contains instructions for assembling the image. Containerfiles are configuration files that specify how to build a container image. Systems like Kubernetes natively support containerd as a container runtime. They include commands for installing dependencies, copying files, setting environment variables, and defining runtime configurations. Container images can be stored in repositories, which can be public or private. Organizations often set up private registries for security and version control using tools such as Harbor, JFrog Artifactory and Bintray, GitLab Container Registry, or other container registries. Containers can communicate with each other and the external world through networking. Container provides a default network namespace, but can be used with custom network plugins. Containers within the same network can communicate using container names or IP addresses.

Remote computing devices 80 are any computing devices not part of computing device 10. Remote computing devices 80 include, but are not limited to, personal computers, server computers, thin clients, thick clients, personal digital assistants (PDAs), mobile telephones, watches, tablet computers, laptop computers, multiprocessor systems, microprocessor based systems, set-top boxes, programmable consumer electronics, video game machines, game consoles, portable or handheld gaming units, network terminals, desktop personal computers (PCs), minicomputers, mainframe computers, network nodes, virtual reality or augmented reality devices and wearables, and distributed or multi-processing computing environments. While remote computing devices 80 are shown for clarity as being separate from cloud-based services 90, cloud-based services 90 are implemented on collections of networked remote computing devices 80.

Cloud-based services 90 are Internet-accessible services implemented on collections of networked remote computing devices 80. Cloud-based services are typically accessed via application programming interfaces (APIs) which are software interfaces which provide access to computing services within the cloud-based service via API calls, which are pre-defined protocols for requesting a computing service and receiving the results of that computing service. While cloud-based services may comprise any type of computer processing or storage, three common categories of cloud-based services 90 are serverless logic apps, microservices 91, cloud computing services 92, and distributed computing services 93.

Microservices 91 are collections of small, loosely coupled, and independently deployable computing services. Each microservice represents a specific computing functionality and runs as a separate process or container. Microservices promote the decomposition of complex applications into smaller, manageable services that can be developed, deployed, and scaled independently. These services communicate with each other through well-defined application programming interfaces (APIs), typically using lightweight protocols like HTTP, protobuffers, gRPC or message queues such as Kafka. Microservices 91 can be combined to perform more complex or distributed processing tasks. In an embodiment, Kubernetes clusters with containerized resources are used for operational packaging of system.

Cloud computing services 92 are delivery of computing resources and services over the Internet 75 from a remote location. Cloud computing services 92 provide additional computer hardware and storage on as-needed or subscription basis. Cloud computing services 92 can provide large amounts of scalable data storage, access to sophisticated software and powerful server-based processing, or entire computing infrastructures and platforms. For example, cloud computing services can provide virtualized computing resources such as virtual machines, storage, and networks, platforms for developing, running, and managing applications without the complexity of infrastructure management, and complete software applications over public or private networks or the Internet on a subscription or alternative licensing basis, or consumption or ad-hoc marketplace basis, or combination thereof.

Federated distributed computing services 93 provide large-scale processing using multiple interconnected computers or nodes to solve computational problems or perform tasks collectively. In federated distributed computing, the processing and storage capabilities of multiple machines are leveraged to work together as a unified system, even when different tiers or tessellations may have limited or even no visibility into the resources and processing layer up or downstream. Federated distributed computing services are designed to address problems that cannot be efficiently solved by a single computer or that require large-scale computational power and require dynamism and workload distribution for economic, security or privacy reasons not well supported by canonical distributed computing resources; e.g. most commonly cloud-based computing applications, resources or analytics. Federated DCG coordinated variants of these services enable superior decentralization and further enhance parallel processing, fault tolerance, and scalability by distributing tasks across multiple tiers or tessellations while enabling computing process dependency calculation with varying degrees of visibility, assurance and privacy or security based on constituent computing system, network, workload and user or provider needs and preferences as well as practical legal and regulatory concerns to include but not limited to data localization, national data transfer restrictions, privacy and consumer protections, wiretap/telecommunications monitoring requirements, encryption and data routing and intermediate processing restrictions.

Although described above as a physical device, computing device 10 can be a virtual computing device, in which case the functionality of the physical components herein described, such as processors 20, system memory 30, network interfaces 40, and other like components can be provided by computer-executable instructions. Such computer-executable instructions can execute on a single physical computing device, or can be distributed across multiple physical computing devices, including being distributed across multiple physical computing devices in a dynamic manner such that the specific, physical computing devices hosting such computer-executable instructions can dynamically change over time depending upon need and availability. In the situation where computing device 10 is a virtualized device, the underlying physical computing devices hosting such a virtualized computing device can, themselves, comprise physical components analogous to those described above, and operating in a like manner. Furthermore, virtual computing devices can be utilized in multiple layers with one virtual computing device executing within the construct of another virtual computing device. Thus, computing device 10 may be either a physical computing device or a virtualized computing device within which computer-executable instructions can be executed in a manner consistent with their execution by a physical computing device. Similarly, terms referring to physical components of the computing device, as utilized herein, mean either those physical components or virtualizations thereof performing the same or equivalent functions.

The skilled person will be aware of a range of possible modifications of the various aspects described above. Accordingly, the present invention is defined by the claims and their equivalents.

What is claimed is:

1. A computer system for geometric intent processing comprising a hardware memory and one or more processors, wherein the computer system is configured to execute software instructions stored on nontransitory machine-readable storage media that:

receive a plurality of multi-modal behavioral input signals from individual users and transform the behavioral input signals into high-dimensional geometric intent vectors through mathematical encoding algorithms that map semantic relationships to coordinate positions within a latent vector space;

implement geometric manifold operations including computing geodesic distances between intent vectors using Riemannian metric tensor calculations and determining curvature properties that quantify semantic density distributions across the latent vector space, wherein determining the curvature properties comprises evaluating Ricci curvature tensors at a plurality of manifold positions and identifying regions of semantic concentration that function as persistent attractor basins guiding subsequent intent-vector trajectory computation;

execute real-time geometric aggregation algorithms that combine individual intent vectors through weighted centroid calculations and manifold-aware interpolation operations while preserving geometric consistency constraints;

apply differential privacy transformations to geometric representations through calibrated noise injection while maintaining coordination utility through dimensional reduction algorithms that preserve essential semantic relationships;

generate predictive trajectory calculations by solving geodesic equations through numerical integration schemes to forecast intent evolution patterns and identify geometric divergence conditions indicating potential coordination conflicts, wherein generating the predictive trajectory calculations comprises solving a geodesic deviation equation through Jacobi field computations to quantify trajectory stability, and identifying potential coordination conflicts when computed deviation magnitude exceeds a configurable threshold; and update geometric manifold structure through controlled geometric flow processes that modify local curvature properties based on coordination effectiveness metrics while maintaining mathematical stability through constraint satisfaction algorithms, wherein updating the geometric manifold structure comprises applying a Ricci flow process that evolves a metric tensor field according to a curvature-driven differential equation modified by a coordination-effectiveness coupling term, and enforcing positive definiteness and bounded curvature constraints to prevent geometric singularities;

wherein the geometric processing operations enable computational performance improvements over conventional retrieval-based systems through continuous manifold traversal rather than iterative database queries, such that retrieval latency for relevant intent patterns remains substantially independent of the size of the maintained intent history.

2. The computer system of claim 1, wherein the high-dimensional geometric intent vectors comprise coordinate representations in Riemannian manifold space with time-evolving metric tensors that encode behavioral pattern strength through local curvature variations.

3. The computer system of claim 1, wherein the mathematical encoding algorithms comprise multi-modal signal processing that extracts semantic features from textual communications, temporal behavioral patterns, and contextual information through natural language processing and pattern recognition techniques.

4. The computer system of claim 1, wherein the geometric aggregation algorithms implement federated learning coordination that enables collective intelligence processing without exposing individual behavioral data through privacy-preserving geometric abstraction operations.

5. The computer system of claim 1, wherein the differential privacy transformations comprise k-anonymity techniques and coordinate system rotation operations that prevent individual identification while preserving geometric relationships necessary for coordination analysis.

6. The computer system of claim 1, wherein the geometric flow processes implement Ricci flow algorithms that evolve metric tensor properties according to curvature-driven differential equations while preserving manifold topology.

7. The computer system of claim 1, wherein the computer system is further configured to execute software instructions that maintain persistent geometric state across session boundaries through manifold geometry serialization and coordinate position restoration algorithms.

8. The computer system of claim 1, wherein the computer system is further configured to execute software instructions that generate coordination recommendations through geometric similarity calculations and pattern matching algorithms that identify optimal coordination strategies based on manifold trajectory analysis.

9. The computer system of claim 1, wherein the geometric manifold operations comprise attractor basin creation algorithms that establish stable coordination patterns as persistent geometric structures with curvature properties that guide future intent evolution toward effective coordination states.

10. A method for geometric intent processing comprising:

receiving a plurality of multi-modal behavioral input signals from individual users and transforming the behavioral input signals into high-dimensional geometric intent vectors through mathematical encoding algorithms that map semantic relationships to coordinate positions within a latent vector space;

implementing geometric manifold operations including computing geodesic distances between intent vectors using Riemannian metric tensor calculations and determining curvature properties that quantify semantic density distributions across the latent vector space, wherein determining the curvature properties comprises evaluating Ricci curvature tensors at a plurality of manifold positions and identifying regions of semantic concentration that function as persistent attractor basins guiding subsequent intent-vector trajectory computation;

executing real-time geometric aggregation algorithms that combine individual intent vectors through weighted centroid calculations and manifold-aware interpolation operations while preserving geometric consistency constraints;

applying differential privacy transformations to geometric representations through calibrated noise injection while maintaining coordination utility through dimensional reduction algorithms that preserve essential semantic relationships;

generating predictive trajectory calculations by solving geodesic equations through numerical integration schemes to forecast intent evolution patterns and identify geometric divergence conditions indicating potential coordination conflicts, wherein generating the predictive trajectory calculations comprises solving a geodesic deviation equation through Jacobi field computations to quantify trajectory stability, and identifying potential coordination conflicts when computed deviation magnitude exceeds a configurable threshold; and updating geometric manifold structure through controlled geometric flow processes that modify local curvature properties based on coordination effectiveness metrics while maintaining mathematical stability through constraint satisfaction algorithms, wherein updating the geometric manifold structure comprises applying a Ricci flow process that evolves a metric tensor field according to a curvature-driven differential equation modified by a coordination-effectiveness coupling term, and enforcing positive definiteness and bounded curvature constraints to prevent geometric singularities;

wherein the geometric processing operations enable computational performance improvements over conventional retrieval-based systems through continuous manifold traversal rather than iterative database queries, such that retrieval latency for relevant intent patterns remains substantially independent of the size of the maintained intent history.

11. The method of claim 10, wherein the high-dimensional geometric intent vectors comprise coordinate representations in Riemannian manifold space with time-evolving metric tensors that encode behavioral pattern strength through local curvature variations.

12. The method of claim 10, wherein the mathematical encoding algorithms comprise multi-modal signal processing that extracts semantic features from textual communications, temporal behavioral patterns, and contextual information through natural language processing and pattern recognition techniques.

13. The method of claim 10, wherein the geometric aggregation algorithms implement federated learning coordination that enables collective intelligence processing without exposing individual behavioral data through privacy-preserving geometric abstraction operations.

14. The method of claim 10, wherein the differential privacy transformations comprise k-anonymity techniques and coordinate system rotation operations that prevent individual identification while preserving geometric relationships necessary for coordination analysis.

15. The method of claim 10, further comprising maintaining persistent geometric state across session boundaries through manifold geometry serialization and coordinate position restoration algorithms.

16. The method of claim 10, further comprising generating coordination recommendations through geometric similarity calculations and pattern matching algorithms that identify optimal coordination strategies based on manifold trajectory analysis.

17. The method of claim 10, wherein the geometric manifold operations comprise attractor basin creation algorithms that establish stable coordination patterns as persistent geometric structures with curvature properties that guide future intent evolution toward effective coordination states.

* * * * *